United States Patent
Weber et al.

(10) Patent No.: US 6,178,409 B1
(45) Date of Patent: *Jan. 23, 2001

(54) SYSTEM, METHOD AND ARTICLE OF MANUFACTURE FOR MULTIPLE-ENTRY POINT VIRTUAL POINT OF SALE ARCHITECTURE

(75) Inventors: Jay C. Weber, Menlo Park; David A. Berger, San Mateo; Atul Arora, San Jose, all of CA (US)

(73) Assignee: VeriFone, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/672,346

(22) Filed: Jun. 17, 1996

(51) Int. Cl.$^7$ ............................... H04L 9/00; G06F 17/60
(52) U.S. Cl. ............................... 705/79; 705/26; 705/39; 705/76; 705/77; 705/40; 705/44; 380/255; 380/287; 713/150; 713/153; 713/155; 713/156; 713/168; 713/175
(58) Field of Search .................................. 705/26, 27, 1, 705/35, 39, 40, 44, 50, 64, 76, 77, 79; 380/9, 23, 24, 25, 30, 49, 50, 59, 255, 256, 257, 259, 277, 287; 713/150, 151, 153, 168–181, 200, 201, 202, 155–159

(56) References Cited

U.S. PATENT DOCUMENTS

| | | | |
|---|---|---|---|
| 3,956,615 | * | 5/1976 | Anderson et al. ............... 235/61.7 B |
| 4,277,837 | * | 7/1981 | Stuckert . |
| 4,303,904 | * | 12/1981 | Chasek . |
| 4,454,414 | * | 6/1984 | Benton ................................ 235/379 |
| 4,614,861 | | 9/1986 | Pavlov et al. ......................... 235/380 |
| 4,630,201 | | 12/1986 | White . |
| 4,689,478 | | 8/1987 | Hale et al. ........................... 235/380 |
| 4,766,293 | | 8/1988 | Boston ................................. 235/379 |
| 4,859,837 | | 8/1989 | Halpern ............................... 235/380 |
| 4,877,950 | | 10/1989 | Halpern ............................... 235/487 |
| 4,906,828 | * | 3/1990 | Halpern ............................... 235/379 |
| 4,935,962 | * | 6/1990 | Austin .................................. 380/25 |
| 4,968,873 | | 11/1990 | Dethloff et al. ...................... 235/380 |

(List continued on next page.)

FOREIGN PATENT DOCUMENTS

| | | |
|---|---|---|
| 0 172 670 A2 | 2/1986 | (EP) . |
| 0 256 768 A2 | * 2/1988 | (EP) . |
| 0 256 768 A3 | * 2/1988 | (EP) . |
| 0 363 122 A2 | 4/1990 | (EP) . |
| 0 363 122 A3 | 4/1990 | (EP) . |
| 0 256 768 B1 | * 3/1994 | (EP) . |
| 0 363 122 B1 | 12/1994 | (EP) . |
| WO 91/16691 | 10/1991 | (WO) . |
| WO 93/08545 | * 4/1993 | (WO) . |

OTHER PUBLICATIONS

Anderson, R.J., *UEPS —A Second Generation Electronic Wallet*, (1992) University of Cambridge Computer Laboratory, pp. 411–418.

Bank Systems Technology, *SET Tool Kit for Secure Commerce*, (May 1996) p. 16.

(List continued on next page.)

Primary Examiner—Bernarr E. Gregory

(57) ABSTRACT

A server communicates bidirectionally with a gateway over a first communication link, over which service requests flow to the server for one or more merchants and/or consumers. Service requests are associated with a particular merchant based on storefront visited by a consumer or credentials presented by a merchant. Service requests result in merchant specific transactions that are transmitted to the gateway for further processing on existing host applications.

24 Claims, 57 Drawing Sheets

U.S. PATENT DOCUMENTS

| | | | |
|---|---|---|---|
| 4,992,646 | * | 2/1991 | Collin .................................. 235/375 |
| 5,016,274 | * | 5/1991 | Micali et al. .......................... 380/23 |
| 5,030,806 | * | 7/1991 | Collin .................................. 235/375 |
| 5,175,416 | | 12/1992 | Mansvelt et al. ..................... 235/379 |
| 5,221,838 | | 6/1993 | Gutman et al. ....................... 235/379 |
| 5,420,405 | * | 5/1995 | Chasek .................................. 235/379 |
| 5,440,634 | * | 8/1995 | Jones et al. ............................ 380/24 |
| 5,448,045 | | 9/1995 | Clark .................................... 235/382 |
| 5,452,352 | | 9/1995 | Talton .................................. 379/355 |
| 5,453,601 | | 9/1995 | Rosen .................................. 235/379 |
| 5,455,407 | | 10/1995 | Rosen .................................. 235/380 |
| 5,459,304 | | 10/1995 | Eisenmann ........................... 235/380 |
| 5,465,291 | | 11/1995 | Barrus et al. .......................... 379/67 |
| 5,476,259 | | 12/1995 | Weingardt ............................. 273/85 |
| 5,478,993 | | 12/1995 | Derksen ............................... 235/380 |
| 5,485,510 | | 1/1996 | Colbert ................................. 379/145 |

OTHER PUBLICATIONS

Bellare et al., *iKP—A Family of Secure Electronic Payment Tools*, USENIX Association, First USENIX Workshop on Electronic Commerce, (Jul. 11–12, 1995) pp. 89–106.

Bryant, A., *Am I Bid Six?, Click to Bid Six!*, The New York Times, (Mar. 13, 1996) pp. D1–D6.

Camp et al., *Token and Notational Money in Electronic Commerce*, USENIX Association, First USENIX Workshop on Electronic Commerce, (Jul. 11–12, 1995), pp. 1–12.

Cox et al., *NetBill Security and Transaction Protocol*, USENIX Association, First USENIX Workshop on Electronic Commerce, (Jul. 11–12, 1995) pp. 77–88.

*One–Click Software Distribution Via the Web*, Curring Edge, Datamation, (May 1, 1996), p. 16.

*Software Taps Net for Supply Data Sharing*, Purchasing, EBN, (Apr. 22, 1996), p. 50.

Flohr, U., *Electronic Money*, Byte, (Jun. 1996), p. 74.

Gifford, et al., *Payment Switch for Open Networks*, USENIX Association, First USENIX Workshop on Electronic Commerce, (Jul. 11–12, 1995), pp. 69–75.

Gosling, et al., *The Java Language Environment a White Paper*, Sun Microsystems Computer Company, (May 1995).

Jones, et al., *Securing the World Wide Web*, Smart Tokens and Their Implementation, World Wide Web Journal, O'Reilly & Associates, Inc., (Dec. 11–14, 1995), pp. 397–409.

Kamens, J., *Retrofitting Network Security to Third–Party Applications—The SecureBase Experience*, USENIS Association, UNIX Security Symposium IV, (1993) pp. 41–57.

Marshall, M., *Banking on the Internet*, Communications Week, (May 20, 1996) No. 611.

Messmer, E., *ActiveX Pioneer Pushes a Commerce*, Network World, (May 6, 1996) p. 33.

Messmer, E., *Edify Soft to Let Banks Open Doors Online*, Network World, (May 20, 1996).

Messmer, E., *Start–Up Puts Security SOCKS on Window Apps*, Network World, (May 20, 1996).

*Microsoft and VeriFone Announce Agreement to Deliver Commerce–enabled Internet Retailing Solutions*, Microsoft Press Release, (Aug. 5, 1996) pp. 1–3.

*Real Security*, Mondex Magazine, (Summer 1996) pp. 5–6.

*What's Up Doc?, That's Infotainment*, Mondex Magazine, (Summer 1996) pp. 8–10.

*Ready to Go. The Trillion Yen Business*, Mondex Magazine, (Summer 1996) pp. 27–29.

Morgan, L., *Cashing In: The Rush is on to Make Net Commerce Happen*, Internet World, (Feb. 1995), pp. 48–51.

Nash, et al., *Vendors Deliver IS–Specific Apps Over the 'Net*, News (May 6, 1996) p. 16.

Nee, E., *Hatim Tyabji*, Upside, (Sep. 1996) pp. 85–93.

Neuman, et al., *Requirements for Network Payment: The NetCheque™ Perspective*, University of Southern California, (1995) pp. 32–36.

Ozer, K., *Online Software Stores*, PC Magazine, (May 28, 1996), p. 36.

Rodriguez, K., *Pushing the Envelope*, Communications Week, (May 13, 1996) pp. 37–39.

Rupley, S., *Digital Bucks? Stop Here*, PC Magazine, (May 28, 1996), pp. 54–60.

*One–Click Software Distribution Via the Web*, Curring Edge, Datamation, (May 1, 1996), p. 16.

Sibert et al., *The DigiBox: A Self–Protecting Container for Information Commerce*, First USENIX Workshop on Electronic Commerce, (Jul. 11–12, 1995), pp. 171–183.

Sirbu, et al., *NetBill: An Internet Commerce System Optimized for Network Delivered Services*, Carnegie Mellon University, (1995) pp. 20–25.

Sliwa, C., *Netscape Unveils New 'Net Commerce Offerings*, Network World, (May 13, 1996) p. 10.

Singleton, A., *Cash on the Wirehead*, Byte, (Jun. 1995) pp. 71–78.

Tang, et al., *A Set of Protocols for Micropayments in Distributed Systems*, First USENIX Workshop on Electronic Commerce, (Jul. 11–12, 1995) pp. 107–115.

Thompson, et al., *A Secure Public Network Access Mechanism*, UNIX Security Symposium, (1992) pp. 227–238.

Trommer, D., *ECS Catalog Merges EDI/Net Platforms: Enables Online Ordering in EDI Format Over Net*, EBN, (May 20, 1996) p. 54.

Trommer, D., *GE/Netscape Form Software Venture: Will Focus on Electronic Commerce Solutions*, EBN, (Apr. 22, 1996) p. 54.

Vaughan–Nichols, Steven, *XVision Turns a PC Into X Terminal for Unix, VMS Host*, Government Computer News, Jul. 8, 1996, pp. 38, 42.

Vincenzetti et al., *STEL: Secure TELnet*, 5th UNIX Security Symposium, Jun. 5–7, 1995.

Wexler, Joanie, *AT&T Sell Insurers on the Web*, Network World, May 20, 1996, p. 27.

Wiggins, Richard, *Business Browser: A Tool to Make Web Commerce Secure*, Internet World, Feb. 1995, pp. 52, 54, 55.

Yacobi, Yacov, *Efficient Electronic Money*, Official Gazette, Apr. 23, 1996, p. 2976.

Yee et al., *Secure Coprocessors in Electronic Commerce Applications*, First USENIX Workshop on Electronic Commerce, Jul. 11–12, 1995, pp. 155–169.

ABA Banking Journal, *Will SET Kill Card Fraud On the Internet?*, Apr. 1996, pp. 237–238.

Advertising Age, *Visa Turns To Redgate for Online, CD–ROM Work; Sample the Surf; Checkfree, Cybercash Interact; New on the 'Net; EDS Joins the Cyber–Rush*, Jul. 17, 1995, pp. 249–250.

AFX News, *Microsoft, American Express Unit Sign Internet Payment System Agreement*, Feb. 29, 1996, p. 427.

Agence France Presse, *Visa, Matercard Announce Security Standard for Internet*, Feb. 1, 1996, p. 85.

The American Banker, *Vendors Ready—and Waiting—for E–Commerce*, Feb. 2, 1996, pp. 47–50.

The American Banker, *News Analysis: Despite Accord, Hard Work Ahead On Security Standard for Internet*, Feb. 2, 1996, pp. 51–53.

The American Banker, *Microsoft Signs Visa as a Processor; Pact Gives Banks Alternative to Intuit*, Feb. 14, 1996, pp. 528–529.
The American Banker, *Two New On–Line Alliances Pair Niche Leaders*, Feb. 21, 1996, pp. 493–494.
The American Banker, *News Analysis: Beware of Deals Like Verifone–Oracle, Banks Told*, Feb. 27, 1996, pp. 443–445.
The American Banker, *Amex Accepts SET Protocol For Payments On Internet*, Mar. 1, 1996, pp. 382–383.
The American Banker, *Encryption Software Firm Adopts On–Line Protocol*, Mar. 14, 1996, p. 352.
The American Banker, *Frontiers*, Mar. 18, 1996, pp. 317–319.
The American Banker, *Card Briefs: Novus Supporting SET Payment Protocol*, Apr. 2, 1996, p. 235.
The American Banker, *If It Has To Do With Data Security, Changes Are This 'Little' Company Is in Involved*, Apr. 15, 1996, pp. 156–160.
The American Banker, *On the Question of Internet Security, A Three–Sided Debate*, Apr. 15, 1996, pp. 161–165.
The American Banker, *Web Security Firm To Add MC–Visa Protocol*, Apr. 23, 1996, pp. 130–131.
The American Banker, *Card Briefs: ICverify Internet Tools To Get SET Protocol*, May 3, 1996, p. 53.
The American Banker, *Mastercard Official Resigns To Lead Internet Security Firm*, May 3, 1996, p. 54–55.
American Marketplace, *Visa–Mastercard Security Agreement: A Green Light For Online Commerce*, Feb. 8, 1996, pp. 5–6.
Amusement Business, *More 'Digital Homeless' Find Place in Cyberspace; Professionals Not Subscribing To An Online Computer Service*, Feb. 12, 1996, pp. 536–537.
AP Online, *Cable TV's Sci–Fi Channel*, Jun. 9, 1995, pp. 259–261.
AP Online, *Purchases On Net Studied*, Jan. 31, 1996, pp. 171–172.
AP Online, *AP Top News At 5 a.m. EST Thursday, Feb. 1, 1996*, Feb. 1, 1996, pp. 86–88.
AP Online, *AP Top News At 6 a.m. EST Thursday, Feb. 1, 1996*, Feb. 1, 1996, pp. 89–91.
AP Online, *AP Top News At 7 a.m. EST Thursday, Feb. 1, 1996*, Feb. 1, 1996, pp. 92–94.
AP Online, *AP Top News At 8 a.m. EST Thursday, Feb. 1, 1996*, Feb. 1, 1996, pp. 95–97.
AP Online, *AP Top News At 9 a.m. EST Thursday, Feb. 1, 1996*, Feb. 1, 1996, pp. 115–117.
AP Online, *AP Financial News At 9:10 a.m. EST Thursday, Feb. 1, 1996*, Feb. 1, 1996, pp. 118–122.
AP Online, *AP Top News At 10 a.m. EST Thursday, Feb. 1, 1996*, Feb. 1, 1996, pp. 125–127.
AP Online, *Standard Found For Web Credit*, Feb. 1, 1996, pp. 123–124.
AP Online, *AP financial News At 11:10 a.m. EST Thursday, Feb. 1, 1996*, Feb. 1, 1996, pp. 107–110.
AP Online, *AP Financial News At 3:10 p.m. EST Thursday, Feb. 1, 1996*, Feb. 1, 1996, pp. 98–102.
AP Online, *AP Financial News At 5:10 p.m. EST Thursday, Feb. 1, 1996*, Feb. 1, 1996, pp. 103–106.
AP Online, *AP Financial News At 5:20 p.m. EST Thursday, Feb. 1, 1996*, Feb. 1, 1996, pp. 111–114.
AP Online, *Amer Express Backs Rival Ides*, Feb. 29, 1996, pp. 428–429.
AP Worldstream, *Financial Pages*, Feb. 1, 1996, pp. 128–129.
AP Worldstream, *Financial Pages*, Feb. 29, 1996, pp. 430–432.
AP Worldstream, *A Summary of News From the U.S. Virgin Islands*, May 25, 1995, pp. 265–268.
Asia, Inc., *Internet Security*, May 1996, pp. 64–66.
Asia, Inc., *Internet Security*, May 1996, pp. 67–69.
Asian Banker, *Shopping On the Internet*, Mar. 1996, pp. 384–388.
Asian Wall Street Journal, *Fraud, Nosy Web Pages Torment Internet Users*, Mar. 18, 1996, pp. 320.
Asiaweek, *Protocols, Cyber Security; How to Head Off the Hackers*, Feb. 23, 1996, pp. 489–490.
Associated Press, *Cable's Sci–Fi Channel Creates World Wide Web 'Home Page'*, Jun. 9, 1995, pp. 262–264.
Associated Press, *Visa and MasterCard Lead Group to Make Credit Purchases Safe On the Net*, Jan. 31, 1996, pp. 173–174.
Associated Press, *Visa, MasterCard Resolve Technical Differences For On–Line Credit Transactions*, Feb. 1, 1996, pp. 130–131.
Associated Press, *American Express Endorses Rivals' Ideal for Secure Online Credit*, Feb. 29, 1996, pp. 433–434.
Associated Press, *American–Express Endorses Rivals' Idea For Secure Online Credit*, Mar. 1, 1996, pp. 389–390.
Austin American–Statesman, *Standard Proposed For Electronic Verification*, Jul. 3, 1995, pp. 251–252.
Austin American–Statesman, *Credit Cards to GFet Internet Security; Visa, MasterCard Have Agreed On a Way to Scramble Card Numbers*, Feb. 2, 1996, pp. 45–46.
Baltimore Sun, *Sun Names former Reporter to lead Move Into Internet; Service Will offer News and Advertising*, Jan. 31, 1996, pp. 175–176.
Banker, *Banks Take Charge*, Mar. 1996, pp. 396–399.
Banker, *Product*, Mar. 1996, pp. 400–403.
Banker, *Technology, Banks Take Charge*, Mar. 1996, pp. 391–394.
Banker, *Visa and MasterCard Join Forces to Develop Standards*, Mar. 1996, p. 395.
Banker, *Credit Card Standards*, Apr. 1996, p. 239.
Banking Policy Report, *Visa and MasterCard Move to Safeguard Card Transactions on Internet*, Mar. 4–18, 1996, pp. 370–371.
Bank Systems & Technology, *First Union, Open Market Hit the Internet*, May 1995, pp. 269–270.
Black Sun Interactive, *3D PointWorld, Downloading, PointWorld*, Apr. 16, 1996, p. 1.
Business Journal–Portland, *Taking the Plunge Into On–Line Sales*, Feb. 9, 1996, pp. 2–4.
Business Times, *SNS Online Service Confident of Success*, Nov. 27, 1995.
Business Times, *Opening Windows to Net Security*, Mar. 6, 1996, pp. 362–363.
Business Times, *Card, IT Leaders Make Shopping On the Net Safer*, Apr. 2, 1996, p. 236.
Business Wire, *MasterCard International Goes Live On the Internet; New MasterCard World Wide Web Site Home Page Combines Utility and Imagination*, Mar. 27, 1995, pp. 294–296.
Business Wire, *Adobe and Netscape to Bring Commercial Publishing to the Internet*, Mar. 28, 1995, pp. 291–293.
Business Wire, *Emerging U.S. Debit Market Attracts International Player* Jul. 27, 1995, pp. 244–245.

Business Wire, *VeriSign Inc. to Provide Digital IDs for Open Market's Secure WebServer; Key Technology for Verifying the Identities of Parties in Electronic Commerce*, Aug. 14, 1995, pp. 241–243.

Business Wire, *ComNet '96 Explores Electronic Commerce; Business On the Internet the Focus of Many Conference Sessions*, Jan. 4, 1996, pp. 181–183.

Business Wire, *"Computer Within a Floppy Disk" Puts Secure Electronic Commerce In the Palm of Your Hand*, Jan. 17, 1996, pp. 179–180.

Business Wire, *RSA Data Secruity, Inc. Established Japanese Subsidiary Company to Market RSA Encryption Technology to Developers in Japan*, Feb. 8, 1996, pp. 7–8.

Business Wire, *VeriSign to Provide Digital ID Services for FTP Software's Esplanade (TM) Web Server for Windows NT; Alliance Will Ensure Secure Electronic Transactions for Users of New Web Servers*, Feb. 12, 1996, pp. 538–540.

Business Wire, *First Data and Netscape Offering Internet Payment Processing Service; New Service Available Now*, Feb. 20, 1996, pp. 500–501.

Business Wire, *RSA Announces Support for SET Payment Standard Across Entire Product Line; World's Most Popular Encryption Solution Provider Now Supports Visa/MasterCard Standard for Secure Payments Over the Internet*, Mar. 4, 1996, pp. 372–373.

Business Wire, *Certicom—Special Task Group to Review Secure Electronic Transaction Protocol Developed by Visa and MasterCard—Sherry E. Shannon Appointed Chair of the New Task Group*, Mar. 15, 1996, pp. 340–341.

Business Wire, *Panel of Electronic Commerce Experts to Reveal "What Gates and McNealy Won't Tell You About Electronic Commerce" —ICat Corp. Convenes Panel of Pioneers to Discuss the Hype and Reality at New York Trade Show*, Mar. 26, 1996, pp. 289–290.

Business Wire, *Major Flaws Seen in Visa/MasterCard Security Plan for Internet Commerce; Newtork Security Expert Says RSA Encryption and Authentication Standard Leaves Consumers Vulnerable to Hackers*, Apr. 16, 1996, pp. 154–155.

Business Wire, *ICVERIFY to Incorporate SET Specification in its Software Solutions; SET Specification Provides Long Awaited Internet Security for Both Customers and Merchants*, Apr. 26, 1996, pp. 125–126.

Business Wire, *John Gould Joins Terisa Systems As Chief Executive Officer*, Apr. 29, 1996, pp. 102–103.

Business Wire, *IBM Leads Industry With Comprehensive Strategy, Technologies for Electronic Commerce; Elecronic Shopping, Secure Transactions*, May 1, 1996, pp. 70–75.

Business Wire, *L.L. Bean Signs Up With IBM; IBM Announces New Products, Services that Make Internet Real for Business*, May 1, 1996, pp. 76–80.

Business Wire, *Electronic Commerce Just Got Real; NETCOM, Federal Express, Open Market and CheckFree Join iCat to Discuss Breakthrough Electronic Commerce Solution*, May 2, 1996, pp. 59–61.

Calgary Herald, *Visa and MasterCard Agree On Standard*, Feb. 2, 1996, pp. 54–55.

Calgary Herald, *'Net Security Hinders Commerce*, Apr. 4, 1996, pp. 228–229.

Canada Newswire, *Attention Business/Technology Editors: Special Task Group to Review Secure Electronic Transaction Protocol Developed by Visa and MasterCard*, Mar. 15, 1996, pp. 342–343.

CardFAX, *A Joint Technical Standard for Security Credit Card Transactions Over the Internet*, Feb. 2, 1996, p. 56.

Card News, *Security Advances May Improve, Not Perfect, On–Line Transactions*, Feb. 5, 1996, pp. 28–30.

Card News, *Amex, First Data Initiate On–Line Purchase Efforts*, Mar. 4, 1996, pp. 374–375.

Card News, *Card News Briefs: Discovery Joins Security Rush*, Apr. 1, 1996, p. 240.

Card News, *Cards on the Web Addressed*, Apr. 29, 1996, pp. 104–105.

Cards International, *VeriSign Secures Net Deals*, Jul. 20, 1995, pp. 246–247.

Cards International, *International:. MC and Visa Co–Operate On Internet Specs*, Feb. 14, 1996, 530–531.

Cards International, *Amex Set to Support Security Specs*, Mar. 12, 1996, pp. 356–357.

Charletston Gazette, *Secure Internet Credit Code Unveiled*, Feb. 2, 1996, pp. 57–59.

U.P.I., *Checkfree Partnering With Cybercash*, Jul. 19, 1995, p. 248.

Chicago Sun–Times, *Visa, MasterCard Agree On Online Security*, Feb. 2, 1996, pp. 60–61.

Christian Science Monitor, *Visa, MasterCard Tackle Internet Security*, Feb. 2, 1996, p. 80.

Columbus Dispatch, *Roving Bandits Make Buying Risky Business*, Nov. 6, 1994, p. 312–313.

Comline Daily News from Korea, *MasterCard, Visa Agree to a Single Security Standard*, Feb. 7, 1996, p. 11.

Communications News, *Business Banks Its Future On Electronic Commerce; Strategies Being Pursued for Secure Financial Transactions on the Internet; Netcomm Update; Industry Trend or EventCom*, Apr. 1996, pp. 241–243.

CommunicationsWeek, *MCI Offers Secure Transaction Service*, Oct. 2, 1995, pp. 229–230.

CommunicationsWeek, *In Brief; Charge it On the 'Net*, Feb. 5, 1996, p. 31.

CommunicationsWeek, *On–Line Payment Scheme Arrives*, Feb. 26, 1996, pp. 456–458.

CommunicationsWeek, *In Brief; Amex Set For Internet*, Mar. 4, 1996, p. 376.

CommunicationsWeek, *Safety On the 'Net Can Encryption Offer Peace of Mind to Nervous Network Managers*, Mar. 25, 1996, pp. 299–303.

CommunicationsWeek, *Tandem, VLSI Partner to Develop Security Chips for Commercial Use*, Apr. 15, 1996, pp. 166–167.

CommunicationsWeek, *Shop Till You Drop With the JEPI Standard*, Apr. 22, 1996, pp. 134–135.

CommunicationsWeek, *Terisa, to Add SET to Web Software*, Apr. 29, 1996, pp. 106–107.

CommunicationsWeek, *Netscape Adds Electronic–Commerce Apps*, May 13, 1996, pp. 10–11.

CommunicationsWeek, *Internet Security—A Moving Target*, May 13, 1996, pp. 12–15.

Computer Conference Analysis Newsletter, *UniForum; Conference On Unix and Open Systems With Focus On the Internet; Industry Trend or Event*, Feb. 26, 1996, pp. 459–479.

Computer Connection, *Telecomm Decency Act Draws Cheers, Jeers and Fears*, Feb. 10, 1996, pp. 549–557.

Computer Connection, *Internet Security Standards Agreement*, Feb. 10, 1996, pp. 558–559.

Computergram International, *Microsoft Confounded: Visa–MasterCard Spec Free*, Feb. 2, 1996, p. 62.

Computergram International, *First Data, Netscape Jointly Deliver First Real–Time On–Line Credit*, Apr. 11, 1996, p. 223.
Computer Reseller News, *Terisa Systems Enters Channel With Security Products*, Apr. 22, 1996, pp. 136–137.
Computer Shopper, *AT&T Offers Low–Tech Protection for Internet: No–Deductible Insurance for Online Buyers*, May, 1996, pp. 81–82.
Computer Technology Review, *Digital Signatures Keep Cyberstreets Safe for Shoppers*, Feb. 1996, pp. 132–134.
Computer Weekly, *Web Takes the Credit; Visa, MasterCard Join Forces to Develop Secure Payment Systems for Electronic Commerce; Company Business and Marketing*, Feb. 8, 1996, pp. 9–10.
Computerworld, *News Shorts*, Feb. 5, 1996, pp. 32–33.
Computerworld, *Microsoft Provides Rapid Net Deployment Ability*, Mar. 18, 1996, pp. 321–323.
Computerworld, *Briefs*, Mar. 18, 1996, p. 324.
Computerworld, *Predictions*, Apr. 29, 1996, pp. 108–110.
Computerworld, *Credit–Card Authorization Set For Net*, May 13, 1996, pp. 16–17.
Corporate EFT Report, *MasterCard, Visa to Combine Internet Security Standards*, Feb. 7, 1996, pp. 12–13.
Corporate EFT Report, *Products Could Spur On–Line Transactions*, Mar. 6, 1996, pp. 364–365.
Corporate EFT Report, *Amex Eyes Internet Security*, Mar. 6, 1996, p. 366.
Corporte EFT Report, *Corporate EFT Report News Briefs*, Apr. 3, 1996, pp. 230–231.
Credit Card Mmanagement, *Internet Commerce Gets A Boost*, Mar. 1996, pp. 404–405.
Credit Card News, *Electronic Commerce Gets a Boost*, Feb. 15, 1996, pp. 526–527.
Daily Mail, *Now Spending Cuts Are On the Cards; Money Mail*, Feb. 7, 1996, pp. 14–15.
Daily Telegraph, *Card Guard Makes It Safer to Cybershop*, Feb. 2, 1996, p. 63.
Daily Telegraph, *Innovations; Codes to Beat the Criminal Internet*, Feb. 13, 1996, pp. 534–535.
Datamation, *Microsoft Plays Interent Catch–U. Microsoft & the Enterprise: I–Nets; Company Business and Marketing; Cover Story*, Mar. 15, 1996, pp. 344–348.
Des Moines Register, *Safe Shopping On–Line; Card Associations Agree On Internet Security*, Feb. 17, 1996, pp. 520–522.
Digital Media, *Turning the Page; MCI Switches From News Corp to the Microsoft Network; Letter; Company Business and Marketing Column*, Mar. 12, 1996, pp. 358–360.
Discount Merchandiser, *Secure Electronic Transactions*, Mar. 1996, pp. 406–407.
DM News, *Open Market Offers Internet Security; Clients Can Get On the World Wide Web For Less Than $1,000*, Apr. 3, 1995, pp. 281–282.
DM News, *Mainstream Alternative For Advertisers; Business Wants to be Visible; Cybercitizens Want to Buy*, Feb. 12, 1996, pp. 543–545.
DM News, *Canadian Big Guns Set Sights On Skittish Cybershoppers; St. Remy Multimedia, Cogco Cable in Quadruple Play*, Feb. 19, 1996, pp. 506–508.
DM News, *IBM's Commercial Online Service Will Build DBs, Track Spending*, Feb. 19, 1996, pp. 509–510.
Denver Post, *On–Line Car Dealer Rings Up 57 Sales In Four Months*, Feb. 10, 1995, pp. 299–300.
dot.Com, *Internet Data's Payment Service*, Mar. 1, 1996, p. 408.
Edge: Work–Group Computing Report, *Digital ID: Verisign Inc. To Provide Digital IDS For Open Market's Secure Webserver; Key Technology For Verifying the Identifies of Parties In Electronic Commerce*, Aug. 21, 1995, pp. 236–237.
Edge: Work–Group Computing Report, *E–Commerce: IBM Leads Industry With Comprehensive Strategy, Technologies for Electronic Commerce; Electronic Shopping, Secure Transactions*, May 6, 1996, pp. 48–52.
EDI News, *MasterCard, Visa To Combine Internet Security Standards*, Feb. 19, 1996, pp. 511–512.
EDP Weekly, *Visa, MasterCard Announce Single Technical Standard To Safeguard Payment Card Purchases on Internet*, Feb. 12, 1996, p. 546.
EDP Weekly, *American Express To License Microsoft Software To Help Secure Transactions Via Internet*, Mar. 11, 1996, p. 361.
EDP Weekly, *ANSI Committee Creates Special Task Group To Review Secure Electronic Transaction Protocol*, Mar. 25, 1996, p. 304.
EDP Weekly, *Network Security Expert Notes Major Flaws in Visa/MasterCard Security Plan*, Apr. 22, 1996, p. 140.
EFT Report, *Service Variety Seen Key to Home Banking's Future*, Mar. 29, 1995, pp. 288–290.
EPT Report, *MasterCard, Visa To Combine Internet Security Standards*, Feb. 14, 1996, pp. 532–533.
Electronic Buyers' News, *EC Providers Take On Security—Visa, MC Announce Transaction Standard; GE Intros B–to–B Solution*, Feb. 12, 1996, pp. 547–548.
Electronic Buyers' News, *SET Controversy Flares Up—Insiders Debate Integrity Of Proposed Standard*, Apr. 29, 1996, pp. 113–115.
Electronic Engineering Times, *Credit–Card Firms Agree On Security*, Feb. 5, 1996, p. 34.
Electronic Engineering Times, *E–Cash Coming? Bank On It*, Feb. 19, 1996, pp. 513–516.
Electronic Engineering Times, *Secure Internet Transactions Seen*, Feb. 26, 1996, pp. 480–481.
Electronic Engineering Times, *Copyright Protection Moves Into Digital Age*, Mar. 18, 1996, pp. 325–327.
Electronic Engineering Times, *Form Factors Figures Into Security Debate*, Apr. 29, 1996, pp. 111–112.
Electronic Marketplace Report, *Visa, MasterCard Announce Standard For Securing Internet Transactions*, Feb. 6, 1996, pp. 17–18.
Electronic Messaging News, *Visa, MasterCard Combine Standards*, Feb. 7, 1996, p. 16.
Electronic Messaging News, *MasterCard, Visa In Internet Pact*, Feb. 26, 1996, p. 482.
Electronic Payments International, *Ingenico Buys Innovatron Data Systems*, Mar. 1996, pp. 409–410.
Electronic Payments International, *Getting All SET For On–Line Commerce*, Mar. 1996, pp. 411–412.
Electronic Payments International, *The Growing Impact of the Internet*, Mar. 1996, pp. 413–415.
Electronic Payments International, *Telefonica Makes the Right Calls Before SET*, Apr. 1996, pp. 244–245.
Electronic Payments International, *Consortium Explores Internet Payments*, Apr. 1996, pp. 246–247.
Electronic Payments International, *Telefonica Makes the Right Calls Before SET*, Apr. 1996, pp. 248–249.

Electronic Payments International, *Consortium Explores Internet Payments*, Apr. 1996, pp. 250–251.

Exchange, *Novell Expands Networked Application and Electronic Commerce Offerings*, Mar. 22, 1996, pp. 315–316.

Extel Examiner, *Microsoft, American Express Unit Sign Internet Payment System*, Feb. 29, 1996, p. 435.

FDCH Political Transcripts, *The National Consumers League Holds a News Conference on Combatting Fraud on the Internet*; Washington, D.C., Feb. 27, 1996, pp. 446–455.

Federal Document Clearing House Congressional Testimony, *Testimony Oct. 17, 1995 Eugene Ludwig Comptroller Office of the Comptroller of the Currency House Banking Financial Institutions and Consumer Credit Bank Consolidation and Interstate Mega–Mergers*, Oct. 17, 1995, pp. 214–226.

Federal News Service, *Prepared Testimony of Eugene A. Ludwig Controller of the Currency Before the House Committee on Banking and Financial Services Subcommittee on Financial Institutions*, Oct. 17, 1995, pp. 195–205.

Federal News Service, *Prepared Statement of Joel S. Lisker Senior Vice President, Security and Risk Management Mastercard International Incorporated Before the House Committee on Banking and Financial Services*, Apr. 15, 1996, pp. 168–172.

Federal News Service, *Hearing of the House Banking and Financial Services Committee*, Apr. 15, 1996, pp. 173–216.

Financial Post, *Reaching Out on the Electronic Highway*, Mar. 14, 1996, pp. 353–355.

Financial Post, *Race on to Come Up With Web Payment System*, Apr. 27, 1996, pp. 122–124.

Financial Times, *Credit Card Groups to Co–Operate on Internet Security*, Feb. 2, 1996, p. 64.

Fresno Bee, *Credit Firms Set Internet Security Code*, Feb. 2, 1996, p. 65.

Gazette (Montreal), *Digital Sermon Packs 'Em In: 1,100 From Business World listen Raptly to Technoguru's Generalities*, Apr. 18, 1996, pp. 149–151.

Gazette (Montreal), *Bell Global Has High Hopes for Business Network*, Apr. 19, 1996, pp. 147–148.

Houston Chronicle, *Firms Back Cyberspace Verification System*, Jun. 26, 1995, pp. 253–256.

Houston Chronicle, *Firms Back Cyberspace Verification System*, Jun. 26, 1995, pp. 255–256.

Independent, *In Brief: Amex and Microsoft Sign Internet Deal*, Mar. 1, 1996, p. 416.

Industry Week, *Move Over China, Caught In the Web*, May 1, 1995, p. 271.

Information & Interactive Services Report, *Microsoft, Wal–Mart Pact Aims for Online Bargain–Hunters*, Feb. 23, 1996, pp. 491–492.

InformationWeek, *Intranet Tools, E–Mail on the Net to Debut—Major Announcements Expected at Internet World, Electronic Messaging Association Conferences*, Apr. 22, 1996, pp. 142–143.

InformationWeek, *Cisco Places $4 Billion Network Bet—StrataCom Buy Seen Extending ATM, Tying Switching and Routing*, Apr. 29, 1996, pp. 116–117.

InformationWeek, *Netscape's Corporate Push Grows—CompuServe Tie–In Puts Groupware on Internet*, May 13, 1996, p. 27.

InformationWeek, *In Short; Terisa Names CEO*, May 13, 1996, p. 29.

InfoWorld, *National Semiconductor's PersonaCard; Card Holds Key to On–Line Security*, Nov. 14, 1994, pp. 310–311.

InfoWorld, *Standards; Adapt or Die: Internet Standards May Always Be In Flux*, Nov. 6, 1995, pp. 187–192.

InfoWorld, *At Deadline*, Feb. 5, 1996, pp. 35–36.

InfoWorld, *RSA Sale May Improve Security*, Apr. 22, 1996, p. 144.

InfoWorld, *Pipeline*, Apr. 22, 1996, p. 145.

InfoWorld, *Internet Servers; Netscape Antes Up for Commerce*, May 13, 1996, pp. 30–31.

InfoWorld, *IBM, HP Preview 'Net Products Aimed On–Line Commerce*, May 13, 1996, p. 33.

InfoWorld, *Web Page Authoring Tool; Internet Creator Builds Sites One Paragraph at a Time; No Need to Master HTML; Tool Enables On–Line Commerce*, May 13, 1996, pp. 35–37.

InformationWeek, *Europe*, Oct. 2, 1995, pp. 231–234.

Interactive Daily, 4. *Cyberspace Security Bolstered by Pact*, Feb. 2, 1996, p. 68.

Interactive Daily, 5. *Microsoft Allies With American Express*, Mar. 1, 1996, p. 417.

Interactive Marketing News, *Mastercard and Visa Reach Agreement on Security Protocols*, Feb. 16, 1996, pp. 523–524.

International Herald Tribune, *A Giant Leap for Credit Cards? System to Protect Payments on Internet is Unveiled*, Feb. 2, 1996, pp. 66–67.

Investor's Business Daily, *The Electronic Wallet: Secure Payment Methods Sought for Internet*, Dec. 8, 1994, pp. 305–307.

Investor's Business Daily, *CEO Briefing; A4*, Mar. 28, 1996, pp. 285–286.

Korea Economic Daily, *Mastercard, Visa Agree to a Single Security Standard*, Feb. 6, 1996, p. 19.

Los Angeles Times, *The Cutting Edge: Special Report/Hot Tips; What's Coming, When, and Whey It's a Big Deal; Next Year Could Bring Start Of On–Line Profits*, Dec. 18, 1994, pp. 303–304.

Los Angeles Times, *Technology*, Feb. 1, 1996, p. 139.

M2 Presswire, *Adobe and Netscape to bring Commercial Publishing to the Internet (C) 1994–1995 M2 Communications LTD*, Mar. 31, 1995, pp. 283–285.

M2 Presswire, *Verisign, Inc: VeriSign Inc to Provide Digital IDs for Open Market's Secure WebServer*, Aug. 16, 1995, pp. 238–240.

M2 Presswire, *Rednet: EDI for the Apple Macintosh and Power PC*, Oct. 24, 1995, pp. 193–194.

M2 Presswire, *Visa Intl: Security Specifications for Card Transactions on Internet Combined into One Standard*, Feb. 1, 1996, pp. 140–141.

M2 Presswire, *First Data: FD and Netscape Offering Internet Payment Processing Service New Service Available Now*, Feb. 21, 1996, pp. 495–496.

M2 Presswire, *Visa: Visa and MasterCard Welcome American Express to Their Internet Payment System*, Mar. 1, 1996, pp. 418–419.

M2 Presswire, *Credit Card Research Group: Cards to Make a Clean Sweep of the Cybermarket*, Mar. 1, 1996, pp. 420–421.

M2 Presswire, *Racal Airtech: Racal Supports the Visa/MasterCard Secure Electronics Transactions, (SET) Specification*, May 2, 1996, pp. 62–63.

Media Daily, *Microsoft, Visa00 Announce Specification to Secure Payments*, Sep. 27, 1995, p. 235.

Media Daily, *Mastercard and Visa Agree on Online Security Standard*, Feb. 1, 1996, p. 136.

Media Daily, *Netscape Launches Payment System*, May 13, 1996, p. 38.

Report on Microsoft, *News Briefs: Visa and Mastercard*, Apr. 22, 1996, p. 146.

Midrange Systems, *GEIS Aims to Stimulate EDI Growth*, Mar. 15, 1996, pp. 349–350.

Milwaukee Journal Sentinel, *U.S. Postal Service to Enter Electronic Age*, Mar. 4, 1996, pp. 379–380.

Multimedia & Videodisc Monitor, *Tools & Technology: Mastercard, Visa Agree on Encryption Technology*, Mar. 1, 1996, p. 422.

Multimedia Week, *Industry Briefs: Encryption*, Feb. 5, 1996, p. 39.

Nation's Restaurant News, *Amex, Microsoft Seal Security Agreement. American Express Travel Related Services Co. Signs Licensing Agreement With Microsoft Corp.; Brief Article*, Mar. 18, 1996, p. 328.

Nave Research Group, *Navigating and Acting in Virtual Environments*, May 16, 1996, pp. 1–9.

Network Briefing, *Visa & Mastercard Agree E–Payment Spec*, Feb. 16, 1996, p. 525.

Network Computing, *More Than One Way to Skin a Coded Cat*, Mar. 15, 1996, p. 351.

Network World, *Wells Fargo Hops Aboard 'Net Wagon*, Feb. 6, 1995, pp. 301–302.

Network World, *An Insecure Feeling Haunts the 'Net*, Feb. 12, 1996, pp. 541–542.

Network World, *Wal–Mart to Lure Electronic Shoppers With Web Retail Store*, Feb. 19, 1996, pp. 504–505.

Network World, *News Briefs*, Mar. 4, 1996, pp. 377–378.

Network World, *Security Specification Is Full of Holes, Critics Charge*, Apr. 22, 1996, pp. 138–139.

Network World, *ActiveX Pioneer Pushes Commerce*, May 6, 1996, pp. 46–47.

Network World, *Ready, SET, Go; American Express, MasterCard, and Visa Throw Their Combined Weight Behind the SET Payment Protocol for the Web; Merchants May Face a Learning Curve*, May 13, 1996, pp. 18–23.

Network World, *Effort Aims to Unite 'Net Payment Schemes*, May 13, 1996, p. 24.

Network World, *Netscape Unveils New 'Net Commerce Offerings*, May 13, 1996, pp. 25–26.

News, *Credit Card Fraud New Concern of Internet Business*, Mar. 16, 1996, pp. 329–330.

Newsbytes News Network, *France—Bull Forms Smart Card Subsidiary Apr. 13, 1995*, Apr. 13, 1995, pp. 274–275.

Newsbytes News Network, *Open Market Intros "Secure" Web Storefront Oct. 17, 1995*, Oct. 17, 1995, pp. 206–207.

Newsbytes News Network, *Newsbytes Daily Summary Oct. 17, 1995*, Oct. 17, 1995, pp. 208–213.

Newsbytes News Network, *Commerce Direct Offers Secure Electronic Transactions Jan. 22, 1996*, Jan. 22, 1996, pp. 177–178.

Newsbytes News Network, ★★★★*Visa, Mastercard Combine Internet Security Standards Feb. 02, 1996*, Feb. 2, 1996, pp. 71–72.

Newsbytes News Network, *GTE's CyberTrust For Web Electronic Commerce Feb. 06, 1996*, Feb. 6, 1996, pp. 20–21.

Newsbytes News Network, *AT&T WorldNet Spurs Online Credit Use Feb. 6, 1996*, Feb. 6, 1996, pp. 22–23.

Newsbytes News Network, *Open Market, Interleaf Team On Web "Secure Doc Mgt" Mar. 5, 1996*, Mar. 5, 1996, pp. 367–369.

Newsbytes, *Web Marketplace—Online Security Agreement Almost Here Apr. 10, 1996*, Apr. 10, 1996, pp. 224–225.

News Tribune, *Business Briefly*, Feb. 2, 1996, pp. 69–70.

New York Times, *A New Standard is Proposed for Electronic Verification*, Jun. 26, 1995, pp. 257–258.

New York Times, Plan to Guard Credit Safety on Internet, Feb. 1, 1996, pp. 142–143.

New York Times, *Jan. 28—Feb. 3; Attention, Cyber–Shoppers!*, Feb. 4, 1996, p. 40.

New York Times, *Dairy*, Feb. 4, 1996, pp. 41–43.

Nightly Business Report, Feb. 1, 1996, pp. 144–154.

Nightly Business Report, Feb. 1, 1996, pp. 150–154.

Orange County Register, *Life on the Line; Credit Where Credit is Due*, Mar. 31, 1996, pp. 283–284.

Orange County Register, *Bits and Pieces*, Apr. 7, 1996, pp. 226–227.

PC Magazine, *MasterCard and Visa Join Forces for Net Commerce; To Develop the Secure Electronic Transactions Technical Standard for Protecting Credit Card Purchases Made Over the Internet; Technology Information; Brief Article*, Mar. 26, 1996, pp. 291–292.

PC Magazine, *Skinny Client to Rule on Web; Corporate Intranets Will Fuel a New Breed of Applications; Industry Trend or Event; Brief Article*, Mar. 26, 1996, pp. 293–294.

PC Magazine, *MasterCard and Visa Join Forces for Net Commerce*, Mar. 26, 1996, pp. 295–296.

PC Magazine, *Skinny Clients to Rule on Web*, Mar. 26, 1996, pp. 297–298.

PC Magzine, *Digital Bucks? Stop Here; Electronic Commerce Services; The Web at War: The Battle for the Future of the Internet; Company Business and Marketing*, May 28, 1996, pp. 2–5.

PC Magazine, *Digital Bucks? Stop Here*, May 28, 1996, pp. 6–9.

PC User, *Shortlist; News Briefs*, Feb. 21, 1996, pp. 497–499.

PC Week, *Briefly Noted; News Briefs; Brief Article*, Feb. 5, 1996, pp. 37–38.

PC Week, *AT&T Ramps Up Internet Commerce, Access to WorldNet Service; Company Business and Marketing; Brief Article*, Feb. 19, 1996, p. 517.

PC Week, *Big Player; Deals to Speed Net Commerce; Netscape, Oracle, HP Cut Agreements for Credit–Card Systems, Security; Industry Trend or Event*, Feb. 26, 1996, pp. 483–484.

PC Week, *Microsoft Reposition MSN; Microsoft Network to Offer New Services; Online Service Information; Brief Article*, Feb. 26, 1996, pp. 485–486.

PC Week, *Microsoft Reposition MSN*, Feb. 26, 1996, pp. 487–488.

PC Week, *Briefly Noted; News Briefs; Brief Article*, Mar. 4, 1996, p. 381.

PC Week, *New Security Protocol Spurs Internet Took Kits; Secure Electronic Transaction, Industry Trend or Event*, Apr. 15, 1996, pp. 217–218.

PC Week, *New Security Protocol Spurs Internet Took Kits*, Apr. 15, 1996, pp. 219–220.

PC Week, *IBM Takes Charge of E–Commerce; Plans Client, Server Apps Based on SET; NetCommerce Electronic Commerce System; Product Announcement*, Apr. 29, 1996, pp. 118–119.

PC Week, *IBM Takes Charge of E–Commerce; Plans Client, Server Apps Based on SET*, Apr. 29, 1996, pp. 120–121.

Portland Press Herald, *L.L. Bean to Offer Ordering By Internet; It's a Bold Move for a Firm That's Usually Slow to Adopt New Technology*, May 2, 1996, pp. 56–58.

PR Newswire, *Bank One Joins Commercenet*, Oct. 17, 1994, pp. 314–315.

PR Newswire, *Rudolph Beware MCI to Offer Cyber–Santas a Faster Route to the Mall Via Mouse; MarketplaceMCI Opens Door to 25 Million New Customers; Integrated Software Package Assures Secure Electronic Transactions*, Nov. 22, 1996, pp. 308–309.

PR Newswire, *Microsoft Corp. Chooses Software.Net (TM) to be First to Electronically Deliver Microsoft Software; Software.Net to Electronically Market Over Microsoft Products Via the Internet*, Oct. 17, 1995, pp. 227–228.

PR Newswire, *Visa and MasterCard Combine Security Specifications for Card Transactions on the Internet into One Standard; Move Expected to Accelerate Development of Electronic Commerce and Bolster Consumer Confidence in the Security of Cyberspace Transactions*, Feb. 1, 1996, pp. 155–156.

PR Newswire, *SAIC is £Yourservice for Secure Electronic Transactions on the Internet*, Feb. 29, 1996, pp. 436–437.

PR Newswire, *American Express Signs Licensing Agreement With Microsoft to Make Secure Purchases Over the Internet*, Feb. 29, 1996, pp. 438–439.

PR Newswire, *Visa and Mastercard Welcome American Express*, Feb. 29, 1996, pp. 440–441.

PR Newswire, *Centura Announces the Next Step in Online Money Management*, Apr. 15, 1996, pp. 221–222.

PR Newswire, *Industry Security Leader Racal Supports Visa/Mastercard Proposal for Internet*, Apr. 17, 1996, pp. 152–153.

PR Newswire, *Spyglass (TM) Supports Microsoft's ACTIVEX, SET, PCT and ISAPI With Introduction of New Spyglass Web Technology Kits*, Apr. 23, 1996, pp. 132–133.

PR Newswire, *Cybersource's New Internet Commerce Services Provide Software Publishers Turn–Key Electronic Transaction and Distribution Services; Qualcomm, Insignia, Wall Data and Seven Other Publishers Choose CyberSource to Distribute Products Via the Internet*, Apr. 30, 1996, pp. 99–101.

PR Newswire, *1996 Olympic Games Web Site Proves a Successful as Venue for Olympic Ticket Sales; IBM–Developed Server Enables Secure Electronic Transactions for a Large Number of Consumers*, May 1, 1996, pp. 83–84.

PR Newswire, *Dynamic Duo Taxware and IBM; Partners on the Commerce.Net*, May 1, 1996, pp. 85–86.

PR Newswire, *DocuMagix Hotpage Available Now Online Via Software.Net; Software.Net Offers DocuMagix HotPage with Exclusive Custom Content*, May 7, 1996, pp. 44–45.

PR Newswire, *Netscape Announces Netscape Livepayment (TM) to Facilitate Internet Commerce; Leading Companies to Support Netscape's Open, Cross–Platform Softweare for Online Credit Card Processing*, May 13, 1996, pp. 39–41.

Record, *Security is Going on Line; Mastercard, Visa Agree on Standard*, Feb. 2, 1996, pp. 73–75.

Reuters, *Bank One Corp <One.N> Says Joins Commercenet*, Oct. 17, 1994, p. 316.

Reuters, *MasterCard, Visa to Set Electronic Standard NYT*, Feb. 1, 1996, p. 160.

Reuters, *Visa and Mastercard Adopt Joint Internet Standard*, Feb. 1, 1996, pp. 164–165.

Reuters, *GE<GE.N> Info Services Debuts net Commerce System*, Feb. 6, 1996, pp. 24–25.

Reuters, *AMEX <AXP.N>, Microsoft <MSFT.O> In Pact*, Feb. 29, 1996, p. 442.

Reuters, *Netscape<NSCP.O> Offers Secure Internet Collection*, May 13, 1996, p. 42.

Reuter Business Report, *America Online, Others Push for Net Security*, Apr. 11, 1995, pp. 276–277.

Reuter Business Report, *Visa and Mastercard Adopt Joint Internet Standard*, Feb. 1, 1996, pp. 158–159.

Reuter Business Report, *Mastercard, Visa to Set Electronic Standard NYT*, Feb. 1, 1996, p. 157.

Reuter Business Report, *Improving Internet Safety to Protect Commerce*, Apr. 3, 1996, pp. 232–234.

Reuter European Business Report, *America Online, Others Push for Net Security*, Apr. 11, 1995, pp. 278–279.

Reuter European Business Report, *Mastercard, Visa to Set Electronic Standard—NYT*, Feb. 1, 1996, p. 161.

Reuter European Business Report, *Visa and Mastercard Adopt Joint Internet Standard*, Feb. 1, 1996, pp. 162–163.

Reuters World Service, *MasterCard, Visa to Set Electronic Standard—NYT*, Feb. 1, 1996, p. 169.

Risk Management, *Are You Exposed on the Internet? Security Issues and Data Protection; Circuit Breakers*, Apr. 1996, pp. 252–254.

Rocky Mountain News, *Visa, MasterCard Agree on 'Net Security; Deal Allows to Offer Customers Greater Protection in On Line Services*, Feb. 2, 1996, pp. 76–77.

Rocky Mountain News, *The Web: It's Anybody's Business; Colorado Retailers and Service Companies Caught Up in Awesome Potential of Internet*, Mar. 24, 1996, pp. 305–310.

Sacramento Bee, *Credit Card Standard Set for Net*, Feb. 23, 1996, pp. 78–79.

The San Diego Union–Tribune, *Business; Ed. 1,2,3,4,5,6,7, 8; p. C–2*, Mar. 1, 1996, pp. 423–424.

The San Francisco Chronicle, *Mastercard, Visa Accord on Internet Credit–Card Giants Agree on a Security Standard*, Feb. 1, 1996, pp. 137–138.

The San Francisco Examiner, *Credit–Card Companies OK Internet Security Deal*, Feb. 1, 1996, pp. 166–167.

The San Francisco Examiner, *Infobahn leads to a Volvo Dealer*, Mar. 1, 1996, pp. 297–298.

Seybold Report on Desktop Punlicshjing, *Visa, MasterCard Adopt SET*, Feb. 19, 1996, pp. 518–519.

South China Morning Post, *Business; Banking*; p. 7, Mar. 30, 1995, pp. 286–287.

Standard & Poor's Emerging & Special Situation, *New Issues—Cybercash Avoid*, Feb. 20, 1996, pp. 502–503.

The Straits Times (Singapore), *Larger NetworkAsia Show This Year*, Apr. 25, 1995, pp. 272–273.

The Straits Times (Singapore), *Credit Card Firms Devise Joint Net Payment Scheme*, Feb. 2, 1996, p. 81.

The Straits Times (Singapore), *Music Scene Alive and Thriving Since the '30s*, Feb. 6, 1996, pp. 26–27.

The Straits Times (Singapore), *Concern Grows Over Credit Card Debts*, Mar. 24, 1996, pp. 311–314.

Sunday Times, *Credit Card Set Standard for Net Buys*, Feb. 4, 1996, p. 44.

Telecomworldwire, *Global Players Unite on Payment Standards*, Feb. 1, 1996, p. 168.

Telecomworldwire, *Sidewire: Science Applications International Corp, a US Provider of Information and Network*, Mar. 1, 1996, p. 425.

Telecomworldwire, *Adobe, Netscape Form Major Commercial Internet Publishing Plan*, Apr. 4, 1995, p. 280.

The Toronto Star, *Firm Unveils Secure Net Paying System*, Mar. 27, 1996, pp. 287–288.

Origin Universal New Services Limited, *Racal Supports the Visa/Mastercard Secure Electronics Transactions (SET)*, May 1, 1996, pp. 87–88.

Upside, *The Cyber Bowl*, Apr. 1996, pp. 255–266.

Upside, *The Key to Security*, Apr. 1996, pp. 267–276.

Upside, *End of the Line for On–Line Services?*, May 1996, pp. 89–98.

U.S. Banker, *Card Pact Weaves A Tighter Net*, Mar. 1996, p. 426.

Wall Street Journal, *Visa, Mastercard Reach an Agreement for Single System of Internet Payment*, Feb. 1, 1996, p. 170.

The Washington Post, Feb. 2, 1996, pp. 83–84.

The Washington Post, *Give Us Some Credit: Your Card is Safe; There Are Many Very Good Reasons Not to Shop On–Line. Fear That Your Credit Card Number Will be Abused Should Not Be One of Them*, Apr. 24, 1996.

The Washington Post, *Who Was That Masked Cybershopper?; MasterCard–Visa Agreement on Credit Card Security May Make On–Line Commerce Fly*, Feb. 2, 1996, p. 82.

Working Woman, *Adventure On–Line . . . ; Using Online Services to Make Travel Arrangements*, Apr. 1996, pp. 277–282.

Your Money, *Brokers Not Equal When It Comes to Charging Customers*, Mar. 16, 1996, pp. 331–337.

Your Money, *Credit Card Fraud New Concern of Internet Business*, Mar. 16, 1996, pp. 338–339.

Borenstein et al., *MIME (Multipurpose Internet Mail Extensions) Part One: Mechanisms for Specifying and Describing the Format of Internet Message Bodies*, Borenstein & Freed, Sep. 1993.

Fielding et al., *Hypertext Transfer Protocol —HTTP/1.1*, Fielding, Frystyk, Berners–Lee, Gettys and Mogul, May 2, 1996.

Fielding et al., *Hypertext Transfer Protocol—HTTP/1.1*, Fielding, Frystyk, Berners–Lee, Gettys and Mogul, Jun. 3, 1996.

An RSA Laboratories Technical Note, Version 1.5, Revised Nov. 1, 1993.

Internet Protocol, *DARPA Internet Program Protocol Specification*, University of Southern California, Sep. 1981.

Transmission Control Protocol, *DARPA Internet Program Protocol Specification*, University of Southern California, Sep. 1981.

Pages from the Internet Shopping Network website at www.isn.com, including the homepage and pages entitled "Who We Are", ; "Member Privacy & Security"; "Types of Membership"; "Payment Methods"; and, "Free Membership. "*

* cited by examiner

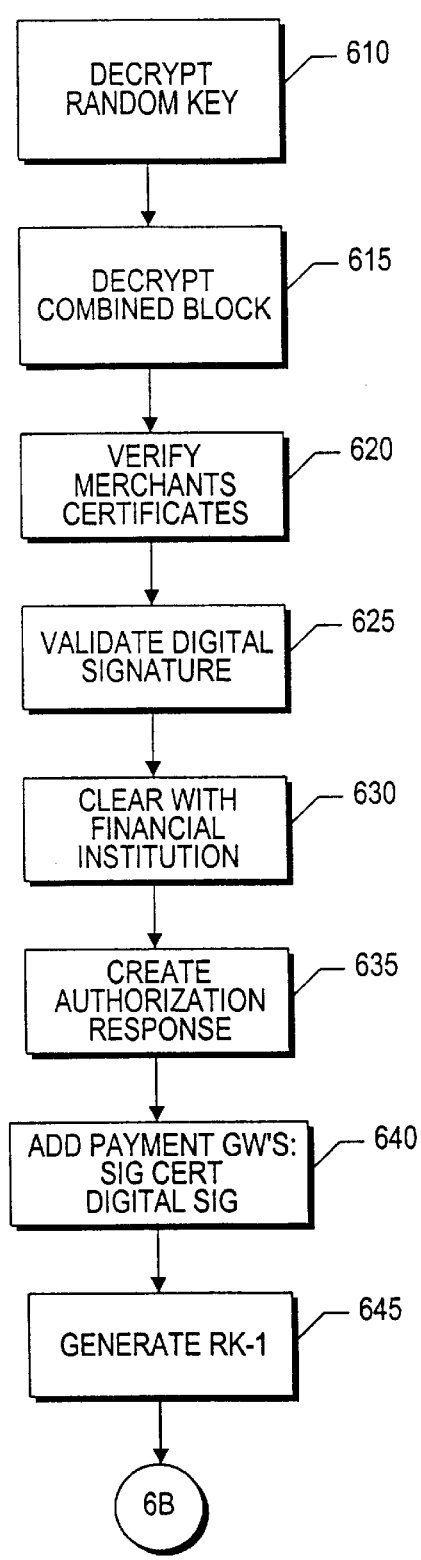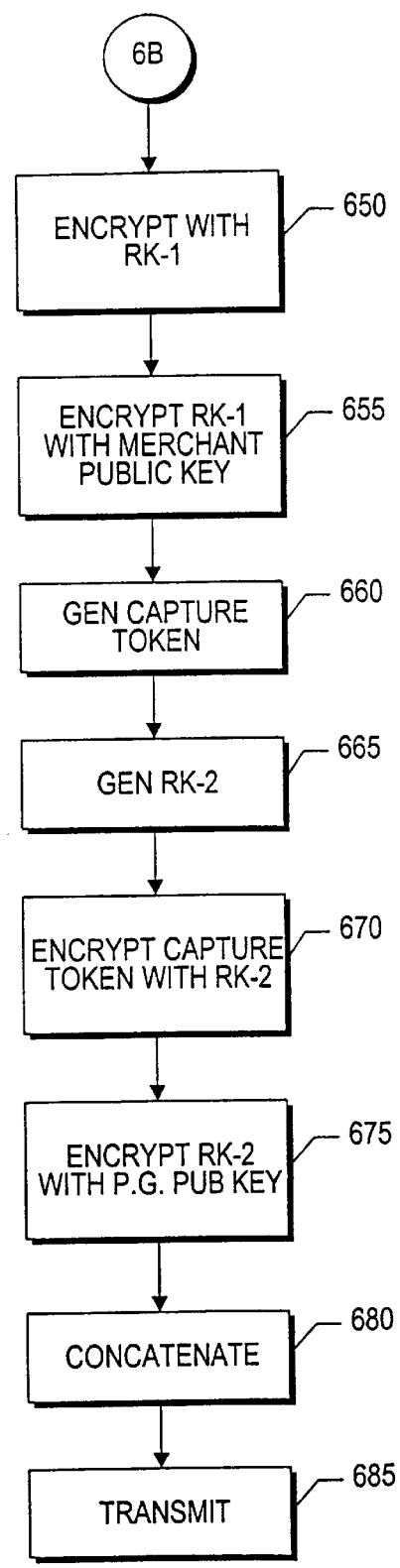
*FIG. 6A*  *FIG. 6B*

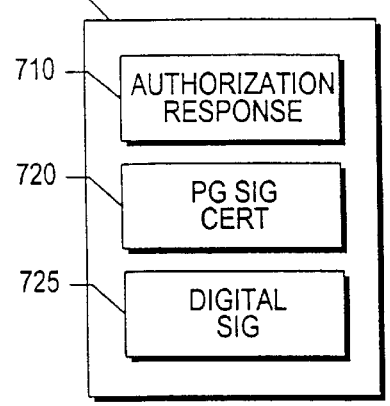
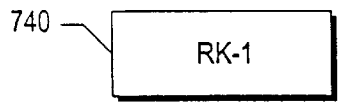
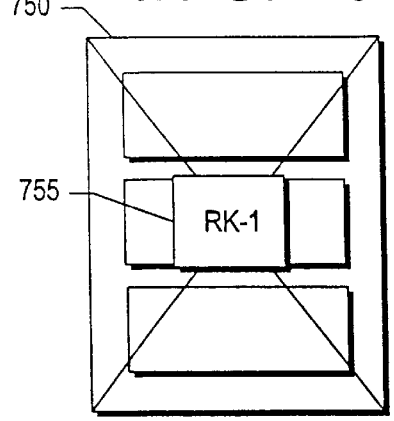
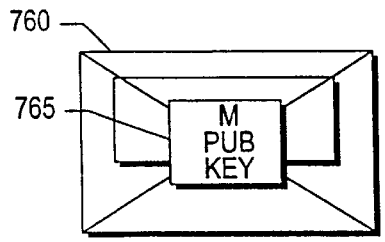
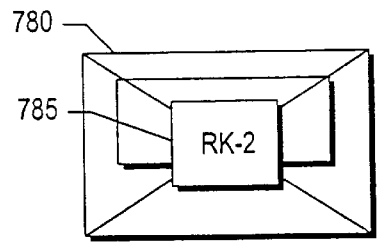
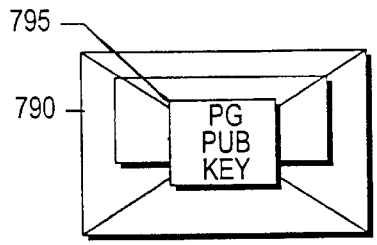
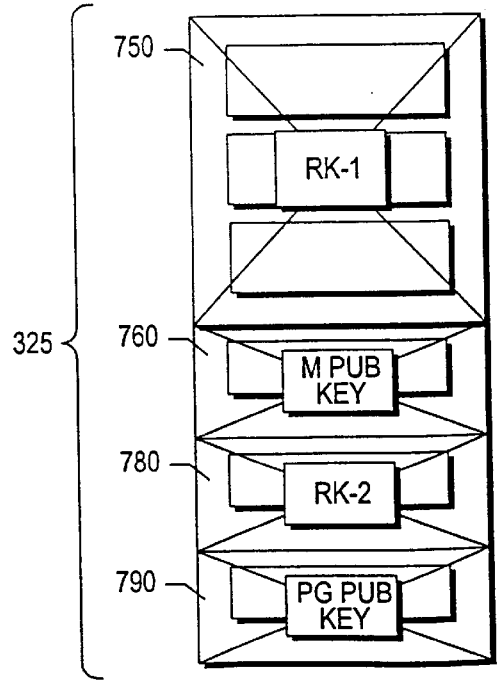
*FIG. 7A* *FIG. 7B* *FIG. 7C* *FIG. 7D* *FIG. 7E* *FIG. 7F* *FIG. 7G* *FIG. 7H* *FIG. 7I* *FIG. 7J*

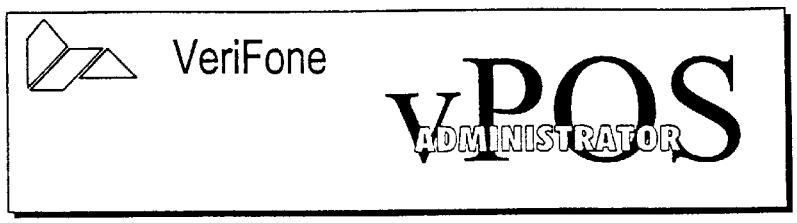

Terminal Totals Report

| Overall Terminal Totals | | |
|---|---|---|
| Sales | Trans. Count | 25 |
| | Amount | $6161.70 |
| Credits | Trans. Count | 5 |
| | Amount | ($11.70) |
| Net Sales | | $6150.70 |

| Visa Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

| MasterCard Totals | | |
|---|---|---|
| Sales | Trans. Count | 5 |
| | Amount | $1232.34 |
| Credits | Trans. Count | 1 |
| | Amount | ($2.34) |
| Net Sales | | $1230.00 |

| Discover Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

| American Express Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

*FIG. 40*

| JCB Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

| ADMINISTRATOR |
|---|

Copyright © 1996 VeriFone, Inc.

FIG. 41

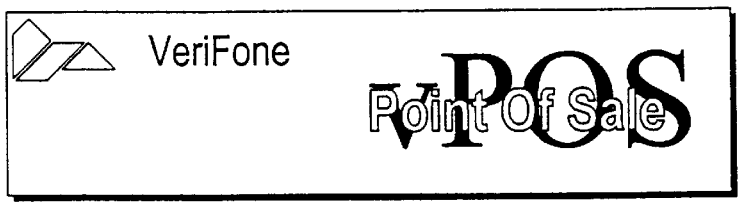

Terminal Setup

Terminal Tables Configuration
Card(s) Definition Table    Review
Acquirer(s) Definition Table    Review
Merchant Configuration Table    Review Help Copyright © 1996 VeriFone, Inc.

FIG. 42

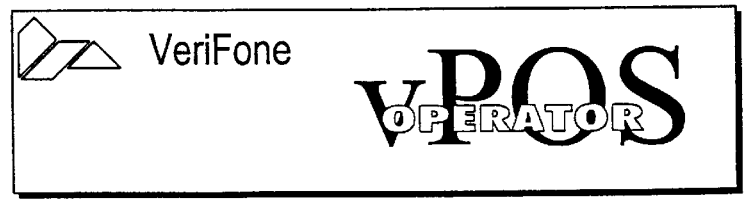

Terminal Type    CDT List Update/Review
Cards acepted by the merchant

Visa

Copyright © 1996 VeriFone, Inc.

FIG. 43

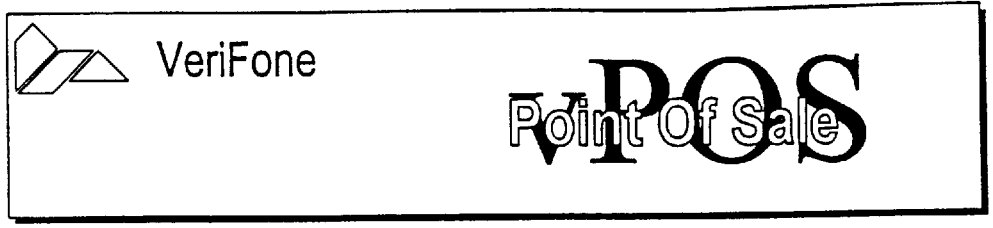
Order Number834100050
Bill To
Account Number 
Name on Card        Good Through
Address Line 1
Address Line 2
City                State/Province
Country             Zip/Postal Code
Email               Phone
If you wish to have billing defaults set in your browser, check this box
Total=$59.99
By pressing the PAY button I agree to pay the above total amount according to the card issuer agreement
RETURN TO SHOPPING        PAY
*FIG. 48*

SYSTEM, METHOD AND ARTICLE OF MANUFACTURE FOR MULTIPLE-ENTRY POINT VIRTUAL POINT OF SALE ARCHITECTURE

FIELD OF THE INVENTION

The present invention relates to the secure, electronic payment in exchange for goods and services purchased over a communication network, and more specifically, to a system, method and article of manufacture for securely transmitting payment information from a customer to a merchant to a payment gateway and returning a certification, including a credit confidence factor to allow a merchant to determine whether to accept or reject payment information utilizing a flexible, extensible architecture.

The present invention relates to an electronic graphical representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven or greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Clearing House (ACH) where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations. However, the payments made through these types of EFPT systems are limited in that they cannot be performed without the banking system. Moreover, ACH transactions usually cannot be performed during off business hours.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems which provide non-ergonomic interfaces are disclosed in U.S. Pat. Nos. 5,476,259; 5,459,304; 5,452,352; 5,448,045; 5,478,993; 5,455,407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Terisa Systems, Shen, Kerberos, Photuris, Pretty Good Privacy ("PGP") which meets the IPSEC criteria. One of ordinary skill in the art readily comprehends that any of the general-purpose secure communication protocols can be substituted for the SSL transmission protocol without undue experimentation.

Banks desire an Internet payment solution that emulates existing Point of Sale (POS) applications that are currently installed on their host computers, and require minimal changes to their host systems. This is a critical requirement since any downtime for a banks host computer system represents an enormous expense. Currently, VeriFone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, a plethora of report generation mechanisms and formats are utilized by merchants that banking organizations work with.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol, and by providing other value-added services that a merchant may not be able to obtain at another bank.

Internet-based payment solutions require additional security measures that are not found in conventional POS terminals. This additional requirement is necessitated because Internet communication is done over publicly-accessible, unsecured communication line in stark contrast to the private, secure, dedicated phone or leased line service utilized between a traditional merchant and an acquiring bank. Thus, it is critical that any solution utilizing the Internet for a communication backbone, employ some form of cryptography.

As discussed above, the current state-of-the-art in Internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

SUMMARY OF THE INVENTION

According to a broad aspect of a preferred embodiment of the invention, a server communicates bidirectionally with a gateway over a first communication link, over which service requests flow to the server for one or more merchants and/or consumers. Service requests are associated with a particular merchant based on storefront visited by a consumer or credentials presented by a merchant. Service requests result in merchant specific transactions that are transmitted to the gateway for further processing on existing host applications.

DESCRIPTION OF THE DRAWINGS

The foregoing and other objects, aspects and advantages are better understood from the following detailed description of a preferred embodiment of the invention with reference to the drawings, in which:

FIGS. 6A and 6B depict the detailed steps of processing a payment authorization request and generating and transmitting a payment authorization request response in accordance with a preferred embodiment;

FIGS. 7A through 7J depict views of the payment authorization response and its component arts in accordance with a preferred embodiment;

FIGS. 36–48 are screen displays in accordance with a preferred embodiment;

DETAILED DESCRIPTION

Figure 1A:
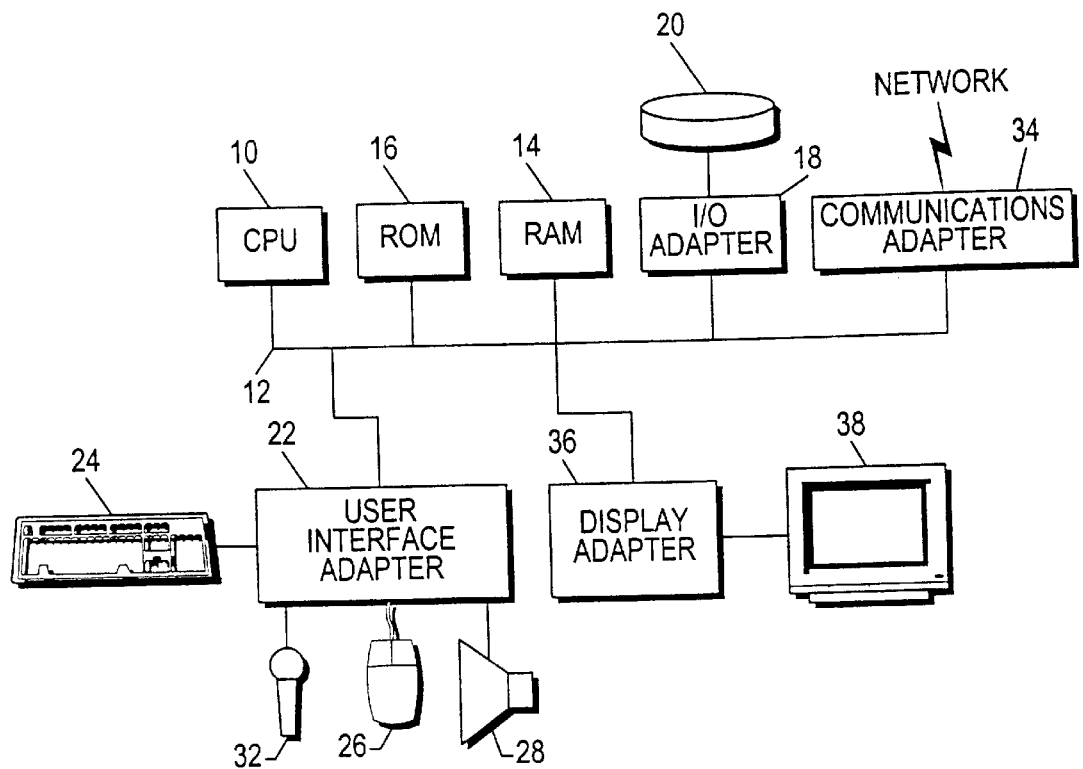
FIG. 1A is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned. preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

- Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
- Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
- Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "HypertextTransfer Protocol—HTTP/1.1: HTTP Working Group InternetDraft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 1B:
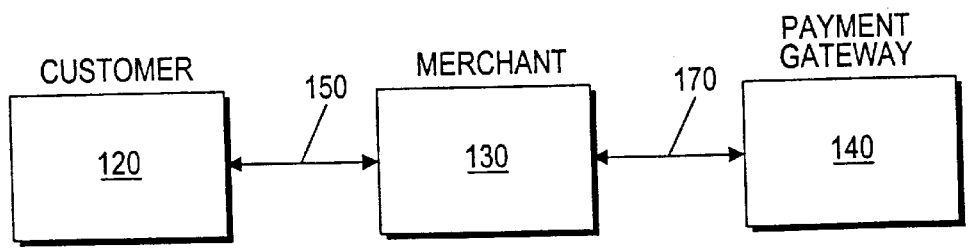
FIG. 1B depicts an overview in accordance with a preferred embodiment.

FIG. 1B depicts an overview of the present invention. Customer computer system 120 is in communication with merchant computer system 130. The customer-merchant session 150 operates under a general-purpose secure communication protocol such as the SSL protocol. Merchant computer system 130 is additionally in communication with payment gateway computer system 140. A payment gateway is a system that provides electronic commerce services in support of a bank or other financial institution, and that interfaces to the financial institution to support the authorization and capture of transactions. The customer-institution session 170 operates under a variant of a secure payment technology such as the SET protocol, as described herein, referred to as Merchant-Originated Secure Electronic Transactions ("MOSET"), as is more fully described herein.

Customer-to-Merchant Communication

Figure 2:
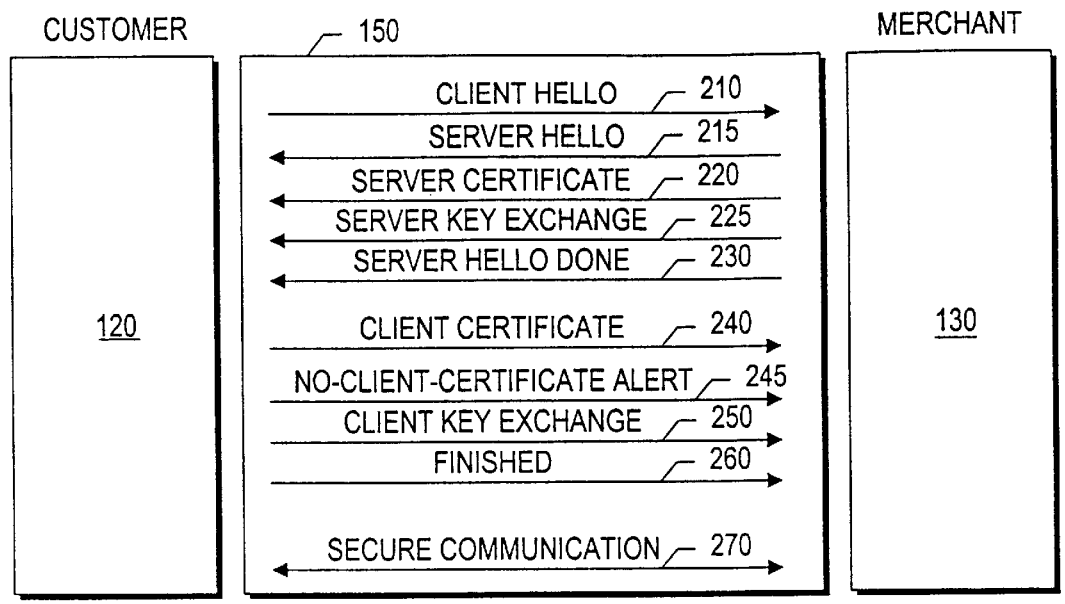
FIG. 2 depicts a more detailed view of a customer computer system in communication with merchant system under the Secure Sockets Layer protocol in accordance with a preferred embodiment.

FIG. 2 depicts a more detailed view of customer computer system 120 in communication with merchant system 130 using customer-merchant session 150 operating under the SSL protocol as documented in Freier and incorporated by reference.

Customer computer system 120 initiates communication with merchant computer system 130 using any well-known access protocol, e.g., Transmission Control Protocol/Internet Protocol ("TCP/IP"). A description of TCP/IP is provided in Information Sciences Institute, "Transmission Control Protocol DARPA Internet Program Protocol Specification (RFC 793)" (September, 1981), and Information Sciences Institute, "Internet Protocol DARPA Internet Program Protocol Specification (RFC 791)" (September, 1981). In this implementation, customer computer system 120 acts as a client and merchant computer system 130 acts as a server.

Customer computer system 120 initiates communication by sending "client hello" message 210 to the merchant computer system 130. When a client first connects to a server it is required to send the client hello message 210 as its first message. The client can also send a client hello message 210 in response to a hello request on its own initiative in order to renegotiate the security parameters in an existing connection. The client hello message includes a random structure, which is used later in the protocol. Specifically, the random structure includes the current time and date in standard UNIX 32-bit format according to the sender's internal clock and twenty-eight bytes of data generated by a secure random number generator. The client hello message 210 further includes a variable length session identifier. If not empty, the session identifier value identifies a session between the same client and server whose security parameters the client wishes to reuse. The session identifier may be from an earlier connection, the current connection, or another currently active connection. It is useful to specify the current connection if the client only wishes to update the random structures and derived values of a connection. It is useful to specify another currently active connection if the client wishes to establish several simultaneous independent secure connections to the same server without repeating the full handshake protocol. Client hello message 210 further includes an indicator of the cryptographic algorithms supported by the client in order of the client's preference, ordered according to client preference.

In response to client hello message 210, if merchant computer system 130 wishes to correspond with customer computer system 120, it responds with server hello message 215. If merchant computer system 130 does not wish to communicate with customer computer system 120, it responds with a message, not shown, indicating refusal to communicate.

Server hello message 215 includes a random structure, which is used later in the protocol. The random structure in server hello message 215 is in the same format as, but has contents independent of, the random structure in client hello message 210. Specifically, the random structure includes the current time and date in standard UNIX 32-bit format according to the sender's internal clock and twenty-eight bytes of data generated by a secure random number generator. Server hello message 215 further includes a variable length session identifier. The session identifier value identifies a new or existing session between the same client and server. Server hello message 215 further includes an indicator of the cryptographic algorithms selected from among the algorithms specified by client hello message 210, which is utilized in further encrypted communications.

Optionally, Merchant computer system 130 transmits a server certificate 220. If transmitted, server certificate 130 enables customer computer system 120 to authenticate the identity of merchant computer system 130.

If merchant computer system 130 does not transmit a server certificate 220, or if server certificate 220 is suitable only for authentication, it may optionally transmit a server key exchange message 225. Server key exchange message 225 identifies a key that may be used by customer computer system 120 to decrypt further messages sent by merchant computer system 130.

After transmitting server hello message 215, and optionally transmitting server certificate 220 or server key exchange message 225, merchant computer system 130 transmits a server hello done message 230 and waits for a further response from customer computer system 120.

Customer computer system 120 optionally transmits client certificate 240 to merchant computer system 130. If transmitted, client certificate 240 enables merchant computer system 130 to authenticate the identity of customer computer system 120. Alternatively, customer computer system 120 may transmit a no-client-certificate alert 245, to indicate that the customer has not registered with any certification authority.

If customer computer system 130 does not transmit a client certificate 240, or if client certificate 240 is suitable only for authentication, customer computer system 130 may optionally transmit a client key exchange message 250. Client key exchange message 250 identifies a key that may be used by merchant computer system 130 to decrypt further messages sent by customer computer system 120.

After optionally transmitting client certificate 240, no-client-certificate alert 245, and/or client key exchange message 250, customer computer system 120 transmits a finished message 260.

At this point, customer computer system 120 and merchant computer system 130 have:

1) negotiated an encryption scheme that may be commonly employed in further communications, and
2) have communicated to each other a set of encryption keys that may be used to decrypt further communications between the two computer systems.

Customer computer system 120 and merchant computer system 130 may thereafter engage in secure communications 270 with less risk of interception by third parties.

Among the messages communicated by customer computer system 120 to merchant computer system 130 may be messages that specify goods or services to be ordered and payment information, such as a credit card number and related information, collectively referred to as "payment information," that may be used to pay for the goods and/or services ordered. In order to obtain payment, the merchant must supply this information to the bank or other payment gateway responsible for the proffered payment method. This enables the merchant to perform payment authorization and payment capture. Payment authorization is the process by which permission is granted by a payment gateway operating on behalf of a financial institution to authorize payment on behalf of the financial institution. This is a process that assesses transaction risk, confirms that a given transaction does not raise the account holder's debt above the account's credit limit, and reserves the specified amount of credit. Payment capture is the process that triggers the movement of funds from the financial institution to the merchant's account after settlement of the account.

Payment Authorization

Merchants utilize point-of-sale products for credit and debit transactions on a daily basis. An embodiment in accordance with the subject invention allows an acquirer processor to accept transactions from Internet storefronts without altering a current host environment. The system easily converts payment protocol messages and simultaneously manages transactions from a number of Internet merchant servers. As the number of transactions grows, the payment gateway can be scaled to handle the increased business, and it can be configured to work with specific business processes used by the acquirer/processor. Thus, the payment gateway supports Internet processing utilizing payment processing operations.

The payment gateway provides support for configuring and installing the Internet payment capability utilizing existing host point-of-sale technology. The payment gateway also provides an intuitive Graphical User Interface (GUI) with support built in to accommodate future payment instruments such as debit cards, electronic checks, electronic cash and micropayments. The payment gateway implements secure transactions using RSA public-key cryptography and the MasterCard/Visa Secure Electronic Transaction (SET) protocol. The gateway also provides full functionality for merchant payment processing including authorization, capture, settlement and reconciliation while providing monitor activity with reporting and tracking of transactions sent over the Internet. Finally, the payment gateway also implements Internet payment procedures that match current processor business models to ensure consistency for merchants. Handling Internet transactions is destined to become a necessary function for every payment procrocessing system. Today, merchants often transmit data received over the Internet inefficiently. Some fax the information or waste time keying data into a non-Internet system.

Figure 3:
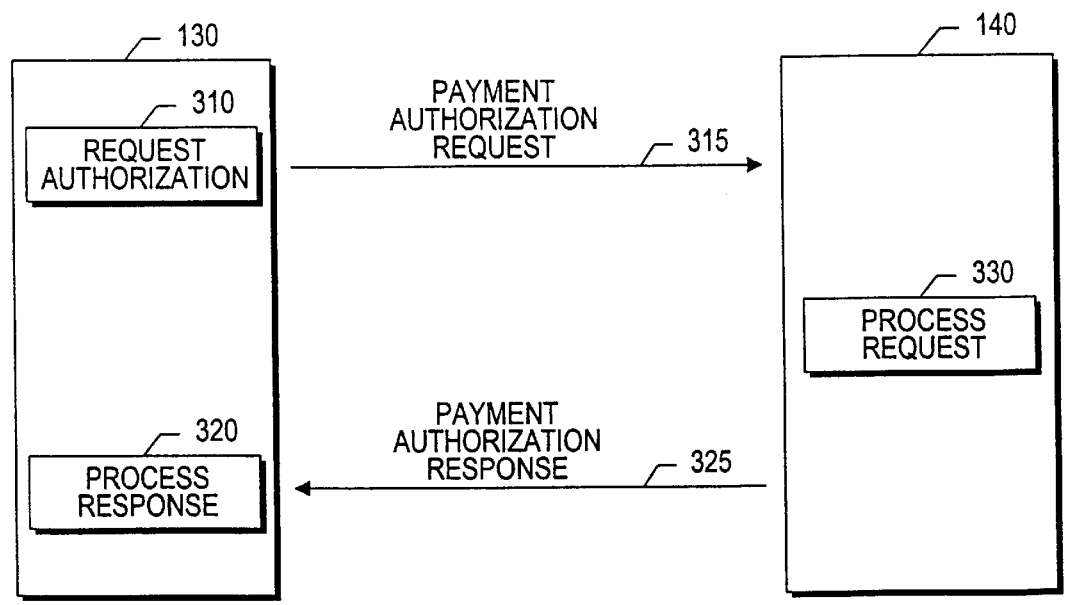
FIG. 3 depicts an overview of the method of securely supplying payment information to a payment gateway in order to obtain payment authorization in accordance with a preferred embodiment.

FIG. 3 depicts an overview of the method of securely supplying payment information to a payment gateway in order to obtain payment authorization. In function block 310, merchant computer system 130 generates a payment authorization request 315 and transmits it to payment gateway computer system 140. In function block 330, payment gateway system 140 processes the payment authorization request, generates a payment authorization response 325 and transmits it to merchant computer system 130. In function block 320, merchant computer system 130 processes payment authorization response 325 and determines whether payment for the goods or services sought to be obtained by the customer has been authorized.

Payment Authorization Request Generation

Figure 4:
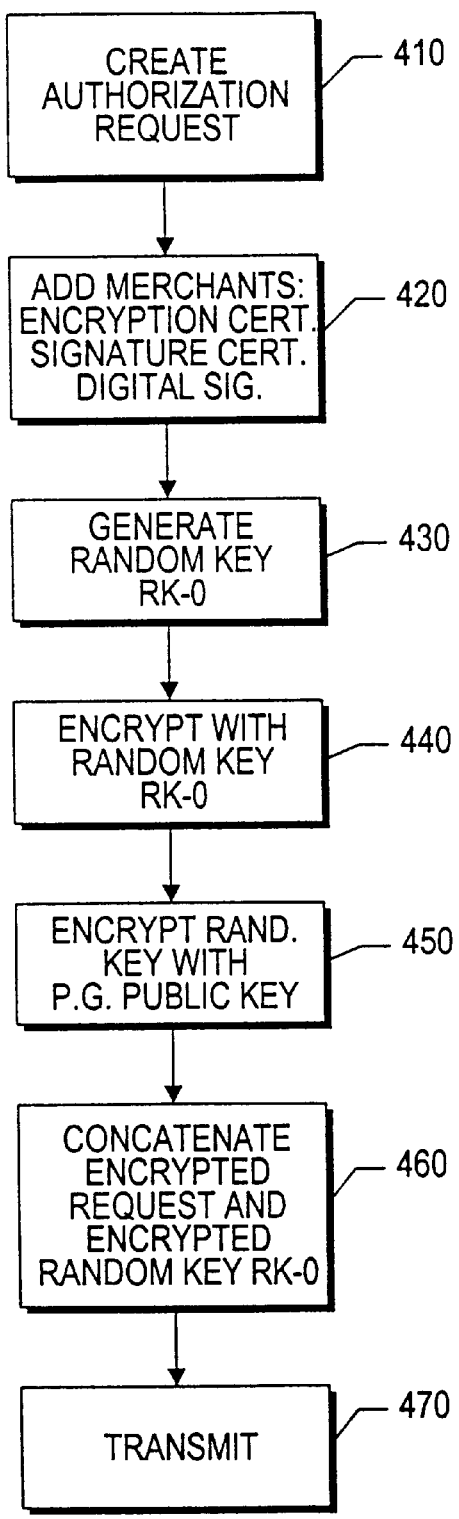
FIG. 4 depicts the detailed steps of generating and transmitting a payment authorization request in accordance with a preferred embodiment.
Figure 5A:
FIGS. 5A through 5F depict views of the payment authorization request and its component parts in accordance with a preferred embodiment.

FIG. 4 depicts the detailed steps of generating and transmitting a payment authorization request. FIGS. 5A through 5F depict views of the payment authorization request and its component parts. In function block 410, merchant computer system 130 creates a basic authorization request 510. The basic authorization request is a data area that includes all the information for determining whether a request should be granted or denied. Specifically, it includes such information as the party who is being charged, the amount to be charged, the account number of the account to be charged, and any additional data, such as passwords, needed to validate the charge. This information is either calculated based upon prior customer merchandise selection, or provided by the customer over the secure link 270 established in the customer-merchant general-purpose secure communication protocol session. FIG. 5A depicts a basic authorization request 510.

In function block 420, merchant computer system 130 combines basic authorization request 510, a copy of its encryption public key certificate 515 and a copy of its signature public key certificate 520. Merchant computer system 130 calculates a digital signature 525 for the combined contents of the combined block 530 comprising basic authorization request 510, the encryption public key certificate 515 and the signature public key certificate 520, and appends it to the combination of the combined basic authorization request 510, the encryption public key certificate 515 and the signature public key certificate 520. The merchant computer system calculates digital signature 525 by first calculating a "message digest" based upon the contents of the combined basic authorization request 510, the encryption public key certificate 515 and the signature public key certificate 520. A message digest is the fixed-length result that is generated when a variable length message is fed into a one-way hashing function. Message digests help verify that a message has not been altered because altering the message would change the digest. The message digest is then encrypted using the merchant computer system's 130 digital signature private key, thus forming a digital signature.

Figure 5B:
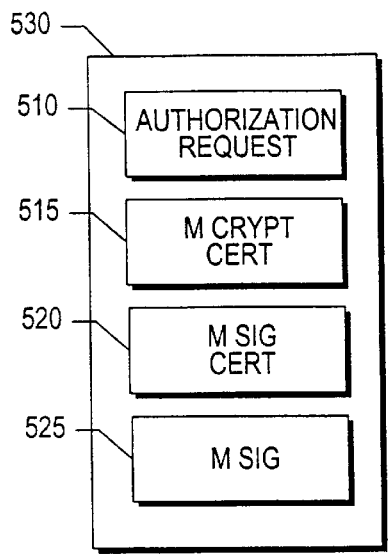

FIG. 5B depicts the combined block 530 formed by function block 420 and containing basic authorization request 510, the encryption public key certificate 515, the signature public key certificate 520, and digital signature 525.

Figure 5C:

In function block 430, merchant computer system 130 generates a random encryption key RK-0 540, denoted as RK-0. Random encryption key RK-0 540 is a symmetric encryption key. A symmetric encryption key is a key characterized by the property that a message encrypted with a symmetric key can be decrypted with that same key. This is contrasted with an asymmetric key pair, such as a public-key/private-key key pair, where a message encrypted with one key of the key pair may only be decrypted with the other key of the same key pair. FIG. 5C depicts random encryption key RK-0 540.

Figure 5D:
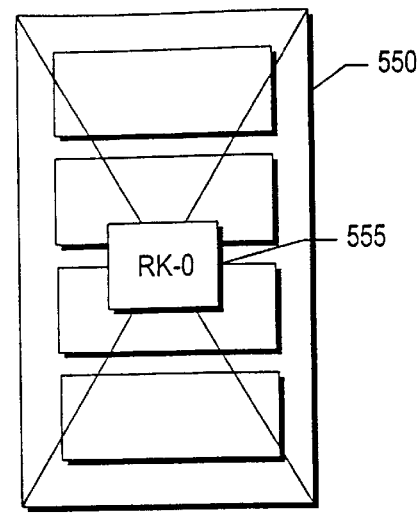

In function block 440, merchant computer system 130 encrypts combined block 530 using random encryption key RK-0 540 to form encrypted combined block 550. FIG. 5D depicts encrypted combined block 550. The encryption state of encrypted combined block 550 is graphically shown by random key lock 555, which indicates that encrypted combined block 550 is encrypted using random key RK-0 540.

Figure 5E:
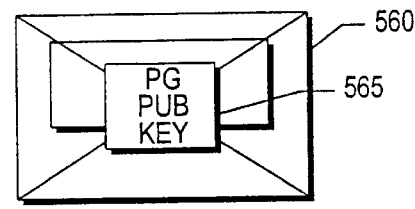

In function block 450, merchant computer system 130 encrypts random encryption key RK-0 540 using the public key of payment gateway system 140 to form encrypted random key 560. FIG. 5E depicts encrypted random key 560. The encryption state of encrypted random key 560 is graphically shown by payment gateway public key lock 565, which indicates that encrypted random key 560 is encrypted using the payment gateway public key.

Figure 5F:
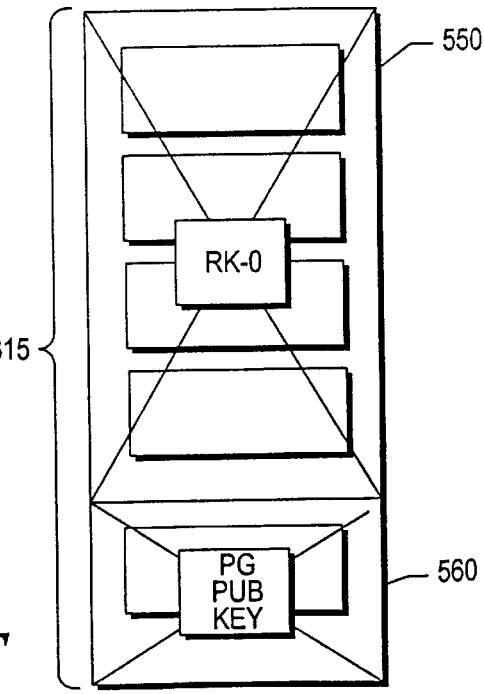

In function block 460, merchant computer system 130 concatenates encrypted combined block 550 and encrypted random key 560 to form merchant authorization request 315. FIG. 5F depicts merchant authorization request 315 comprising encrypted combined block 550 and encrypted random key 560. In function block 470, merchant computer system 130 transmits merchant authorization request 315 to payment gateway system 140.

Payment Authorization Request Processing

FIG. 6 depicts the detailed steps of processing a payment authorization request and generating and transmitting a payment authorization request response. Function blocks 610 through 630 depict the steps of processing a payment authorization request, while function blocks 635 through 685 depict the steps of generating and transmitting a payment authorization request response.

In function block 610, payment gateway computer system 140 applies its private key to encrypted random key 560 contained within received merchant authorization request 315, thereby decrypting it and obtaining a cleartext version of random key RK-0 540. In function block 615, payment gateway computer system 140 applies random key RK-0 540 to encrypted combined block 550, thereby decrypting it and obtaining a cleartext version of combined block 530. Combined block 530 comprises basic authorization request 510, a copy of merchant computer system's 130 encryption public key certificate 515 and a copy of merchant computer system's 130 signature public key certificate 520, as well as merchant digital signature 525.

In function block 620, payment gateway computer system 140 verifies merchant computer system's 130 encryption public key certificate 515 and merchant computer system's 130 signature public key certificate 520. Payment gateway computer system 140 performs this verification by making a call to the certification authorities associated with each certificate. If verification of either certificate fails, payment gateway computer system 140 rejects the authorization request.

In function block 625, payment gateway computer system 140 validates merchant digital signature 525. Payment gateway computer system 140 performs this validation by calculating a message digest over the contents of the combined basic authorization request 510, the encryption public key certificate 515 and the signature public key certificate 520. Payment gateway computer system 140 then decrypts digital signature 525 to obtain a copy of the equivalent message digest calculated by merchant computer system 130 in function block 420.

If the two message digests are equal, the digital signature 525 is validated. If validation fails, payment gateway computer system 140 rejects the authorization request.

In function block 630, payment gateway computer system 140 determines the financial institution for which authorization is required by inspection of basic authorization request 510. Payment gateway computer system 140 contacts the appropriate financial institution using a secure means, e.g, a direct-dial modem-to-modem connection, or a proprietary internal network that is not accessible to third parties, and using prior art means, obtains a response indicating whether the requested payment is authorized.

Payment Authorization Response Generation

Function blocks 635 through 685 depict the steps of generating and transmitting a payment authorization request response. FIGS. 7A through 7J depict views of the payment authorization response and its component parts.

In function block 635, payment gateway computer system 140 creates a basic authorization response 710. The basic authorization request is a data area that includes all the information to determine whether a request was granted or denied. FIG. 7A depicts basic authorization response 710.

In function block 640, payment gateway computer system 140 combines basic authorization response 710, and a copy of its signature public key certificate 720. Payment computer system 140 calculates a digital signature 725 for the combined contents of the combined block 730 comprising basic authorization response 710 and the signature public key certificate 720, and appends the signature to the combination of the combined basic authorization response 710 and the signature public key certificate 720. The payment gateway computer system calculates digital signature 725 by first calculating a message digest based on the contents of the combined basic authorization response 710 and signature public key certificate 720. The message digest is then encrypted using the merchant computer system's 140 digital signature private key, thus forming a digital signature.

FIG. 7B depicts the combined block 730 formed in function block 640 and containing basic authorization response 710, the signature public key certificate 720, and digital signature 725.

In function block 645, payment gateway computer system 150 generates a first symmetric random encryption key 740, denoted as RK-1. FIG. 7C depicts first random encryption key RK-1 740.

In function block 650, payment gateway computer system 140 encrypts combined block 730 using random encryption key RK-1 740 to form encrypted combined block 750. FIG. 7D depicts encrypted combined block 750. The encryption state of encrypted combined block 750 is graphically shown by random key lock 755, which indicates that encrypted combined block 750 is encrypted using random key RK-1 740.

In function block 655, payment gateway computer system 140 encrypts random encryption key RK-1 740 using the public key of merchant computer system 130 to form encrypted random key RK 760. FIG. 7E depicts encrypted random key RK-1 760. The encryption state of encrypted random key 760 is graphically shown by merchant public key lock 765, which indicates that encrypted random key 760 is encrypted using the merchant public key.

In function block 660, payment gateway computer system 140 generates a random capture token 770. Random capture token 770 is utilized in subsequent payment capture processing to associate the payment capture request with the payment authorization request being processed. FIG. 7F depicts capture token 775.

In function block 665, payment gateway computer system 140 generates a second symmetric random encryption key 775, denoted as RK-2. FIG. 7G depicts second random encryption key RK-2 775.

In function block 670, payment gateway computer system 140 encrypts capture token 770 using random encryption key RK-2 770 to form encrypted capture token 780. FIG. 7H depicts encrypted capture token 780. The encryption state of encrypted capture token 780 is graphically shown by random key lock 785, which indicates that encrypted capture token 780 is encrypted using random key RK-2 770.

In function block 675, payment gateway computer system 140 encrypts second random encryption key RK-2 775 using its own public key to form encrypted random key RK-2 790. FIG. 7I depicts encrypted random key RK-2 790. The encryption state of encrypted random key 790 is graphically shown by payment gateway public key lock 795, which indicates that encrypted random key 790 is encrypted using the payment gateway public key.

In function block 680, payment gateway computer system 140 concatenates encrypted combined block 750, encrypted random key RK-1 760, encrypted capture token 780 and encrypted random key RK-2 790 to form merchant authorization response 325. FIG. 7J depicts merchant authorization response 325 comprising encrypted combined block 750, encrypted random key RK-1 760, encrypted capture token 780 and encrypted random key RK-2 790. In function block 685, payment gateway computer system 140 transmits merchant authorization response 325 to merchant system 130.

Payment Authorization Response Processing

Figure 8:
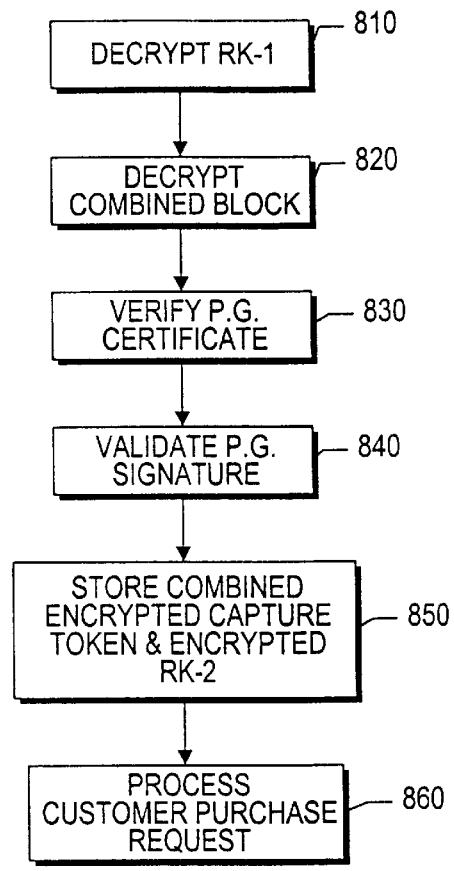
FIG. 8 depicts the detailed steps of processing a payment authorization response in accordance with a preferred embodiment.

FIG. 8 depicts the detailed steps of processing a payment authorization response. In function block 810, merchant computer system 130 applies its private key to encrypted random key RK-1 760 contained within received merchant authorization response 325, thereby decrypting it and obtaining a cleartext version of random key RK-1 740. In function block 820, merchant computer system 130 applies random key RK-1 740 to encrypted combined block 750, thereby decrypting it and obtaining a cleartext version of combined block 730. Combined block 730 comprises basic authorization response 710, a copy of payment gateway computer system's 140 signature public key certificate 720, as well as payment gateway digital signature 725. In function block 830, merchant computer system 130 verifies payment gateway computer system's 140 signature public key certificate 720. Merchant computer system 130 performs this verification by making a call to the certification authority associated with the certificate. If verification of the certificate fails, merchant computer system 130 concludes that the authorization response is counterfeit and treats it though the authorization request had been rejected.

In function block 840, merchant computer system 130 validates payment gateway digital signature 725. Merchant computer system 130 performs this validation by calculating a message digest over the contents of the combined basic authorization request 710 and the signature public key certificate 720. Merchant computer system 130 then decrypts digital signature 725 to obtain a copy of the equivalent message digest calculated by payment gateway computer system 140 in function block 640. If the two message digests are equal, the digital signature 725 is validated. If validation fails, concludes that the authorization response is counterfeit and treats it though the authorization request had been rejected.

In function block 850, merchant computer system 130 stores encrypted capture token 780 and encrypted random key RK-2 790 for later use in payment capture. In function block 860, merchant computer system 130 processes the customer purchase request in accordance with the authorization response 710. If the authorization response indicates that payment in authorized, merchant computer system 130 fills the requested order. If the authorization response indicates that payment is not authorized, or if merchant computer system 130 determined in function block 830 or 840 that the authorization response is counterfeit, merchant computer system 130 indicates to the customer that the order cannot be filled.

Payment Capture

Figure 9:
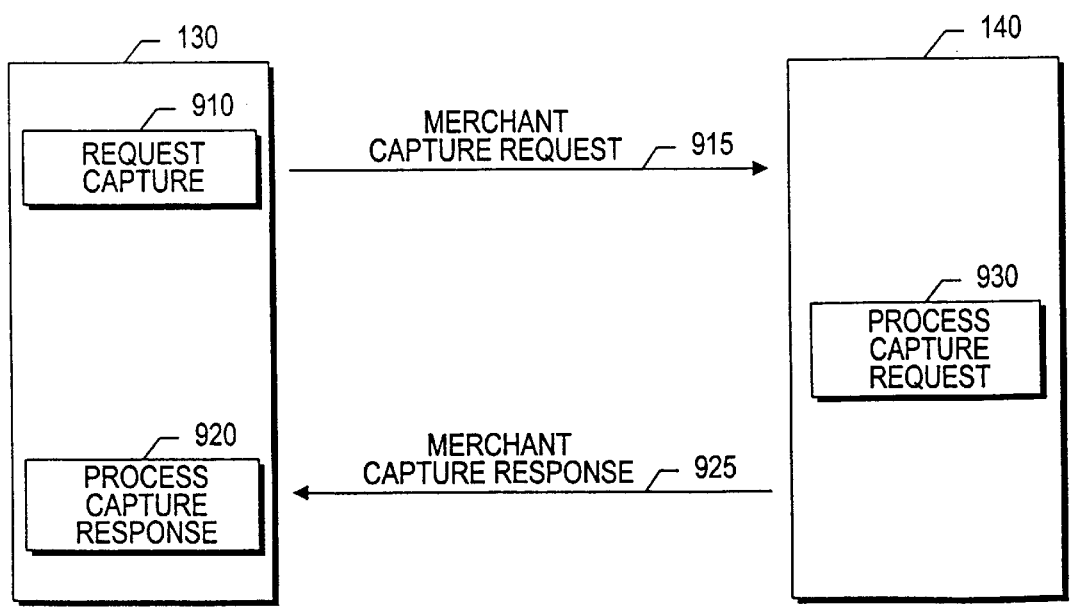
FIG. 9 depicts an overview of the method of securely supplying payment capture information to a payment gateway in accordance with a preferred embodiment.

FIG. 9 depicts an overview of the method of securely supplying payment capture information to payment gateway 140 in order to obtain payment capture. In function block 910, merchant computer system 130 generates a merchant payment capture request 915 and transmits it to payment gateway computer system 140. In function block 930, payment gateway system 140 processes the payment capture request 915, generates a payment capture response 925 and transmits it to merchant computer system 130. In function block 920, merchant computer system 130 processes payment capture response 925 and verifies that payment for the goods or services sought to be obtained by the customer have been captured.

Payment Capture Request Generation

Figure 10:
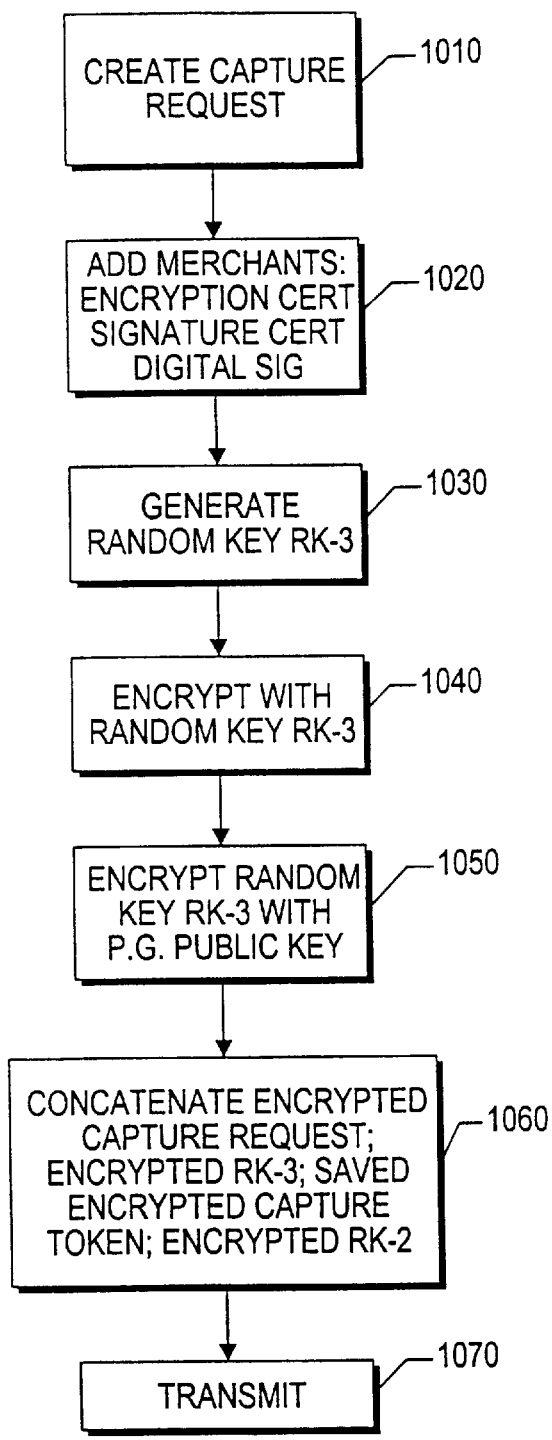
FIG. 10 depicts the detailed steps of generating and transmitting a payment capture request in accordance with a preferred embodiment.

FIG. 10 depicts the detailed steps of generating and transmitting a payment capture request. FIGS. 11A through 11F depict views of the payment capture request and its component parts. In function block 1010, merchant computer system 130 creates a basic capture request 510. The basic capture request is a data area that includes all the information needed by payment gateway computer system 140 to trigger a transfer of funds to the merchant operating merchant computer system 130.

Figure 11A:
FIGS. 11A through 11F depict views of the payment capture request and its component parts in accordance with a preferred embodiment.

Specifically, a capture request includes a capture request amount, a capture token, a date, summary information of the purchased items and a Merchant ID (MID) for the particular merchant. FIG. 11A depicts basic authorization request 1110.

In function block 1020, merchant computer system 130 combines basic capture request 1110, a copy of its encryption public key certificate 1115 and a copy of its signature public key certificate 1120. Merchant computer system 130 calculates a digital signature 1125 for the combined contents of the combined block 1130 comprising basic capture request 1110, the encryption public key certificate 1115 and the signature public key certificate 1120, and appends it to the combination of the combined basic capture request 1110, the encryption public key certificate 1115 and the signature public key certificate 1120. The merchant computer system calculates digital signature 1125 by first calculating a message digest over the contents of the combined basic capture request 1110, the encryption public key certificate 1115 and the signature public key certificate 1120. The message digest is then encrypted using the merchant computer system's 130 digital signature private key, thus forming a digital signature.

Figure 11B:
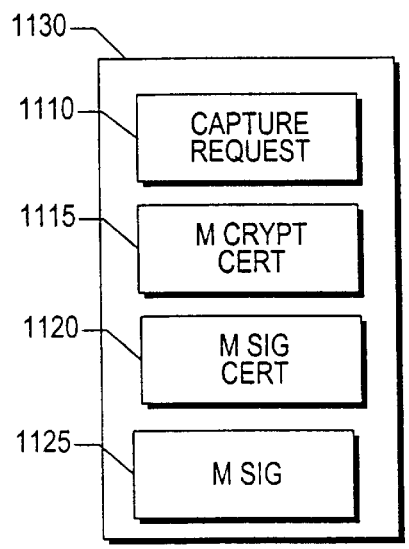
Figure 11C:
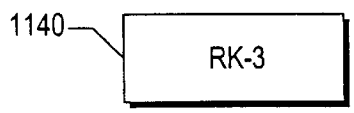
Figure 11D:
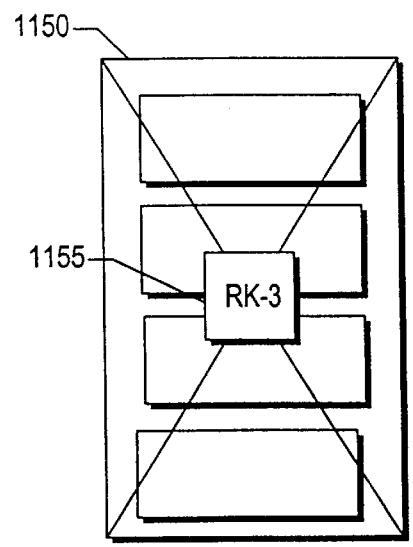
Figure 11E:
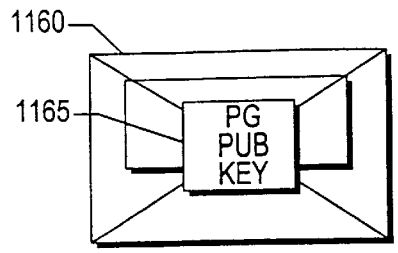

FIG. 11B depicts the combined block 1130 formed by function block 1020 and containing basic capture request 1110, the encryption public key certificate 1115, the signature public key certificate 1120, and digital signature 1125. In function block 1030, merchant computer system 130 generates a random encryption key 1140, denoted as RK-3. Random encryption key RK-3 1140 is a symmetric encryption key. FIG. 11C depicts random encryption key RK-3 1140. In function block 1040, merchant computer system 130 encrypts combined block 1130 using random encryption key RK-3 1140 to form encrypted combined block 1150. FIG. 11D depicts encrypted combined block 1150. The encryption state of encrypted combined block 1150 is graphically shown by random key lock 1155, which indicates that encrypted combined block 1150 is encrypted using random key RK-3 1140. In function block 1050, merchant computer system 130 encrypts random encryption key RK-3 1140 using the public key of payment gateway system 140 to form encrypted random key 1160. FIG. 1E depicts encrypted random key 1160. The encryption state of encrypted random key 1160 is graphically shown by payment gateway public key lock 1165, which indicates that encrypted random key RK-3 1160 is encrypted using the payment gateway public key.

Figure 11F:
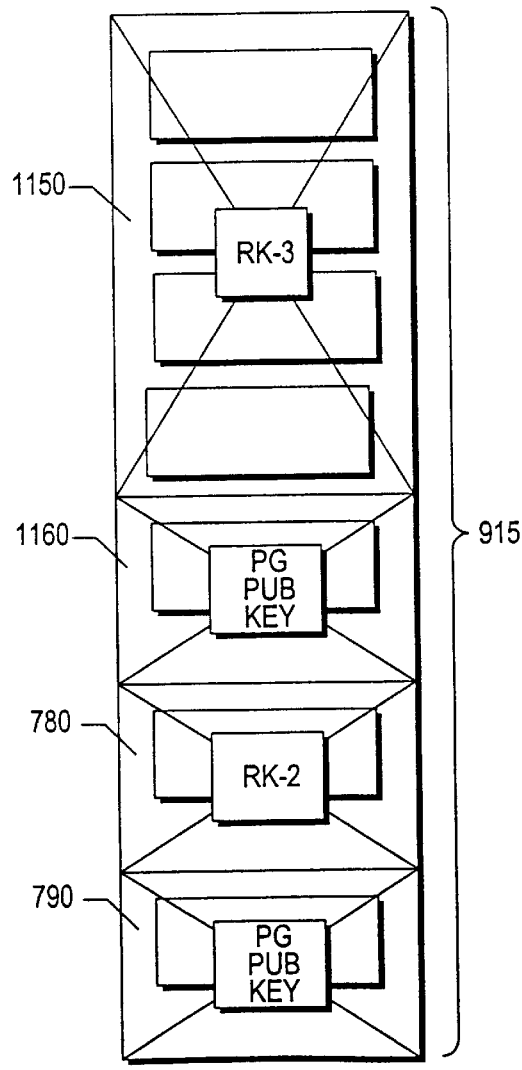

In function block 1060, merchant computer system 130 concatenates encrypted combined block 1150, encrypted random key 1160, and the encrypted capture token 780 and encrypted random key RK-2 790 that were stored in function block 850 to form merchant capture request 915. FIG. 11F depicts merchant capture request 915, comprising encrypted combined block 1150, encrypted random key 1160, encrypted capture token 780 and encrypted random key RK-2 790. In function block 1070, merchant computer system 130 transmits merchant capture request 915 to payment gateway system 140.

Payment Capture Request Processing

Figures 12A, 12B:
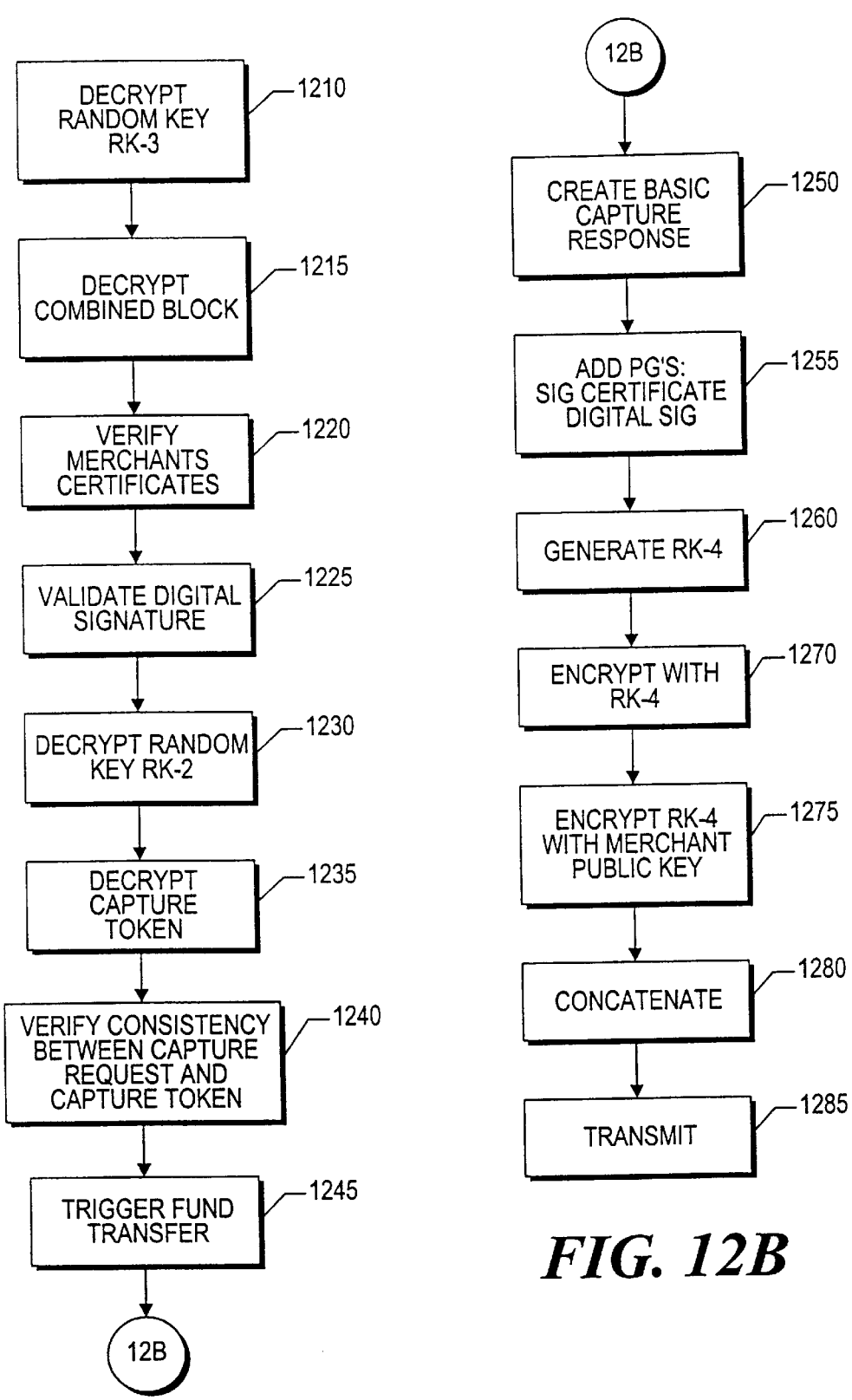
FIGS. 12A and 12B depict the detailed steps of processing a payment capture request and generating and transmitting a payment capture request response in accordance with a preferred embodiment.

FIG. 12 depicts the detailed steps of processing a payment capture request and generating and transmitting a payment capture request response. Function blocks 1210 through 1245 depict the steps of processing a payment capture request, while function blocks 1250 through 1285 depict the steps of generating and transmitting a payment capture request response. In function block 1210, payment gateway computer system 140 applies its private key to encrypted random key 1160 contained within received merchant capture request 915, thereby decrypting it and obtaining a cleartext version of random key RK-3 1140. In function block 1215, payment gateway computer system 140 applies random key RK-3 1140 to encrypted combined block 1150, thereby decrypting it and obtaining a cleartext version of combined block 1130. Combined block 1130 comprises basic capture request 1110, a copy of merchant computer system's 130 encryption public key certificate 1115 and a copy of merchant computer system's 130 signature public key certificate 1120, as well as merchant digital signature 1125. In function block 1220, payment gateway computer system 140 verifies merchant computer system's 130 encryption public key certificate 1115 and merchant computer system's 130 signature public key certificate 1120. Payment gateway computer system 140 performs this verification by making a call to the certification authorities associated with each certificate. If verification of either certificate fails, payment gateway computer system 140 rejects the capture request.

In function block 1225, payment gateway computer system 140 validates merchant digital signature 1125. Payment gateway computer system 140 performs this validation by calculating a message digest over the contents of the combined basic capture request 1110, the encryption public key certificate 1115 and the signature public key certificate 1120. Payment gateway computer system 140 then decrypts digital signature 1125 to obtain a copy of the equivalent message digest calculated by merchant computer system 130 in function block 1020. If the two message digests are equal, the digital signature 1125 is validated. If validation fails, payment gateway computer system 140 rejects the capture request. In function block 1230, payment gateway computer system 140 applies its private key to encrypted random key RK-2 790 contained within received merchant capture request 915, thereby decrypting it and obtaining a cleartext version of random key RK-2 775. In function block 1235, payment gateway computer system 140 applies random key RK-2 775 to encrypted capture token 780, thereby decrypting it and obtaining a cleartext version of capture token 770.

In function block 1240, payment gateway computer system 140 verifies that a proper transaction is being transmitted between capture token 780 and capture request 1110. A capture token contains data that the gateway generates at the time of authorization. When the authorization is approved, the encrypted capture token is given to the merchant for storage. At the time of capture, the merchant returns the capture token to the gateway along with other information required for capture. Upon receipt of the capture token, the gateway compares a message made of the capture request data and the capture token data and transmits this information over a traditional credit/debit network. If an improperly formatted transaction is detected, payment gateway computer system 140 rejects the capture request. In function block 1245, payment gateway computer system 140 determines the financial institution for which capture is requested by inspection of basic capture request 1110. Payment gateway computer system 140 contacts the appropriate financial institution using a secure means, e.g, a direct-dial modem-to-modem connection, or a proprietary internal network that is not accessible to third parties, and using prior art means, instructs a computer at the financial institution to perform the requested funds transfer after settlement.

Payment Capture Response Generation

Function blocks 1250 through 1285 depict the steps of generating and transmitting a payment capture request response. FIGS. 13A through 13F depict views of the payment capture response and its component parts.

Figure 13A:
FIGS. 13A through 13F depict views of the payment capture response and its component parts in accordance with a preferred embodiment.

In function block 1250, payment gateway computer system 140 creates a basic capture response 710. The basic capture request is a data area that includes all the information to indicate whether a capture request was granted or denied. FIG. 13A depicts basic authorization request 1310.

In function block 1255, payment gateway computer system 140 combines basic capture response 1310, and a copy of its signature public key certificate 1320. Payment computer system 140 calculates a digital signature 1325 for the combined contents of the combined block 1330 comprising basic capture response 1310 and the signature public key certificate 1320, and appends the signature to the combination of the combined basic authorization request 1310 and the signature public key certificate 1320. The payment gateway computer system calculates digital signature 1325 by first calculating a message digest over the contents of the combined basic capture response 1310 and signature public key certificate 720. The message digest is then encrypted using the merchant computer system's 140 digital signature private key, thus forming a digital signature.

Figure 13B:
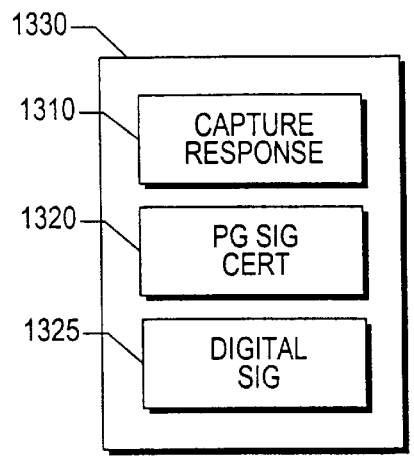
Figure 13C:
Figure 13D:
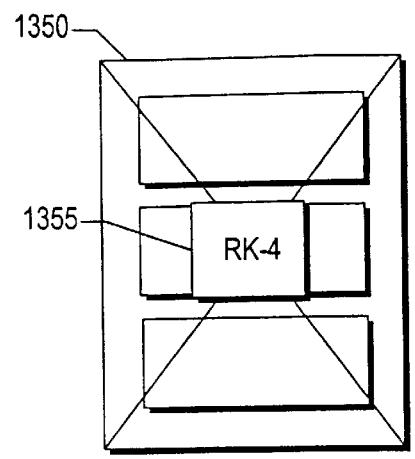
Figure 13E:
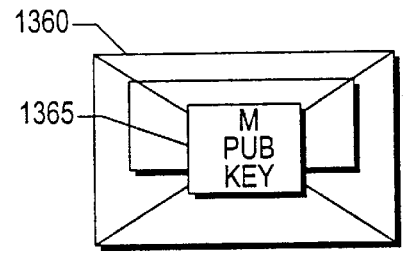
Figure 13F:
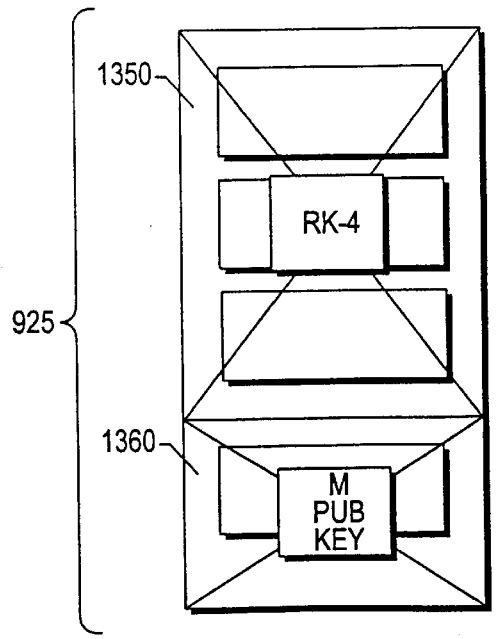

FIG. 13B depicts the combined block 1330 formed by function block 1255 and containing basic capture request 1310, the signature public key certificate 1320, and digital signature 1325. In function block 1260, payment gateway computer system 140 generates a symmetric random encryption key 1340, denoted as RK-4. FIG. 13C depicts random encryption key RK-4 1340. In function block 1275, payment gateway computer system 140 encrypts combined block 1330 using random encryption key RK-4 1340 to form encrypted combined block 1350. FIG. 13D depicts encrypted combined block 1350. The encryption state of encrypted combined block 1350 is graphically shown by random key lock 1355, which indicates that encrypted combined block 1350 is encrypted using random key RK-4 1340. In function block 1275, payment gateway computer system 140 encrypts random encryption key RK-4 1340 using the public key of merchant computer system 130 to form encrypted random key RK-4 1360. FIG. 13E depicts encrypted random key RK-4 1360. The encryption state of encrypted random key 1360 is graphically shown by merchant public key lock 1365, which indicates that encrypted random key 1360 is encrypted using the merchant public key. In function block 1280, payment gateway computer system 140 concatenates encrypted combined block 1350 and encrypted random key RK-4 1360 to form merchant capture response 925. FIG. 13F depicts merchant capture response 925 comprising encrypted combined block 1350 and encrypted random key RK-4 1360. In function block 1285, payment gateway computer system 140 transmits merchant capture response 925 to merchant system 130.

Payment Capture Response Processing

Figure 14:
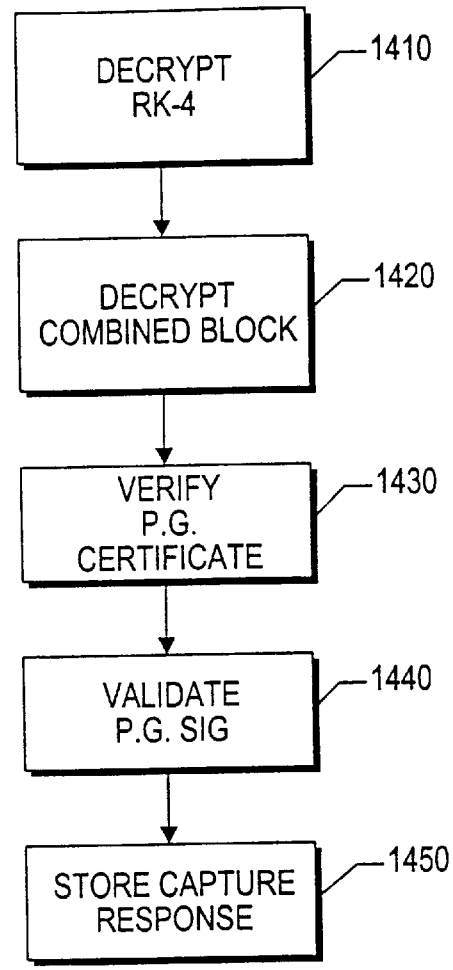
FIG. 14 depicts the detailed steps of processing a payment capture response in accordance with a preferred embodiment.

FIG. 14 depicts the detailed steps of processing a payment capture response. In function block 1410, merchant computer system 130 applies its private key to encrypted random key RK-4 1360 contained within received merchant capture response 925, thereby decrypting it and obtaining a cleartext version of random key RK-4 1340. In function block 1420, merchant computer system 130 applies random key RK-4 1340 to encrypted combined block 1350, thereby decrypting it and obtaining a cleartext version of combined block 1330. Combined block 1330 comprises basic capture response 1310, a copy of payment gateway computer system's 140 signature public key certificate 1320, as well as payment gateway digital signature 1325. In function block 1430, merchant computer system 130 verifies payment gateway computer system's 140 signature public key certificate 1320. Merchant computer system 130 performs this verification by making a call to the certification authority associated with the certificate. If verification of the certificate fails, merchant computer system 130 concludes that the capture response is counterfeit and raises an error condition.

In function block 1440, merchant computer system 130 validates payment gateway digital signature 1325. Merchant computer system 130 performs this validation by calculating a message digest over the contents of the combined basic authorization request 1310 and the signature public key certificate 1320. Merchant computer system 130 then decrypts digital signature 1325 to obtain a copy of the equivalent message digest calculated by payment gateway computer system 140 in function block 1255. If the two message digests are equal, the digital signature 1325 is validated. If validation fails, merchant computer system 130 concludes that the authorization response is counterfeit and raises an error condition. In function block 1450, merchant computer system 130 stores capture response for later use in by legacy system accounting programs, e.g. to perform reconciliation between the merchant operating merchant computer system 130 and the financial institution from whom payment was requested, thereby completing the transaction. The system of the present invention permits immediate deployment of a secure payment technology architecture such as the SET architecture without first establishing a public-key encryption infrastructure for use by consumers. It thereby permits immediate use of SET-compliant transaction processing without the need for consumers to migrate to SET-compliant application software.

VIRTUAL POINT OF SALE (vPOS) DETAILS

A Virtual Point of Sale (vPOS) Terminal Cartridge is described in accordance with a preferred embodiment. The vPOS Terminal Cartridge provides payment functionality similar to what a VeriFone PoS terminal ("gray box") provides for a merchant today, allowing a merchant to process payments securely using the Internet. It provides full payment functionality for a variety of payment instruments.

Payment Functionality

Figure 15A:
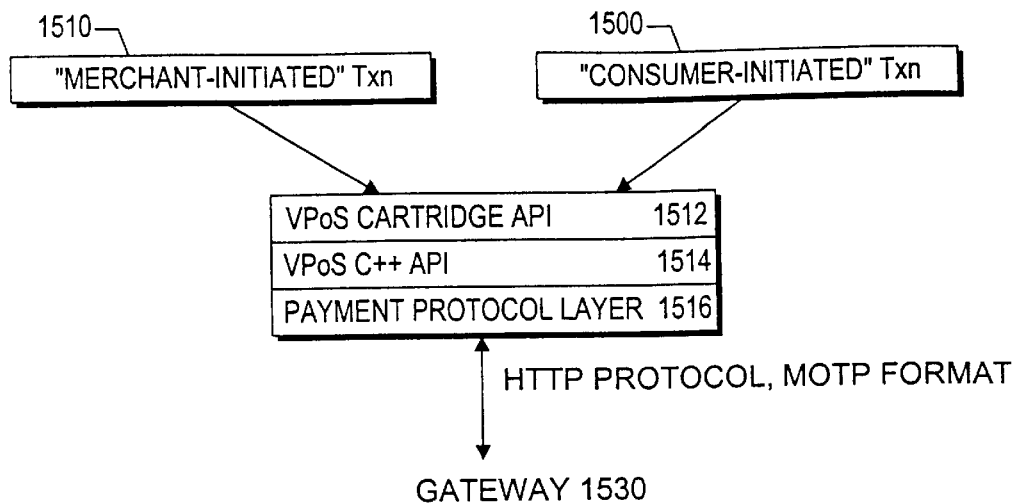
FIGS. 15A & 15B depicts transaction processing of merchant and consumer transactions in accordance with a preferred embodiment.

FIG. 15A illustrates a payment processing flow in accordance with a preferred embodiment. The payment functionality provided by the vPOS terminal is divided into two main categories: "Merchant-Initiated" 1510 and "Consumer-Initiated" 1500. Some payment transactions require communication with the Acquirer Bank through the Gateway 1530. The normal flow of a transaction is via the vPOS Cartridge API 1512 to the vPOS C++ API 1514 into the payment protocol layer 1516 which is responsible for converting into the appropriate format for transmission to the Gateway for additional processing and forwarding to existing host payment authorization systems. Host legacy format refers to an existing authorization system for credit card approval currently utilized with the VeriFone Point of Sale (POS) gray terminals. The output from the payment protocol layer 1516 is transmitted to the authorization processing center via the gateway 1530. These transactions are referred to as "Online Transactions" or "Host Payments." The transactions that can be done locally by the merchant without having to communicate with the Acquirer Bank are referred to as "Local Functions and Transactions." To support different types of payment instruments, the vPOS Terminal payment functionality is categorized as set forth below.

Host Payment Functionality: These transactions require communication with the final host, either immediately or at a later stage. For example, an Online Authorization-Only transaction, when initiated, communicates with the host immediately. However, an Off-line Authorization-Only transaction is locally authorized by the vPOS terminal without having to communicate with the host, but at a later stage this off-line authorization transaction is sent to the host. Within the Host Payment Functionality some transactions have an associated Payment Instrument, while others do not. These two kinds of transactions are:

Host Financial Payment Functionality: These transactions have a Payment Instrument (Credit Card, Debit Card, E-Cash, E-Check, etc.) associated with them. For example, the "Return" transaction, which is initiated upon returning a merchandise to the merchant.

Host Administrative Payment Functionality: These transactions do not require a payment instrument, and provide either administrative or inquiry functionality. Examples of these transactions are "Reconcile" or the "Batch Close."

Local Functions and Transactions: These transactions do not require communication with the host at any stage, and provide essential vPOS terminal administrative functionality. An example of this is the vPOS terminal configuration function, which is required to set up the vPOS terminal. Another example is the "vPOS Batch Review" function, which is required to review the different transactions in the vPOS Batch or the Transaction Log.

Payment Instruments

A preferred embodiment of a vPOS terminal supports various Payment Instruments. A consumer chooses a payment based on personal preferences. Some of the Payment Instruments supported include:

Credit Cards

Debit Cards

Electronic Cash

Electronic Checks

Micro-Payments (electronic coin)
Smart Cards

URL Table

The table below enumerates the URLs corresponding to the transactions supported by the vPOS Terminal Cartridge. Note that the GET method is allowed for all transactions; however, for transactions that either create or modify information on the merchant server, a GET request returns an HTML page from which the transaction is performed via a POST method.

| Transaction | URL | POST | Access Control |
|---|---|---|---|
| HOST FINANCIAL PAYMENT FUNCTIONALITY | | | |
| auth capture | /vPOSt/mi/auth-capture/ | allowed | merchant login/password |
| auth capture | /vPOSt/ci/authcapture/ | allowed | no access control |
| auth only | /vPOSt/mi/authonly/ | allowed | merchant login/password |
| auth only | /vPOSt/ci/authonly/ | allowed | no access control |
| adjust | /vPOSt/mi/adjust/ | allowed | merchant login/password |
| forced post | /vPOSt/mi/forcedpost/ | allowed | merchant login/password |
| offline auth | /vPOSt/mi/offlineauth/ | allowed | merchant login/password |
| offline auth | /vPOSt/ci/offlineauth/ | allowed | no access control |
| pre auth | /vPOSt/mi/preauth/ | allowed | merchant login/password |
| pre auth comp | /vPOSt/mi/preauthcomp/ | allowed | merchant login/password |
| return | /vPOSt/mi/return/ | allowed | merchant login/password |
| return | /vPOSt/ci/return/ | allowed | no access control |
| void | /vPOSt/mi/void/ | allowed | merchant login/password |
| HOST ADMINISTRATIVE PAYMENT FUNCTIONALITY | | | |
| balance inquiry | /vPOSt/mi/bi/ | not allowed | merchant login/password |
| host logon | /vPOSt/mi/hostlogon/ | allowed | merchant login/password |
| parameter download | /vPOSt/mi/parametersdnld/ | not allowed | merchant login/password |
| reconcile | /vPOSt/mi/reconcile/ | allowed | merchant login/password |
| test host | /vPOSt/mi/testhost/ | not allowed | merchant login/password |
| LOCAL FUNCTIONS & TRANSACTIONS | | | |
| accum review | /vPOSt/mi/accum/review/ | not allowed | merchant login/password |
| batch review | /vPOSt/mi/batch/review/ | not allowed | merchant login/password |
| cdt review | /vPOSt/mi/cdt/review/ | not allowed | merchant login/password |
| cdt update | /vPOSt/mi/cdt/update/ | allowed | merchant login/password |
| cpt review | /vPOSt/mi/cpt/review | not allowed | merchant login/password |
| cpt update | /vPOSt/mi/cpt/update/ | allowed | merchant login/password |
| clear accum | /vPOSt/accum/clear/ | allowed | merchant login/password |
| clear batch | /vPOSt/mi/batch/clear/ | allowed | merchant login/password |
| hdt review | /vPOSt/mi/hdt/review/ | not allowed | merchant login/password |
| hdt update | /vPOSt/mi/hdt/update/ | allowed | merchant login/password |
| lock vPOS | /vPOSt/mi/lock/ | allowed | merchant login/password |
| query txn | /vPOSt/ci/querytxn/ | not allowed | no access control |
| query txn | /vPOSt/mi/querytxn/ | not allowed | merchant |
| tct review | /vPOSt/mi/tct/review/ | not allowed | merchant login/password |
| tct update | /vPOSt/mi/tct/update/ | allowed | merchant login/password |
| unlock vPOS | /vPOSt/mi/unlock/ | allowed | merchant login/password |

URL Descriptions

This section describes the GET and POST arguments that are associated with each transaction URL. It also describes the results from the GET and POST methods. For URLs that produce any kind of results, the following fields are present in the HTML document that is returned by the vPOS Terminal Cartridge:

| | |
|---|---|
| txnDate | Date of the transaction (mm/dd/yy or dd/mm/yy) |
| txnTime | Time of the transaction (hh:mm:ss GMT or hh:mm:ss local time) |
| merchantId | Merchant ID of the merchant using the vPOS terminal |
| terminalId | vPOS Terminal Id |
| txnNum | Transaction number of the given transaction |
| txnType | Type of transaction |

For URLs that deal with financial transactions, the following fields are present in the HTML document that is returned by the vPOS terminal cartridge:

| | |
|---|---|
| txnAmount | Transaction amount that is being authorized, forced posted, voided, etc. |
| poNumber | Purchase order number |
| authIdentNum | Authorization ID number for the transaction |
| retRefNum | Retrieval reference number for the given transaction |
| piInfo | Payment instrument information. This varies for different payment instruments. For example, in the case of credit cards, the credit card number (piAcctNumber) and expiration date (piExpDate) are returned. |

Accumulate Review

URL Functionality: This is a local information inquiry function that retrieves the local (merchant's) transaction totals (accumulators).
GET Arguments: None.
GET Results: Retrieves the transaction totals for the merchant. Currently, the total is returned as an HTML document. The transaction totals currently returned are:

| | |
|---|---|
| creditAmt | Total Credit Amount since the last settlement logged in the vPOS terminal |
| creditCnt | Total Credit Count since the last settlement logged in the vPOS terminal |
| debitAmt | Total Debit Amount since the last settlement logged in the vPOS terminal |
| debitCnt | Total Debit Count since the last settlement logged in the vPOS terminal |

Note: Accum Review is a local function, as opposed to Balance Inquiry which is done over the Internet with the host.

Adjust

URL Functionality: Corrects the amount of a previously completed transaction.
GET Arguments: None
GET Results: Because the Adjust transaction modifies data on the merchant server, the POST method should be used. Using the GET method returns an HTML form that uses the POST method to perform the transaction.
POST Arguments:

| | |
|---|---|
| pvsTxnNum | Previous transaction number |
| txAdjustedAmount | The adjusted transaction amount. Note that the original transaction amount is easily retrievable from the previous transaction number. |

POST Results: On success, pvsTxnNum and txnAdjustedAmount are presented in the HTML document, in addition to the transaction fields described above.

Auth Capture

URL Functionality: This transaction is a combination of Auth Only (Authorization without capture) and Forced Post transactions.
GET Arguments: None
GET Results: Because the Auth Capture transaction modifies data on the merchant server side, the POST method should be used. Using the GET method returns an HTML form that uses the POST method to perform the transaction.
POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields described above is returned. On failure, an HTML document that contains the reason for the failure of the transaction is returned. The transaction is logged into a vPOS Terminal transaction log for both instances.

Auth Only

URL Functionality: Validates the cardholder's account number for a Sale that is performed at a later stage. The transaction does not confirm the sale to the host, and there is no host data capture. The vPOS captures this transaction record and later forwards it to confirm the sale in the Forced Post transaction request.
GET Arguments: None.
GET Results: Because the Auth Only transaction modifies data on the merchant server side, the POST method should be used. Using the GET method returns an HTML form that uses the POST method to perform the transaction.
POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields is returned. On failure, an HTML document that contains the reason for the failure of the transaction is returned. The transaction is logged into vPOS Terminal transaction log for both instances.
NOTE: The /vPOSt/ci/authonly/ URL should be used for customer-initiated transactions. /vPOSt/mi/authonly/ should be used for merchant-initiated transactions.

Balance Inquiry

URL Functionality: Performs an on-line inquiry or the merchant's balance.
GET Arguments: None
GET Results:

| | |
|---|---|
| mrchtBlnceAmt | Merchant balance amount for a given merchant. The balance amount at any given time is the difference between the credit and debit amount since the last settlement between the merchant and the acquirer. |

Batch Review

URL Functionality: Retrieves all records from the transaction log or the batch.
GET Arguments: None
GET Results: The GET method retrieves the transactions that have been batched in the vPOS terminal for future reconciliation. The batch can be cleared from the vPOS terminal after a manual reconciliation between the acquirer and the vPOS. The batch data is retrieved as a set of records and is formatted as a table in the HTML document. The following fields are present in a typical record:

| | |
|---|---|
| nTransType | Transaction type |
| nPurchOrderNo | Purchase order number |
| szAcctNum | Customer's payment instrument account number |
| szExpDate | Customer's payment instrument expiration date |
| szTransAmt | Transaction amount |
| szTransDate | Transaction date |
| szTransTime | Transaction time |
| szRetrievalRefNum | Transaction's retrieval reference number |
| szAuthId | Authorization ID for the transaction |
| szOrigAmt | Original transaction amount |
| szBatchNum | Batch number for the given transaction |
| nCurrencyType | Currency in which the transaction was done |
| InTransNum | Transaction number |

CDT Review

URL Functionality: Displays the vPOS terminal configuration data corresponding to the Card Definition Table (CDT).
GET Arguments: None
GET Results: The GET method returns a default HTML form that contains the current configuration values. The form can be modified and posted using the /vPOSt/mi/cdt/update/ URL to update the card definition table. Not all fields in the card definition table are editable. The following fields are returned in a form to the user:

| | |
|---|---|
| nHostIndex | Index into the Host Definition Table or the Acquirer that maps to this card issuer. |
| szPANLo | Low end of the PAN (Primary Account Number) range |
| szPANHi | High end of the PAN range |
| nMaxPANDigit | Maximum number of digits in the PAN for this acquirer. |
| NMinPANDigit | Minimum number of dits in the PAN for the acquirer |
| szCardLabel | Card Issuer's name |

| Transactions Available bit vector | Specifies if a particular transaction is allowed for a given card range. |
|---|---|

(Some of these fields are not editable by a merchant, and still need to be determined.)

CDT Update
URL Functionality: Updates the vPOS terminal configuration data corresponding to the Card Definition Table (CDT).
GET Arguments: None
GET Results: The GET method returns a default HTML form that contains the current configuration values. The form can be filled out and posted using the /vPOSt/mi/cdt/update URL to update the card definition table.
POST Arguments: (Editable CDT fields need to be decided.)
POST Results: (Depends on editable CDT fields, and therefore needs to be decided.)

Clear Accumulator
URL Functionality: Zeroes out the accumulator totals currently resident in the vPOS terminal.
GET Arguments: None.
GET Results: Presents a form that uses the POST method to zero the accumulators.
POST Arguments: None.
POST Results: Zeroes the accumulators/transaction totals in the vPOS terminal.

Clear Batch
URL Functionality: Zeroes out the transaction logs currently batched in the vPOS terminal.
GET Arguments: None.
GET Results: Presents a form that uses the POST method to clear the batch.
POST Arguments: None.
POST Results: Zeroes the transactions that comprise the batch in the vPOS terminal.

Forced Post
URL Functionality: Confirms to the host the completion of a sale, and requests for data capture of the transaction. This is used as a follow-up transaction after doing an Authorization (Online or Off-line) transaction.
GET Arguments: None.
GET Results: Returns the HTML form for performing the Forced Post transaction.
POST Arguments:

| pvsTxnNum | the previous transaction number from an auth only transaction |
|---|---|

POST Results: On success, pvsTxnNum is presented in the HTML document. On failure, an HTML document is returned that contains the reason for the failure of the transaction.

HDT Review
URL Functionality: Displays the vPOS terminal configuration data corresponding to the Host Definition Table (HDT).
GET Arguments: None
GET Results: The GET method returns a default HTML form that contains the current configuration values. The form can be modified and posted using the /vPOSt/mi/hdt/update URL to update the hosts definition table. Not all fields in the host definition table are editable. The following fields are returned in a form to the user:

| sZTermId | Terminal ID for this vPOS terminal |
|---|---|
| szMerchId | Merchant ID for this vPOS terminal |
| szCurrBatchNum | Current batch number existing on the vPOS |
| szTranNum | Reference number for the next transaction in the vPOS transaction log/batch. This is generated by vPOS and is not editable by the merchant. |
| szTPDU | Transport Protocol Data Unit. Required for building the ISO 8583 packet. |
| InSTAN | System trace number; message number of the next transaction to be transmitted to this acquirer. |
| szNII | Network International Number. Required for building the ISO 8583 packet. |
| szHostName | Name for identifying the host. |
| nHostType | Host type |
| nNumAdv | Number of off-line transactions that can be piggybacked at the end of an on-line transaction. |
| Data Capture Required Bit vector: | Specifies for which transactions data capture is required. |

(Some of these fields are not editable by a merchant and need to be determined.)

HDT Update
URL Functionality: Updates the vPOS terminal configuration data corresponding to the Host Definition Table (HDT).
GET Arguments: None
GET Results: The GET method returns a default HTML form that contains the current configuration values. The form can be filled out and posted to the merchant server using the /vPOSt/mi/hdt/update URL to update the host definition table

Unlock vPOS
URL Functionality: Local function that starts the vPOS at the start of the day.
GET Arguments: None.
GET Results: Returns an HTML form that uses the POST method to perform this transaction.
POST Arguments: None.
POST Results: Resets a Boolean flag on the merchant server that enables transactions to be accepted by the vPOS terminal.

Offline Auth
URL Functionality: This transaction is same as the "Authorization Only" transaction, except that the transaction is locally captured by the vPOS terminal without having to communicate with the host. A Forced Post operation is done as a follow-up operation of this transaction.
GET Arguments: None.
GET Results: Because the Offline Auth transaction modifies data on the merchant server side, the POST method should be used. Using the GET method returns an HTML form for using the POST method to perform the transaction.
POST Arguments:

| piAcctNumber | Payment Instrument account number, e.g., Visa credit card number |
|---|---|
| piExpDate | Expiration date |
| txnAmt | Transaction amount |

POST Results: On success, an HTML document that contains the transaction fields described in Section 4.1 is returned. On failure, an HTML document that contains the reason for the failure of the transaction is returned. The transaction is logged into vPOS terminal transaction log for both instances.

Parameter Download

URL Functionality: Downloads the vPOS configuration information from the host and sets up the vPOS in the event of the configuration data being changed.
GET Arguments: None
GET Results: Retrieves an HTML form that uses the POST method for the parameter download transaction.
POST Arguments: None.
POST Results: Downloads the following parameters from the host and uploads them into the vPOS terminal configuration table.

| |
|---|
| card/issuer definition table (CDT) |
| host/acquirer definition table (HDT) |
| communications parameter table (CPT) |
| terminal configuration table (TCT) |

The various configuration parameters can be reviewed and modified using the URLs for the desired functionality.

Pre Auth

URL Functionality: Used in lodging and hotel establishments to pre-authorize a charge that is completed some time in future.
GET Arguments: None
GET Results: Retrieves the HTML form for posting the pre-authorizaton transaction.
POST Arguments:

| | |
|---|---|
| piAcctNumber | Payment Instrument account number, e.g., Visa credit card number |
| piExpDate | Expiration date |

Pre Auth Comp

URL Functionality: Completes a pre-authorization transaction.
GET Arguments: None
GET Results: Retrieves the HTML form for posting the pre-authorization completion transaction.
POST Arguments:

| | |
|---|---|
| pvsTxnNum | Previous transaction number from an auth only transaction |

POST Results: On success, pvsTxnNum is presented in the HTML document. On failure, an HTML document is returned that contains the reason for the failure of the transaction.

Reconcile

URL Functionality: This transaction is done at the end of the day to confirm to the host to start the settlement process for the transactions captured by the host for that particular vPOS batch.
GET Arguments: None
GET Results: Retrieves the HTML form for posting the Reconcile transaction.
POST Arguments: None.
POST Results: On success, the reconcile function prints any discrepancies in the merchant's batch of transactions and totals vis-a-vis the host's batch of transactions in totals. The output format is a combination of the output of the Batch Review and Accum Review transactions.

Return

URL Functionality: Credits the return amount electronically to the consumer's account when previously purchased merchandise is returned. The vPOS terminal captures the transaction record for this transaction.
GET Arguments: None
GET Results: Retrieves the HTML form for posting the Return transaction.
POST Arguments:

| | |
|---|---|
| preVTxnNum | Reference to the previous transaction number |

The previous transaction has access to the following fields:

| | |
|---|---|
| txnAmount | Transaction amount |
| piAccountNum | Payment instrument account number |
| piExpDate | Payment instrument expiration date |

POST Results: On success, pvsTxnNum is presented in the HTML document, in addition to

Test Host

URL Functionality: Checks the presence of the host and also the integrity of the link from the vPOS to the host.
GET Arguments: None.
GET Results: On success, an HTML document is returned that reports success in connecting to the host. On failure, an HTML document is returned that reports the error encountered in testing the host.

Lock vPOS

URL Functionality: This local function locks or stops the vPOS terminal from accepting any transactions.
GET Arguments: None.
GET Results: Returns an HTML form that posts the locking of the vPOS terminal.
POST Arguments: None.
POST Results: On success, an HTML document is returned that contains the status that vPOS terminal was successfully. On failure, an HTML document is returned that reports the cause of failure of the operation, e.g., access denied, the vPOS terminal is already locked or is presently processing a transaction, etc.

Void

URL Functionality: Cancels a previously completed draft capture transaction.
GET Arguments: None.
GET Results: Retrieves an HTML form for posting the Void transaction.

POST Arguments:

| | |
|---|---|
| pvsTxnNum | Transaction number from a previous Auth Only transaction. |

Host Logon
URL Functionality: Administrative transaction used to sign-on the vPOS with the host at the start of the day, and also to download encryption keys for debit transactions.
GET Arguments: None
GET Results: Retrieves an HTML form for posting the Host Logon transaction.
POST Arguments: None.
POST Results: Currently, debit card based transactions are not supported. The result is an HTML document indicating the success or failure of the host logon operation.

CPT Review
URL Functionality: Returns the vPOS terminal configuration data corresponding to the Communications Parameter Table (CPT).
GET Arguments: None
GET Results: The GET method returns a default HTML form that contains the current configuration values corresponding to the vPOS terminal's communication parameters. The form can be filled out and posted to the merchant server using the /vPOSt/mi/cpt/update URL to update the communications parameter table. The following fields are returned in a form to the user:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the vPOS should receive a response from the host |

CPT Update
URL Functionality: Updates the vPOS terminal configuration data corresponding to the Communications Parameter Table (CPT).
GET Arguments: None
GET Results: The GET method returns a default HTML form that contains the current configuration values. The form can be modified and posted to update the communication parameter table.
POST Arguments:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the vPOS should receive a response from the host |

POST Results: On success, the HTML document returned by the vPOS contains the values set by the merchant. On failure, the HTML document contains the reason for the failure of the invocation of the URL.

TCT Review
URL Functionality: Returns the vPOS terminal configuration data corresponding to the Terminal Configuration Table (TCT).
GET Arguments: None.
GET Results: The GET method returns a default HTML form that contains the current configuration values. The form can be filled out and posted using the /vPOSt/mi/tct/update URL to update the terminal configuration table. The following fields are returned in a form to the user:

| | |
|---|---|
| szMerchName | Merchant name |
| szSupervisorPwd | Supervisor password |
| fvPOSLock | 1 = vPOS locked, 0 = vPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

TCT Update
URL Functionality: Updates the vPOS terminal configuration data corresponding to the Terminal Configuration Table (TCT).
GET Arguments: None
GET Results: The GET method returns a default HTML form that contains the current configuration values. The form can be filled out and posted using the /vPOSt/mi/tct/update URL to update the terminal configuration table.
POST Arguments: All arguments in TCT Review functionality are the returned values from the /vPOSt/mi/tct/update the URL.

| | |
|---|---|
| szMerchName | Merchant name |
| szSupervisorPwd | Supervisor password |
| fvPOSLock | 1 = vPOS locked, 0 = vPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompP | Password for pre-authorization completion |

POST Results: On success, the POST modifies values of the terminal configuration table parameters. On failure, the HTML document contains the reason for the failure of the transaction.

Query Transactions
URL Functionality: Permits the merchant and customer to query a given transaction corresponding to a transaction number.
GET Arguments:

| | |
|---|---|
| txnNum | Transaction number |

GET Results: For a given transaction, the URL returns an HTML document. If a transaction refers to an older transaction, the transaction's entire history is made available.

URL results
Depending upon the method (GET/ POST) as well as the success or failure of the HTTP request, different documents are returned to the user. The vPOS terminal provides a framework whereby different documents are returned based upon a number of preferences. Currently the language and content-type are supported as preferences.

A simple framework is proposed here. Each of the transaction has a set of documents associated with it: form for the payment transaction, GET success, GET failure, POST success, and POST failure.

In the directory structure defined below, documents are stored corresponding to the preferences. The top level of the directory structure is the content-type, the next level is language (for NLS support). For example, to create text/html content in US English & French, the directory structure given below would contain the HTML documents for each of the transactions. The vPOS terminal cartridge has a configuration file that allows the user to specify the content-type as well as the language to be used for a cartridge. The first release of the vPOS terminal cartridge supports one content-type and language for each server.

DATA STRUCTURES & FUNCTIONS

Functions

A brief description of the Virtual Point of Sale Terminal cartridge functions are provided below. vPOSTInit( ), vPOSTExec( ) and vPOSTShut( ) are the entry points required for each cartridge in accordance with a preferred embodiment. The other functions implement some of the key vPOST cartridge functionality. A source listing of the vPOS code is provided below to further accentuate the detailed disclosure of a preferred embodiment.

vPOSTInit()

```
/* vPOST cartridge Initialization here */
WRBReturnCode
vPOSTInit(void **clientCtx){
    vPOSTCtx *vPOSTCXP;
    /* Allocate memory for the client context */
    if (!(vPOSTCXP = (vPOSTCtx *)malloc(sizeof(vPOSTCtx))))
        return WRB_ERROR;
    *clientCtx = (void *)vPOSTCXP;
    return (WRB#DONE);}
``` vPOSTShut()

```
WRBReturnCode
vPOSTShut(void *WRBCtx, void *clientCtx){
    *WRBCtx; /* not used * /
    assert( clientCtx)
    /* Free the client context allocated in vPOSTInit() routine
        free( clientCtx)
        return (WRB_DONE);}
``` vPOSTExec()

```
/* The driver cartridge routine */
WRBReturnCode
vPOSTExec( void *WRBCtx, void *clientCtx)
{
    vPOSTCtx *vPOSTCXP;
    char *uri;
    char *txnMethod; /* HTTP method */
    enum evPOSTTxn *txn; /* vPOST transaction */
    char *txnOutFile ; /* Output file from transaction */
    char **txnEnv ; /* environment variables values for transaction */
    char *txnContent; /* transaction's POST data content */
    WRBEntry *WRBEntries;
    int numEntries;
    vPOSTCxp (vPOSTCtx *) clientCtx;
    /* WRBGetURL gets the URL for the current request */
    if (!(uri = WRBGetURL( WRBCtx)))
        return (WRB_ERROR);
    /* WRBGetContent() gets the QueryString/POST data content */
    if (!(txnContent = WRBGetContent( WRBCtx)))
        return WRB_ERROR;
    }
    /* WRBGetParserContent() gets the parsed content */
    if (WRB_ERROR == WRBGEtParsedContent( WRBCtx, &WRBEntries,
        &numEntries))
            return WRB_ERROR;
    }
    /* WRBGetEnvironment() gets the HTTP Server Environment */
    if (!(txnEnv = WRBGetEnvironment( WRBCtx)))
        return WRB_ERROR;
    }
    /* vPOSTGetMethod() gets the method for the current request */
    if (!(method = vPOSTGetMethod( txnEnv ))){
        return #RB#ERROR);
    }
    /* vPOSTGetTxn() gets the vPOST transaction for the request */
```

-continued

```
    txn vPOSTGetTxn( uri);
    if (eTxnError txn)
        return {WRB_ERROR);
    }
    /* vPOSTExecuteTransaction() executes the vPOST transaction */
    txnOutFile vpOSTExecuteTransaction( WRBCtx, txn, txnMethod,
        txnEnv, txnContent);
    if (!(txnOutFile))
        return (WRB_ERROR);
    }
    /* Write out the file */
    vPOSTWnteFile(txnOutFile);
    return (WRB_DONE);
}
                        vPOSTGetTxn()

enum evPOSTTxn
vPOSTGetTxn( char *uri)
}
    /*
    * The function scans the uri and extracts the string
    * corresponding to the transaction and returns it to the
    * caller.
    */
}
```

Transaction Log Format

This section describes the format of a record for the transaction log for the vPOST cartridge.

| Field Name | Field Description |
|---|---|
| nTransType | Transaction Type |
| nPurchOrderNo | Purchase Order Number |
| szAcctNum | Payment Instrument Account number |
| szExpDate | Payment instrument expiration date |
| szTransAmt | Transaction amount |
| szTransDate | Date of transaction (configurable to be mm/dd/yy or dd/mm/yy) |
| szTransTime | Time of transaction (configurable to be GMT or local time) |
| szRetrievalRefNum | Retrieval reference number |
| szAuthId | Authorization ID |
| szOrigAmt | Original transaction amount |
| szBatchNum | Batch number to which this particular transaction belongs in the vPOST batch |
| nCurrencyType | Currency |
| lnTransNum | Transaction number |

Figure 15B:
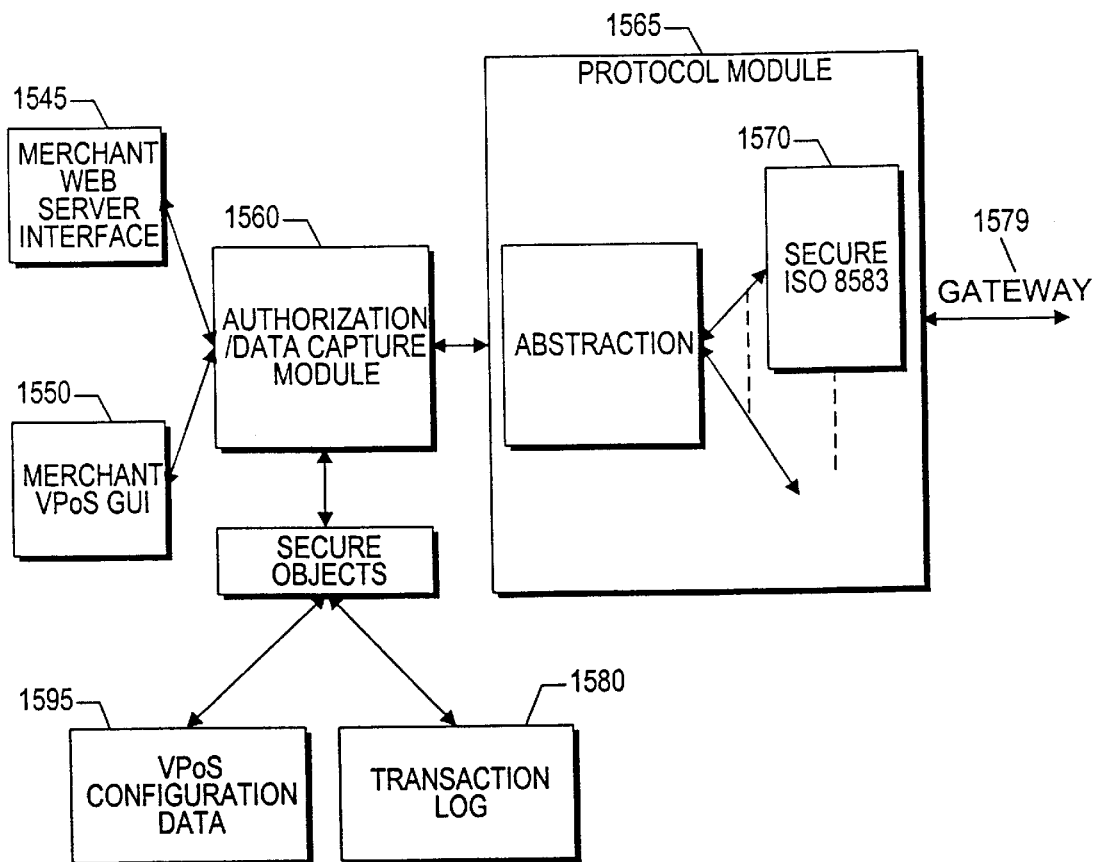

In the block diagram shown in FIG. 15B, the vPOS provides an interface for transactions which are initiated both by the consumer and the merchant. The merchant initiates a transaction from a Graphical User Interface (GUI) 1550 and all the transactions that are initiated by the consumer are routed by the Merchant WEB Server 1545.

The Authorization/Data Capture Module 1560 processes the requests originated by the merchant or the consumer and routes them to the Protocol Module 1565. The Protocol Module is responsible for building the payment protocol request packet (e.g., an SSL-encapsulated ISO 8583 packet) 1570 before sending the request to the Gateway 1579. Then, the Gateway 1579 awaits a response from the Protocol Module 1565, and upon receiving the response, the Gateway 1579 parses the data and provides unwrapped data to the Authorization/Data-Capture Module 1560. The Authorization/Data-Capture Module 1560 analyzes the response and updates the Transaction Log 1580. The Transaction Log 1580 contains information concerning any successfully completed transactions and the accumulators or the transaction totals. The vPOS terminal creates and maintains the Transaction Log 1580, and the vPOS Configuration Data 1585 contains information which is used to configure the behavior of the vPOS. The entire vPOS functionality is thread-safe and hence using the vPOS in a multi-threaded environment does not require any additional interfacing requirements.

FIGS. 36–48 are vPOS screen displays in accordance with a preferred embodiment.

Payment Functionality

As discussed above, the different Payment Functionality provided by the vPOS terminal can be divided into two main categories as "Merchant Initiated" and "Consumer Initiated." Some of these transactions require communication with the Gateway and these transactions are referred to as "Online Transactions." The transactions which can be done locally to the merchant without having to communicate are referred to as "Local Functions/Transactions." In order to provide support for many different types of Payment Instruments, the vPOS Payment Functionality have been categorized.

Host payment functionality and transactions require communication with the host either immediately or at a later stage. Each of the host financial payment transactions come to this category and require a Payment Instrument. These transactions can be initiated with different types of Payment Instruments which the vPOS terminal supports.

An authorization without capture transaction is used to validate the card holder's account number for a sale that needs to be performed at a later stage. The transaction does not confirm a sale's completion to the host, and there is no host data capture in this event. The vPOS captures this transaction record and later forwards it to the host to confirm the sale in a forced post transaction request. An authorization without capture transaction can be initiated both by the consumer and the merchant.

A forced post transaction confirms to a host computer that a completion of a sale has been accomplished and requests data capture of the transaction. The forced post transaction is used as a follow-up transaction after doing an authorization (Online or Off-line) transaction.

The transaction can be initiated only by the merchant. The authorization with post transaction is a combination of authorization without capture and forced post transactions. This transaction can be initiated both by the consumer and the merchant.

The offline post transaction is identical to the "authorization without capture" transaction, except that the transaction is locally captured by the vPOS without initiating communication with a host. A forced post operation is done as a follow-up operation of this transaction. This transaction can be initiated by both the consumer and the merchant.

The return transaction is used to credit the return amount electronically to the consumer's account when a purchased merchandise is returned. The vPOS captures the return transaction record when the merchandise is returned, and this transaction can be initiated only by the merchant.

The void transaction cancels a previously completed draft capture transaction. The vPOS GUI provides an interface for retrieving a transaction record required to be voided from the batch and passes it to the Authorization/Data-Capture module after confirmation. The batch record is updated to reflect the voided transaction after getting an approval from the gateway. This transaction can be initiated only by the merchant.

The pre-authorization transaction is identical to the authorization without capture transaction, but the consumers' "open-to-buy" amount is reduced by the pre-authorization amount. An example of this type of transaction is the "check-in" transaction in a hotel environment. A check-in transaction sends a pre-authorization request to the host, so that an amount required for the customers' stay in the hotel is reserved. The pre-authorization transaction is followed by a pre-authorization complete transaction. This transaction can be initiated both by the consumer and the merchant.

The pre-authorization complete transaction is done as a follow-up to the pre-authorization transaction. This transaction informs the host of the actual transaction amount. The pre-authorization complete transaction amount could be more or less than the pre-authorization amount. An example is the "check-out" transaction in a hotel environment. The check-out amount can be less than or more than the check-in amount. This transaction can only be initiated by a merchant.

The adjust transaction is initiated to make a correction to the amount of a previously completed transaction. The adjust transaction can be initiated only by the merchant. The host administrative transactions do not require any payment instrument. The balance inquiry transaction is used for on-line inquiry into the balance of the merchant's account. The batch data or the configuration data is not affected by this transaction.

The reconciliation or close transaction is processed at the end of the day to start the settlement process for the transactions captured by the host for that particular vPOS.

The host log-on transaction is an administrative transaction which is used to synchronize the vPOS with the host at the start of the day and also initiate a fresh batch at the vPOS terminal.

The parameters download transaction is used to download the vPOS configuration information from the host and set-up the vPOS in the event of any change in the configuration data. A test transaction is used to detect the presence of a host and the status of a link from the vPOS to the host.

Local transactions or functions are initiated by a merchant and do not require communication with the gateway. These transactions can only be initiated by a merchant. The totals or accumulators review is a local information inquiry function and is used to retrieve the local (merchant's) totals. The detail transaction or the batch review function is used to retrieve all the records from the transaction log or the batch. The clear batch function is used to start a fresh batch. This transaction is utilized to electronically reconcile the vPOS with the host and to manually reconcile the vPOS with the host. After completing the manual reconciliation processing, the merchant can initiate this transaction to start a fresh batch.

The clear accumulator function is similar to the clear batch functionality and resets all vPOS terminal accumulators to zero. This function is required when the merchant is not able to reconcile the vPOS with the host electronically.

The vPOS unlock or start transaction is a local function used to start the vPOS at the start of the day. The vPOS lock or stop function is used to Lock or stop the vPOS from accepting any transactions. The vPOS configuration setup function is used to setup the vPOS configuration data. The vPOS configuration data is divided into different tables, for example, the Card/Issuer Definition Table (CDT), the Host/Acquirer Definition Table (HDT), the Communications Parameters Table (CPT) and the Terminal Configuration Table (TCT). The following sections explain each of these configuration tables in detail.

| Host Definition Table (HDT) The table contains information specific to the acquirer. | | |
|---|---|---|
| Field | Attributes/ Bytes | Field Description/Comments |
| Terminal Identifier | ANS(20) | Terminal ID for this acquirer/host |
| Merchant Identifier | ANS(20) | Merchant ID for this acquirer/host |
| Current Batch Number | N(6) | Batch Number for the batch currently existing on the vPOS |
| Transaction Number | I(2) | Reference Number for next transaction in the vPOS transaction log/ batch (vPOS generated) |
| TPDU | AN(10) | Transport Protocol Data Unit - Required for building the ISO 8583 packet. |
| STAN | LU(4) | Systems Trace Number - Message Number of the transaction to be transmitted next for this acquirer. |
| NII | N(3) | Network International Identifier - Required for building the ISO 8583 packet. |
| Host Name or Label | ANS(20) | Name for identifying the host, e.g., "AMEX-SIN". This is only a text string and is used for the purpose of identifying the host. |
| No. of advice messages | I(2) | No. of off-line transactions (advice message) that can be piggy-backed at the end of an on-line transaction. If set to zero then piggy-backing is disabled. |

The following fields specify whether Data Capture Required for a particular transaction for this acquirer.

| Field | Attributes/ Bytes | Field Description/Comments |
|---|---|---|
| Host Protocol Type | I(2) | Host Protocol type, e.g., ISO 8583, SET, etc., |
| Host Protocol Sub-Type | I(2) | Sub protocol type, e.g., AMEX-ISO8583, MOSET, etc., |
| Auth Only DC Flag | Bit(1 bit) | 1 = REQUIRED, 0 = NOT REQUIRED |
| Auth Capture DC Flag | Bit(1 bit) | 1 = REQUIRED, 0 = NOT REQUIRED |

Card Definition Table (CDT)

This table contains information which are specific to the card issuer.

| Field | Attributes/ Bytes | Field Description/Comments |
|---|---|---|
| Adjust DC Flag | Bit(1 bit) | 1 = REQUIRED, 0 = NOT REQUIRED |
| Refund DC Flag | Bit(1 bit) | 1 = REQUIRED, 0 = NOT REQUIRED |
| Cash Advance DC Flag | Bit(1 bit) | 1 = REQUIRED, 0 = NOT REQUIRED |
| Cash Back DC Flag | Bit(1 bit) | 1 = REQUIRED, 0 = NOT REQUIRED |
| Off-line Auth DC Flag | Bit(1 bit) | 1 = REQUIRED, 0 = NOT REQUIRED |
| Void DC Flag | Bit(1 bit) | 1 = REQUIRED, 0 = NOT REQUIRED |
| Pre-Auth DC Flag | Bit(1 bit) | 1 = REQUIRED, 0 = NOT REQUIRED |
| Pre-Auth Complete DC Flag | Bit(1 bit) | 1 = REQUIRED, 0 = NOT REQUIRED |

| Field | Attributes/ Bytes | Field Description/Comments |
|---|---|---|
| Host Index | I(2) | Index into the HDT or the acquirer which maps to this card issuer. |
| PAN Low Range | N(19) | Low end of the PAN range |
| PAN High Range | N(19) | High end of the PAN range. |
| Minimum PAN digits | I(2) | The minimum number of digits in the PAN for this acquirer. |
| Maximum PAN digits | I(2) | The maximum number of digits in the PAN for this acquirer. |
| Card Label | ANS(20) | Card Issuer Name for identification, e.g., VISA. |

The following fields specify whether a particular transaction is allowed for a card range.

| Field | Attributes/ Bytes | Field Description/Comments |
|---|---|---|
| Auth Only Allowed | Bit(1 bit) | 1 = ALLOWED, 0 = NOT ALLOWED |
| Auth Capture Allowed | Bit(1 bit) | 1 = ALLOWED, 0 = NOT ALLOWED |
| Adjust Allowed | Bit(1 bit) | 1 = ALLOWED, 0 = NOT ALLOWED |
| Refund Allowed | Bit(1 bit) | 1 = ALLOWED, 0 = NOT ALLOWED |
| Cash Advance Allowed | Bit(1 bit) | 1 = ALLOWED, 0 = NOT ALLOWED |
| Cash Back Allowed | Bit(1 bit) | 1 = ALLOWED, 0 = NOT ALLOWED |
| Off-line Auth Allowed | Bit(1 bit) | 1 = ALLOWED, 0 = NOT ALLOWED |
| Void Allowed | Bit(1 bit) | 1 = ALLOWED, 0 = NOT ALLOWED |
| Pre-Auth Allowed | Bit(1 bit) | 1 = ALLOWED, 0 = NOT ALLOWED |
| Pre-Auth Complete Allowed | Bit(1 bit) | 1 = ALLOWED, 0 = NOT ALLOWED |

Communications Parameter Table (CPT)

This table contains communications parameters information specific to an acquirer. The HDT and this table have a one-to-one mapping between them.

| Field | Attributes/ Bytes | Field Description/Comments |
|---|---|---|
| Primary Address | AN(100) | Primary Host Address (Telephone number, IP address, etc.) |
| Secondary Address | AN(100) | Secondary Host Address to be used if the Primary Address is busy or not available. |
| Tertiary Address | AN(100) | Tertiary Host Address. |
| Response Time-out | I(2) | Time-out value (in seconds) before which the vPOS should receive a response from the host. |

Terminal Configuration Table (TCT)

This table contains information specific to a particular vPOS terminal.

| Field | Attributes/ Bytes | Field Description/Comments |
|---|---|---|
| Merchant Name | ANS(100) | Name of the merchant having the vPOS terminal. |
| vPOS Lock Flag | Bit (1 bit) | 1 = vPOS Locked, 0 = vPOS Unlocked |

Payment Instruments

As discussed above, the vPOS terminal supports different Payment Instruments and each of the Payment Functions described above can be initiated by these different Payment Instruments. The consumer making a purchase from a merchant provides a choice of payment methods depending upon their personal preference. The Payment Instrument Class Hierarchy which is used by the different vPOS terminal Payment Functions is described below.

Message Sequence Diagram

Figure 17:
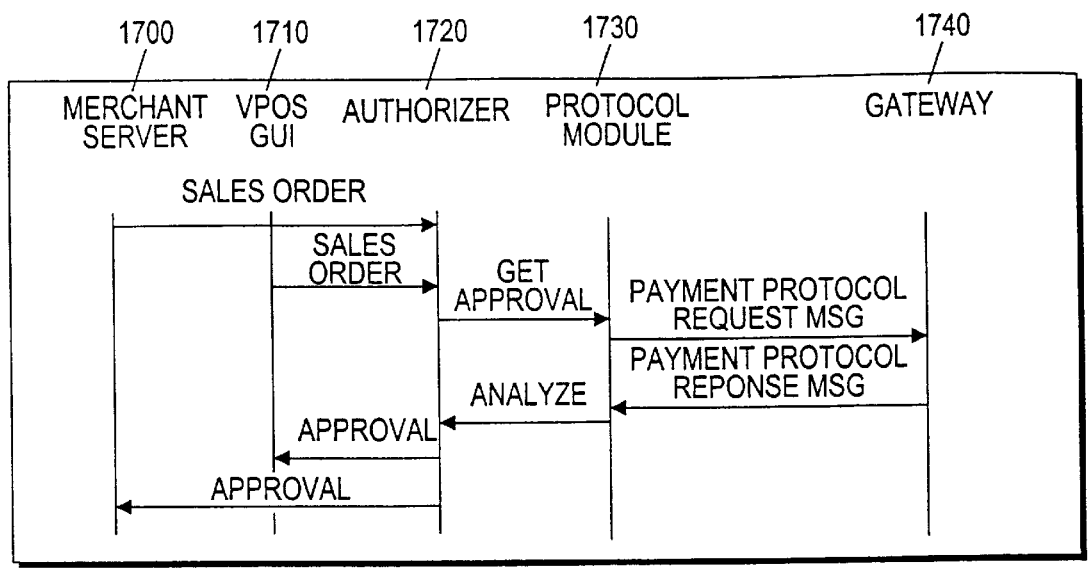
FIG. 17 shows a typical message flow between the merchant, vPOS terminal and the Gateway in accordance with a preferred embodiment.

FIG. 17 shows a typical message flow between the consumer, merchant, vPOS terminal and the Gateway. This section describes the different classes listed in the previous section, their data and members, and defines the type of the transaction that is to be performed. Processing commences at 1700 when a merchant server receives a sales order and passes it via the vPOS Graphical User Interface (GUI) 1710 to an authorizer 1720 for approval and subsequent protocol processing 1730 and ultimately transmission via the gateway 1740 to the network.

Class Name:
    CVPCLTransaction

Data:

Transaction Type (int)
Transaction Date and Time (CPCLDateTime)
Card Definition Table (CVPCL_CDT)
Host Definition Table (CVPCL_HDT)
Communications Parameters Table (CVPCL_CPT)
Terminal Configuration Parameters (CVPCL_TCT)
Batch Record (CVPCLBatch)
Accumulator Record (CVPCLAccum)
Member Functions:

CVPCLTransaction();
EStatus GetTransType();

```
EStatus GetTransDateTime(CPCLDateTime&);
EStatus SetTransType(const int);
virtual EStatus InitializeTrans(TvPOSParamsBlk *) = 0;
virtual EStatus ExecuteTrans(TvPOSResultsBlk *) = 0;
virtual EStatus ShutDown() = 0;
```

Host Transaction Class Definitions

This section contains all the host transaction class definitions.

Host Transaction Class (CVPCLHostTrans)

This is an abstract base class derived from the CVPCLTransaction class and is used for deriving transaction classes which need to communicate with the host either immediately or at a later stage.
Class Name:
  CVPCLHostTrans
Data:
Member Functions:
  CVPCLHostTrans( );

Financial Transaction Class (CVPCLFinancialTrans)

This is an abstract base class derived from the CVPCLHostTrans. This class is used to derive transaction classes which require a payment instrument (e.g., a Credit Card) associated with them to perform the transaction.
Class Name:
  CVPCLFinancialTrans
Data:
  Transaction Amount (CVPCLAmt)
  Purchase Order Number (char[ ])
  Transaction Number (char[ ])
  Authorization Identification Number (char[ ])
  Retrieval Reference Number (char[ ])
  Batch (CVPCLBatch)
  Accumulators (CVPCLAccumulators)
Member Functions:
  CVPCLFinancialTrans( );
  EStatus GetTransAmt(CVPCLAmt&);
  EStatus GetPurchOrderNum(char *);
  EStatus GetTransRefNum(char *);
  EStatus GetRetRefNum(char *);
  EStatus GetAuthId(char *);
  EStatus GetCurrencyType(EPCLCurrency *);
  EStatus SetPurchOrderNum(const char *);
  EStatus SetTransRefNum(const char *);
  EStatus SetRetRefNum(const char *);
  EStatus SetAuthId(const char *);
  EStatus SetCurrencyType (const char *)

Financial Credit Card Transaction Class (CVPCLFinCCTrans)

This is the base abstract class for the financial host transaction which require a Credit Card payment instrument. This class is derived from the CVPCLFinancialTrans.
Class Name:
  CVPCLFinCCTrans
Data:
  Credit Card Payment Instrument (CPCLCreditCard)
Member Functions:
  CVPCLFinCCTrans( );

Credit Card Authorization Only Transaction Class (CVPCL_CCAuthOnly)

This is the class derived from the CVPCLFinCCTrans class and implements the Authorization Only Transaction.
Class Name:
  CVPCL_CCAuthOnly
Data:
Member Functions:
  CVPCL_CCAuthOnly( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Authorization with Capture Transaction Class (CVPCL_CCAuthCapt)

This is the class derived from the CVPCLFinCCTrans class and implements the Authorization with Data Capture Transaction.
Class Name:
  CVPCL_CCAuthCapt
Data:
Member Functions:
  CVPCL_CCAuthCapt( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Return Transaction Class (CVPCL_CCReturn)

This is the class derived from the CVPCLFinCCTrans class and implements the Return Transaction.
Class Name:
  CVPCL_CCReturn
Data:
Member Functions:
  CVPCL_CCReturn( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Pre-Authorization Transaction Class (CVPCL_CCPreAuth)

This is the class derived from the CVPCLFinCCTrans class and implements the Pre-Authorization Transaction.
Class Name:
  CVPCL_CCPreAuth
Data:
Member Functions:
  CVPCL_CCPreAuth( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Off-line Authorization Only Transaction Class (CVPCL_CCOfflineAuth)

This is the class derived from the CVPCLFinCCTrans class and implements the Offline Authorization Class Transaction.

Class Name:
  CVPCL_CCOfflineAuth
Data:
Member Functions:
  CVPCL_CCOfflineAuth( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Adjust Transaction Class (CVPCL_CCAdjust)

This is the class derived from the CVPCLFinCCTrans class and implements the Adjust Transaction.
Class Name
  CVPCL_CCAdjust
Data:
Member Functions:
  CVPCL_CCAdjust( );
  EStatus InitializeTrans(TvPOSParamsBlk *);
  EStatus ExecuteTrans(TvPOSResultsBk *);
  EStatus ShutDownTrans( );
  EStatus FormBatchRec( );

Credit Card Void Transaction Class (CVPCL_CCVoid)

This is the class derived from the CVPCLFinCCTrans class and implements the Void Transaction.
Class Name:
  CVPCL_CCVoid
Data:
Member Functions:
  CVPCL_CCVoid( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Forced Post Transaction Class (CVPCL_CCForcedPost)

This is the class derived from the CVPCLFinCCTrans class and implements the Forced Post Transaction.
Class Name:
  CVPCL_CCForcedPost
Data:
Member Functions:
  CVPCL_CCForcedPost( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Pre-Authorization Complete Transaction Class (CVPCL_CCPreAuthComp)

This is the class derived from the CVPCLFinCCTrans class and implements the Pre-Authorization Completion Transaction.
Class Name:
  CVPCL_CCPreAuthComp
Data:
Member Functions:
  CVPCL_CCPreAuthComp( );
  EStatus InitializeTrans(TvPOSParamsBlk *);
  EStatus ExecuteTrans(TvPOSResultsBlk *);
  EStatus ShutDownTrans( );
  EStatus FormBatchRec( );

Credit Card Balance Inquiry Class (CVPCL_CCBalanceInq)

This class is derived from the CVPCLFinCCTrans class and is used to perform the Merchant Balance Inquiry function.
Class Name:
  CVPCL_CCBalanceInq
Data:
Member Functions:
  CVPCL_CCBalanceInq( );
  EStatus InitializeTrans(TvPOSParamsBlk *);
  EStatus ExecuteTrans(TvPOSResultsBlk *);
  EStatus ShutDownTrans( );

Administrative Host Transaction Class (CVPCLAdminHostTrans)

This is an abstract base class derived from the CVPCLHostTrans class and is used to derive the administrative host transaction classes.
Class Name:
  CVPCLAdminHostTrans
Data:
Member Functions:
  CVPCLAdminHostTrans( );
  int GetHostIndex( );
  EStatus SetHostIndex (const int);

Reconcile Transaction Class (CVPCLReconcile)

This is the class derived from the CVPCLAdminHostTrans class and implements the Reconcile or Close functionality.
Class Name:
  CVPCLReconcile
Data:
Member Functions:
  CVPCLReconcile( );
  EStatus InitializeTrans(TvPOSParamsBlk *);
  EStatus ExecuteTrans(TvPOSResultsBlk *);
  EStatus ShutDownTrans( );

Host Log-on Transaction Class (CVPCLHostLogon)

This is the class derived from the CVPCLAdminHostTrans class and implements the Host Log-on Transaction.
Class Name:
  CVPCLHostLogon
Data:
Member Functions:
  CVPCLHostLogon( );
  EStatus InitializeTrans(TvPOSParamsBlk *);
  EStatus ExecuteTrans(TvPOSResultsBlk *);
  EStatus ShutDownTrans( );

Parameters Download Transaction Class (CVPCLParamsDwnld)

This is the class derived from the CVPCLAdminHostTrans class and implements the Parameters Download (vPOS configuration information from the host) functionality.

Class Name:
 CVPCLParamsDwnld
Data:
Member Functions:
 CVPCLParamsDwnld( );
 EStatus InitializeTrans(TvPOSParamsBlk *);
 EStatus ExecuteTrans(TvPOSResultsBlk *);
 EStatus ShutDownTrans( );

Test Transaction Class (CVPCLTestHost)

This is the class derived from the CVPCLAdminHost-Trans class and implements the Test functionality which is used to test the host and the link.
Class Name:
 CVPCLTestHost
Data:
Member Functions:
 CVPCLTestHost( );
 EStatus InitializeTrans(TvPOSParamsBlk *);
 EStatus ExecuteTrans(TvPOSResultsBlk *);
 EStatus ShutDownTrans( );

Local Transaction Class Definitions (CVPCLLocalTrans)

This is the abstract base class for all the transactions that are performed locally to the vPOS.
Class Name:
 CVPCLLocalTrans
Data:
 Record Number (int)
 Host Index (int)
Member Functions:
 CVPCLocalTrans( );
 int GetRecNum( );
 int GetHostIndexo
 EStatus SetRecNum(const int);
 EStatus SetHostIndex(const int);

Virtual POS Lock/Stop Class (CVPCLvPOSLock)

This class implements the vPOS Lock or the Stop Local functionality. Under the locked state the vPOS does not accept any transaction requests. The class is derived from the CVPCLLocalTrans base class.
Class Name:
 CVPCLvPOSLock
Data:
Member Functions:
 CVPCLvPOSLock( );
 EStatus InitializeTrans(TvPOSParamsBlk *);
 EStatus ExecuteTrans(TvPOSResultsBlk *);
 EStatus ShutDownTrans( );

Virtual POS UnLock/Start Class (CVPCLvPOSUnlock)

This class implements the vPOS UnLock or the Start Local functionality. The class is derived from the CVPCLLocalTrans base class.
Class Name:
 CVPCLvPOSUnLock
Data:
Member Functions:
 CVPCLvPOSUnlock( );
 EStatus InitializeTrans(TvPOSParamsBlk *);
 EStatus ExecuteTrans(TvPOSResultsBlk *);
 EStatus ShutDownTrans( );

Transaction Data Administration Class (CVPCLTransDataAdmin)

This is an abstract base class used to derive the classes which are required to review/manage the transaction data which includes the batch data and the accumulator data. The class is derived from the CVPCLLocalTrans base class.
Class Name:
 CVPCLTransDataAdmin
Data:
Member Functions:
 CVPCLTransDataAdmin( );

Batch Review Class (CVPCLBatchReview)

This class is derived from the CVPCLTransDataAdmin base class and implements the batch review functionality.
Class Name:
 CVPCLBatchReview
Data:
Member Functions:
 CVPCLBatchReview( );
 EStatus InitializeTrans(TvPOSParamsBlk *);
 EStatus ExecuteTrans(TvPOSResultsBlk *);
 EStatus ShutDownTrans( );

Clear Batch Class (CVPCLClearBatch)

This class is derived from the CVPCLTransDataAdmin base class and implements the clear batch functionality, which is used to clear the batch in the event of doing a manual reconciliation between the vPOS and the acquirer.
Class Name:
 CVPCLClearBatch
Data:
Member Functions:
 CVPCLClearBatch( );
 EStatus InitializeTrans(TvPOSParamsBlk *);
 EStatus ExecuteTrans(TvPOSResultsBlk *);
 EStatus ShutDownTrans( );

Accumulators Review Class (CVPCLAccumReview)

This class is derived from the CVPCLTransDataAdmin base class and implements the Accumulators Review functionality.
Class Name:
 CVPCLAccumReview
Data:
Member Functions:
 CVPCLAccumReview( );
 EStatus InitializeTrans(TvPOSParamsBlk *);
 EStatus ExecuteTrans(TvPOSResultsBlk *);
 EStatus ShutDownTrans( );

Clear Accumulators Class (CVPCLClearAccum)

This class is derived from the CVPCLTransDataAdmin base class and implements the Accumulators Clear functionality.
Class Name:
 CVPCLClearAccum Data:
Member Functions:
   CVPCLClearAccum( );
   EStatus InitializeTrans(TvPOSParamsBk *);
   EStatus ExecuteTrans(TvPOSResultsBlk *);
   EStatus ShutDownTrans( );

vPOS Configuration Data Administration Class
          (CVPCLConfigDataAdmin)

This is an abstract base class and is used to derive classes which implement the functionality for managing the vPOS configuration data. The class is derived from the CVPCLLocalTrans base class.
Class Name:
   CVPCLConfigDataAdmin
Data:
Member Functions:
Acquirer Data or the Host Definition Table Review Class (CVPCL_HDTReview)
This class is derived from the CVPCLConfigDataAdmin class and implements the Host Definition Table Review functionality.
Class Name:
   CVPCL_HDTReview
Data:
Member Functions:
   CVPCL_HDTReview( );
   EStatus InitializeTrans(TvPOSParamsBlk *);
   EStatus ExecuteTrans(TvPOSResultsBlk *);
   EStatus ShutDownTrans( );

Issuer Data or the Card Definition Table Review
          Class (CVPCL_CDTReview)

This class is derived from the CVPCLConfigDataAdmin class and implements the Card Definition Table Review functionality.
Class Name:
   CVPCL_CDTReview
Data:
Member Functions:
   CVPCL_CDTReview( );
   EStatus InitializeTrans(TvPOSParamsBlk *);
   EStatus ExecuteTrans(TvPOSResultsBlk *);
   EStatus ShutDownTrans( );

Communication Parameters Table Review Class
          (CVPCL_CPTReview)

This class is derived from the CVPCLConfigDataAdmin class and implements the Communications Parameters Table Review functionality.
Class Name:
   CVPCL_CPTReview
Data:
Member Functions:
   CVPCL_CPTReview( );
   EStatus InitializeTrans(TvPOSParamsBlk *);
   EStatus ExecuteTrans(TvPOSResultsBlk *);
   EStatus ShutDownTrans( );

Terminal Configuration Table Review Class
          (CVPCL_TCTReview)

This class is derived from the CVPCLConfigDataAdmin class and implements the Terminal Configuration Table Review functionality.
Class Name:
   CVPCL_TCTReview
Data:
Member Functions:
   CVPCL_TCTReview( );
   EStatus InitializeTrans(TvPOSParamsBlk *);
   EStatus ExecuteTrans(TvPOS ResultsBlk *);
   EStatus ShutDownTrans( );

Acquirer Data or the Host Definition Table Update
          Class (CVPCL_HDTUpdate)

This class is derived from the CVPCLConfigDataAdmin class and implements the Host Definition Table Update functionality.
Class Name:
   CVPCL_HDTUpdate
Data:
Member Functions:
   CVPCL_HDTUpdate( );
   EStatus InitializeTrans(TvPOSParamsBlk *);
   EStatus ExecuteTrans(TvPOSResultsBlk *);
   EStatus ShutDownTrans( );

Issuer Data or the Card Definition Table Update
          Class (CVPCL_CDTUpdate)

This class is derived from the CVPCLConfigDataAdmin class and implements the Card Definition Table Update functionality.
Class Name:
   CVPCL_CDTUpdate
Data:
Member Functions:
   CVPCL_CDTUpdate( );
   EStatus InitializeTrans(TvPOSParamsBlk *);
   EStatus ExecuteTrans(TvPOSResultsBlk *);
   EStatus ShutDownTrans( );

Communications Parameters Table Update Class
          (CVPCL_CPTUpdate)

This class is derived from the CVPCLConfigDataAdmin class and implements the Communications Parameters Table Update functionality.
Class Name:
   CVPCL_CPTUpdate
Data:
Member Functions:
   CVPCL_CPTUpdate( );
   EStatus InitializeTrans(TvPOSParamsBlk *);
   EStatus ExecuteTrans(TvPOSResultsBlk *);
   EStatus ShutDownTrans( );

Terminal Configuration Table Update Class
          (CVPCL_TCTUpdate)

This class is derived from the CVPCLConfigDataAdmin class and implements the Terminal configuration Table Update functionality.
Class Name:
   CVPCL_TCTUpdate
Data:
Member Functions:
   CVPCL_TCTUpdate( );
   EStatus InitializeTrans(TvPOSParamsBlk *);

EStatus ExecuteTrans(TvPOSResultsBlk *);
EStatus ShutDownTrans( );

Batch Class (CVPCLBatch)

This class defines the batch record and the operations which are performed on the batch.
Class Name:
  CVPCLBatch
Data:

Batch Record Structure (TvPOSBatchRec)
```
// Definition of the TvPOSBatchRec is as below,
typedef struct_vPOSBatchRec
{
    char szTransAmt[ ];
    char szTransDate[ ];
    char szTransTime[ ];
    char szRetrievalRefNum[ ];      // Trans. Ref. No. sent by the host
    char szAuthIdf[ ]               // Approval Code sent by the host
    char szOrigAmt[ ];              // Original amount for - Adjust
    char szPurchOrderNum[ ];
    char szBatchNum[ ];
    EPCLTransType TransType;
    EPCLPmtInst PmtInst;
    EpCLCurrency CurrencyType;
    EPCLDecimals NumDecDigits;
    unsigned int nTransRefNum;      // Running Ref. Number gen. by the
                                    // vPOS for every approved txn.
    unsigned long InSTAN;           // Sys. Trace Number incr. by vPOS
                                    // for every trans. that is trans. to host
    TPmtInstData PayInstData;
}TvPOSBatchRec;
```

Member Functions:

```
CVPCLBatch();
EStatus SetTransType(const
EPCLTransType);
EStatus SetRetRefNum(const char *);
EStatus SetAuthId(const char *);
EStatus SetPurchOrderNum(const char *);
EStatus SetTransRefNum(const long);
EStatus SetTransAmt(const char *);
EStatus SetBatchNum(const char *);
EStatus SetSTAN(const ong);
EStatus SetDateMMDDYYYY(const
char *);
EStatus SetTimeHHMMSS(const char *);
EStatus SetPmtInst(const EPCLPmtInst);
EStatus SetCCAcctNum(const char *);
EStatus SetCCExpDate(const char *);
EStatus SetOrigAmt(const char *);
EStatus GetBatchRec(TvPOSBatchRec *);
EStatus InitBatch();
EStatus OpenBatch(const char *, FILE **,
const char *);
EStatus CloseBatch(FILE *);
EStatus AddBatchRec ();           // Adds a record to the batch
EStatus GetBatchRec (const long); // Gets a record from the batch
EStatus UpdateBatchRec (const     // Update batch record with
long);                            // NR
EStatus DeleteBatchRec (const long); // Deletes the batch record
```

Accumulator Class (CVPCLAccum)

This class defines the Accumulator record and the operations on the accumulators.
Class Name:
  CVPCLAccum
Data:
  Credit Amount (char szCreditAmt[AMT_SZ+1])
  Credit Count (int nCreditCnt)
  Debit Amount (char szDebitAmt[AMT_SZ+1)
  Debit Count (int nDebitCnt)

Member Functions:

int OpenAccum(int fHandle);
  int GetAccum (int nAccumType, int *pnAccumCnt, char *pszAccumAmt);
  int CloseAccum(int fHandle); int CleanAccum( );

Host Definition Table Class (CVPCL_HDT)

This class defines the Host Definition Table record and the operations on the table.

Class Name:

CVPCL_HDT

Data:

Host Definition Table Record Structure (TvPOSHDTRec)
  The TvPOSHDTRec structure contains the following fields,
  typedef struct_vPOSHDTRec

```
{
    char szTermId[];
    char szMerchId[];
    char szBatchNum[];
    char szTPDU[];
    char szNII[];
    char szHostName[];
    EPCLHostProtType HostProtType;
    EPCLHostProtSubType HostProtSubType;
    // Data Capture Required Flags
    vPOSBool fAuthOnlyDC;
    vPOSBool fAuthCaptDC;
    vPOSBool fForcedPostDC;
    vPOSBool fAdjustDC;
    vPOSBool fReturnDC;
    vPOSBool fOfflineAuthDC;
    vPOSBool fvoidDC;
    vPOSBool fPreAuthDC;
    vPOSBool fPreAuthCompDC;
    unsigned int nNumAdv;           // Max. No. of piggy-back trans. allowed
    unsigned int nTransRefNum;
    unsigned long lnSTAN;           // Systems Trace Number
}TvPOSHDTRec;
```

Member Functions:
CVPCL_HDT( );
EStatus CleanHDT( );
EStatus LoadHDTRec(const int);
EStatus SaveHDTRec(const int);
EStatus GetNumRecs(int *);
EStatus GetHDTRec(TvPOSHDTRec *);
EStatus GetTermId(char *);
EStatus GetMerchId(char *);
EStatus GetBatchNum(char *);
EStatus GetTransRefNum(unsigned int *);
EStatus GetTPDU(char *);
EStatus GetNII(char *);
EStatus GetHostName(char *);
EStatus GetHostProtType(EPCLHostProtType *);
EStatus GetHostProtSubType(EPCLHostProtSubType *);
EStatus GetNumAdv(unsigned int *);
EStatus GetSTAN(unsigned long *);
EStatus GetAuthOnlyDC(vPOSBool *);
EStatus GetAuthCaptDC(vPOSBool *);
EStatus GetAdjustDC(vPOSBool *);
EStatus GetReturnDC(vPOSBool *);
EStatus GetForcedPostDC(vPOSBool *);
EStatus GetOfflineAuthDC(vPOSBool *);
EStatus GetVoidDC(vPOSBool *);
EStatus GetPreAuthDC(vPOSBool *);
EStatus GetPreAuthCompDC(vPOSBool *);
EStatus SetHDTRec(TvPOSHDTRec *);
EStatus SetTermId(const char *);
EStatus SetMerchId(const char *);
EStatus SetBatchNum(const char *);
EStatus SetTransRefNum(const unsigned int);
EStatus SetTPDU(const char *);
EStatus SetSTAN(const unsigned long);
EStatus SetNII(const char *);
EStatus SetHostName(const char *);
EStatus SetHostProtType(const EPCLHostProtType);

EStatus SetHostProtSubType(const EPCLHostProtSubType);
EStatus SetNumAdv(const int);
EStatus SetAuthOnlyDC(const vPOSBool);
EStatus SetAuthCaptDC(const vPOSBool);
EStatus SetAdjustDC(const vPOSBool);
EStatus SetReturnDC(const vPOSBool);
EStatus SetForcedPostDC(const vPOSBool);
EStatus SetOfflineAuthDC(const vPOSBool);
EStatus SetVoidDC(const vPOSBool);
EStatus SetPreAuthDC(const vPOSBool);
EStatus SetPreAuthCompDC(const vPOSBool);

Card Definition Table Class (CVPCL_CDT)

This class defines the Card Definition Table record and the operations on the table.
Class Name:
CVPCL_CDT
Data:

```
Card Definition Table Record Structure (TvPOSCDTRec)
The TvPOSCDTRec structure contains the following fields,
typedef struct _vPOSCDTRec
{
    char szPANLo[];
    char SZPANHi[];
    char szCardLabel[];
    int nHostIndex;
    int nMinPANDigit;
    int nMaxPANDigit;
    // Transaction Allowed Flags
    vPOSBool fAuthOnlyAllwd;
    vPOSBool fAuthCaptAllwd;
    vPOSBool fForcedPostAllwd;
    vPOSBool fAdjustAllwd;
    vPOSBool fReturnAllwd;
    vPOSBool fOfflineAuthAllwd;
    vPOSBool fVoidAllwd;
    vPOSBool fpreAuthAllwd;
    vPOSBool fPreAuthCompMlwd;
}TvPOSCDTRec;
```

Member Functions:
CVPCL_CDT( );
EStatus CleanCDT( );
EStatus LoadCDTRec(const int);
EStatus SaveCDTRec(const int);
EStatus GetNumRecs(int *);
EStatus GetCDTRec(TvPOSCDTRec *);
EStatus GetPANLo(char *);
EStatus GetPANHi(char *);
EStatus GetCardLabel(char *);
EStatus GetCDTHostIndex(int *);
EStatus GetMinPANDigit(int *);
EStatus GetMaxPANDigit(int *);
EStatus GetAuthOnlyAllwd(vPOSBool *);
EStatus GetAuthCaptAllwd(vPOSBool *);
EStatus GetAdjustAllwd(vPOSBool *);
EStatus GetReturnAllwd(vPOSBool *);
EStatus GetOfflineAuthAllwd(vPOSBool *);
EStatus GetVoidAllwd(vPOSBool *);
EStatus GetPreAuthAllwd(vPOSBool *);
EStatus GetPreAuthCompAllwd(vPOSBool *);
EStatus GetForcedPostAllwd(vPOSBool *);
EStatus SetCDTRec(TvPOSCDTRec *);
EStatus SetHostIndex(const int);
EStatus SetMinPANDigit(const int);
EStatus SetMaxPANDigit(const int);
EStatus SetPANLo(const char *);
EStatus SetPANHi(const char *);
EStatus SetCardLabel(const char *);
EStatus SetAuthOnlyAllwd(const vPOSBool);
EStatus SetAuthCaptAllwd(const vPOSBool);
EStatus SetAdjustAllwd(const vPOSBool);
EStatus SetReturnAllwd(const vPOSBool);
EStatus SetForcedPostAllwd(const vPOSBool);
EStatus SetOfflineAuthAllwd(const vPOSBool);
EStatus SetVoidAllwd(const vPOSBool);
EStatus SetPreAuthAllwd(const vPOSBool);
EStatus SetPreAuthCompAllwd(const vPOSBool);

Communications Parameters Table Class (CVPCL_CPT)

This class defines the communications parameters table and the operations on the table.
Class Name:
CVPCL_CPT
Data:

Communications Parameters Table Record Structure (TvPOSCPTRec)
The TvPOSCPTRec structure contains the following fields,
typedef struct _vPOSCPTRec
{
    char szAcqPriAddress[];
    char szAcqSecAddress[];
    char szAcqTerAddress[];
    int nRespTimeOut;
}TvPOSCPTRec;

Member Functions:
CVPCL_CPT( );
EStatus CleanCPT( );
EStatus LoadCPTRec(const int);
EStatus SaveCPTRec(const int);
EStatus GetNumRecs(int *);
EStatus GetCPTRec(TvPOSCPTRec *);
EStatus GetAcqPriAddress(char *);
EStatus GetAcqSecAddress(char *);
EStatus GetAcqTerAddress(char *);
EStatus GetRespTimeOut(int *);
EStatus SetCPTRec(TvPOSCPTRec *);
EStatus SetAcqPriAddress(const char *);
EStatus SetAcqSecAddress(const char *);
EStatus SetAcqTerAddress(const char *);
EStatus SetRespTimeOut(const int);

Terminal Configuration Table Class (CVPCL_TCT)

This class defines the vPOS terminal configuration parameters table and the operations on the table.
Class Name:
CVPCL_TCT
Data:

Terminal Configuration Table Record Structure (TvPOSTCTRec)
The TvPOSTCTRec structure contains the following fields,
typedef struct _vPOSTCTRec
    char szMerchName[];
    vPOSBool fvPOSLock;   // vPOS Lock/ Unlock Toggle Flag
}TvPOSTCTRec;

Member Functions:
CVPCL_TCT( );
EStatus LoadTCTRec( );
EStatus SaveTCTRec( );
EStatus CleanTCTo( );
EStatus GetTCTRec(TvPOSTCTRec *);
EStatus GetMerchName(char *);
EStatus GetvPOSLock(vPOSBool *);
EStatus SetMerchName(const char *);
EStatus SetvPOSLock(const vPOSBool);

Amount Class (CVPCLAmount)

This class defines the amount data items and the operations on them.
Class Name:
CVPCLAmount
Data:
Amount (char[ ])
Currency Type (EPCLCurrency)
Member Functions:
CVPCLAmount( );
EStatus Initialize(const CPCLAmount&);
EStatus Initialize(const char *);
EStatus Initialize(const long);
void operator=(const char *);
void operator=(const long);
EStatus GetAmount(char *);
operator const char * ( )const;
operator const long ( );

Payment Instruments Class (CPCLPmtInst)

Figure 16:
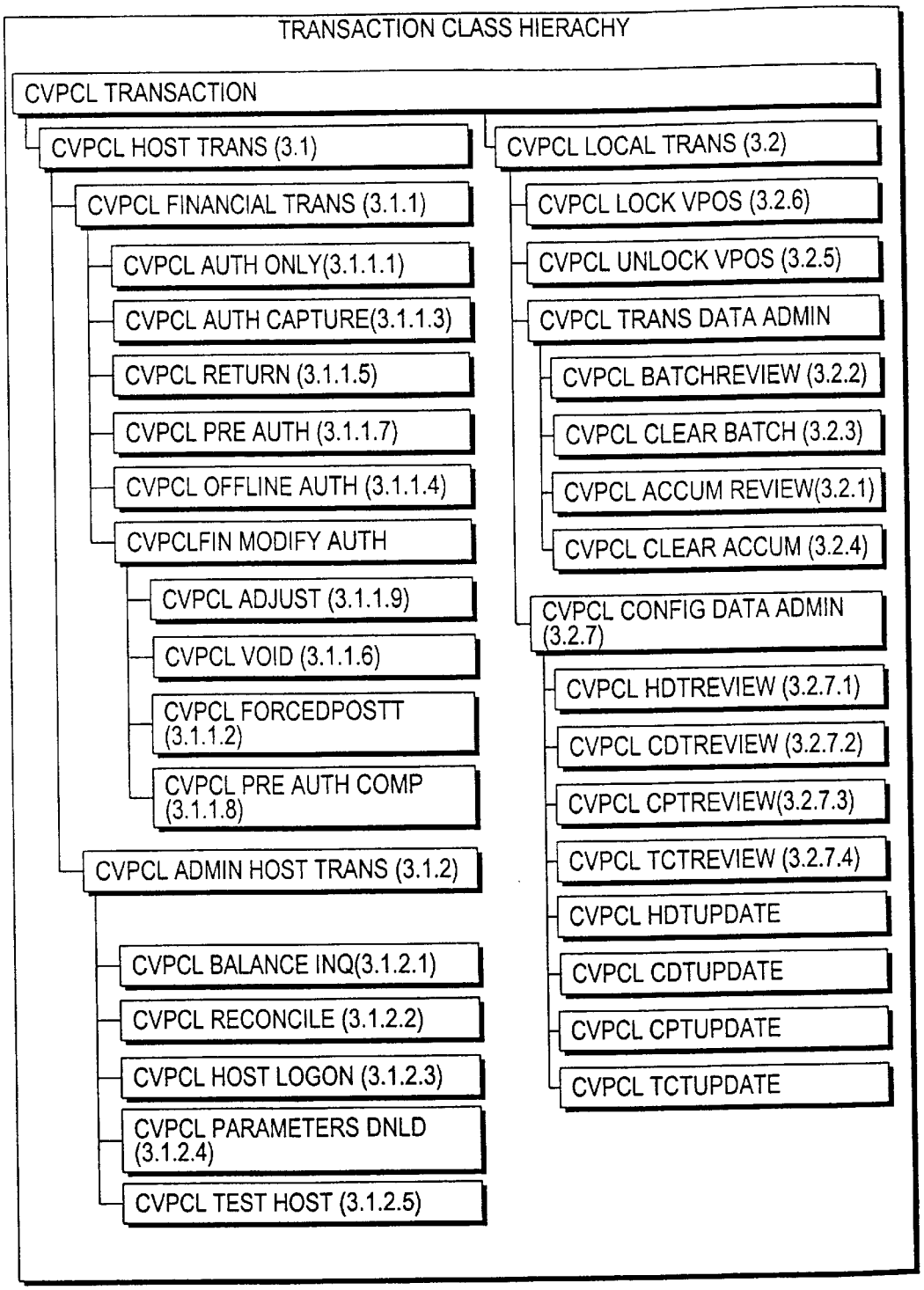
FIG. 16 illustrates a transaction class hierarchy block diagram in accordance with a preferred embodiment.

This section defines the Payment Instrument Class hierarchy. FIG. 16 illustrates a transaction class hierarchy in accordance with a preferred embodiment.
Class Name:
  CPCLPmtInst
Data:
  Payment Instrument Type (EPCLPmtInst)
Member Functions:
  CPCLPmtInst( );
  EStatus GetPmtInstType(EPCLPmtInst *);

Bank Cards Class (CPCLBankCard)

This class is derived from the CPCLPmtInst class and implements the bank cards class.
Class Name:
  CPCLBankCard
Data:
  Account Number (char[ ])
  Expiration Date (CPCLDateTime)
  Index into the CDT table (int)
Member Functions:
  CPCLBankCard( );
  EStatus Initialize( );
  EStatus SetAcctNum(const char *);
  EStatus SetExpDate(const char *);
  EStatus GetAcctNum(char *);
  EStatus GetExpDate(char *);
  EStatus ValidateCard( );
  int GetCDTIndex( );
  vPOSBool DoLuhnCheck( );
  vPOSBool DoCardRanging( );
  EStatus DoValidateExpDate( );

Credit Cards Class (CPCLCreditCard)

This class is derived from the CPCLBankCard class and has the same data and the methods as the CPCLBankCard class.
Class Name:
  CPCLCreditCard
Data:
Member Functions:
  CPCLCreditCard( );

Debit Cards Class (CPCLDebitCard)

This class is derived from the CVPCLBankCard class and implements the debit card class.
Class Name:
  CPCLDebitCard
Data:
  Card Holder Encrypted PIN (char[ ])
Member Functions:
  CPCLDebitCard( );
  EStatus GetEncryptedPIN(char *);
  EStatus SetEncryptedPIN(char *);

vPOS Class Library Interface and API Definition

This section explains the classes which provide the interface to the vPOS class library.

Data Structures required for the vPOS Interface Class

Transaction Parameters Structure (TvPOSParamsBlk)—This structure is a subset of all the transaction parameters required for the different transactions.

```
typedef struct _vPOSParamsBlk
{
    char sZTransAmt[];              // Without decimal point.
                                    // Left most two digits implied to be decimal digits
    char szPurchOrderNum[];
    char szRetRefNum[];
 char szBatchNum[];
    char szNewBatchNum[];
    char szOrigAmt[];
    char sZCPSData[];
    char sZAuthId[];                // Auth Id for offline auth-Only transaction
    int HostIndex;
    unsigned int nTransRefNum;
    vPOSBool fvPOSLock;
    ECPSDataType eCPSType;
    EPCLTransType TransType;
    EStatus TransResult;
    EPCLPmtInst PmtInst;
    EPCLCurrency CurrencyType;
    EPCLDecimals NumDecDigits;
    EVPCLAccumType AccumType;
    TPmtInstData PayInstData;
    union _vPOSConfigData
    {
       TvPOSHDTRec srHDTRec;
       TvPOSCDTRec srCDTRec;
       TvPOSCPTRec srCPTRec;
       TvPOSTCTRec srTCTRec;
    {vPOSConfigData;
    void *Context;                  // Context from the calling interface
    EStatus (*vPOSCallBack)(TvPOSResultsBlk *, void *);
}TvPOSParamsBlk;
```

Transaction Results Structure (TvPOSResultsBlk)—This structure contains all the fields returned from the host and other fields which are required for doing terminal data capture.

```
typedef struct __vPOSResultsBlk
{
    char szNewBatchNum[ ];
    int nHostIndex;
    EStatus TransResult;
    TvPOSBatchRec srBatchRec;
    TvPOSAccumRec srAccumRec;
    char szCardLabel[ ];
    TvPOSHDTRec srRDTRec;
    TvPOSCDTRec srCDTRec;
    TvPOSCPTRec srCPTRec;
    TvPOSTCTRec srTCTRec;
}TvPOSResultsBlk;
```

The various status codes for the enumeration EStatus are detailed below.

vPOS Interface Class (CvPOSInterface)

This class provides the interface to the vPOS Transaction Class Library.
Class Name:
  CvPOSInterface
Data:
Member Functions:
  CvPOSInterface( );
  // Creates the Transaction Object, takes care
  // of other initialization and executes the transaction.
  CVPCLTransaction *pclTransFactory(TvPOSParamsBlk *);
  EStatus DestroyTrans(CVPCLTransaction *);

vPOS API Definition

This section explains in the vPOS API which are required for interfacing with the vPOS Class Library. All the different vPOS transactions can be initiated using the API defined in this section.

vPOSInitialize—Initialize vPOS

This API is used to start and initialize the vPOS. The API definition is disclosed below.

API Definition:
  vPOSBool vPOSInitialize(void);
Parameters:
  None
Returns:
  TRUE or FALSE indicating whether the function call was a success.

vPOSExecute—Execute a vPOS Transaction

This API is used to execute a particular vPOS transaction.
API Definition:
  vPOSBool vPOSExecute(TvPOSParamsBlk *, TvPOSResultsBlk *)
Parameters:
  Pointer to the Parameters: Structure (TvPOSParamsBlk)
  Pointer to the Results Structure (TvPOSResultsBlk)
Returns:
  TRUE or FALSE indicating whether the function call was a success.

vPOSShutDown—Shutdown the vPOS

This is used to shutdown the vPOS.
API Definition:
  vPOSBool vPOSShutDown(void)
Parameters:
  None
Returns:
  TRUE or FALSE indicating whether the function call was a success.

vPOS Status Codes

This section details the different status codes (listed under the enumeration EStatus) which the vPOS returns for the different operations performed.
enum EStatus

```
{
    eSuccess = 0,              // Function call or operation successful
    eFailure,                  // General failure
    evPOSLocked,               // vPOS locked, transaction not allowed
                               // Transaction related error codes
    ePmtInstNotSupported,      // Payment Instrument not supported
    eTransNotSupported,        // Transaction type not supported
    eTransInitErr,             // Transaction Initialization Failed
    eAdjustNotAllwd,           // Adjust not allowed on this transaction
    eVoidNotAllwd,             // Void not allowed on this transaction
    eForcedPostNotAllwd,       // Forced Post not allowed on this transaction
    ePreAuthCompNotAllwd,      // Pre-Auth. not allowed on this transaction
    eAmtErr,                   // Error in the amount passed
    eHDTLoadErr,               // Error during loading the HDT table
    eCDTLoadErr,               // Error during loading the CDT table
    eCPTLoadErr,                   // Error during loading the CPT table
    eTCTLoadErr,                   // Error during loading the TCT table
    eHDTWriteErr,                  // Error during writing to the HDT table
    eCDTWriteErr,                  // Error during writing to the CDT table
    eCPTWriteErr,                  // Error during writing to the CPT table
    eTCTWriteErr,                  // Error during writing to the TCT table
    eTCTFieldErr,                  // Error handling a TCT table field
    eLuhnErr,                      // Luhn check failed on the account
    eRangingErr,                   // Card range not found
    ePANLenErr,                    // PAN length error
    eExpiredCard,                  // Card expired
```

-continued

| | |
|---|---|
| eInvalidMonth, | // Invalid month in the expiration date |
| eFileOpenErr, | // General file open error |
| eFileCloseErr, | // General file close error | vPOS Terminal Architecture

Figure 25:
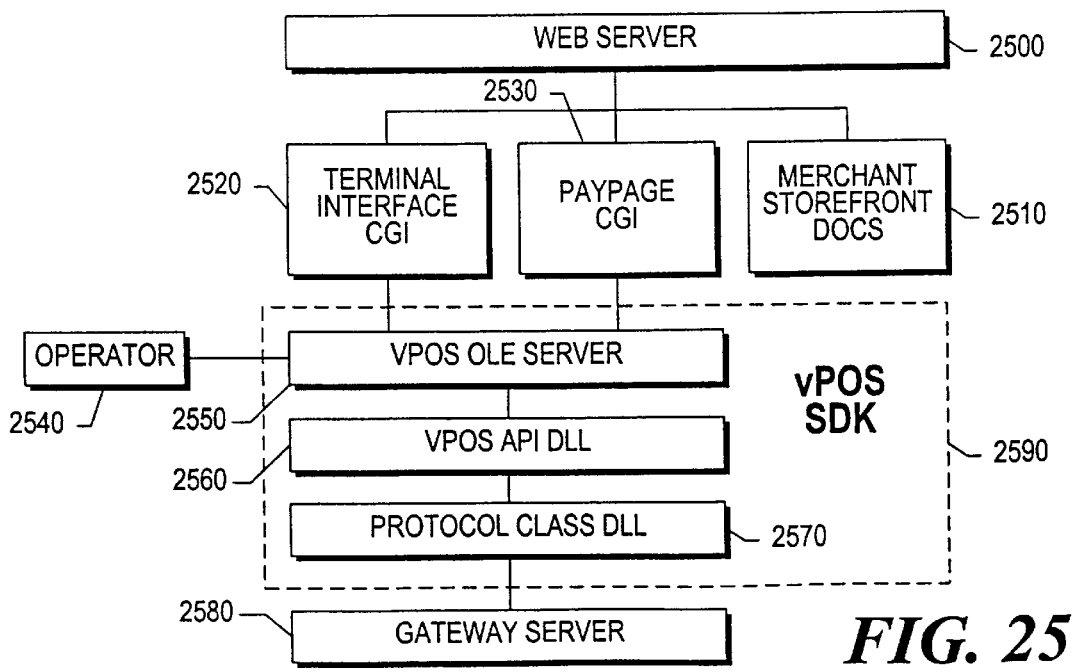
FIG. 25 is a block diagram of the vPOS Terminal Architecture in accordance with a preferred embodiment.

FIG. 25 is a block diagram of the vPOS Terminal Architecture in accordance with a preferred embodiment. The Internet 2500 provides the communication processing necessary to enable the vPOS Terninal architecture. The terminal interface CGI 2520 communicates via the Internet to provide information to the vPOS OLE Server 2550 which formats information in 30 accordance with the vPOS API DLL 2560 which uses the protocol class DLL 2570 to flesh out the message for delivery to the Gateway Server 2580. The collection of the vPOS OLE Server 2550, vPOS API DLL 2560 and the Protocol Class DLL 2570 make up the vPOS Software Development ToolKit (SDK) which are used to enable vPOS applications for interfacing with an Operator 2540.

vPOS/GATEWAY Architecture

The architecture of the Virtual Point of Sale (vPOS) and Virtual Gateway (GATEWAY) architecture maintains SET compliance while providing support for additional message types that are not enabled in SET. The architecture includes isolation of cryptographic details in a single module to facilitate single version government approval while maximizing the flexibility of the system for customization and facilitating transfer of updated versions on an acquirer specific basis. FIG. 18 is a block diagram of the extended SET architecture in accordance with a preferred embodiment. Processing commences at function block 1800 for a consumer-originated transaction via the World Wide Web (WWW) or 1810 for a merchant-originated transaction on the Internet. In either case control passes immediately to the WWW server 1820 for the transaction to be appropriately formatted and the appropriate interface page presented, whether the transaction is a store front 1822, shopping cart 1824, pay page 1826, standard terminal administration 1828-1830 transaction, or an extended terminal transaction 1834. If processing requires authentication of the transaction, then control passes through the Virtual Point of Sale (vPOS) Application Programming Interface (API) library 1840 for SET compliant transactions and through the vPOS API extensions library for extensions to the SET protocol. Then, at function block 1842, if the transaction is SET compliant, and function block 1864 if the transaction is not SET compliant, a library of protocol stack information is used to conform the message before it is transmitted to a Gateway site for ultimate delivery to a bank host 1874 for authorization.

Extended SET messages are processed at the Gateway site on a two track basis with the division criteria being SET compliance (which will change over time as more functionality is put into SET) or SET extensions. Set compliant messages are processed via the protocol statck library 1862, while SET extensions are processed via the protocol stack entension library 1864. Then, at function block 1870 the gateway engine processes SET and Host specific code including gateway administration extensions 1872 that bypass the normal processing and flow directly from the merchant and consumer server 1820 to the gateway administration extensions 1872 to the Gateway Engine 1870.

As described above, there are three channels by which messages are exchanged between vPOS 1846 and GATEWAY 1856.

1. Standard SET Messages

The standard SET messages are originated by the merchant software either via a pay page 1826 directly controlled by the consumer, or via an operator interface consisting of a set of HTML pages and associated executables launched by the pages (e.g. pay page 1826 and standard terminal administration 1828-1830.)

Each SET message type (e.g., authorization v. capture) transmits a different set of data and each requires a different Protocol Data Unit (PDU) to describe its encoding. Examples of how Standard SET messages are encoded are given in the SET documentation previously incorporated by reference.

2. Extended SET Messages

The Extended SET messages are utilized as an "escape mechanism" to implement acquirer-specific messages such as settlement/reconciliation, employee logon/logoff, and parameter download. The messages are developed as a set of name-value pairs encapsulated in a PKCS-7 wrapper and wrapped in Multipurpose Internet Mail Extensions (MIME), described in a book by N. Borenstein & N. Freed, "RFC 1521: MIME (Multipurpose Internet Mail Extensions) Part One: Mechanisms for Specifying and Describing the Format of Internet Message Bodies" (September 1993). The name-value pairs can have arbitrary (8-bit) data, so arbitrary items can be passed through the extended SET channel, including executable programs and Dynamic Load Libraries (DLL)s.

Figure 18B:
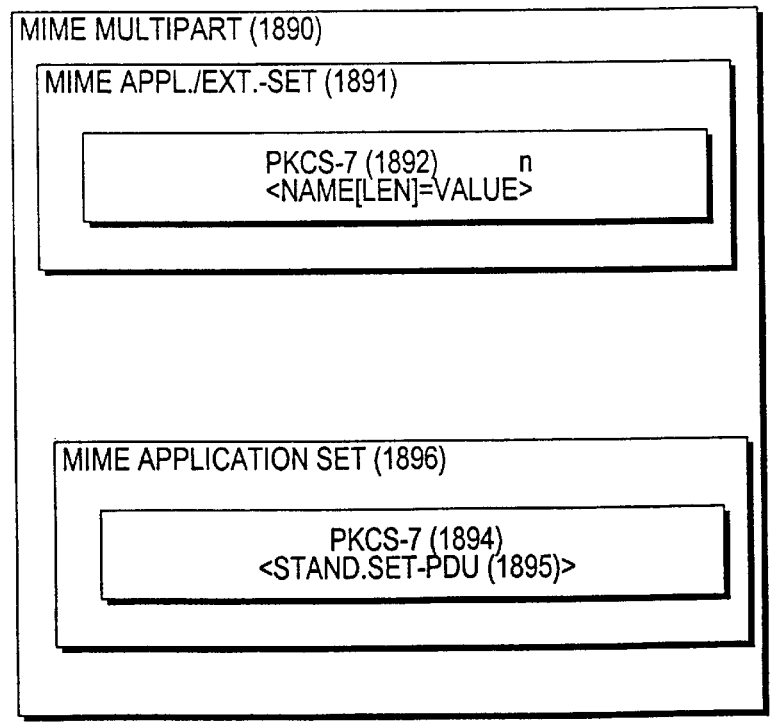
FIGS. 18A–E are block diagrams of the extended SET architecture in accordance with a preferred embodiment.

FIG. 18B illustrates a multipart MIME message with one Extended SET message and one Standard SET authorizing message. Mime is utilized as an outer wrapper 1890 to allow an Extended SET message 1891 to be transmitted as a compon of messages embedded in one MIME multipart message. In this manner, a standard SET message can be sent with an Extended SET message in one vPOS/GATEWAY communication transaction.

Embedding the Extended SET messages in a PKCS-7 wrapper enables the same message authentication to occur as in standard SET messages. Thus, for SET-compliant and non-SET-compliant messages, the same mechanism may be used to restrict which entities the vPOS or Gateway will trust in any communications. An important concept in Extended SET is that all messages, of any type, are sent in a uniform name/value pair format, thus allowing a single Protocol Data Unit to suffice for any type of message sent through the Extended SET channel. Since arbitrary data may be sent this way, a mechanism must be provided to preclude the use of the Extended SET channel by parties other than approved financial institutions. If this is not ensured, then the NSA and the US Department of Commerce will not approve the software for export.

SET itself to some degree ensures that this Extended SET channel is used only by financial institutions. The protocol stack extension library only processes messages that have been signed by a financial institution SET certificate that is in turn signed by a payment instrument brand certificate (such as Visa or MasterCard). Stronger control over the Extended SET channel can be achieved by further restricting processing of messages to those signed (either instead of or in addition to the financial institution SET certificate) by a second certificate belonging to a third-party agency, either governmental or private (e.g., VeriFone, as manufacturer of the software).

Figure 18A:
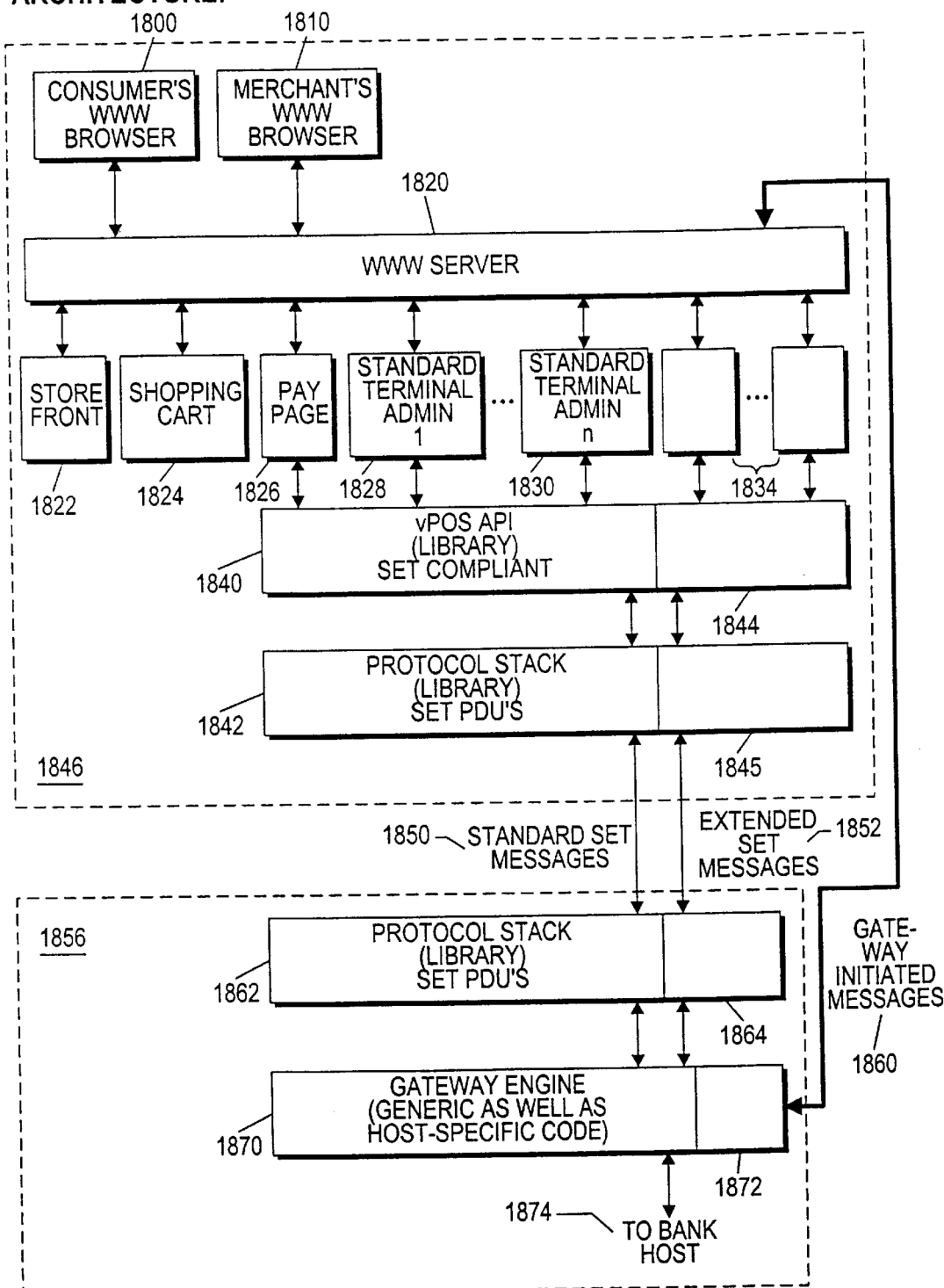

In this way, a particular set of Extended SET messages can be implemented by Bank X, and a different set of messages by Bank Y. If a vPOS has an extended terminal transaction interface as shown in FIG. 18A at block 1834 for Bank X, and has been configured to only accept messages from a Gateway with Bank X's certificate, then it will be able to communicate those messages to a Gateway that has the certificate for Bank X, and accepts messages of the types in Bank X's message set. The vPOS will not be able to connect to the Bank Y gateway, or to any other system that purports to communicate via Extended SET. This restriction is further secured by utilizing a public key certificate that is "hard wired" into vPOS, and which is distributed only to gateways that use the Extended SET mechanism.

Figure 18C:
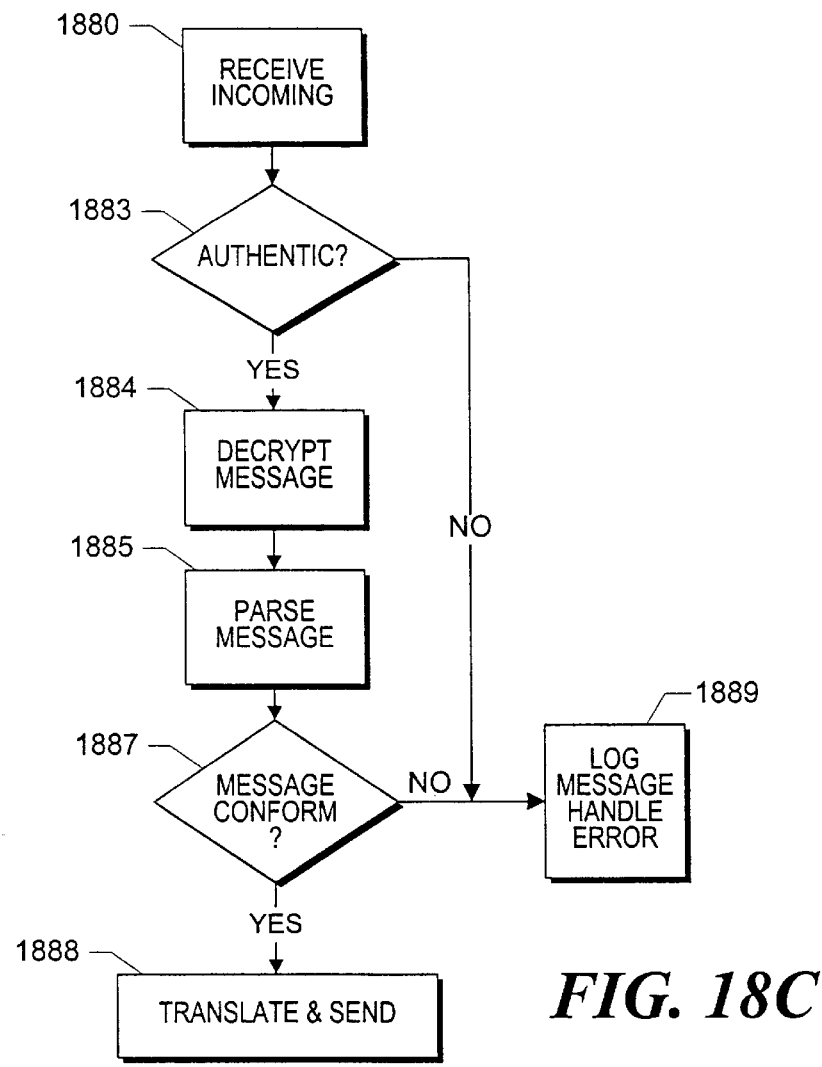

FIG. 18C is an example flowchart of message processing in accordance with a preferred embodiment. Processing commences at function block 1880 when a message is received by an HTTPS server or other listener and passed to decision block 1883 to determine if the sending vPOS has transmitted an authentic message and if the vPOS is authorized to communicate with this gateway. If the message is not authentic, then the message is logged as an error and the error is handled as shown in function block 1889. If the message is authentic, then the message is decrypted at function block 1884 and the PDU parses the message into name/value pairs. Then, based on the message type and the extended SET version information, the remaining message is parsed at function block 1885 and the message is checked for conformance to the appropriate specification as shown at decision block 1887. If the message does not conform, then it is logged and the error handled at function block 1889. If the message conforms to the proper specification in decision block 1887 then the message is translated into the appropriate host format and sent to the host as shown in function block 1888. Thus, when a gateway receives an incoming message from a vPOS and parses the Extended SET portion of the message, a single MIME message can transmit a SET message and/or an Extended Set Message.

An export license for the encryption can be obtained on a case-by-case basis, and since there will be potentially millions of vPOS's, it is desireable to obtain a commodities jurisdiction for the vPOS, to enable a single version of the vPOS (rather than one version for each bank) to be supported by the vPOS architecture. The architecture described here ensures that the single version of vPOS, no matter how it is configured with extended terminal transaction interfaces, cannot be used to communicate any data other than that contained in the extended SET messages that have been approved for export by the US government to be used exclusively for a specific bank.

Figure 18D:
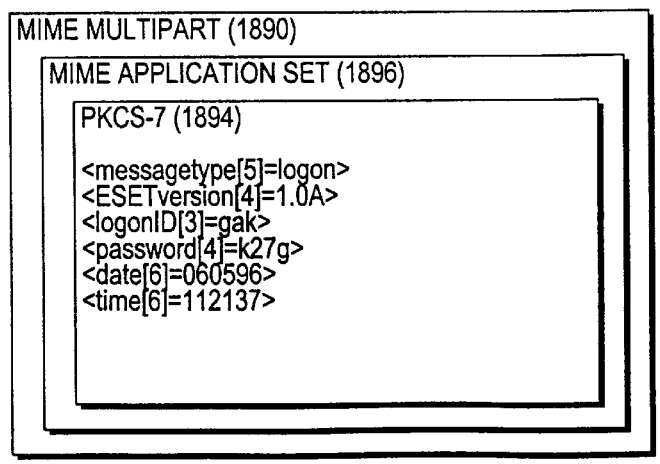

FIG. 18D is an example of a simple message between vPOS and Gateway using the Extended SET channel enabling an employee to sign on, or "logon" to a given terminal in accordance with the subject invention. The message must contain the employee's logon ID, a password to be verified by the bank host computer, and the date and time as shown at 1894.

While the contents of the message are shown without encryption in FIG. 18D, it should be noted that the information (including the logon password) are SET encrypted inside the PKCS-7 wrapper 1894. Certain fields may be designated as mandatory for an Extended SET message, to allow the Gateway or vPOS to decide how to handle the message. For the sake of clarity, in this message 1894, only two fields, "messagetype" and "ESETversion", are mandatory. These fields inform the Gateway that this message is of type "logon," and that the vPOS is using version "1.0A" of the ESET message formats defined for the Gateway. In this embodiment, the length indicator "[5]" is used to distinguish the length (in bytes) of the field of type "messagetype" in the message. In this way, there are no special end-of-data characters, and therefore arbitrary data need not have any "escaped" characters.

It should be noted that using escaped characters will work equally well. Total message integrity is assured by the digital signatures in the PKCS-7 wrapper. This does not, however, preclude the use of other checksumming schemes for additional pinpointing of transmission or encoding errors. The messagetype and ESETversion name/value pairs facilitate Gateway look up of what name/value pairs are expected in the "logon" message. Some name/value pairs may be mandatory, and others may be optional.

Figure 18E:
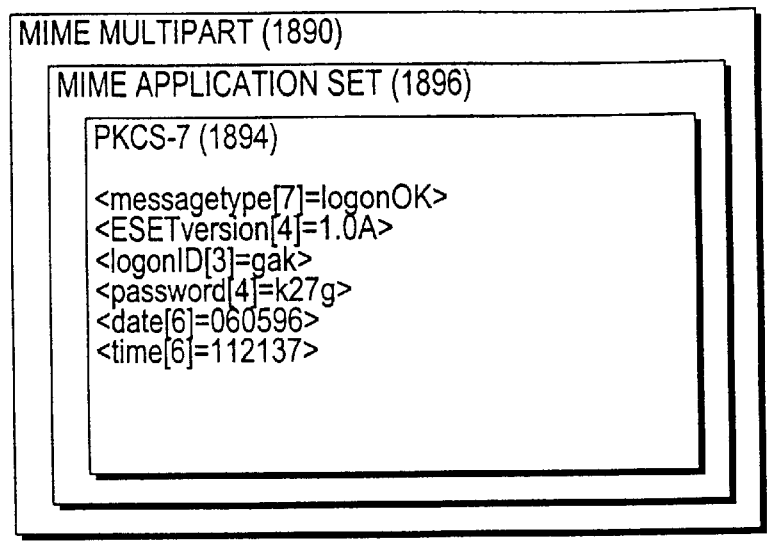

FIG. 18E is an example of a simple message between vPOS and Gateway using the Extended SET channel enabling an employee to sign on, or "logon" to a given terminal in accordance with the subject invention. In response to the logon request message from a vPOS, the Gateway may respond with a "logon accepted" message 1894, as depicted in FIG. 18E, which vPOS, upon receipt and authentication, then uses to unlock the terminal for that user.

Figure 49:
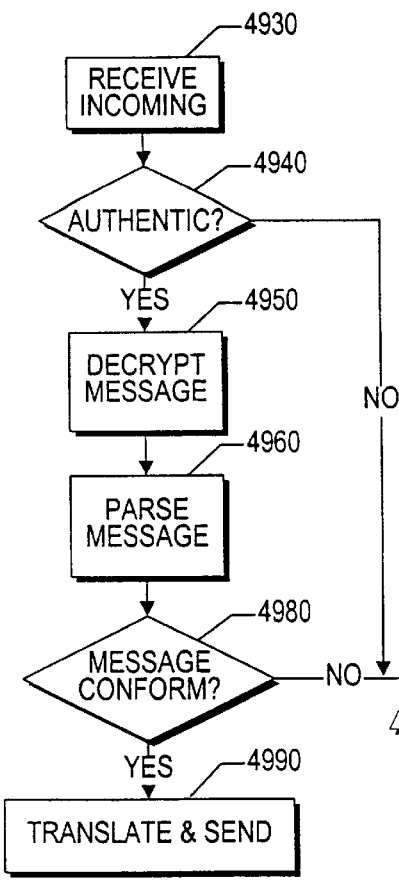
FIG. 49 shows how the vPOS authenticates an incoming response to a request in accordance with a preferred embodiment.

FIG. 49 shows how the vPOS authenticates an incoming response to a request in accordance with a preferred embodiment. Processing commences at function block 4930 when a message is received by the HTTPS, SET server, or other listener that originated the request to which this reponse corresponds. The message is passed to decision block 4940 to determine if the sending Gateway has transmitted an authentic message and if the gateway is authorized to communicate with this vPOS. If the message is not authentic, then the message is logged as an error or possible attack and the error is handled as shown in function block 4970. If the message is authentic, then the message is decrypted at function block 4950 and the PDU parses the message into name/value pairs. Then, based on the message type and the extended SET version information, the remaining message is parsed at function block 4960 and the message is checked for conformance to the appropriate specification as shown at decision block 4980. If the message does not conform, then it is logged and the error handled at function block 4970. If the message conforms to the proper specification in decision block 4980 then the message is translated into a standardized argument string to be passed to the appropriate executable or code entry point in the vPOS, as shown in function block 4990. Thus, when a vPOS receives an incoming message from a Gateway and parses the Extended SET portion of the message, the message may cause vPOS to execute a program that takes action or queries the user to take action.

3. Gateway-intitiated Messages

Since all SET messages between a merchant and an acquirer are currently merchant-initiated (as specified in the SET documentation), there must be a separate mechanism for initiating a message from a gateway, for example to request the upload of management information base (MIB) data, or to download new parameters. This is accomplished by requiring the gateway to send a message to the merchant via a MIME-encapsulated PKCS-7 conformant message containing name-value pairs to the merchant server directly, rather than to the SET module. This channel is shown in FIG. 18A at block 1860.

The message is verified for origination from the acquirer, and is utilized to either initialize a merchant action, such as to update the merchant's administration page (for example by blinking a message saying, "PLEASE RE-INITIALIZE YOUR TERMINAL"), or by initiating a request/response message pair originating from the merchant (for example, "HERE ARE THE CONTENTS OF MY MIB"). This is achieved by calling one of the extended terminal transaction interfaces (FIG. 18A at 1834), which in turn initiates a SET or Extended SET transaction.

Gateway Customization via the Extended SET Channel

Gateway customization in extended SET is extremely powerful and a novel concept for vPOS processing. Each vPOS contains one or more "serial numbers" unique to each copy of the software (a serial number may be embedded in the software, or may be a component of a public key certificate used in the software). Once a merchant has selected an acquirer and obtained the appropriate certificates, the vPOS can be customized utilizing the communication link and messages containing customization applications.

A bank distributes vPOS via different sales channels. The first is direct from a bank to an existing merchant with whom the bank already has an existing relationship. In this case, a version of vPOS already customized for a bank is sent to the merchant, either directly by a bank, or through a third-party distributor or service bureau. The customizations may involve modification or replacement of, for example, a store front 1822, shopping cart 1824, pay page 1826, standard terminal administration transaction interface 1828-1830 or an extended terminal transaction interface 1834. This is a standard model of distribution of software that is customized for small target market segments.

The more interesting case, and the one that concerns the novel use of the Extended SET channel, is where the potential merchant acquires, through some non-bank channel, a "generic" vPOS which has not yet been customized to interact with a specific bank. This vPOS can communicate with a "test gateway", which the merchant may use to experiment with the various features of vPOS and to test the integration of the vPOS into a total online storefront.

In order to actually transact business over the Internet, the merchant must first obtain a merchant ID from the merchant bank with which he signs an acquiring agreement. For online payment processing, the merchant must also obtain an appropriate set of digital credentials in the form of public key certificates and possibly additional passwords, depending on the financial institution. Once these credentials are obtained, the merchant is ready to customize the already-obtained vPOS to communicate with a merchant bank's gateway.

Using the built-in "serial number" certificate and the Test Gateway public key certificate (which is "hard-wired" into the vPOS sofware), it is possible to securely download a particular bank's customization applications to a specific copy of the vPOS software. Once the vPOS is appropriately configured, the last stage of customization download is to configure the vPOS so that it only responds to a public key certificate of the merchant's acquirer. This process is illustrated here in the context of a merchant who obtains a vPOS that talks to the VeriFone test gateway, and desires to customize the vPOS to interact with a gateway at a bank.

Figure 50:
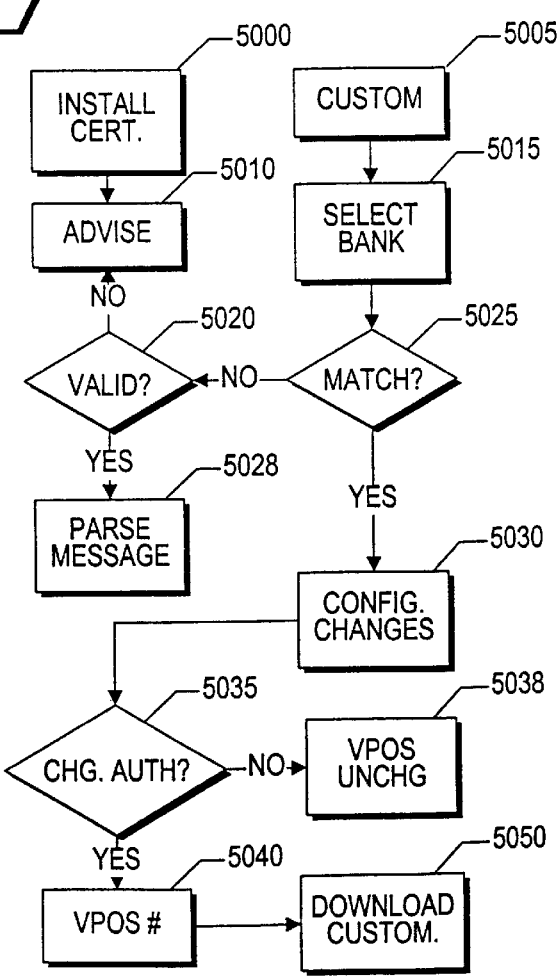
FIG. 50 is a flowchart for the merchant interaction with the Test Gateway in accordance with a preferred embodiment.

The merchant has purchased a vPOS from a non-bank channel. The version communicates with the VeriFone Test Gateway. The merchant uses the gateway to learn about using vPOS, and to test the integration of his storefront system with his payment system. The merchant also obtains certificates for payment processing from a bank, the merchant bank of choise for the merchant. The merchant is now ready to customize vPOS to talk to the bank gateway. The flowchart for the merchant interaction with the Test Gateway is shown in FIG. 50.

The merchant begins at function block 5000, where the newly-obtained merchant SET certificates are installed in the vPOS. The merchant then directs the vPOS to connect to the VeriFone Test Gateway, by selecting this option from the vPOS terminal administration home page 5005. The choice of this option invokes an extended terminal admin page from the default set of such pages supplied with the generic version of vPOS. This program guides the customization process.

The merchant, interacting with the extended terminal admin page, navigates to the list of gateways which is maintained by the Test Gateway, and selects the bank to connect by selecting from the list of banks, at function block 5015. During this process, the merchant's public key certificates are uploaded to the Test Gateway, and checked (at decision block 5025) to verify that the certificates have been signed by the bank to customize the bank for the vPOS. If the certificates do not match, the merchant is advised of the situation in function block 5028, and must select a different bank. If the certificates are not valid SET certificates as detected at decision block 5020, the merchant is advised at function block 5028, and the session terminates. If the certificates are valid and match the selected bank, customization continues at function block 5030.

The extended terminal administration program in vPOS receives a list of the customizations from the Test Gateway that must be performed to specialize the vPOS for a specific bank. Some of these customizations are mandatory, while others are optional. In function block 5030, the vPOS advises the merchant of the customizations, prompting for any choices that must be made by the merchant. The merchant's actions at this point drive decision block 5035, in which the vPOS either returns itself to the "generic" state and terminates the interaction, or begins the configuration of the vPOS, depending on the merchant's confirmation of the request to begin the configuration.

If the merchant has authorized the changes, control is passed to function block 5040 where, the POS stores the certificates of any gateways that it will allow future configuration changes to be initiated from in its database. This may be only a specific bank, such as a bank and the Test Gateway, or other combinations. If only a single, non-Test, bank-owned, gateway is allowed to download changes, the vPOS is no longer customizable for any other bank. Then, a new copy would be purchased by the merchant to have it customized for another bank. If the Test Gateway is still allowed to customize the vPOS, the merchant could switch to another merchant bank and have the current vPOS updated to work with the new bank.

In function block 5050, the customizations are downloaded to the vPOS. The downloads comprise a set of HTML pages and a set of executable programs or scripts that read data from the merchant, perform various functions, and present data to the merchant. In general, the customizations downloaded may augment or replace in part or in whole any and all of function blocks 1822, 1824, 1826, 1828, 1830, or 1834 in FIG. 18A. At a minimum, the terminal "home page" will be replaced so that it points to the new functionality this point, the customization of the vPOS has been completed, and the merchant may now begin sending payment requests to the merchant bank or processor through the vPOS.

Thread Safe vPOS—TID Allocation

Physical terminals process a single transaction at a time since clerks are usually only able to process one transaction at a time. Web Servers can process many transactions at a time, so payment requests can often occur simultaneously. Thus, the vPOS Software must have support for multi-tasking and provide support for multiple threads to be active at the same time in the same system as well as the same process. This requirement is relatively straight forward. However, the authorizing banks require that all transaction requests include a Terminal ID (TID), and, for many banks, no single TID may be active in any two transaction requests that overlap in time. Thus, the vPOS requires dynamic allocation of TIDs to requesting threads.

One way of providing for multiple TID's is to assign a "base" TID, and either an "extension" (a set of extra digits appended to the base), or an increment (a number which is added to the base to obtain the complete TID). While such a solution can be used for the majority of banks and processors, not all banks/processors can accomodate this solution. One example is First Data Corporation. For its ENVOY protocol, the terminal ID must use the Luhn check as recited in an ISO ransrk, which adds a checksum digit to the the terminal ID to reduce chances of fraud or of mistyped information. Thus, to be general enough to handle all bank/processor situations, a pool of TID's is used. The TID's stored in the pool need not be a sequential set of numbers; in fact they can be alpha/special/numeric combinations, and the TID's need have no relation to one another. In a preferred embodiment, a TID is represented as a token in a pool that can be associated with a particular transaction.

To provide for this requirement, the vPOS provides a TID pool in tabular form in a database management system (DBMS). This table has two colums: TID NAME & Allocation date/time. If the TID date is null, then the TID is not in use and may be assigned. A date/time field is utilized to allow TID allocations to expire. TID requests are made utilizing a SQL query on the TID Pool to find the first null or expired date/time, which is replaced with the current date/time and the TID name returned.

REMOTE vPOS

The unique archtitecture of the Cardholder 120, Merchant 130 and Gateway 140, as shown in FIG. 1B, provides communication capability between the modules utilizing the Internet to support linkages 150 and 170. Since the Internet is so pervasive, and access is available from virtually any computer, utilizing the Internet as the communication backbone for connecting the cardholder, merchant and access to the authorizing bank through a gateway allows the merchant vPOS software to be remotely located from the merchant's premises. For example, the cardholder could pay for goods from any computer system attached to the Internet at any location in the world. Similarly, the merchant vPOS system could be located at a central host site where merchant vPOS systems for various merchants all resided on a single host with their separate access points to the Internet. The merchant could utilize any other computer attached to the Internet utilizing a SSL or SET protocol to query the remote vPOS system and obtain capture information, payment administration information, inventory control information, audit information and process customer satisfaction information. Thus, without having to incur the overhead of maintaining sufficient computer processing power to support the vPOS software, a merchant can obtain the information necessary to run a business smoothly and avoid hiring IS personnel to maintain the vPOS system.

vPOS Multi-Merchant Processing

Multiple merchant processing refers to the ability of a plurality of merchants to process their individual vPOS transactions securely on a single computer. The architecture relies on each payment page obtaining the merchant name in a hidden field on the payment page. The vPOS engine receives the merchant name with a particular transaction and synchronizes the processing utilizing a Set Merchant method. This command causes the vPOS API to look up a unique registry tree based on the merchant name. This process causes the vPOS engine to engage the appropriate configuration to process the transaction at hand utilizing a Registry Tree. A registry tree contains Card Definition Tables (CDT)s, Acquirer Definition Tables (ADT)s, Merchant Definition Tables (MDT)s, Protocol Configuration Tables (PCT)s, etc. The CDTs point to specific ADTs since each supported card can be supplied by a distinct acquirer. This is one form of split connection. Each of the ADTs in turn point to PCTs, and some acquirers can support multiple parallel gateways. A merchant's name refers to a unique database in the database management system which contains for example, TIDs.

So, for example, to fully qualify a particular merchant in a multi-merchant system, the Acquirer Definition Table is queried to ascertain the particular Gateway (VFITest), then if Bank of America requires verification of network communication information, the particular CardDT is accessed with for example VISA. The particular merchant will service VISA transactions utilizing a particular acquirer. The particular piece of merchandise will also be detailed in a data base. Finally, the merchant Configurations will also be stored in the database to facilitate E-mail and name lookup.

vPOS CLIENT

The interaction between the vPOS and a client commences when a pay page solicits parameters of a transaction. Then, the parameters are validated to be sure the payment instrument, for example, cardnumber is not null. Then, a transaction object is created, eg. AUTHONLY, and the object is initialized and stuffed with parameters of the transaction, eg. ao.setpan(accnum), and the object is executed. This execution invokes the vPOS engine. The vPOS engine further validates the parameters based on the particular merchant's configuration. For example, some merchans do not accept American Express Cards, but will take Visa, and all merchants check the expiration date of the card. Assuming a valid and acceptable card has been tendered, then a TID is assigned (expiring, existing TIDs) or block a new TID from the TID Pool. This generates a STAN, XID, RRPID unique tag and creates an initial record in the transaction database which is flagged as before gateway processing in case the transaction crashes and must be backed out. Then the protocol parameters are identified in the registry based on card type, and a particular acquirer identified. Then, a protocol object is created and executed to extract results from the protocol object and the before gateway "bit" is flipped to again flag the location of the transaction in the process as it is submitted to the Gateway.

The results received back from the Gateway are placed into a transaction object with is reported back to the pay page and ultimatey back to the pay page user.

vPOS Merchant Pay Customization

A novel feature of the vPOS software provides payment page customization based on a merchant's preferences. This feature automatically lists cards that are accepted by a particular merchant based on the active terminal configuration. Each approved card for a particular merchant is linked to the display via an URL that provides a pointer to the credit card information supported by the merchant. Each card has an entry in a data structure referred to as the Card Definition Table (CDT).

Figure 19:
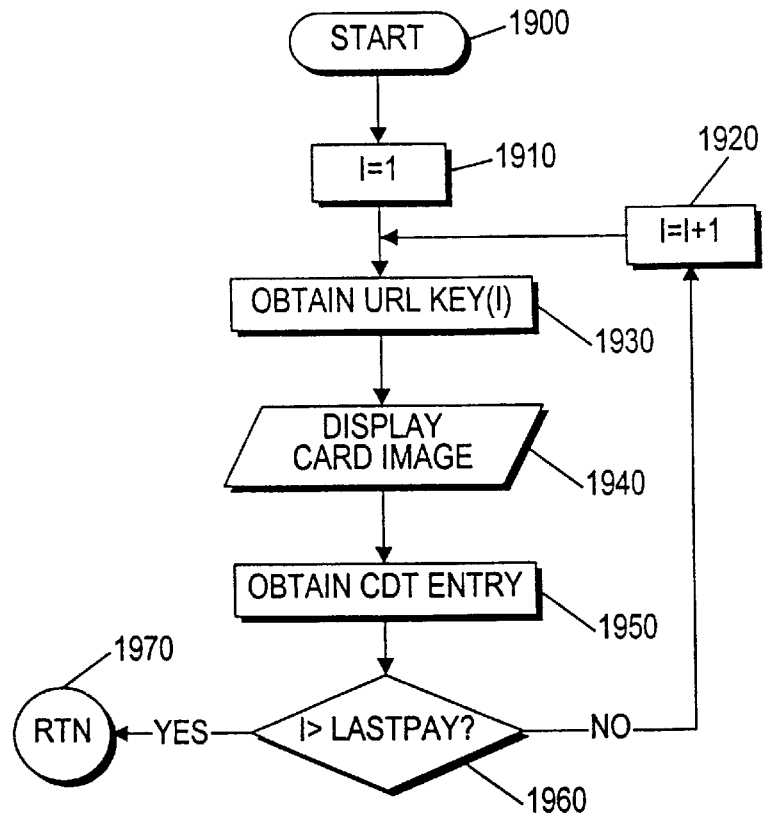
FIG. 19 is a flowchart of vPOS merchant pay customization in accordance with a preferred embodiment.

A preferred embodiment of the vPOS merchant pay customization software in accordance with a preferred embodiment is provided in FIG. 19 which illustrates the logic utilizing a flowchart, and a listing of the source code below. Processing commences at terminal 1900 and immediately flows to function block 1910 where an index variable is initialized for stepping through each of the accepted payment instruments for the merchant's page. Then, at function block 1930, a URL key is obtained associated with the current merchant pay page and index value. The URL key is a registry key name that points to a picture of a credit card that the merchant has associated with the pay page and which the merchant accepts as payment. At output block 1940 the card image associated with the URL key is obtained and displayed on the terminal. The CDT entry is obtained at function block 1950 utilizing the URL key. The CDT is utilized for storing information associated with each card. Then, at decision block 1960, a test is performed to determine if the last payment method card has been processed and displayed on the merchant display. If not, then the index is incremented at function block 1920 and the loop reiterated to process the next card at function block 1930. If all the cards have been processed, then control is returned to the merchant program for processing the transaction at terminal 1970.

Figure 20A:
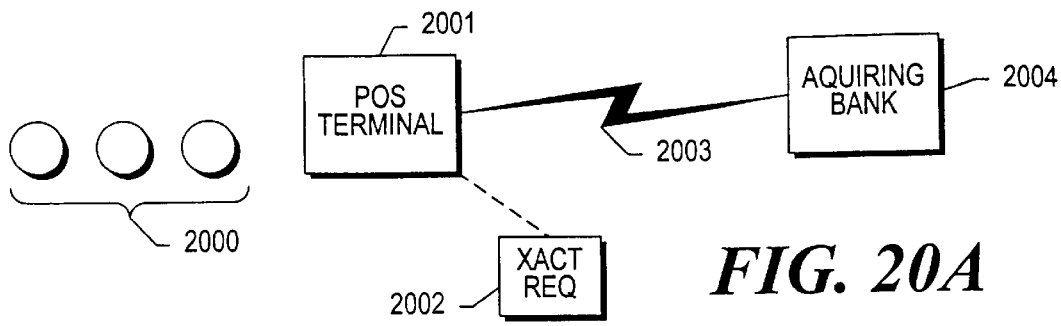
FIGS. 20A–20H are block diagrams and flowcharts setting forth the detailed logic of thread processing in accordance with a preferred embodiment.

FIGS. 20A through 20H are block diagrams and flowcharts setting forth the detailed logic of thread processing in accordance with a preferred embodiment. FIG. 20A illustrates a prior art approach to POS processing utilized in most grocery stores and department stores today. POS Terminal 2001 accepts transactions provided to it one at a time by customers 2000. For each transaction, POS Terminal 2001 builds a transaction request 2002 and transmit it to acquiring bank 2004 over communications link 2003.

Figure 20B:
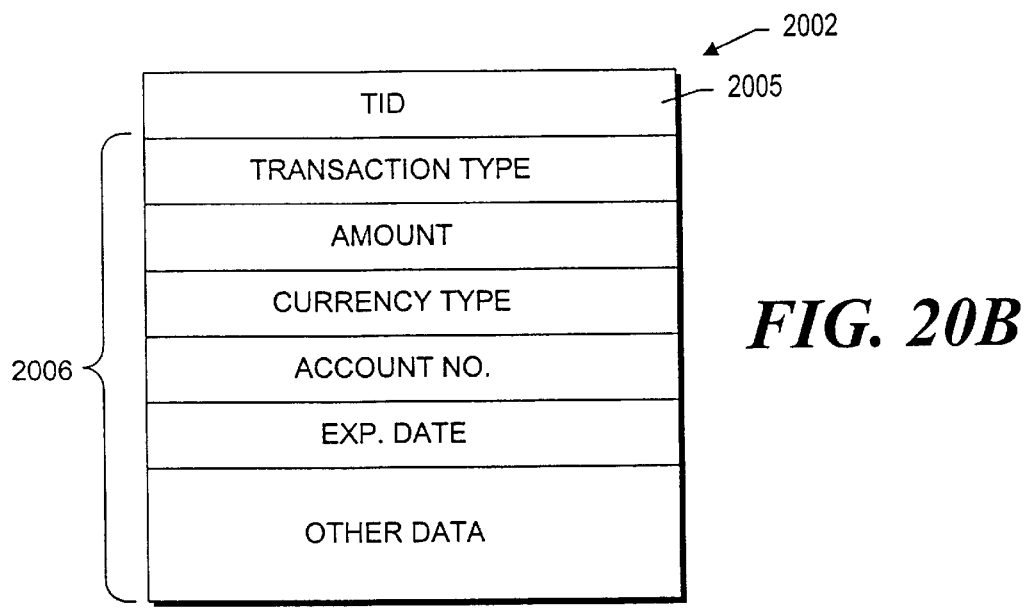

FIG. 20B is a data structure 2002 representing a POS transaction request in accordance with a preferred embodiment. The data structure 2002 includes a TID field 2005, which identifies the physical terminal from which the transaction originates. In addition to the TID field, the data structure also includes other data 2006 necessary to process a transaction. This data includes such fields as a transaction type, a transaction amount, a currency type (such as U.S. dollars), credit card account number, credit card expiration date, etc.

Figure 20C:
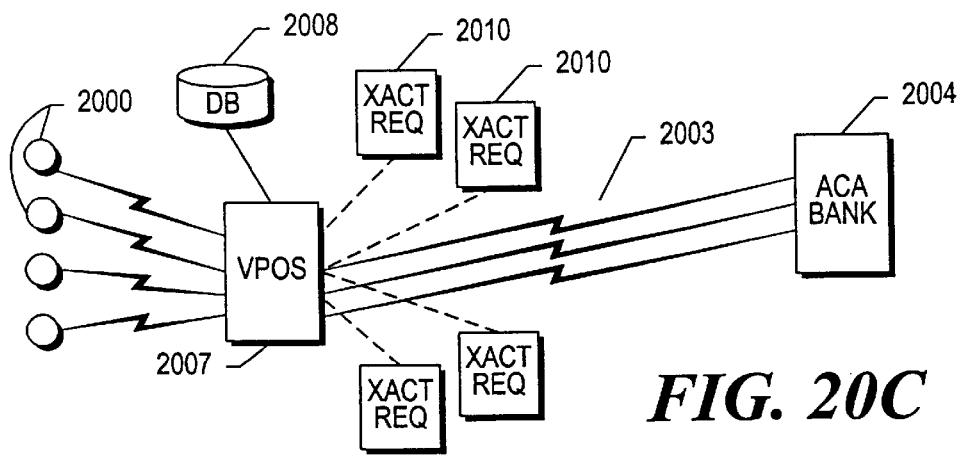

FIG. 20C illustrates a vPOS architecture with account requests being processed by a single acquiring bank. vPOS 2007 processes a plurality of customers 2000 concurrently. For each such customer 2000, vPOS 2007 builds a data structure 2010, representing the transaction to be performed for that customer. Each data structure 2010 contains a unique "virtual terminal" ID. vPOS 2007 selects a virtual terminal ID using database 2008. For each data structure 2010, vPOS 2007 initiates communication with acquiring bank 2004 using communication link 2003.

Figure 20D:
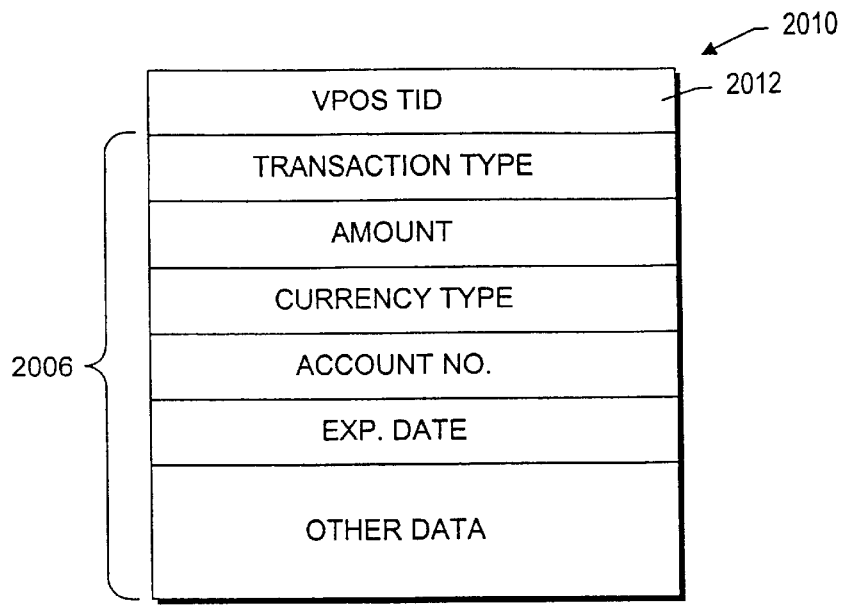

FIG. 20D is a data structure 2010 representing a vPOS transaction request in accordance with a preferred embodiment. The data structure 2010 includes a TID field 2012, which identifies a virtual terminal ID associated with a particular transaction. In addition to the TID field 2012, the data structure also includes other data 2006 necessary to process a transaction. This data includes such fields as a transaction type, a transaction amount, a currency type (such as U.S. dollars), credit card account number, credit card expiration date, etc.

Figure 20E:
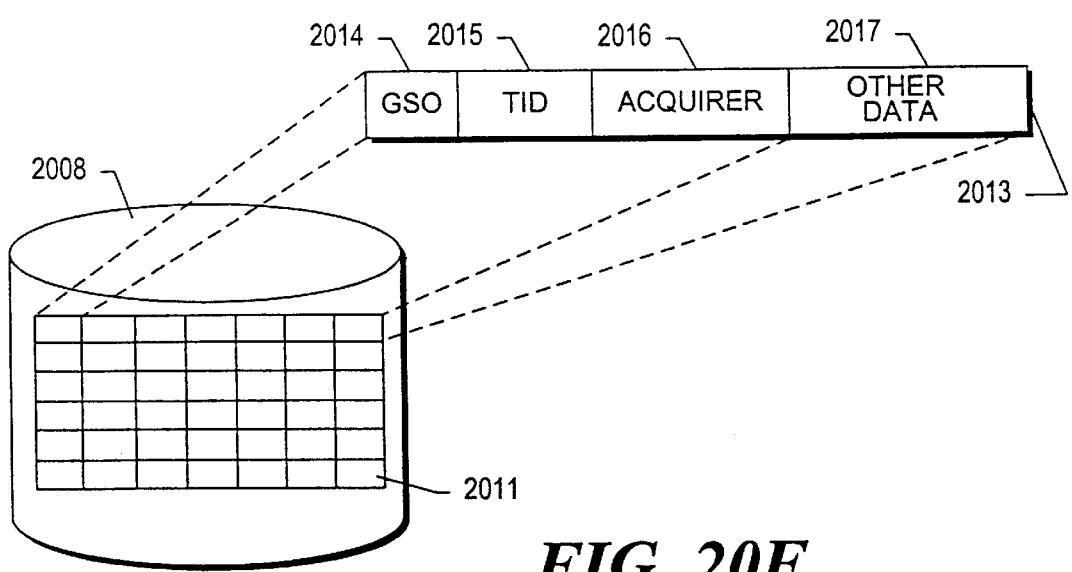

FIG. 20E illustrates a TID allocation database 2008 in accordance with a preferred embodiment. Database 2008 includes a TID allocation table 2011. TID allocation table 2011 includes a plurality of rows, one for each TID used by each acquiring bank. One such row 2013 is illustrated in detail. Row 2013 includes a good/service order (GSO) identifier 2014, which identifies the order being transmitted; a TID field 2015, which identifies a terminal ID that may be used with a particular acquiring bank; and an acquiring bank field 2016, which identifies the acquiring bank for which the TID is valid. In addition, row 2013 may optionally include other fields 2017 that may be used in conjunction with the order processing. A null GSO value indicates that the TID/Acquirer combination is not currently in use.

Figure 20F:
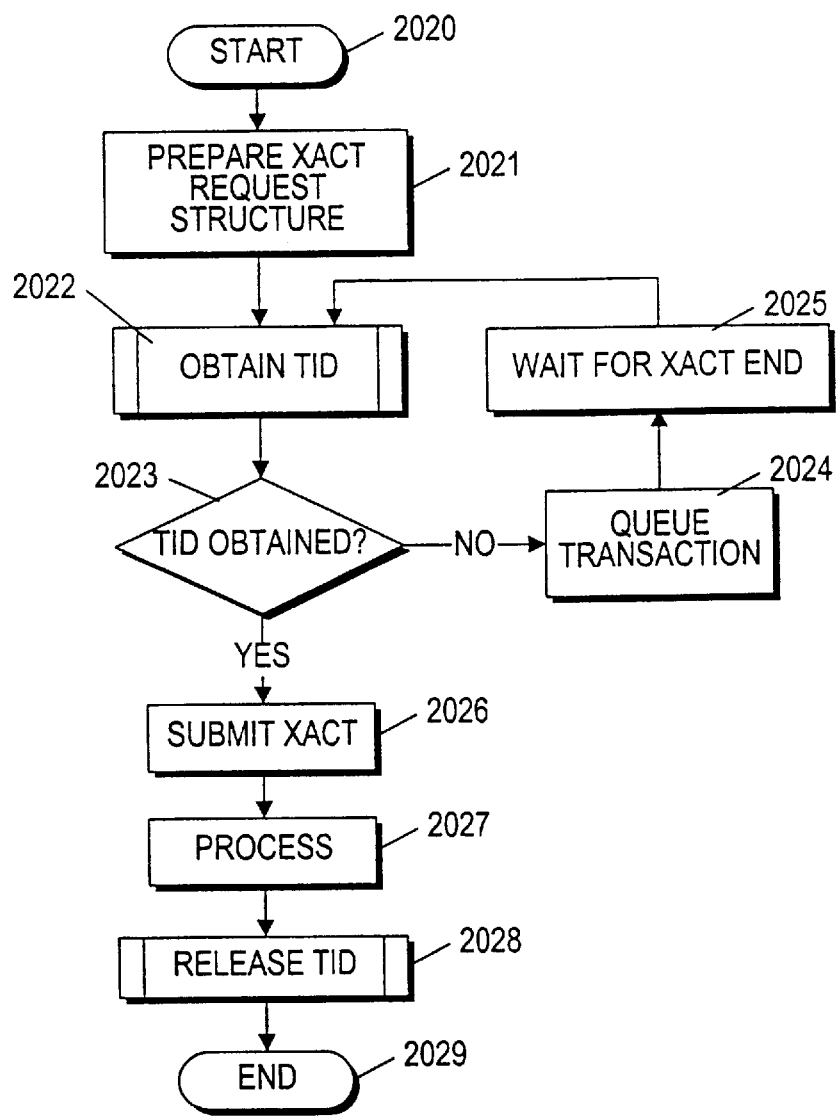
Figure 20G:
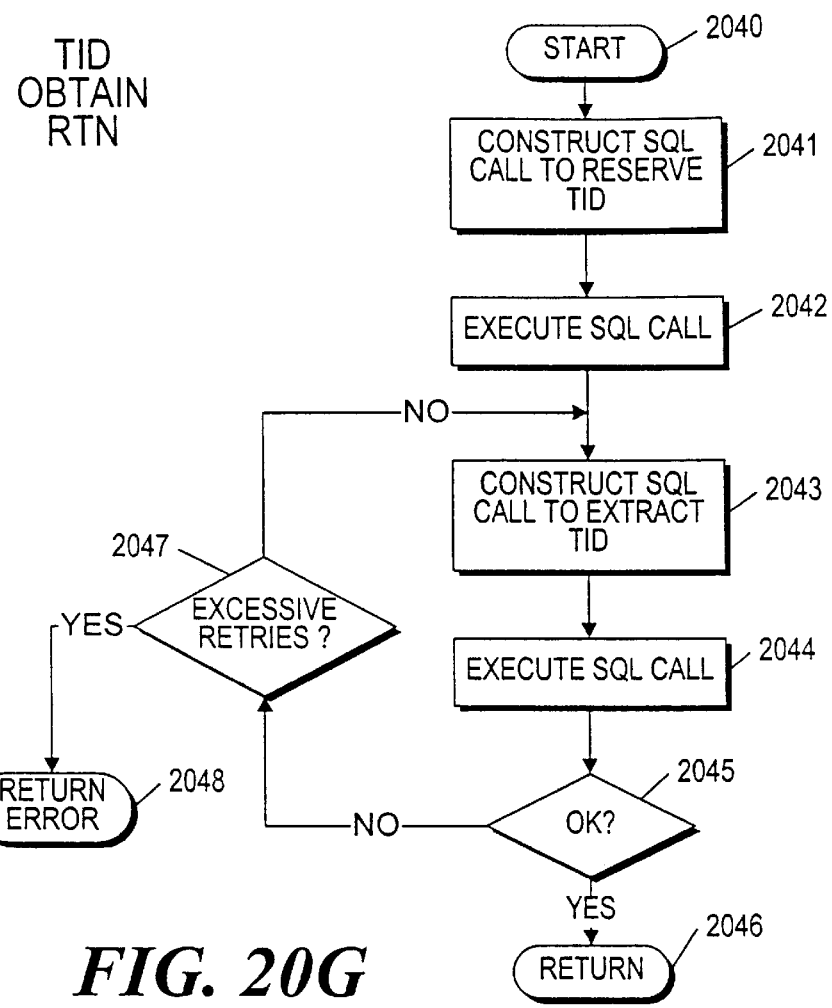
Figure 20H:
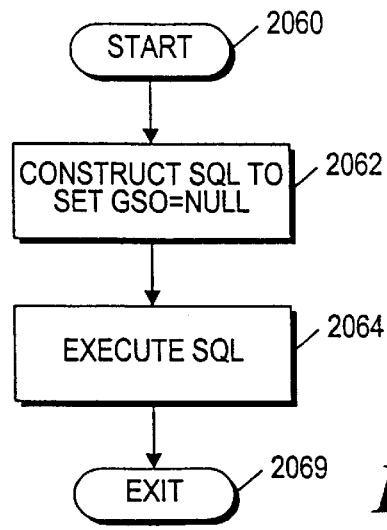

FIGS. 20F through 20H are flowcharts of the detailed logic used to perform virtual terminal ID allocation. FIG. 20F illustrates the main line operation of virtual TID allocation. In step 2020, execution begins. In step 2021, a skeletal transaction request structure is prepared. In step 2022, the main line routine obtains a virtual TID for inclusion within the transaction request structure, as will be more fully disclosed with reference to FIG. 20G, below. In step 2023, the routine verifies that a TID was obtained. If the TID was not obtained, for example, if more transactions are currently being processed than there are TIDs, then execution continues to step 2024. In step 2024, the transaction request is put on a queue for future processing. In step 2025, the routine waits for a transaction process to end, which would free up a TID in use. At that point, control resumes from step 2022, and the routine again attempts to obtain a TID.

If the TID was successfully obtained in step 2023, control proceeds to step 2026. In step 2026, the routine submits the transaction to the acquiring bank. In step 2027, the transaction is processed. In step 2028, the routine makes a database call to free up the TID that was used in the transaction. In step 2029, transaction processing ends.

FIG. 20G depicts in detail the process of obtaining a TID from the database. Execution begins in step 2040. In step 2041, the routine constructs a database call to reserve a TID for processing, for example, by constructing an SQL statement to retrieve a TID row from the database. In step 2042, the routine executes the database call that was constructed in step 2041. In step 2043, the routine constructs a second database call to extract the TID from the row that was reserved in step 2042. In step 2044, the database call constructed in step 2043 is executed to obtain the TID. In step 2045, a return code is checked to verify whether the TID was successfully obtained. If the TID was successfully obtained, control proceeds to step 2046, which returns to the calling program. If, however the TID was not obtained, control proceeds to step 2047. In step 2047, the routine checks to see whether an excessive number of retries have already been attempted. If there have been an excessive number of retries, control proceeds to step 2048, which exits with an error indication. If there has not been an excessive number of retries, control proceeds once again to step 2043 to retry the extraction operation.

FIG. 20H depicts the operation of releasing a TID that had been used in a prior transaction. Execution begins in step 2060. In step 2062, the routine constructs a database call to update the row for the selected TID so that the value for the good and service order is null, thereby indicating that the selected TID is not associated with any good or service order, and is therefore free for reuse. In step 2064, the routine executes the SQL statements constructed in step 2062, thereby releasing the TID for use in future transactions. In step 2069, the routine returns to the calling program.

A source code listing for the transaction request processing is provided below in accordance with a preferred embodiment.

```
#include "rr.h"
#ifndef _NT
#define _NT
extern void _setenvp();
#endif
///////////////////////////////////////////////////
// AcquireBillHtml
// On Pay page, output form entries to acquire billing information
///////////////////////////////////////////////////
EStatus AcquireBillHtml(CWSINT& clWSINT, int nTot, CProf& clProfile, EPCLCurrency
eCurrency) {
    // Current time
    time_t tNow // figure out current year for Credit card expiry
    struct tm *tmNow;
    char szYear[DB_YEAR_SZ + 1];
    char szAmount[FORMATTED_CURRENCY + 1];
    time(&tNow);
    tmNow = localtime(&tNow);
    strftime(&szYear[0], (size_t)DB_YEAR_SZ + 1, "%Y", tmNow); //needs extra 1 for null
    int nYear = atoi(szYear);
/*<TH>payment Type</TH>  <TD><INPUT SIZE = 20 NAME=b_instrument VALUE=[|]P'"
        <<clProfile.m_b_instrument <<"[|]P'></TD>"
        <<"*/
    clWSINT <<"<CENTER><TABLE BORDER=0><CAPTION ALIGN = TOP><B>Bill
To</B></CAPTION> ";
    clWSINT <<"<TR ALIGN=LEFT><TH>Account Number</TH><TD COLSPAN = 5><INPUT
SIZE = 56 MAXLENGTH ="
        <<ACCT_NUM_SZ <<"NAME=b_card></TD></TR> ";
    clWSINT <<"<TR ALIGN=LEFT><TR>Name on Card</TH><TD><INPUT SIZE = 20
MAXLENGTH="<<NAME_SZ
        <<NAME=b_name VALUE=[|]P'"<<clProfile.m_b_name
        "[|]P'></TD><TH>Expiration</TR><TD>Month<SELECT NAME =
b_expire_month><OPTION>01  <OPTION>02 "<<
        "<OPTION>03  <OPTION>04  <OPTION>05  <OPTION>06  <OPTION>
07 <OPTION>08 <OPTION>09 "<<
        "<OPTION>10  <OPTION>11  <OPTION>12 </SELECT>Year<SELECT
NAME = b_expire_ear><OPTION>"<<nYear<<
        "<OPTION>"<<nYear + 1 <<"<OPTION>"<<nYear + 2 <<"<OPTION>"<<nYear
+ 3 <<"<OPTION>"<<nYear + 4 <<
        "</SELECT></TD></TR>    ;
    // <TH>Expires</TH><TD>Month <INPUT SIZE=3 NAME=b_expire_month>Year <INPUT
SIZE=5 NAME=b_expire_year></TD></TR> ";
    clWSINT <<"<TR ALIGN=LEPT><TH>Address Line 1</TH><TD COLSPAN=5><INPUT
SIZE=56 MAXLENGTH="<<ADDR_SZ
        <<"NAME=b_addr1 VALUE=[|]P'"<<clProfile.m_b_addr1 <<"[|]P'></TD></TR> ";
    clWSINT <<"<TR ALIGN=LEFT><TH>Address Line 2</TH><TD COLSPAN=5><INPUT
SIZE=56 MAXLENGTH="<<ADDR_SZ
        <<"NAME=b_addr2 VALUE=[|]P'"<<clProfile.m_b_addr2 <<"[|]P'></TD></TR> ";
    clWSINT <<"<TR ALIGN=LEFT><TH>City</TH><TD><INPUT MAXLENGTH="<<
CITY_SZ <<"NAME=b_city VALUE=[|]P'"
        <<clProfile.m_b_city <<"[|]P'></TD>"<<"<TH>State/Province</TH><TD><INPUT
MAXLENGTH="<<STATE_SZ
        <<"NAME=b_StateVALUE=[|]P'"<<clProfile.m_b_state <<"[|]P'></TD></TR> ";
    clWSINT <<"<TR ALIGN=LEFT><TH>Country</TH><TD><INPUT MAXLENGTH="<<
COUNTRY_SZ
        <<"NAME=b_country VALUE=[|]P'"<<clProfile.m_b_country <<"[|]P'>
</TD><TH>Zip/Postal Code</TH><TD><INPUT MAXLENGTH="
        <<ZIP_SZ <<"NAME=b.3zip VALUE=[|]P'"<<clProfile.m_b_zip <<"[|]P'>
</TD></TR> ";
    clWSINT <<"<TR ALIGN=LEPT><TH>Email</TH><TD><INPUT MAXLENGTH="
BEMAIL_SZ <<"NAME=b_email VALUE=[|]P'"
        clProfile.m_b_email <<"[|]P'></TD>"       "<TH>Phone</TH><TD><INPUT
MAXLENGTH="<<BPHONE_NUM_SZ
        <<"NAME=b_phone VALUE=[|]P'"    clprofile.m_b_phone <<"[|]P'>
</TD></TR> ";
    clWSINT <<"</TABLE></CENTER><P> ";
```

-continued

```
   //NPW<<"NAME=b_addrl></TD>"<<"<TH>Payment
Instrument</TH> <TD><SELECT NAME =b_instrument>";
   // hack from ini (bug) which pay instruments supported
   //NPW clWSINT <<"<OPTION>Credit Card "<<"<OPTION>Debit
Card </SELECT></TD></TR> ";
   CurrForrnat(nTot, eCurrency, szAmount);
   clWSINT <<"<CENTER><FONT SIZE=5>Total ="<<szAmount <<
"</FONT></CENTER>";
   return (eSuccess);
}
/////////////////////////////////////////////////////////
// PayButtonsRtml
// Output buttons on pay page: return to shop, pay, pay window,
// modify order
/////////////////////////////////////////////////////////
void PayButtonsHtml(CWSINT& clWSINT, char* pszShopUrl, CRRReg& clReg)
   char *pszHomeUrl = clWSINT.LookUp("home_url");
   char *pszModifyUrl = clWSINT.LookUp("modify_url");
   char *pszSoftUrl = clWSINT.LookUp("soft_url");
   if (!pszRomeUrl) pszHomeUrl = pszShopUrl; // Home Page
   //if (!pszModifyurl) pszModifyUrl = pszShopUrl; // Shopping Cart typically
   clWSINT <<"<CENTER><H4> By pressing the Pay!button I agree to pay the above total
amount<br> according to the card issuer agreement<H4></CENTER> ";
   clWSINT <<"<CENTER> <A HREF ="<<pszShopUrl <<"><IMG SRC="<<
clReg.m_szReturnShop <<"BORDER = 0></A> ";
#ifdef _SC
   clWSINT <<"<INPUT TYPE = IMAGE NAME = gso SRC ="<<clReg.m_szModifyOrder <<
"BORDER = 0> ";
#else
   if (pszModifyUrl)
      clWSINT <<"<A HREF ="<<pszModifyUrl <<"><IMG SRC="<<
clReg.m_szModifyOrder <<"BORDER = 0></A> ";
#endif
   clWSINT <<"<INPUT TYPE = HIDDEN NAME = home_url VALUE ="<<pszHomeUrl <<
"> "
   "<INPUT TYPE = IMAGE NAME = vPOS SRC ="<<clReg.m_szPay <<"BORDER =
0> "
   "<INPUT TYPE = HIDDEN NAME = shop_url VALUE ="<<pszShopUrl <<"> "
   "<INPUT TYPE = HIDDEN NAME = store VALUE ="<<clWSINT.LookUp("store") <<
"> "; //Can't be NULL or error previously
   if (pszSoftUrl)
      clWSINT <<"<INPUT TYPE = HIDDEN NAME = soft_url VALUE ="<<pszSoftUrl
<<"> ";
   clWSINT <<"</CENTER> ";
}
/////////////////////////////////////////////////////////
// DisplayPayPage
// Outputs billing form, buttons, and static gso
/////////////////////////////////////////////////////////
EStatus DisplaypayPage(CWSINT& clWSINT, CRRReg& clReg, int nError) {
   EStatus eStat;
   char szFileLine[BUFFER_SZ + 1];
   char *pszTag, *pszRefererUrl, *pszShopUrl, *pszExepath, *pszServerName;
   time_t tNow
   int nTagExist = FALSE;
   HKEY hCardsKey; //To enumerate cards
   long retCode;
   int nNoCards;
   DWORD dwtype, dwlen;
   HKEY hCardKey;
   char szCardBuf[MAX_PATH + 1], szCardPic[MAX_PATH + 1];
#ifdef _SC
   CPOLBk clBkGso;
#else
   char *psZTxn, *pszGsoNum, *pszGsoOpaque, *pszTot;
#endif
   // Shipping headers. If come from gso page and cookies are not set, set.
   CProf *pProfile;
   pProfile new CProf();
   if (!pProfile) return (eRRNewFailed);
   eStat = pProfile->Init(clWSINT);
   if (eStat != eSuccess) return (eStat); //Init failed
#ifdef _SC/*NO session cookie for the pay page. This means the user will either use a long
      term cookie or type in their info each time*/
   clWSINT <<"Set-Cookie: profile="<<pProfile->GetCookieLine() <<";path=/ ";
/*    if (clWSINT.LookUp("Server Name"))
      clWSINT <<";domain = "<<clWSINT.LookUp("Server Name") <<
#endif
#ifdef _SC
```

-continued

```
    // Shipping filled in?
    if (!(pProfile->m_s_name[0] && pProfile->m_s_addr1[0] && pProfile->m_s_city[0] &&
pProfile->m_s_state[0] &&
        pProfile->m_s_zip[0] && pProfile->m_s_country[0] && pProfile->m_s_ship[0])) {
        eStat = DisplayGsoPage(clWSINT, clReg, ERROR_DISPLAY); //bug, return
correct?
        return eStat;
    }
    //Creates shopping basket from CGI/Cookies
    eStat = clBkGso.Init(clWSINT, *pProfile, clReg);
    if (eStat != eSuccess) return (eStat); //eRRBasketCreateError
    //Cookies then other headers
    clBkGso .ToCookies(clWSINT, REGULAR);
#endif
    //clWSINT <<"Pragma: no-cache ";
    clWSINT <<"Content-type: text/html ";
    //Where to position the page. if all information is filled in, here.
    if (!nError) {clWSINT <<"<A NAME=jump></A>";}
    //Output HTML
    ifstream ifPay;
    ifPay.open(dReg. m_szPayTemplate, ios::in|ios::nocreate);
    if (ifPay.fail()) return (eRRcantopenPayTemplate); //couldn't read pay template file
    // HTML Template
    while (ifPay)
        ifpay.getline(szFileLine, BUFFER_SZ);
        if (!(pszTag = strstr(szFileLine, DYNAMIC_TAG)))
            clWSINT <<szFileLine <<" ";
    else {
      nTagExist = TRUE;
      // Null the tag, Output the beginning of the line,
      //make the dynamic basket call, output the rest of the line
      if (strlen(szFileLine) == strlen(DYNAMIC_TAG))
        pszTag[0] = NULL;
      else {
        pszTag[0] = (char) NULL;
        pszTag += strlen(DYNAMIC_TAG) + 1;//was 9
      }
      clWSINT <<szFileLine;
      // Dynamic call
      pszRefererUrl = clWSINT.LookUp("Referer");
      if (!pszRefererUrl) return (eRRNoRefererUrl);
      pszExePath = clWSINT.LookUp("Executable Path");
      if (!pszExePath) return (eRRNoExePath);
      pszServerName = clWSINT.LookUp("Server Name");
      if (!pszServerName) return (eRRNoServerName);
      clWSINT <<"<FORM METHOD = POST ACTION = http";
      if (clReg.m_nUseSSL)
        clWSINT <<"s";
      clWSINT <<"://"<<pszServerName <<pszExePath <<
      /*clWSINT < "<FORM METHOD = POST ACTION ="<<pszExePath <<
"#jump>";*/
      // Setting Long Cookies
      clWSINT <<"<CENTER>If you wish to have billing and shipping defaults
set in your browser, check this box"
      "<INPUT TYPE = CHECKBOX
NAME=long_cookies></ CENTER> ";
      // Fill it in message
      if (nError){
        clWSINT <<"<A NAME=jump></A>";
        clWSINT <<"<CENTER><H4>You must fill in <I>all</I> of the
billing information except for <I> address line 2</I> and <I> email</I>.</H4></CENTER>";
      }
      //GsoNum
#ifdef _SC
      time(&tNow); //For multithreading, append instantiation number
      clWSINT <<"<TABLE ALIGN=RIGHT><TR><TH>Order
Number</TH><TD>"<<tNow
           "</TD></TR></TABLE><BR CLEAR=ALL> <INPUT
TYPE=HIDDEN NAME=b_gso_num VALUE ="<<tNow <<"> ";
#else
      //Pay page API: transaction type, GSO #, gso opaque
      pszGsoNum = dWSINT.LookUp("b_gso_num");
      if (pszGsoNum)
        clWSINT <<"<TABLE ALIGN=RIGHT><TR><TH>Order
Number</TH><TD>"<<pszGsoNum
           <<"</TD></TR></TABLE><BR CLEAR=ALL> <INPUT
TYPE=HIDDEN NAME=b_gso_num VALUE ="<<pszGsoNum <<"> ";
      else {
        time(&tNow); // For multithreading, append instantiation number
```

```
        clWSINT <<"<TABLE ALIGN=RIGHT><TR><TH>Order
Number</TH><TD>"<<tNow
        <<"</TD></TR></TABLE><BR CLEAR=ALL> <INPUT
TYPE=HIDDEN NAME=b_gso_num VALUE ="<<tNow <<"> ";
    }
    // Some pay page only specifics: transaction to execute, gso opaque
    pszTxn = clWSINT. LookUp("transaction");
    if (pszTxn)
        clWSINT <<"<INPUT TYPE=HIDDEN NAME=transaction VALUE =
"<<pszTxn <<"> ";
    pszGsoOpaque = clWSINT. LookUp("gso_opaque");
    if (pszGsoOpaque)
        clWSINT <<"<INPUT TYPE=HIDDEN NAME=gsoopaque VALUE =
[|]P'"<<pszGsoOpaque <<"[|]P'> ";
#endif
#ifdef _SC
    //Bill to information & Payment Instrument
    eStat = AcquireBillHtml(ClWSINT, clBkGso.GetTot(), *pProfile,
(EpCLCurrency) clReg.m_eDefaultCurrency);
#else
    // Pay Page alone requires a total
    pszTot = clWSINT.LookUp("total");
    if (!pszTot) return (eRRNoPayTotal);
    eStat = AcquireBillHtml(clWSINT, atoi(pszTot), *pProfile, (EPCLCurrency)
clReg.m_eDefaultCurrency);
    <<"<INPUT TYPE=HIDDEN NAME=total VALUE ="<<pszTot <<
"> ";
#endif
    if (eStat != eSuccess) return (eStat); //error from db? within
AcquireBillHtml
    clWSINT <<"<P> ";
    // Output Buttons on Form
    pszShopUrl = clWSINT.LookUp("shop_url");
    if (!pszShopUrl)
        PayButtonsHtml(clWSINT, pszRefererUrl, clReg);
    else
        PayButtonsHtml(clWSINT, pszShopUrl, clReg);
    //Registry Card LookUp
    clWSINT <<"<CENTER><TABLE CELLSPACING 5><TR><TH>Cards
Accepted:</TH>";
    RegOpenKeyEx(clReg.m_hStoreKey, "API[\]CDT", 0, KEY_READ,
&hCardsKey);
    dwlen = sizeof(int);
    RegQueryvalueEx(hCardsKey, "NoOfRows", 0, &dwtype,
(LPBYTE)&nNoCards, &dwlen);
    for (int i = 0; i < nNoCards; i++) {
        RegEnumKey(hCardsKey, i, szCardBuf, MAX_PATH + 1);
        RegOpenKeyEx(hcardsKey, szCardBuf, 0 KEY_READ,
&hCardKey);
        dwlen = MAX_PATH + 1;
        retCode = RegQueryvalueEx(hcardKey, "CardPicture", 0,
&dwtype, (LPBYTE)szCardPic, &dwlen);
        if (retCode !=ERROR_SUCCESS) return eRRRegistryFailure;
        clWSINT <<"<TD><IMG SRC ="<<szCardPic <<
        RegCloseKey(hCardKey);
    }
    RegCloseKey(hCardsKey);
    clWSINT <<"</TR></TABLE></CENTER>";
    clWSINT <<"</FORM> <HR> ";
#ifdef _SC
    // Output static HTML Table
    clBkGso.ToHtml(clWSINT, NOEDIT);
    //Output static Shipping information
    StaticShipHtml(clWSINT, *pProme); //Also NO_EDIT
    clWSINT <<"<HR> ";
#else
    //Pay page alone takes and passes through a gso
    if (pszGsoOpaque)
        clWSINT < pszGsoOpaque <<" ";
#endif
    // Rest of Line from template file
    if (pszTag)    clWSINT <<pszTag;
    }
  }
  if (nTagExist != TRUE)
    return(eRRNoDynamicTag);
  else
    return (eSuccess);
}
```

-continued

```
//////////////////////////
// Receipt Page
//////////////////////////////////////////////////////////////////
////////////////#ifdef __SC
//////////////////////////////////////////////////////////
// StaticShipHtml
// On Pay page, output Static table of shipping information
// based on cookies set in prior page
//////////////////////////////////////////////////////////
void StaticShipHtml(CWSINT& clWSINT, CProf clProfile)
   clWSINT <<"<CENTER><TABLE CELLSPACING=10><CAPTION ALIGN = TOP><B>Ship To<B></CAPTION> ";
   clWSINT <<"<TR><TH ALIGN=LEFT>Name</TH><TD>"<<clProfile.m__s__name <<
"</TD>"<<
      "<TH ALIGN=LEPT>Address Line 1</TH><TD>"<<clProfile.m__s__addrl <<
"</TD></TR> ";
   clWSINT <<"<TR><TH ALIGN=LEPT>Address Line 2</TH><TD>"<<clProfile.m__s__addr2
"</TD>"<<
      "<TH ALIGN=LEPT>City</TH><TD>"<<dProfile.m__s__city <<"</TD></TR> "
   clWSINT <<"<TR><TH ALIGN=LEFT>State/Province</TH><TD>"<<clProfile.m__s__state
<<"</TD>"<<
      "<TH ALIGN=LEFT>Zip/Postal Code</TH><TD>"<<clprofile.m__s__zip <<
"</TD></TR> ";
   clWSINT <<"<TR><TH ALIGN=LEFT>Country</TH><TD>"<<clProfile.m__s__country <<
"</TD>"<<
      "<TH ALIGN=LEET>Shipping Method</TH><TD>"<<clProfile.m__s__ship <<
"</TD></TR> ";
   clWSINT <<"</TABLE></CENTER><P>";
}
#endif
//////////////////////////////////////////////////////////
// StaticBillHtml
// On Receipt page, output static table of billing information
//////////////////////////////////////////////////////////
void StaticBillHtml(CWSINT& clWSINT, CProf clProfile) {
   /*<TH>payrnent Type</TH>  <TD>"<<clprofile.m__b__instrument
      <<"</TD>*/
   clWSINT <<"<CENTER><TABLE CELLSPACING= 10><CAPTION ALIGN = TOP><B>Bill
To<B></CAPTION> ";
   clWSINT <<"<TR ALIGN=LEFT><TH>Account Number</TH><TD COLSPAN=3>"<<
clProfile.m__b__card <<"</TD></TR> ";
   clWSINT <<"<TR ALIGN=LEFT><TH>Name on Card</TH><TD>"<<clProfile.m__b__name
<<
      "</TD><TD><B>Expires:</B><I>Month</I>"<<clProfile.m__b__expire__month <<
"<I>Year</I>"<<clProfile.m__b__expire__year <<"</TD></TR> ";
   clWSINT <<"<TR ALIGN=LEFT><TH>Address Line 1</TH><TD COLSPAN=3>"<<
clProfile.m__b__addrl <<"</TD></TR> ";
   clWSINT <<"<TR ALIGN=LEFT><TH>Address Line 2</TH><TD COLSPAN=3>"<<
clProfile.m__b__addr2 <<"</TD></TR> ";
   clWSINT <<"<TR ALIGN=LEFT><TH>City</TH><TD>"<<clprofile.m__b__city <<"</TD>
      < "<TH>State/Province</TH><TD>"<<clProfile.m__b__state <<"</TD></TR> ";
   clWSINT <<"<TR ALIGN=LEFT><TH>Country</TH><TD>"<<clProfile.m__b__country <<
      "</TD><TH>Zip/Postal Code</TH><TD>"<<dProfile.m__b__zip <<
"</TD></TR> ";
   clWSINT <<"<TR ALIGN=LEFT><TH>Email</TH><TD>"<<clProfile.m__b__email <<
"</TD>"
      <<"<TH>Phone</TH><TD>"<<dProfile.m__b__phone <<"</TD></TR> ";
   clWSINT <<"</TABLE></CENTER><P> ";
}
//////////////////////////////////////////////////////////
//vPOSReceipt
// Generates a receipt from the return block and profile info.
//////////////////////////////////////////////////////////
#ifdef vPOS__OLE
   #ifdef __SC
      void vPOSReceipt(CWSINT& clWSINT, /* CVPCLFinCCTrans */
CVPCL__OleCCAuthOnly *pTxn, CProf& clProfile, CRRReg& clReg, CPOLBk& clBkGso)
   #else
      void vPOSReceipt(CWSINT& dWSINT, /* CVPCLFinCCTrans */
CVPCL__OleCCAuthOnly *pTxn, CProf& clProfile, CRRReg& dReg)
   #endif
#else
   #ifdef __SC
      void vPOSReceipt(CWSINT& clWSINT, CVPCLFinCCTrans *pTxn, CProf&
clProfile, CRRReg& clReg, CPOLBk& dBkGso) {
   #else
      void vPOSReceipt(CWSINT& clWSINT, CVPCLFinCCTrans *pTxn, CProf&
clProfile, CRRReg& clReg) {
   #endif
```

-continued

```
#endif
  // Set Long cookies (if applicable)
  struct trn *tmNow;
  char szDate[32]; //what is the max date? in this format/ bug
  time_t tNow;
  time(&tNow);
  tNow += clReg.m_nProfileLife * 86400;//ini constant for length of cookie stay
  tmNow = localtime(&tNow);
  strftime(szDate, (size_t)31, "%a, %d-%b-%y %H:%M:%S GMT", tmNow);
  if (clWSINT.LookUp("long_cookies"))
      clWSINT <<"Set-Cookie: cust_profile="<<clProfile.GetCookieLine() <<";
expires="
      szDate <<"; path=/ "; //Profile cookies
#ifdef _SC // Shopping cart sets local cookies on receipt
      clWSINT <<"Set-Cookie: profile="<<clprofile.GetCookieLine() <<"; expires="
      szDate <<"; path=/ "; //Profile cookies
#endif
  /*clWSINT <<"; domain = "<<clWSINT.LookUp("Server Name") <<"; ";*/
#ifdef _SC
  // Delete shopping basket
  clBkGso.ToCookies(clWSINT, EXPIRE);
#endif
  clWSINT <<"Pragrna: no-cache ";
  clWSINT <<"Content-type: text/ html    ";
  clWSINT <<"<HTML><BODY"<<clReg.m_szBackgroundString <<"> ";
  clWSINT <<"<A NAME=jump></A> ";
  clWSINT <<"<CENTER><IMG SRC="<<clReg.m_szReceiptBanner <<"></CENTER> ";
  clWSINT <<"<CENTER><H2>This is your receipt. Please save it using the <I> Save
As</I> option frorn the <I> File Menu</I> in your browser</H2></CENTER>";
  //vPOS Return Block
  char szGso[PURCH_ORDER_NUM_SZ + 1];
  char szTransAmt[AMT_SZ + 1];
  char szDisplayTransAmt[FORMATTED_CURRENCY + 1]; //Extra point for decimal
  enum EPCLCurrency eCurr;// = (EPCLCurrency) clReg.m_eDefaultCurrency;
  enum EPCLDecimals eDec;// eTwoDecDigits;
  char szTime[TRANS_TIME_SZ + 1];
  char szPan[ACCT_NUM_SZ + 1];
  char szExpDate[EXP_DATE_SZ + 1];
  char szRetRefNum[RET_REF_NUM_SZ + 1];
  pTxn->GetRespTransAmt(szTransAmt, AMT_SZ + 1, &eCurr, &eDec);
  pTxn->GetPurchOrderNum(szGso, PURCH_ORDER_NUM_SZ + 1);
  pTxn->GetRespTransDate(szDate, TRANS_DATE_SZ + 1);
  pTxn->GetRespTransTime(szTime, TRANS_TIME_SZ + 1);
  pTxn->GetRetRefNum(szRetRefNum, RET_REF_NUM_SZ + 1);
  pTxn->GetPAN(szPan ACCT_NUM_SZ + 1);
  pTxn->GetExpDate(szExpDate, EXP_DATE_SZ+ 1);
  clWSINT <<"<CENTER><TABLE BORDER=0 CELLSPACING= 10><CAPTION><B>"<<
clReg.m_szShopName
      <<"- Order Number</B>-"<<szGso
      <<"</CAPTION>  <TR ALIGN=LEPT><TH>Time</TH><TD>"<<szTime[0]
      < sz_Time[1]<<":"<<szTime[2]<<szTime[3]<<":"<<&szTime[4]<<
"</TD><TH>Date</TH><TD>"
      <<szDate[0]<<szDate[1]< "/"<<szDate[2]<<szDate[3]<<"/"<<&szDate[4]
<<"</TD></TR>"
      <<"<TR ALIGN=LEFT><TH>Account Number</TH ><TD COLSPAN=3><B>"<<
szPan <<"</B></TD></TD>"
      <<"<TR ALIGN=LEFT><TH>Authorization Code</TH><TD>"<<"No Auth?"
      <<"</TD><TH>Reference Number</TH><TD>"<<szRetRefNum <<
"</TD></TR>"
      <<"</TABLE></CENTER>";
  CurrFormat(atoi(szTransAmt), eCurr, szDisplayTransAmt);
  clWSINT <<"<CENTER><FONT SIZE=5>Total ="<<szDisplayTransAmt <<
"</FONT></ CENTER><HR> ";
  //transtype, time, date, acct #, expire, vPOS id, transaction type, auth code, ref#,
amount
  // Soft goods fulfillment
  char *pszSoftUrl = clWSINT.LookUp("soft_url");
  if (pszSoftUrl)
      clWSINT <<pszSoftUrl <<"<HR>";
#ifdef _SC
  // Static Gso, placeholder crap until do LnGrp
  clBkGso.ToHtml(clWSINT, NOEDIT);
  clWSINT <<"<HR>";
  // Static Billing
  StaticBillHtml(clWSINT, dProfile);
  clWSINT <<"<HR>";
  // Static Shipping
  StaticShipHtml(clWSINT, clProfile);
  clWSINT <<"<HR>";
```

-continued

```
#else
  // Static passed gso if it exists
  char *pszGso = clWSINT.LookUp("gso_opaque");
  if (pszGso) clWSINT <<pszGso;
  // Static Billing
  StaticBillHtml(clWSINT, clProfile);
  clWSINT <<"<HR>";
#endif
  // Merchant Signature Block (if/ when applicable)
  // Buttons
  char *pszHomeUrl = dWSINT.LookUp("home_url");
  char *pszShoPUrl = dWSINT.LookUp("shop_url");
  clWSINT <<"<CENTER>  <A HREF ="<<pszShopUrl
    <<"><IMG SRC="<<clReg.m_szReturnShop <<"BORDER = 0></A> "
    <<"<A HREF ="<<pszHomeUrl <<"><IMG SRC="<<clReg.m_szHome <<"BORDER =
0><A>=n"
    <<"</CENTER><HR> ";
  //Acquirer Banner
  char szPANLo[ACCT_NUM_SZ + 1], szPANHi[ACCT_NUM_SZ + 1], szBuf[MAX_PATH + 1];
  char szTruncPAN[ACCT_NUM_SZ+ 1];
  HKEY hCardsKey, hCardKey;
  DWORD dwtype, dwlen;
  int nNoCards, nPANLen;
  long retCode;
  RegOpenKeyEx(clReg.m_hStoreKey, "API[\]CDT", 0 KEY_READ, &hCardsKey);
  dwlen = sizeof(int);
  RegQueryValueEx(hCardsKey, "NoOfRows", 0, &dwtype, (LPBYTE)&nNoCards, &dwlen);
  for (int i = 0; i < nNoCards; i++)
    RegEnumKey(hCardsKey, i, szBuf, MAX_PATH + 1);
    RegOpenKeyEx(hCardsKey, szBuf, 0 KEY_READ, &hCardKey);
    dwlen = ACCT_NUM_SZ+ 1;
    retCode = RegQueryvalueEx(hCardKey, "PANLo", 0, &dwtype, (LPBYTE)szPANLo,
&dwlen);
    if (retCode != ERROR_SUCCESS) return;
    dwlen = ACCT_NUM_SZ + 1;
    retCode = RegQueryValueEx(hCardKey, "PANHi", 0, &dwtype, (LPBYTE)szPANHi,
&dwlen);
    if (retCode != ERROR_SUCCESS) return;
    nPANLen = strlen(szPANLo);
    strncpy(szTruncPAN, szPan, nPANLen);
    szTruncPAN[nPANLen] = '[0]';
    if((atoi(szTruncpAN) >= atoi(sZPANLo)) && (atoi(szTruncPAN) <= atoi(SzPANHi)))
      char szAcquirer[MAK_PATH + 1], szAcquirerBanner[MAX_PATH + 1];
      szAcquirer[0] = NULL; szAcquirerBanner[0] = NULL;
      HKEY hAcquirersKey, hAcquirerKey;
      int nNoAcquirers = 0;
      dwlen = MAX_PATH + 1;
      RegQueryvalueEx(hcardKey, "Acquirer", 0, &dwtype,
(LPBYTE) szAcquirer, &dwlen);
      RegOpenKeyEx(clReg,m_hStoreKey, "API[\]ADT", 0, KEY_READ
&hAcquirersKey);
      dwlen = sizeof(int);
      retCode = RegQueryvalueEx(hAcquirersKey, "NoOfRows", 0, &dwtype,
(LPBYTE)&nNoAcquirers, &dwlen);
      for (int j = 0;j < nNoAcquirers;j+ ){
        retCode = RegEnumKey(hAcquirersKey, j, szBuf, MAX_PATH + 1);
// Get jth Acquirer subkey in szbuf
        if (retCode != ERROR_SUCCESS) break;
        if (!strcmp(szBuf, szAcquirer)) {
          RegOpenKeyEx(hAcquirersKey, szBuf, 0, KEY_READ,
&hAcquirerKey);
          dwlen = MAX_PATH + 1;
          retCode = RegQueryvalueEx(hAcquirerKey,
"AcquirerBanner", 0, &dwtype, (LPBYTE) szAcquirerBanner, &dwlen);
          if (retCode != ERROR_SUCCESS) break;
          clWSINT <<"<CENTER><IMG SRC="<<szAcquirerBanner
<<"></CENTER> ";
          RegCloseKey(hAcquirerKey);
          break;
        }
      }
      RegCloseKey(hAcquirersKey);
      break;
    }
    RegCloseKey(hCardKey);
  }
  RegCloseKey(hCardsKey);
  clWSINT <<"</HTML>";
}
```

-continued

```
///////////////////////////////////////////////////
// vPOSPay
// Create a PO object and invoke the vPOS
///////////////////////////////////////////////////
EStatus vPOSPay(CWSINT& dWSINT, CRRReg& clReg)
   EStatus eStat;
   EPCLTransType eTxn;
   char *pszTxn = clWSINT.LookUp("transaction");
   char szBuf[MAX_CGI_VAR + 1]; //used for cgi variable tstore and for number later
#ifdef _SC
   CPOLBk clBkGso; // GSO data structure
#else
   //Total for transaction
   char *pszTotal = clWSINTLookup("total");
   if (!pszTotal) return(eRRNoPayTotal);
#endif
   //Profile object
   CProf *pProfile;
   pProfile = new CProf();
   if (!pProfile) return (eRRNewFailed);
   eStat = pProfile->Init(clWSINT);
   if (eStat != eSuccess) return (eStat);
   // Check billing information
   if (!(pProfile->m_b_name[0] && pProfile->m_b_addr1[0] && pProfile->m_3b_city[0] &&
pProfile->m_b_state[0] &&
      pProfile->m_b_zip[0] && pProfile->m_b_country[0] && pProfile->m_b_phone[0]
&&
      pProfile->m_b_card[0] && pProfile->m_b_expire_month[0] && pProfile-
>m_b_expire_year[0])) {
      eStat = DisplayPayPage(ClWSINT, clReg, TRUE);
      return eStat;
   }
   // Payment transaction for a credit card
#ifdef vPOS_OLE
      CVPCL_OleCCAuthOnly *pTxn;
   #else
      CVPCLFinCCTrans *pTxn;
   #endif
   if (pszTxn) {
      eTxn = eNumTransTypes;
      if (!strcmp("authonly", pszTxn))
         eTxn = eTransAuthOnly;
/*    if (!strcmp("authcapture", pszTxn))
         eTxn = eTransAuthCapture;
      if (!strcmp("offlineauth", pszTxn))
         eTxn = eTransofflineAuth;*/
   }
   else
      eTxn = clReg.m_eDefaultAuthTrans;
   //Create Transaction object
   switch (eTxn) {
   case eTransAuthOnly:
      #ifdef vPOS_OLE
         pTxn = new CVPCL_OleCCAuthOnly();
      #else
         pTxn = new CVPCL_CCAuthOnly();
      #endif
      if (!pTxn) return eFailure; // Transaction Init Failure
   break;
   default:
      return eRRIllegalTransaction;
   }
   //Transaction Initialize
   char *pszMerchant = clWSINT.LookUp("store");
   sprintf(szBuf, "MerchName=");
   strncat(szBuf, pszMerchant, (MAX_CGI_VAR-10)); //The 10 is for MerchName=
   // Connect to the OLE Automation Server
#ifdef vPOS_OLE
   eStat = pTxn->CreateDispatch()
   if (eSuccess != eStat) {
      return eFailure;
#endif
   eStat = pTxn->InitTrans(szBuf);
   if (eStat != eSuccess) return eFailure; //eRRTxnInitFailed
   // GSO Number
   char* b_gso_num = clWSINT.LookUp("b_gso_num");
   if (!b_gso_num) return (eRRNoGsoNum);
   //Compose Gso object
   // CPOLPO clPO(&b_gso_num);
```

```
// Creates shopping basket from CGI/ Cookies. This information is borrowed by
//Line Group class. For each item in the basket, put it in the PO object. We use a
member function
//That others using the library cannot use because they may not have a basket object
at their disposal.
//Those others must use the Set methods directly
//Then get prices from database. If prices differ, error code
#ifdef __SC
   eStat = clBkGso.Init(clWSINT, *pProfile, clReg);
   if (eStat != eSuccess) return (eStat);
//    eStat = clPO.InitFromBk(clBkGso);
   if (eStat != eSuccess) return (eStat);
#endif
   // set all stuff from profile object
   // set custcookie
   // set cust id
   // set personal message
   //Pay Page standalone. Call an integrator function, execute vPOS stuff, call an ending
function.
   //The calls before and after are for the integrator to reconcile his database with the
vPOS.
   //GSO VERIFICATION suggestions
   // Check to see if this purchase order exists in the database & if it is linked properly
with this price
   //Insert GSO and line items into db with before vPOS Txn status
   //eStat = Gsovenfy(bgsonum, pszTotal); //For integrator to fill in.
   //if (eStat != eSuccess) return eStat; //Failed lookup check
#ifdef __SC
   int nTot;
/*    nTot = clBkGso.GetTot() * 100;
   if (((clBkGso.GetTot() * 100) - nTot) >= .5)
      ++nTot;
   sprintf(szBuf, "%.2f", nTot/ 100.0); //Transaction Amount, hack to get past 2 digits*/
   //erase szBuf below. Lose precision by flooring this integer need to define round
up/down
   sprintf(szBuf, "%d", (int)clBkGso. GetTot());
   pTxn->SetReqTransAmt(szBuf, (EpCLCurrency) clReg. m__eDefaultCurrency,
eTwoDecDigits);
#else
   //Amount
   NumClean(pszTotal);
   pTxn->SetReqTransAmt(pszTotal, (EPCLCurrency) clReg.m__eDefaultCurrency,
eTwoDecDigits);
#endif
   //GSO Num
   pTxn->SetPurchOrderNum(b__gso__num);
   // Retry Counter
   pTxn->SetRRPid(1); //The first time a transaction is executed this must be set to 1
   //AVS Data
   if (clReg.m__nAVS) {
      char avs__zip[ZIP#SZ + 1];
      strncpy(avs__zip, pProfile->m__b__zip, ZIP__SZ);
      avs__zip[ZIP__SZ] = NULL;
      NumClean(avs__zip);
      pTxn->SetAVSData(avs__zip);
   }
   pTxn->SetBName(pProfile->m__b__name);
   pTxn->SetBStreetAddress1(pProfile->m__b__addr1);
   pTxn->SetBStreetAddress2(pProfile->m b__addr2)
   pTxn->SetBCity(pProfile->m b__city);
   pTxn->SetBStateProvince(pProfile->m__b__state);
   pTxn->SetBZipPostaiCode(pProfile->m b__zip); //Insert as is zip into db
   pTxn->SetBCountry(pProfile->m b__country);
   pTxn->SetBEMail(pProfile->m b__email);
   pTxn->SetBDayTimePhone(pProfilee->m__b__phone);
   //Card Number and expiry date
   NumClean(pProfile->m__b__card);
   char szDate[DB__MONTH__SZ + DB__YEAR__SZ + 1];
   strncpy(szDate, pProfile->m__b__expire__month, DB__MONTH__SZ);
   szDate[DB__MONTH__SZ] = NULL;
   strncat(szDate, pProfile->m__b__expire__year, DB__YEAR__SZ);
   pTxn->SetPAN(pProfile->m__b__card);
   pTxn->SetExpDate(szDate);
   // Execute Transaction
   eStat = pTxn->ExecuteTrans();
   if (eStat != eSuccess) return eStat; //DB or Internai Error of some kind
   //Transaction Shutdown
   eStat = pTxn->ShutDownTrans();
   if (eStat != eSuccess) return eFailure; // eRRTxnShutFailed
```

-continued

```
// Gso after for integrator to fill in
//Gso reconcile(success or failure, gso_number);
//Delete cookies GSO. Set shipping|billing cookies. Send receipt - member function of
PO object.
#ifdef _SC
    vPoSReceipt(clWSINT, pTxn, *pProfile, clReg, clBkGso); //This should be PO object
#else
    vPOSReceipt(clWSINT, pTxn, *pProfile, clReg); //Use Get Methods for Receipt
#endif
#ifdef vPOS_OLE
    // Disconnect from the server
    pTxn->ReleaseDispatch();
#endif
    return (eSuccess);
```

Default Gateway Configuration

The vPOS is initially shipped enabled to connect to a default gateway with a single instance of a gateway defined that accesses a predefined site for testing of an installation before bringing it online in a production mode. The test installation contacts and converses with an actual gateway that simulates live transactions. After the installation checks out utilizing a set of test transactions, the test gateway downloads the pre-checked customizations to the installation so that it can switch over to the production acquirer. This download processing is enabled in extensions to SET.

Internet Transaction Gateway

Payment methods that issue cards for conducting business utilize four major entities. These entities are the issuer, consumer, merchant and the acquirer. The issuing bank that provides the consumer with a credit card are usually not the same bank as the acquiring bank that serves the merchant. When the consumer utilizes a credit card to pay for a purchase, the merchant swipes the card through the POS terminal which makes a connection to the merchant's acquirer via the telephone network and transmits an authorization request with data read from the magnetic stripe. The acquirer's host processor, depending on the card number, will either perform local processing or switch the request to the correct issuing bank's host processor through the interchange network. In a few seconds, the authorization response is returned to the originating POS indicating either an approval or a rejection.

The Internet is a viable infrastructure for electronic commerce. Ubiquitous browser software for the World Wide Web provides around-the-clock access to a large base of information content provided by Web servers. Utilizing a preferred embodiment, consumers using browsers can shop at virtual stores and malls presented as Web pages managed by the merchants' servers. Consumers can make purchases and pay for them using credit cards or other digital payment instruments in a secure manner. For such Internet-based payments to be authorized, a "gateway" is necessary at the back end to channel transactions to legacy processors and interchange networks.

Figure 21A:
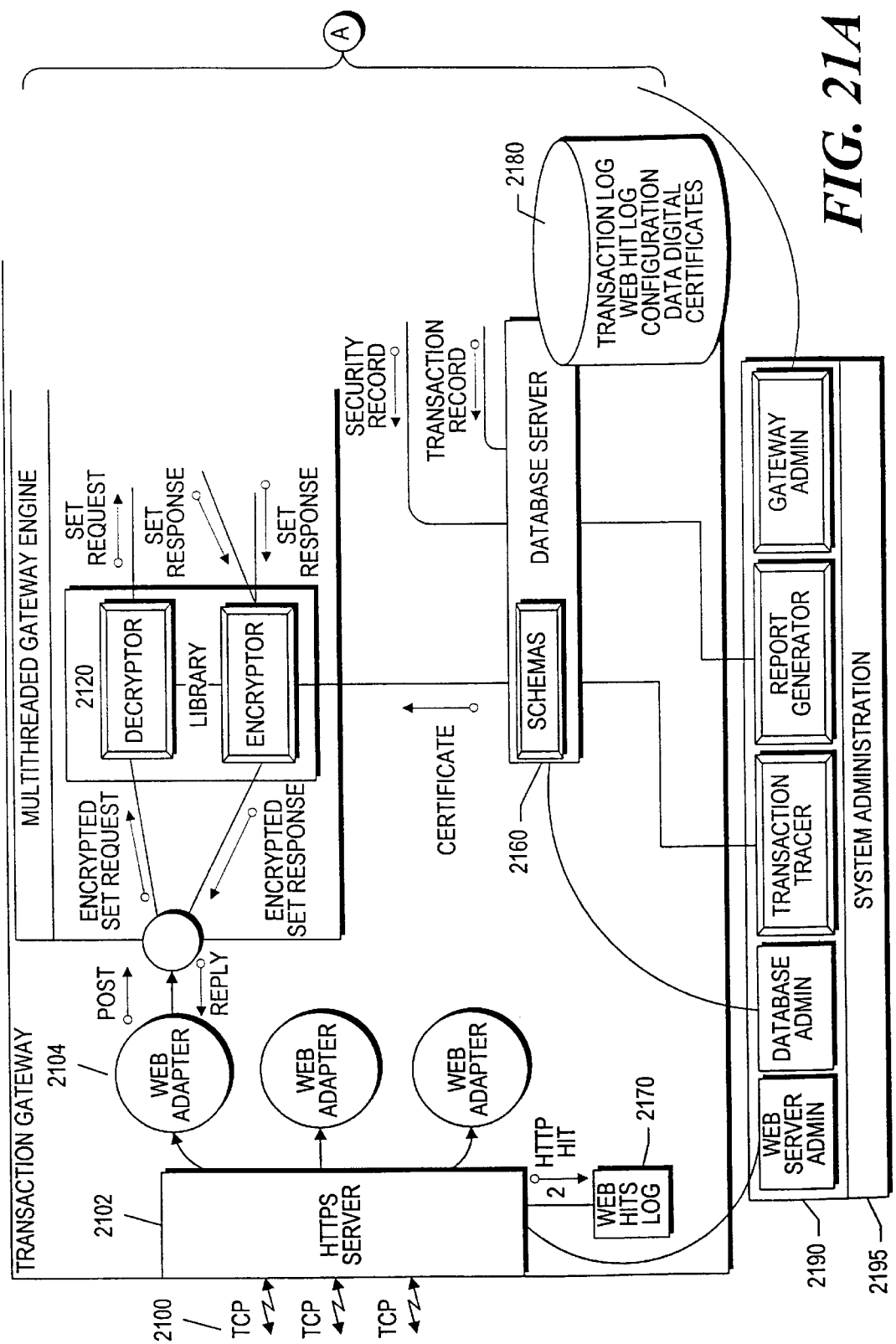
FIG. 21 is a detailed diagram of a multithreaded gateway engine in accordance with a preferred embodiment.
Figure 21B:
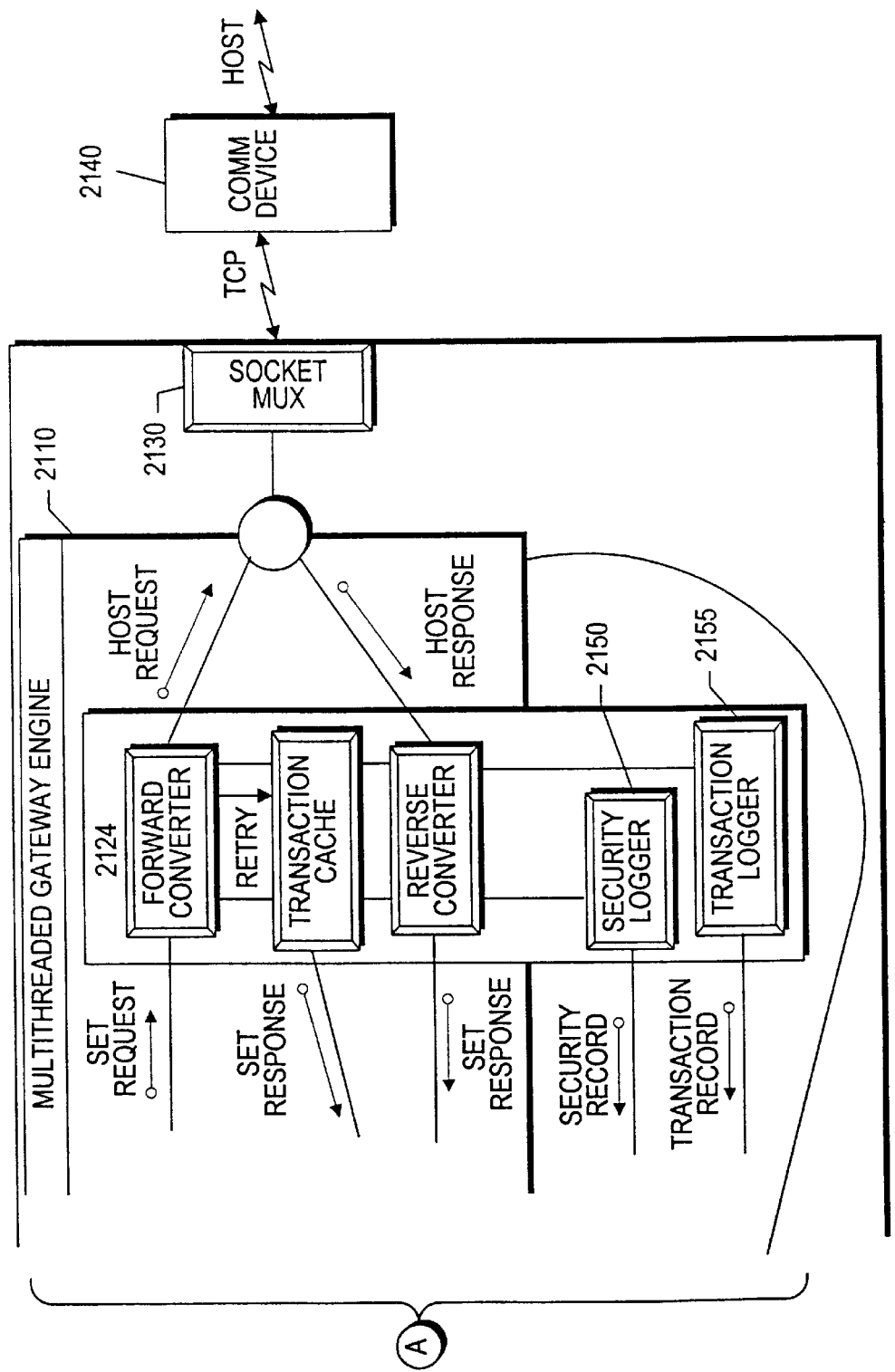

FIG. 21 is a detailed diagram of a multithreaded gateway engine in accordance with a preferred embodiment. Processing commences when a TCP transaction 2100 is received by a HTTPS Server 2102 and parsed to an appropriate Web Adaptor 2104 which posts an encrypted set transaction to the multithreaded gateway engine 2110. The encrypted SET request is received at a decryptor 2120, decrypted into a standard SET transaction and authenticated for converting by the forward converter 2124. Inside the forward converter 2124, decides if the request is an original request, and honest retry attempt or a replay attack. The converted transaction is passed to the socket multiplexor 2130 to communicate via an existing communication link 2140 to a host computer. A security logger 2150 is also utilized for passing security records back via a database server 2160 to a database administration application 2190. A transaction logger 2155 also utilizes the database server 2160 to capture transaction logs in a database 2180. Other system administration tasks 2195 include a web server administration task 2190 which logs web hits in a log 2170.

Figure 22:
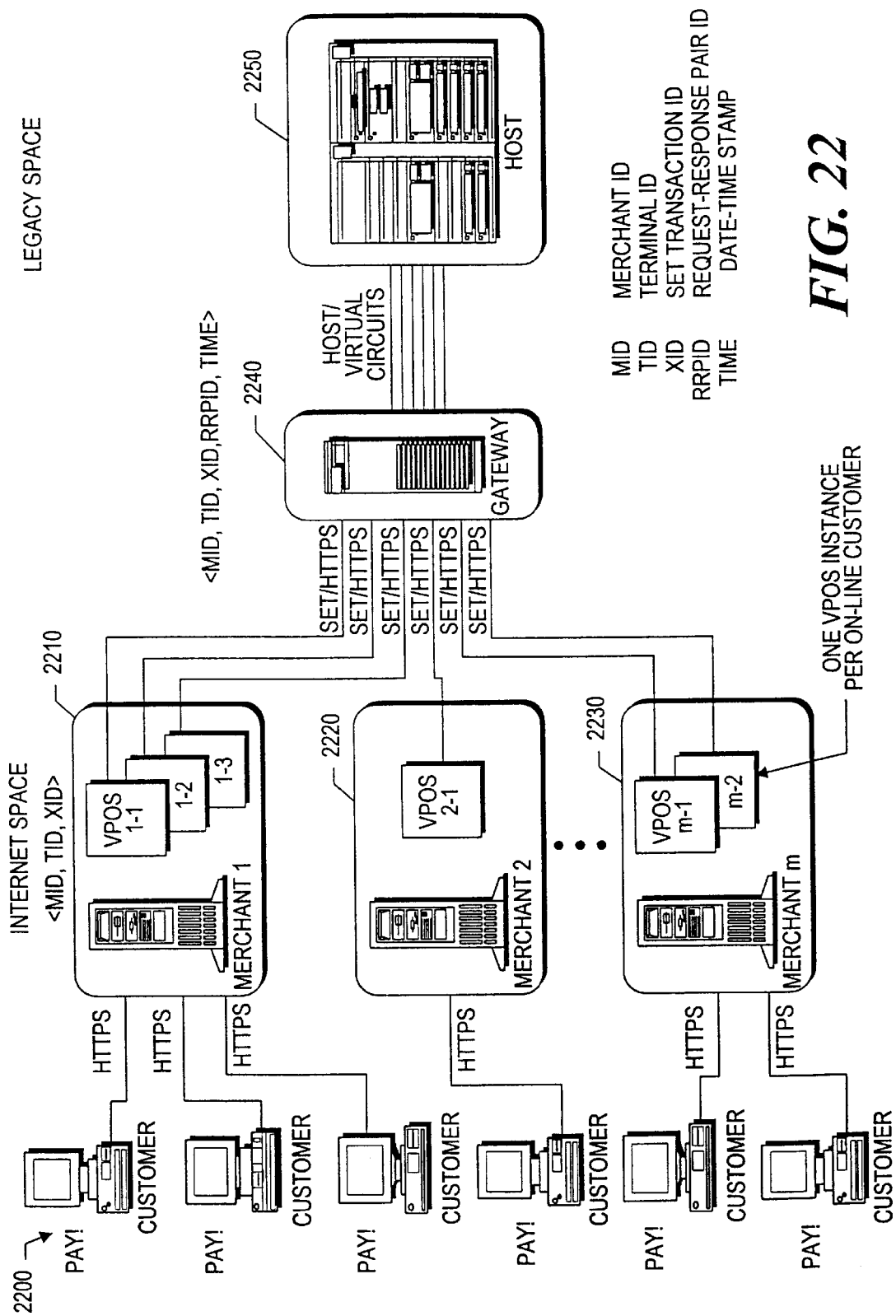
FIG. 22 is a flow diagram in accordance with a preferred embodiment.

FIG. 22 is a flow diagram in accordance with a preferred embodiment. Processing flows from customers 2200 that are paying for products over the Internet or other communication medium utilizing HTTPS or other protocols to one or more merchants 2210, 2220 or 2230 to a gateway 2240 which directs transactions to a particular host processor 2250 for authorization processing in accordance with the present invention.

Internet Payment Authorization

The Gateway is a secure computer system that mediates transactions between the merchants' servers and a payment processor. The Gateway supports secure communications between merchants using the Internet on one side, and a processor using standard secure financial networks on the other side. Between the two interfaces, the Gateway maintains a detailed log of all transactions, whether in-progress, completed, or failed. The Gateway accepts transactions from merchants and converts them into legacy compatible formats before forwarding them to the host processor. Responses from the host, after the reverse conversions, will be returned to the originating merchants.

Figure 23:
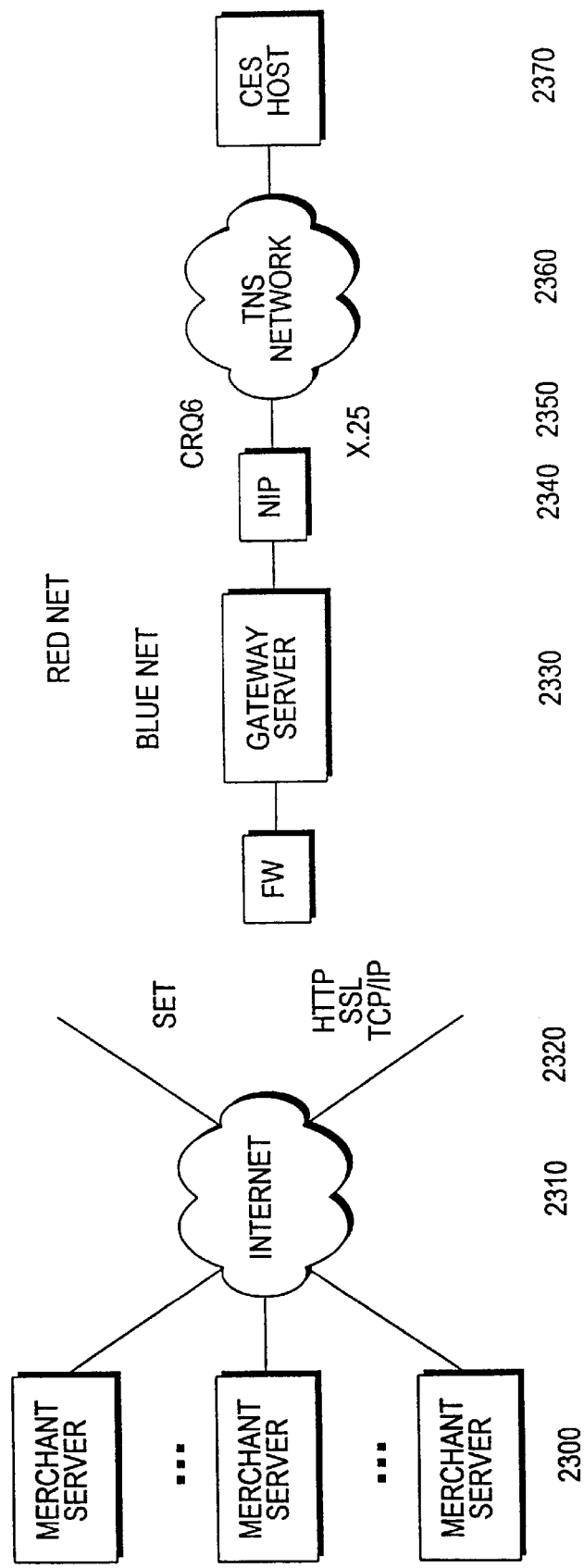
FIG. 23 illustrates a Gateway's role in a network in accordance with a preferred embodiment.

The Gateway performs many functions, including:
- Receives encrypted credit card transactions from the merchants via the Internet
- Unwraps and decrypts transactions
- Authenticates digital signatures of transactions based on certificates
- Supports all transaction types and card types
- Accepts concurrent transactions from each of the merchant servers
- Converts transaction data to legacy formats; forwards the mapped requests (in the clear) to a payment processor over existing communication links
- Converts transaction responses, correlates them with the original requests, and sends the mapped responses back to the merchants
- Provides logging, monitoring, reporting, and system administration FIG. 23 illustrates a Gateway's 2330 role in a network in accordance with a preferred embodiment. The Gateway 2330 strictly conforms to all SET stipulations regarding certificate management, PKCS signed data encapsulation, PKCS encrypted data encapsulation, ASN.1 representation, DER encoding, MIME encapsulation, and message sequencing. A merchant server 2300 communicates via the Internet 2310 using the SET protocol 2320 through a gateway server 2330 using a network interface processor 2340 to communicate to a legacy network 2360 in, for example the X.25 protocol 2350. The legacy host 2370 ultimately receives and processes the transaction from the merchant server 2300 without modification to its code.

Internet Communication Protocols

As discussed above, the TCP/IP protocol suite is utilized at the transport level. At the application level, in compliance with SET, all requests arrive at the Gateway in MIME encapsulated HTTP format. Similarly, all responses from the Gateway to the merchant servers will be transferred in HTTP. The HTTP protocol stipulates that a request-response pair will go through the same TCP connection and that the originator, in this case a merchant server, will establish a connection to send the request and will take down the connection when it has received the response.

Host Payment Protocols

Message conversions performed by the Gateway will be significantly more than format transliterations: per-protocol differences in data elements and message semantics must be considered carefully. Some of the transaction types that are supported are listed below.

---

Transaction Types

Credit card sale with capture
Credit card sale without capture
Credit card sale with capture including AVS (MasterCard and VISA)
Credit card sale without capture including AVS (MasterCard and VISA)
Credit card return (Credit)
Credit card post authorization (Force Post)
Credit card post authorization (Force Post) with partial reversal support, enhanced authorization data, and AVS rest code VISA)
Credit card sale with capture - Void
Credit card return (Credit) - Void
Totals request (for balancing)

---

Host Communications Protocols

A virtual, private network between the Gateway and the host processor is established to expedite host communication. In addition, two Network Interface Processors (NIP)s—a "near end" NIP that interfaces to the Gateway and a "far end" NIP that interfaces to the host. The NIPs will handle virtual connections between themselves. The far-end NIP will take care of specific communication details. The near-end NIP is an IP-addressable device that converts between TCP messages and packets. It is installed on a public network 2330, which is a LAN outside the corporate firewall. The Gateway, on the secure public network 2330, utilizes TCP/IP 2320 to communicate with the near-end NIP.

GATEWAY FEATURES

Because the Gateway must sustain reliable operations and enable graceful evolution, it is designed with some important attributes, including: Security, Availability, Performance, Scalability, and Manageability.

Security
Channel Security

At the application level, SET provides signed and encrypted data encapsulations of payment information portions of the transaction messages. Transport-level encryption of the entire message packet is required for additional security. The HTTPS protocol—i.e., HTTP over SSL 3.0—is utilized between the merchants and the Gateway. The virtual connections between the near-end NIP and the host are part of a private network. The termination will occur outside the firewall. Data between the Gateway and the host is sent in the clear with no encryption. In this network configuration, a transaction between a merchant's vPOS and the host will cross the firewall four times: SET request from vPOS to Gateway, legacy request from Gateway to NIP, LEGACY response from NIP back to Gateway, and SET response from Gateway back to vPOS.

Certificate Management
Payment Protocol Certificates

The Gateway uses certificates to authenticate the two parties involved in each MOSET transaction. Through a Certificate Authority, one certificate is issued for the Gateway and one certificate for each of the merchant servers.

Secure Channel Certificates

SSL will require separate certificates for the Gateway and the merchants.

Availability

Site redundancy and location redundancy allows the Gateway to sustain service through virtually instantaneous recovery from internal failures or external disasters that cause physical damages to the system. Minimum-outage recovery is possible with redundant configurations of important components.

Site Redundancy

The Gateway supports connections to a proprietary bank network and supports mirrored disk arrays.

Location Redundancy

The Gateway architecture supports location redundancy where a secondary remote system is connected to the primary system via dedicated WAN links for software-driven database duplication.

Scalability

The Gateway software architecture, the choice of third-party software components, and the selection of hardware platforms enable the system to gracefully adapt and evolve to take on new demands in different dimensions.

The Gateway resides on an HP 9000 that is housed in a standard 19" EIA rack.

Gateway Hardware Configuration

---

Server Hardware Description

K-Class SMP Server - Model K420 - Standard Configuration

120 MHz PA-RISC 7200 CPU
128 MB ECC RAM
Built-in I/O includes Fast/Wide/Differential SCSI-2, EtherTwist 802.3 LAN, AUI, RS-232C Connectors, Centronics Parallel Port, and Internal Modem
650 MB CD-ROM Drive
HP-UX 10.10 Operating System (with two-user license)
4 HP-PB Slots
Additions 1    SCSI-2 Disk Controller
     to support disk mirroring over dual SCSI-2 buses -continued Server Hardware Description

| | |
|---|---|
| 1 | 2 GB Internal SCSI-2 Disk Drive, 20MB/s transfer rate, not mirrored for systems software and swap space |
| 1 | 4 GB External High-Availability Disk Arrays for databases total of 4 × 2 MB modules required |
| 1 | 4 GB DAT drive with data compression |
| 1 | HP-PB Slot Expansion Option provides 4 additional HP-PB slots for peripheral controllers |
| 2 | FDDI interface cards (each card uses 2 HP-PB slots) |
| 1 | Option for eight-user license for HP-UX |

Cryptographic Hardware

Figure 24:
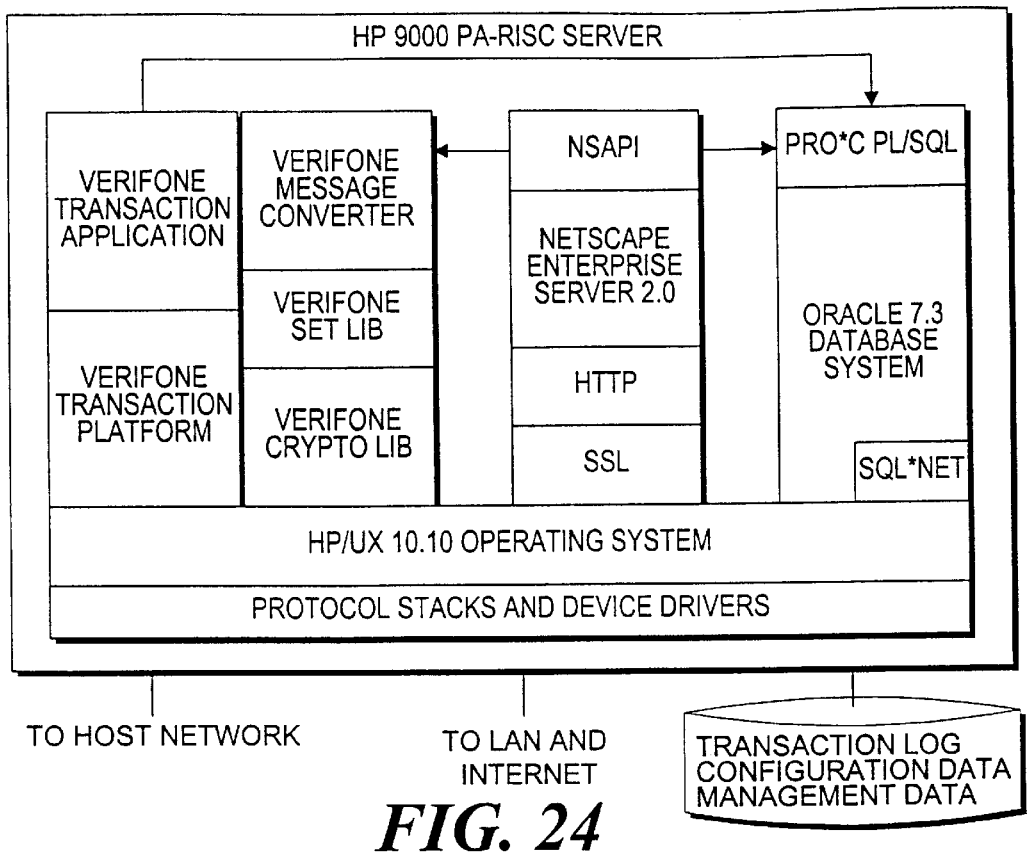
FIG. 24 is a block diagram of the Gateway in accordance with a preferred embodiment.

The encryption and decryption algorithms used in processing SET/SSL messages require significant computational power. A "security processor" is deployed with the Gateway to boost the performance of cryptographic algorithms. The processor is a networked peripheral device to the HP 9000 server. It provides cryptographic services suitable for SET/SSL processing, and its services are accessible via calls to software libraries running on HP-UX. FIG. 24 is a block diagram of the Gateway in accordance with a preferred embodiment.

Gateway Architecture

Operating System Software

The Gateway runs under the HP-UX Version 10.10 operating system and is upgraded to support future significant system releases. HP-UX 10.10 conforms to major standards, including:

X/Open UNIX 95 (conforming with the Single UNIX Specification, SPEC 1170)

X/Open Portability Guide Issue 4 Base Profile (XPG4) OSF AES

IEEE POSIX 1003.1 and 1003.2

AT&T System V Interface Definition (SVID3 base and kernel extensions subset) Level 1 API support UC Berkeley Software Distribution 4.3 (BSD 4.3) including such features as job control, fast file system, symbolic links, long file names, and the C shell System V.4 File System Directory Layout This compliance with various software standards assures that while a preferred embodiment of the invention is disclosed in association with a best mode of practicing the invention other similar software and hardware environments can be readily substituted without undue experimentation.

Relational Database Management System (RDBMS) Software

The Gateway uses Oracle7 Server version 7.3 as the RDMBS and will be upgraded to use future significant system releases. The multi-threaded, multi-server architecture of Oracle7 provides applications with scalability to high-volume transaction workloads. When deployed with the HP 9000 K-Class platform, Oracle7 performs a symmetrically parallel database operation across all available processors. In addition, Oracle7 includes options for creating high-availability systems:

The Oracle7 Parallel Server option extends the reliability of applications by transparently harnessing the power of clustered computers in a single logical processing complex that can tolerate individual machine failures.

Oracle7 Symmetric Replication provides high data availability. Data can be replicated from the primary system to one or more alternative sites.

HTTP Server

The Gateway utilizes Netscape's Enterprise Server 2.0 as the HTTP server. The server is designed for large-scale Internet commerce deployment, Enterprise Server 2.0 achieves performance and reliability with such features as optimized caching, SMP support, enhanced memory management, and SNMP-based performance monitoring. Efficient process management features minimize system load and increase server reliability. Security features are provided using the SSL 3.0 protocol.

Protocol Stacks

Internet and LAN—The TCP/IP protocol stack will be provided as part of the HP-UX operating system.

Other Application-Level Protocols

Application-level protocols enable client-server interoperability. Each of the following protocols are transported using TCP or UDP.

HTML. HTML will be used to define screens for Gateway system administration.

HTTP. The HTTP layer is part of Enterprise Server 2.0. The server is administered with a Web browser.

SQL*Net. The Gateway's Oracle7 database can be accessed by administration clients using SQL*Net. Administration software can establish database connectivity to retrieve data for generating transaction reports.

SNMP. Enterprise Server 2.0 can be monitored using SNMP. The Gateway utilizes SNMP for remote system management.

Transaction Performance Monitoring and Measurement

The "hits" performance indicators are available from the Web server. Statistics can be generated at any time to highlight the load pattern or to pinpoint the time when the server was most active.

Gateway statistics about transaction requests (by transaction type) and transaction results (e.g., success, failed due to host, failed due to authentication, etc.) can be determined at any time for a particular time interval by generating a report.

The Gateway is upgradeable to interoperate with a real-time event monitoring system such as OpenVision's Performance Manager.

Basic Request/Response Mappings

The following table shows the basic request/response mapping between the SET protocol and the LEGACY protocol.

| SET Request/Response Pair | LEGACY Request/Response Pair and Transaction Code |
|---|---|
| AuthReq, AuthRes | LEG/CTR (05) |
| AuthRevReq, AuthRevRes | LEG/ CTR (99) |
| CapReq, CapRes | LEG/CTR (42 or 44) |
| CapRevReq, CapRevRes | LEG/CTR (41) |
| CredReq, CredRes | LEG/CTR (40) |
| CredRevReq, CredRevRes | LEG/CTR (90) |
| BalReq, BalRes | CTA/CTL (48) |

Detailed Message Field Mappings

The following sections map the fields in LEGACY messages to fields in SET messages. The names of the SET fields are the names used in the SET ASN.1 specification. The full scope of the SET fields is listed in order to remove any ambiguity (but does not necessarily reflect actual naming conventions in source code).

LEGACY—Authorization Request Record (LEG)

| LEGACY - Authorization Request Record | Place in SET request to get LEGACY request data |
|---|---|
| (a) Host Processing Address | hard-coded at Gateway to "VERI" |
| (b) Record Type | hard-coded at Gateway to "LEG" |
| (c) Control | hard-coded at Gateway to "6" |
| (d) Originating Merchant Number | from Merchant Certificate in unwrapped SET request |
| (e) Sequence Number | generated at Gateway |
| (f) Original Sequence Number | generated at Gateway |
| (g) Date and Time of Original Transaction | |
| 05 - CC Authorization Request | AuthReq . AuthReqDate |
| 40 - CC Capture Credit | CredReq . CredDate |
| 41 - CC Capture Void | CapRevReq . CapRevDate |
| 42 - CC Capture Post (non AVS) | CapReq . CapDate |
| 44 - CC Capture Post (AVS) | CapReq . CapDate |
| 76 - CC Authorization Reversal | This transaction code will not be used. |
| (h) Device ID - part 1 | hard-coded at Gateway to binary zeros. |
| (i) Device ID - part 2 | The Terminal-id generated by Merchant System and delivered to the Gateway software as a result of decoding the SET request. |
| (j) Transaction Code | |
| 05 - CC Authorization Request | AuthReq received |
| 40 - CC Capture Credit | CredReq received |
| 41 - CC Capture Void | CapRevReq received |
| 42 - CC Capture Post) (non AVS) | CapReq received (if CapReq . RespData . AVSResult is blank) |
| 44 - CC Capture Post (AVS) | CapReq received (if CapReq . RespData . AVSResult is non-blank) |
| 76 - CC Authorization Reversal | This transaction code will not be used. |
| (k) Alphabetic Card Issuer Code | computed at Gateway from PAN |
| 05 - CC Authorization Request | AuthReq . PI . PANData . PAN |
| 40 - CC Capture Credit | CredReq . RespData . CapToken . TokenOpaque . PAN |
| 41 - CC Capture Void | CapRevReq . RespData . CapToken . TokenOpaque . PAN |
| 42 - CC Capture Post (non AVS) | CapReq . RespData . CapToken . TokenOpaque . PAN |
| 44 - CC Capture Post (AVS) | CapReq. RespData. CapToken . TokenOpaque . PAN |
| 76 - CC Authorization Reversal | This transaction code will not be used. |
| (l) Authorization Amount | |
| 05 - CC Authorization Request | AuthReq . AuthReqAmt |
| 40 - CC Capture Credit | CredReq . CredReqAmt (could be different than CapToken) |
| 41 - CC Capture Void | CapRevReq . CapRevAmt |
| 42 - CC Capture Post (non AVS) | CapReq . CapReqAmt |
| 44 - CC Capture Post (AVS) | CapReq . CapReqAmt |
| 76 - CC Authorization Reversal | This transaction code will not be used. |
| (m) Cash Back Amount | hard-coded to "00000000" (EBCDIC) |
| (n) Card or Driver's License Data | |
| 05 - CC Authorization Request Account Number Expiry Date | AuthReq . PI . PANData . PAN AuthReq . PI . PANData . CardExpiration |

-continued

| LEGACY - Authorization Request Record | Place in SET request to get LEGACY request data |
|---|---|
| 40 - CC Capture Credit Account Number Expiry Date | CredReq . RespData . CapToken . TokenOpaque . PI . PAN CredReq . RespData . CapToken . TokenOpaque . PI . CardExp |
| 41 - CC Capture Void Account Number Expiry Date | CapRevReq . RespData . CapToken . TokenOpaque . PI . PAN CapRevReq . RespData . CapToken . TokenOpaque . PI . CardExp |
| 42/44 - CC Capture Post (non AVS or AVS) Account Number Expiry Date | CapReq . RespData . CapToken . TokenOpaque . PI . PAN CapReq . RespData . CapToken . TokenOpaque . PI . CardExp |
| 76 - CC Authorization Reversal | This transaction code will not be used. |
| (o) Additional Data | |
| 05 - CC Authorization Request ZIP Code | AuthReq . AVSData . ZIPCode (if VISA Card) blank (if non VISA Card) |
| 40 - CC Capture Credit BANK Reference Number | CredReq . RespData . LogRefID |
| 41 - CC Capture Void BANK Reference Number | CapRevReq . RespData . LogRefID |
| 42 - CC Capture Post Authorization Code 44 - CC Capture Post AVS | CapReq . RespData . AuthCode |
| (p) CPS ACI Flag | CapReq . RespData . CapToken . TokenOpaque. |
| (q) CPS Transaction ID | CPSAciFlag CapReq . RespData . CapToken . TokenOpaque. |
| (r) CPS Validation Code | CPSTransId CapReq . RespData . CapToken . TokenOpaque. |
| (s) Visa Response Code | CPSValCode CapReq . RespData . CapToken . TokenOpaque. |
| (t) Merchant Category Code | VisaRespCode CapReq . RespData . CapToken . TokenOpaque. |
| (u) Entry Mode | MerchantCatCode |
| (v) Original Authorization Amount | CapReq . RespData . CapToken . TokenOpaque . EntryMode |
| (w) AVS Result Code | CapReq . RespData . CapToken . AuthAmt |
| (x) Authorization Code | CapReq . RespData . AVSResult CapReq . RespData . AuthCode |
| 76 - CC Authomzation Reversal | This transaction code will not be used. |

LEGACY—Authorization Request Response (CTR)

The field Settlement Date is returned by the host in a LEGACY Authorization Request Response (when a transaction is force posted).

This Settlement Date field contains the day that a posted transaction will be settled between the Merchant and the Acquiring Bank. Since a bank desires that this date be made available to the Merchant for the purposes of financial record keeping this field must be returned to vPOS.

| LEGACY Authorization Request Response | Place in SET response to put LEGACY data returned from host |
|---|---|
| (a) Host Processing Address | echoed by host, not included in SET response |
| (b) Record Type | echoed by host, not included in |

-continued

| LEGACY Authorization Request Response | Place in SET response to put LEGACY data returned from host |
|---|---|
| (c) Control | SET response echoed by host, not included in SET response |
| (d) Settlement Date | echoed by host |
| (e) Sequence Number | echoed by host, not included in SET response |
| (f) Original Sequence Number | echoed by host, not included in SET response |
| (g) Account Indicator | not included in SET response |
| (h) Device ID - part 1 | echoed by host, not included in SET response |
| (i) Device ID - part 2 | echoed by host, included in SET response in a location to be determined by the Payment Protocols Team. The value echoed is the terminal-id as delivered in the SET request. |
| (j) Action Code | The Action code returned in the LEGACY response will be combined with the Error Code (if present) and translated to a canonical list of error codes. See section 0 for exactly where this canonical error code will be returned for each transaction type. |
| (k) Transaction Code | echoed by host, not included in SET response |
| (l) Authorization Amount | |
| 05 - CC Authorization Request | AuthResPayload . AuthAmt (if SalesInd = False) SaleResPayload . CapAmt (if SalesInd = True) |
| 40 - CC Capture Credit | CredRes . CredResSeq . CredResItem . CredActualAmt |
| 41 - CC Capture Void | CapRevRes . CapRevSeq . CapRevResItem . CaptureAmt |
| 42 - CC Capture Post (non AVS) | CapRes . CapRevSeq . CapResItem . CapResultPayload . CapAmt |
| 44 - CC Capture Post (AVS) | CapRes . CapRevSeq . CapResItem . CapResultPayload . CapAmt |
| 76 - CC Authorization Reversal | This transaction code will not be used. |
| (m) Authorization Code | |
| 05 - CC Authorization Request | AuthResorSale . RespData . AuthCode (if SalesInd = False) AuthResorSale . RespData . AuthCode (if SalesInd = True) |
| (n) AVS Result Code | AuthResorSale . RespData . AVSResult |
| (o) Reference Number AVS Result Data only received if transcode = 05 and VISA and approved but not captured | AuthResorSale . RespData . LOGRefId |
| (p) CPS ACI Flag | AuthResorSale . RespData . CapToken . TokenOpaque . CPSAciFlag |
| (q) CPS Transaction Id | AuthResorSale . RespData . CapToken . TokenOpaque . CPSTransId |
| (r) CPS Validation Code | AuthResorSale . RespData . CapToken . TokenOpaque . CPSValCode |
| (s) Visa Response Code | AuthResorSale . RespData . CapToken . TokenOpaque . VisaRespCode |
| (t) Merchant Category Code | AuthResorSale. RespData. CapToken. TokenOpaque. MerchantCatCode |
| (u) Entry Mode | AuthResorSale. RespData. CapToken. TokenOpaque. EntryMode |

Error Code Location in SET Response Messages

The following table shows the explicit SET field in which the canonical error code will be returned in SET response messages.

| SET Response Message | Location of Canonical Error Code |
|---|---|
| AuthRes | AuthResorSale . RespData . RespCode (if SalesInd = False) AuthResorSale . RespData . RespCode (if SalesInd = True) |
| AuthRevRes | AuthRev will not be supported by the Gateway |
| CapRes | CapRes . CapResSeq . CapResItem . CapCode |
| CapRevRes | CapRevRes . CapRevResSeq . DraftCaptureStatus |
| CredRes | CredRes . CredResSeq . CredResItem . CredCode |
| CredRevRes | CredRev will not be supported by the Gateway |
| BalRes | CapRes . CapResSeq . CapResItem . CapCode |

Error Code Values in SET Response Messages

The following table itemizes the proposed mapping of LEGACY specific action codes and error code pairs to the canonical error codes that will be sent in the SET response messages. The canonical error response code values and descriptions were taken directly from "ISO 8583: 1987 section 4.3.8 Table 7".

VeriFone Proprietary SET Extensions

The SET protocol currently has no provisions to support "Balance Inquiry" requests. Balance Inquiry requests are used by the Merchant to query its Acquiring Bank as to various totals for the current days or past days transaction totals.

The following two sections detail a proposed mapping between the LEGACY protocol and two new VeriFone proprietary SET extensions: BalInq (Balance Inquiry) and BalRes (Balance Response). The BalInq request is used by vPOS to query the Gateway as to the transaction totals and BalRes is the response sent by the Gateway to vPOS.

LEGACY—Administrative Inquiry Record (CTA)

| LEGACY - Administrative Inquiry Record | Place in SET request to get LEGACY request data |
|---|---|
| (a) Host Processing Address | name-value pair |
| (b) Record Type | name-value pair |
| (c) Control | name-value pair |
| (d) Merchant Number | name-value pair |
| (e) Device ID - part 1 | name-value pair |
| (f) Device ID - part 2 | name-value pair |
| (g) Date and Time of Inquiry | name-value pair |
| (h) Sequence Number | name-value pair |
| (i) Transaction Code | name-value pair |
| (j) Feedback Level | name-value pair |
| 10 - Totals online and offline for the Merchant | |
| 20 - Totals online and offline for the Chain | |
| (k) Feedback Day | name-value pair |
| 0 - Today | |
| 1 - Yesterday | |
| 2 - Two Days Back | |
| 3 - Three Days Back | |
| (l) Feedback Type | name-value pair |
| 00 - All combined Visa and MasterCard Sales | |
| 10 - MasterCard Net Totals | |
| 20 - Visa Net Totals | |
| 40 - Discover Totals | |
| 50 - Amex Totals | |
| (m) Feedback ID | name-value pair |
| Level 10: 7 Digit Merchant | |
| Level 20: 5 Digit Chain | |

LEGACY—Administrative Response Record (CTL)

| LEGACY - Administrative Response Record | Place in SET response to put LEGACY data returned from host |
|---|---|
| (a) Host Processing Address | name-value pair |
| (b) Record Type | name-value pair |
| (c) Control | name-value pair |
| (d) Settlement Date | name-value pair |
| LEGACY - Administrative Response Record | Place in SET response to put LEGACY data returned from host |
| (e) Sequence Number | name-value pair |
| (f) Device ID - part 1 | name-value pair |
| (g) Device ID - part 2 | name-value pair |
| (h) Action Code (O, D or E) | name-value pair |
| (i) Transaction Code | name-value pair |
| Additional Data | name-value pair |
| (j) Error Code | |
| (k) Total Item Count | |
| (l) Total Sales Amount (Credit Card) | |
| (m) Totals Sales Item Count | |
| (n) Total Credits Amount (Credit Card) | |
| (o) Total Credits Item Count (Credit Card) | |

Gateway Analysis for SET Message Handling

This section tackles general design considerations of the Gateway software and is not limited to LEGACY (unless specifically mentioned). The complete functional behavior of the Gateway will be described in a separate document.

Replay Attack Handling

A replay attack at the Gateway is a request where either:
  a) the request is stale; the request was received "too late" with respect to the reqdate in the request. This window is specified by a configurable Gateway policy.
  b) the request is not stale but the exact rrpid (Request/Response Pair Id) has already been seen before in a request and still logged in the Gateway database. The <xid, mid, rrpid> tuple will be the primary key that determine whether a request had already been received. This will allow the possibility of the same rrpid to be generated from the same merchant but for a xid and also allow the same rrpid to be generated by a totally different merchant.

New Attempt vs. Retry Attempt

It is possible that messages sent between the vPOS and Gateway may be lost in transit. This could happen either because of hardware/software problems in the Internet or for hardware/software reasons local to the Gateway or Merchant System.

The question is then "How does a Gateway recognize an honest retry attempt from an initiator?" First a little background into the nature of a SET request. All SET requests have the following fields:

| | |
|---|---|
| xid | merchant's transaction id |
| mid | merchant id (contained in certificate) |
| tid | terminal id (from Merchant System) |
| rrpid | request response pair id |
| reqdate | request date (from Merchant System) |
| reqdata | request specific data |

Let the following tuple represent a generic SET request:
<xid, mid, tid, rrpid, reqdate, reqdata>

The merchant establishes the xid during the shopping phase with the consumer. The same xid is used for both the AuthReq and the CapReq and subsequent CreditReq requests. Using the same xid for many requests makes it impossible for the Gateway to distinguish between repeated transactions vs. new transactions.

For example, how could a Gateway possibly determine whether two valid CredReq requests were to be interpreted as two individual credits or a retry of a single request.

request 1: $<xid_1, mid_m, tid_t, rrpid_1, reqdate_1, reqdata_1>$
  (perhaps a CredReq for $10.00)
request 2: $<xid_1, mid_m, tid_t, rrpid_2, reqdate_2, reqdata_1>$
  (perhaps a new CredReq for $10.00)
could also be interpreted as . . .
request 1: $<xid_1, mid_m, tid_t, rrpid_1, reqdate_1, reqdata_1>$
  (perhaps a CredReq for $10.00)
request 2: $<xid_1, mid_m, tid_t, rrpid_2, reqdate_2, reqdata_1>$
  (perhaps a retry of above)

The reqdates are different in both cases because the date is generated along with the rrpid to thwart replay attacks. In this example the Gateway will not be able to determine whether the second CreditReq should be performed or whether it is simply a retry to request 1 with $rrpid_1$. The Gateway must know whether or not to apply a new credit or to deliver a response that it may already have from the host (it may have came too late for the first attempt or have been lost on the way to vPOS). If no response was logged from the host for request 1, the Gateway could repeat its original request to the host when receiving request 2. In a sense, the Gateway will act as an intelligent request/response cache.

The Gateway splits the rrpid number space into two parts. One main part that will remain the same for the same request across all its retry attempts and a smaller portion to indicate the number of retry attempts. Then, rrpidRetryCount=rrpid MOD MAXRETRIES (0 for initial request, >0 for a retry)

NOTE: The initial rrpids generated by vPOS software are equal to 0 MOD MAXRETRIES and in subsequent retries the lower order digits are incremented by one for each retry attempt. This requires extra stored in the vPOS application. The vPOS software must persistently store the rrpid used (which contains the retry count of the transaction) so that repeated attempts will follow the correct semantics.

In general the Gateway will support the following logic [assuming the second request is fresh and not a replay attack]:

If two requests,
  request 1:$<xid_1, mid_m, tid_t, rrpid_1, reqdate_1, reqdata_1>$
  request 2: $<xid_1, mid_m, tid_t, rrpid_2, reqdate_2, reqdata_1>$
are received at $t_1$ and $t_2$ (where $t_2 > t_1$) and,
  $(rrpid_1 - (rrpid_1 \text{ MOD MAXRETRIES})) = (rrpid_2 - (rrpid_2 \text{ MOD MAXRETRIES}))$
then the Gateway will interpret the second request as a retry request.

But if,
  $(rrpid_1 - (rrpid_1 \text{ MOD } 100)) \neq (rrpid_2 - (rrpid_2 \text{ MOD MAXRETRIES}))$ then the Gateway will interpret the second request as a new request.

In addition to being able to distinguish between a retry and a new request, the proposed rrpid scheme can be used to determine how many vPOS requests got lost in the Internet. This is a useful value-added service for system management.

Robustness and Error Handling Issues

There are several robustness issues that need to addressed. The basic flow is that vPOS sends a request to the Gateway, the Gateway logs the SET key fields from the incoming attempt in the database. The Gateway then generates a host request which it logs completely in the database. The host handles the request and generates a response that is directed towards the Gateway which, when received is logged completely in the Gateway database. Finally the Gateway generates an SET response to vPOS, the contents of which is not logged in the database.

If the Gateway has not received the request or receives the request but is not able to log the request in the database it is easily handled by a vPOS retry attempt. This recovery action needs no further discussion. In general, if the vPOS does not receive a reply to a request it has sent to the Gateway it must retry persistently until a response is received. All retry attempts from vPOS for the same request must have the same base portion of the rrpid but a different value in the retry counter.

The Gateway must handle replay attacks as outlined previously in this document. If the Gateway receives a request that it has already received from vPOS there could be several possible dispositions:

a) the request had already been handled completely with the host and a host response is in the Gateway database. In this case the Gateway can simply translate the host response to a SET response and send it to vPOS.
 b) the request had been sent to the host before (as determined by a database field) but a response from the host is not on file. In this case the Gateway must retry the host request.

If the vPOS times-out for any reason, it must retry later using an rrpid that indicates a retry attempt. If the Gateway receives a late-response (after vPOS has given up) it simply logs it in the database for that retry attempt (if no retry attempt for the transaction is still outstanding at the host). There is a glare situation where the original response could arrive so late that it could be confused with the response from a currently outstanding retry attempt with the host. This situation is logged and the first response not sent back to vPOS.

A response from the host indicating a successful transaction may get lost on the way back to the Gateway or not be able to be logged in persistent storage in the Gateway. In either case vPOS is in a situation where the retry request when received by the host may result in a response from the host indicating that the request is a duplicate. The vPOS software must be able to handle this. In the LEGACY case when a duplicate post is received by the host the second one automatically causes the first one to void and the second transaction fails too. In this case vPOS should retry the transaction under a new rrpid. If the transaction goes through end-to-end all effects of the previous transactions will not matter.

TokenOpaque Contents

The Gateway requires information captured at the time of an AuthReq that must be repeated to the host at the time of the associated CapReq. The mechanism of choice (built into SET) for this is enabled utilizing this data in the TokenOpaque token of the CapToken which is sent in an AuthRes. This CapToken is stored at the Merchant system and represented to the Gateway at the time of the CapReq. The format of an TokenOpaque is an OctetString. The following general format (not specific to LEGACY) is proposed for capturing this information:

| Field Name | Field Data Type | Explanation/Example |
|---|---|---|
| VersionName | char(8) | e.g. "LEGACY" |
| VersionRevision | char(8) | e.g. "1.0" (generally <major, minor>) |
| PILength | integer | length of PI data |
| PI | unsigned char (PILength) | strongly encrypted |
| HostSpecDataLength | integer | length of host specific data |
| HostSpecData | unsigned char(HostSpecData Length) | host specific data |

Host Specific Data (LEGACY-only)

For "LEGACY" version "1.0", it is proposed that newline seperated "name[length]=value" pairs be used to store the host specific data. A null character will terminate the host specific data. The following host specific data (name value pairs) will need to be included:

BrandID
 CPSACIFlag
 CPSTransactionId
 CPSValidationCode
 VisaResponseCode
 MerchantCategoryCode
 EntryMode
NOTE: PI Contains PAN and ExpiryDate.
Proposal for AVS Data Encoding The "Address Verification" data element for the "Address Verification Service" (AVS) is defined in SET as an IA5String. Each host may require different data to be sent to use the AVS feature. The Gateway will need to be able to extract the information from this to inter-work with the legacy systems. A well-defined format for this data is required, an IA5String blob is insufficient.

The following data structure is utilized to deliver the AVS data.\
 StreetAddress1=800 El Camino Real\n
 StreetAddress2=Suite 400\n
 City=Menlo Park\n
 StateProvince=CA\n
 Country=USA \n
 PostOfficeBox=\n
 ZipPostalCode=94025\n
 \n
 An empty line indicates the end of AVSData.

The detailed information that is available for the Address Verification Service depends on the Payment Window that captures the data from the consumer.
AVS Data (LEGACY-only)

For "LEGACY" version "1.0" only the ZipPostalCode name value pair is required. The Gateway will only use the first 5 characters of this value.

Transaction Replay Attacks

The processing of Internet-based payment transactions is a coordinated interaction between the Internet Transaction Gateway and the vPOS servers that is based on the following principles. A vPOS terminal, as the initiator of the payment transaction, is responsible for the round-trip logical closure of the transaction. vPOS will retry a transaction that has been initiated with the Gateway but where the response for the request was never received from the Gateway. A vPOS terminal selects—out of a pre-assigned range—aTerminal-Id that is to be used by the Gateway in a request to the host processor. This data element must be transported from the vPOS to the Gateway along with the payment-related information. The Terminal-Ids must be unique among the concurrent vPOS instances on a vPOS server system. However, the TerminaL-Ids have no history. For example, a subsequent Force Post transaction need not use the same Terminal-Id as the original Authorization transaction. The vPOS will be responsible for making sure that only one request is outstanding for the same <Merchant-id, Terminal-id> data elements from a vPOS server system. The Gateway does not know that a response was successfully received by vPOS. This means that the vPOS must be responsible for initiating any retry attempts. The Gateway never initiates a retry attempt with the host processor without an explicit retry request from vPOS. The Gateway when asked to retry a request with the host, performs a relational database look-up and delivers a response that has already been received from the host processor but was previously missed by vPOS. This behavior of the Gateway is also known as the "transaction response cache." The Gateway will need to know that a vPOS request is a retry of something already sent. The prior request may or may not have been received. A solution for determining the difference between a retry attempt and a new request was described earlier in this document. vPOS must understand the "canonical" error codes that it will receive via the Gateway and be able to initiate the proper recovery action and/or generate the appropriate user-interface dialog.

Certificate Processing

Merchants require a mechanism for verifying legitimate cardholders is of valid, branded bankcard account numbers. A preferred embodiment utilizes technology to link a cardholder to a specific bankcard account number and reduce the incidence of fraud and thereby the overall cost of payment processing. Processing includes a mechanism that allows cardholder confirmation that a merchant has a relationship with a financial institution allowing it to accept bankcard payments. Cardholders must also be provided with a way to identify merchants they can securely conduct electronic commerce. Merchant authentication is ensured by the use of digital signatures and merchant certificates.

In a preferred embodiment, a holder of a payment instrument (cardholder) surfs the web (Internet) for required items. This is typically accomplished by using a browser to view on-line catalog information on the merchant's World Wide Web page. However, order numbers can be selected from paper catalogs or a CD-ROM and entered manually into the system. This method allows a cardholder to select the items to be purchased either automatically or manually. Then, the cardholder is presented with an order form containing the list of items, their prices, and totals. The totals could include shipping, handling and taxes for example. The order form is delivered electronically from the merchant's server or created on the cardholder's computer by electronic shopping software. An alternative embodiment supports a negotiation for goods by presenting frequent shopper identification and information about a competitor's prices.

Once the price of goods sold and the means of payment has been selected, the merchant submits a completed order and the means for payment. The order and payment instructions are digitally signed by cardholders who possess certificates. The merchant then requests payment authorization from the cardholder's financial institution. Then, the merchant sends confirmation of the order, and eventually ships the goods or performs the requested services from the order. The merchant also requests payment from the cardholder's financial institution.

Figure 1C:
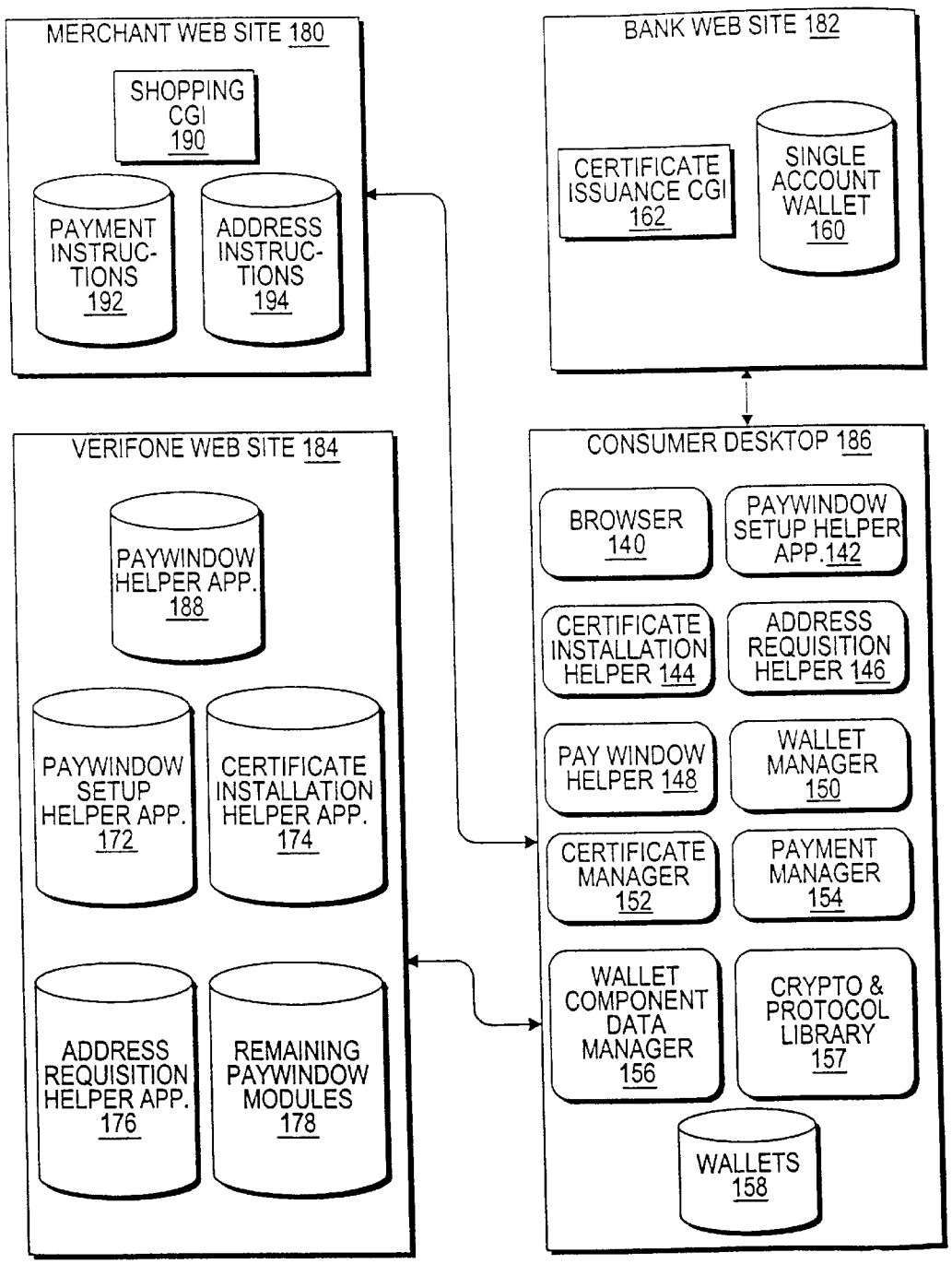
FIG. 1C is a block diagram of the system in accordance with a preferred embodiment.

FIG. 1C is a block diagram of a payment processing system in accordance with a preferred embodiment. The Certificate Issuance at the Bank Web Site 162 resides at the bank web site 182. It is utilized for issuing SET complaint /X.500 certificates to consumers. The implementation of this system may vary from one bank to another. However, the system gathers consumer's personal information, and after processing the information, the system issues a certificate along with a payment instrument to the consumer.

The Single Account Wallet 160 at the bank web site 182 represents the MIME message that is created by the Certificate Issuance system. This MIME message contains a VeriFone wallet. The VeriFone wallet contains a single payment instrument and the certificate associated with it. For security reasons, the private key is not included in the wallet. The has to specify a private key before using the instrument for payment. When the consumer is issued the certificate, this MIME message is sent to the browser. The browser launches the Certificate Installation application 174, 144 which is defined as a helper application in the browser. The Certificate Installation application 174, 144 reads the MIME message and install the wallet into the wallet database 158.

Various helper applications 198, 172, 174, 176 are provided to make the consumer's shopping experience easy and efficient including the following helper applications. The Paywindow helper application 188 is utilized by the consumer to authorize the payment to the merchant, to administer their wallets, to review their previously completed payment transactions and to perform housekeeping activities on the wallets. This application is defined as a 'helper' application on the consumer's desktop. The browser launches this application when the merchant system sends a MIME message requesting payment.

The PayWindow Setup Helper application 172 is used by the consumer to install helper applications and other modules from the web site onto the consumer desktop. When a consumer attempts to install an application for a first time, the consumer does not have a helper application on the desktop. Thus, the first time installation of an application requires a consumer to perform two steps. First the user must download the system package to their desktop and then the user must run setup to decompress and install the system. Thereafter, whenever the consumer gets a new release of system software, the browser launches this helper application which in turn installs the appropriate other system modules.

The Certificate Installation Helper Application 174 is utilized to install a wallet that is issued by a bank. When the bank's certificate issuance web system sends the MIME message containing the VeriFone wallet, the browser launches this application. This application queries a consumer to determine if the payment instrument contained in the wallet is to be copied to an existing wallet or to be kept in the new wallet. This application then installs the payment instrument and the certificate into the wallet database 158.

The Certificate Issuance CGI scripts 162 and the Single Account Wallet 160 at the Bank Web Site 182 is processed as described in the native system. The Certificate Installation Applet of the Bank Web Site 182 is utilized by the Certificate Issuance CGI scripts 162 system to deliver a consumer's certificate to the consumer's desktop.

Figure 26:
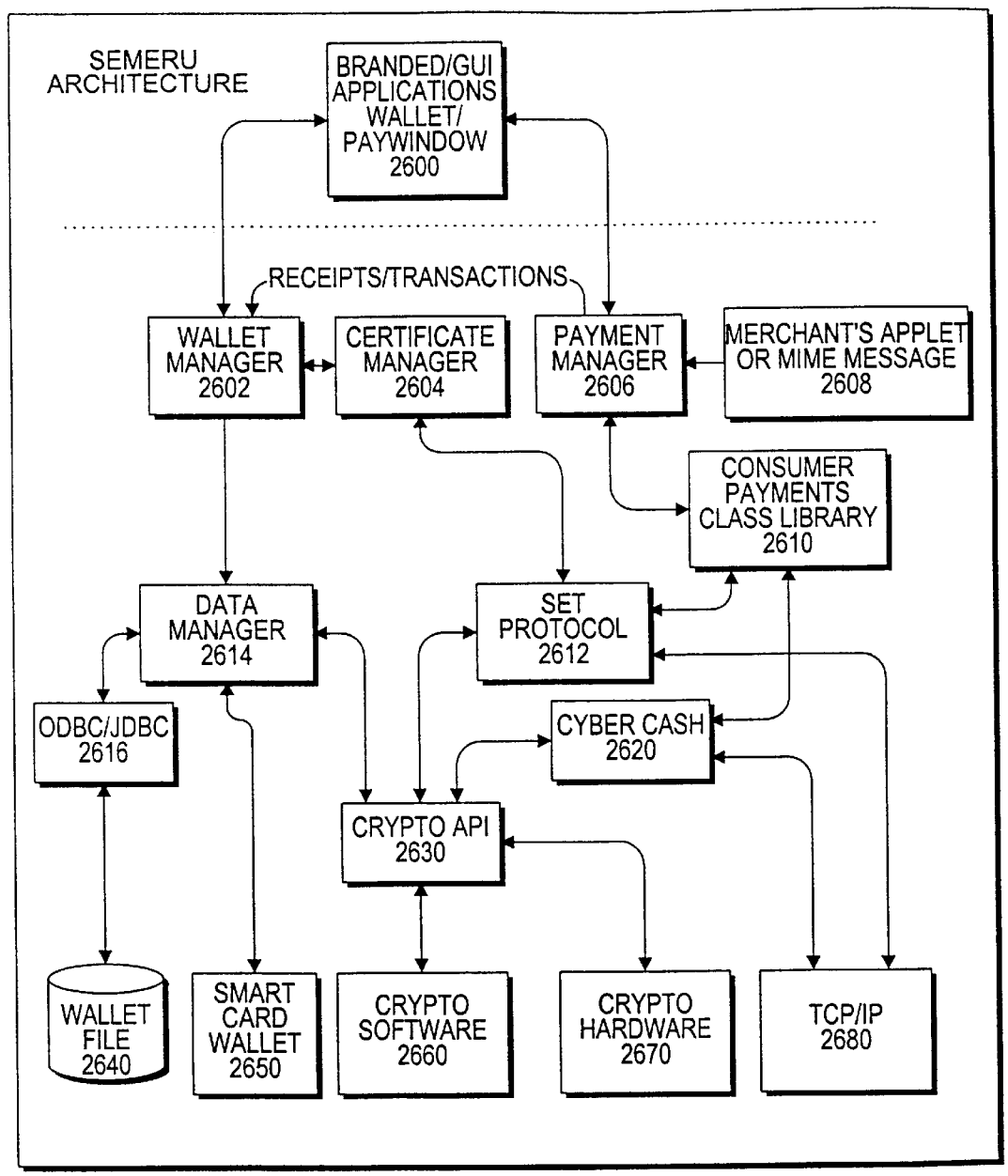
FIG. 26 is an architecture block diagram in accordance with a preferred embodiment.

FIG. 26 is an architecture block diagram in accordance with a preferred embodiment of the subject invention. Processing commences at function block 2600 where the Graphical User Interface (GUI) part of the application is initialized. The GUI application 2600 provides the consumer with support for ordering and making payments during the shopping process. There are also GUI components provided for wallet creation; importing, certificate and payment method creation and maintenance; and for transaction register review and reporting. The screen designs, and their associated logic, for the helper applications and applets are individually discussed in detail below.

The Certificate Manager 2604 manages the automatic downloading of a consumer's certificate from a bank, validation of a consumer's and a merchant's certificates and automatic requisition of certificate renewal.

The Payment Manager 2606 coordinates and completes the payment request that is received from the merchant system. The payment request is received via a MIME message in the native code implementation or via an applet in the Java implementation. The payment request received contains the final GSO, Ship-To name, merchant certificate, merchant URL, coupons and the payment amount. The manager 2606 then communicates with the payment related GUI component to interact with the consumer to authorize and complete the payment transaction. The manager is also responsible for determining the payment protocol based on the consumer's payment instrument and the merchant's preferred payment protocol.

Figure 27:
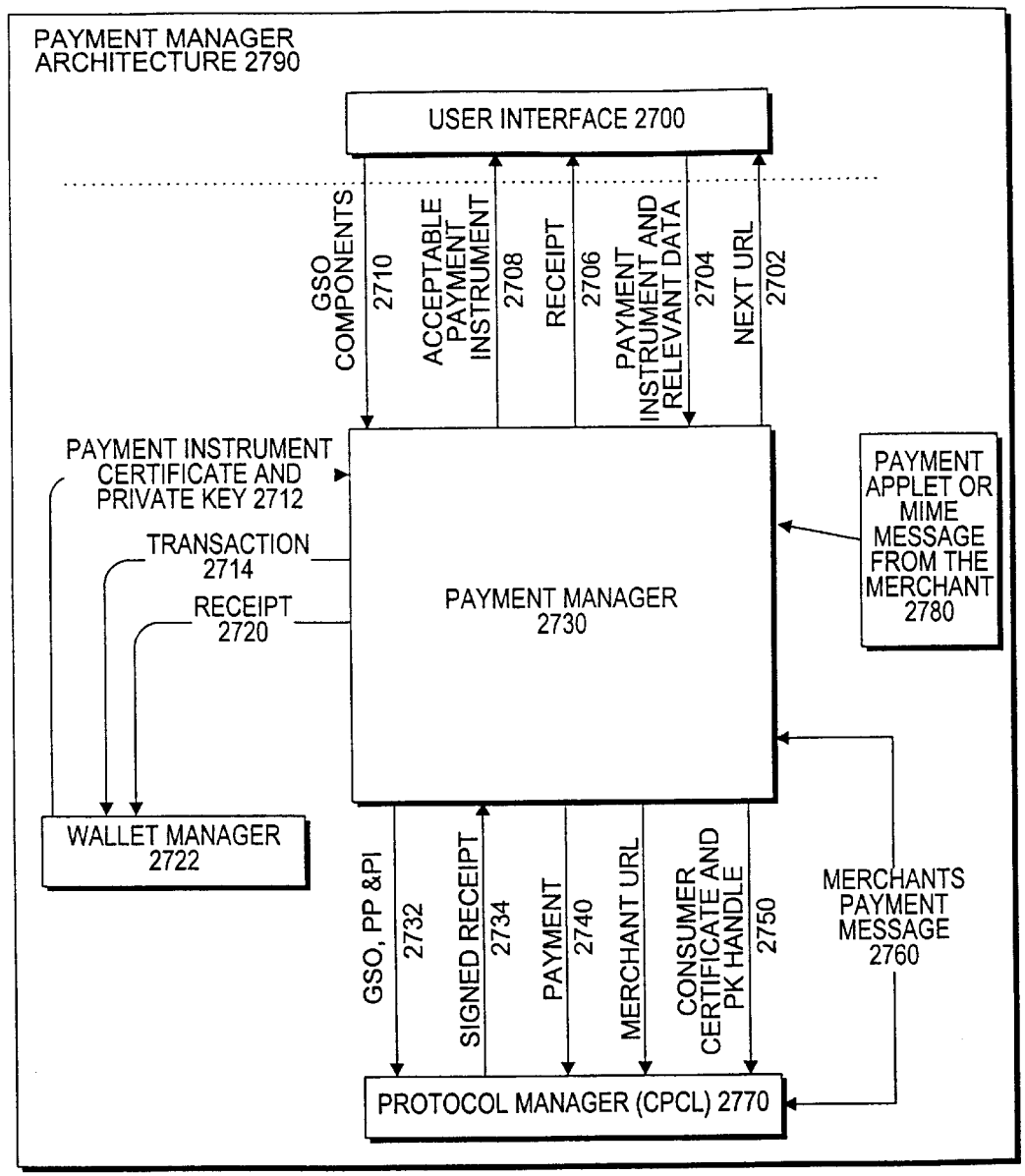
FIG. 27 is a block diagram of the payment manager architecture in accordance with a preferred embodiment.

The manager 2606 includes a well defined Application Programming Interface (API) which enables OEMs to interface with the payment manager 2606 to make payments to specific HTTP sites. The detailed logic associated with the payment manager 2606 is presented in FIG. 27.

The payment manager 2606 enforces standard operations in the payment process. For example the receipt and the transaction record can automatically be transferred to the Wallet file once the payment is completed. The payment manager architecture in accordance with a preferred embodiment is presented in FIG. 27. A user interfaces with the payment manager 2730 via a user interface 2700 that responds to and sends a variety of transactions 2710, 2708, 2706, 2704 and 2702. The transactions include obtaining the next record, payment record, receipt, acceptance of the payment instrument and GSO components. In turn, the payment manager 2730 sends transactions 2714 and receipts 2720 to the wallet manager 2722 and receives payment instruments, certificates and private keys from the wallet manager 2722.

The payment manager 2730 also sends and receives transactions to the protocol manager 2770 including a merchant's payment message 2760, a consumer certificate and PK handle 2750, a merchant URL 2742, a payment 2740, a signed receipt 2734 and a GSO, Selected Payment Protocol and Selected Payment Instrument 2732. The payment manager 2730 also accepts input from the payment applet or MIME message from the merchant as shown at function block 2780. One aspect of the payment processing is a Consumer Payments Class Library (CPCL) 2770 which encapsulates the payment protocols into a single API. By encapsulating the payment protocols, applications are insulated from protocol variations. A SET Protocol provides an implementation of the client-side component of the Secure Electronic Transaction (SET) Protocol. A complete implementation of the client-side component of the CyberCash micro-payment protocol is also provided.

The Wallet Manager 2722 provides a standard interface to the wallet. It defines the wallet database structures and the payment instrument data structures, controls the access to the wallet and provides concurrency checking if more than one application attempts to open the same wallet. The interface to the wallet manager 2722 is published to allow OEMs to interface with the wallet manager and access the wallet database. The wallet manager consists of the following sub-components:

Wallet Access. This component provides an interface to read and write wallet information.

Transaction Manager. This component provides an interface to read and write transaction corresponding to a wallet into the wallet database.

Payment Instrument Manager. This component manager provides a common interface to the specific payment instrument access components.

Credit Card Access, Debit Card Access, Check Access. These components deal with a specific payment instrument.

A Data Manager provides storage and retrieval of generic data items and database records. It is assumed that data fields, index fields or entire data records can be marked as encrypted and the encryption process is largely automated. The data manager has no specific knowledge of database records appropriate to different payment methods. This layer is separated out so as to reduce changes required when new payment methods are introduced. However RSA key pairs and certificates might be considered as "simple" data types. This component also provides an abstraction which supports wallet files on computer disk or contained in smart cards.

The Open Data Base Connectivity (ODBC)/Java Data Base Connectivity (JDBC) component provides Data Base Connectivity where formal database components are required. An embodiment of the Smart Card Wallet allows wallet data to be stored and/or secured by a cryptographic token.

A preferred embodiment includes a single file or directory of files comprising a "wallet" which contains personal information and information about multiple payment methods with the preferred implementation. These payment methods (Visa cards, debit cards, smart cards, micro-payments etc.) also contain information such as account numbers, certificates, key pairs, expiration dates etc. The wallet is envisaged to also contain all the receipts and transaction records pertaining to every payment made using the wallet. A Cryptographic API component provides a standard interface for RSA and related cryptographic software or hardware. This support includes encryption, signature, and key generation. Choice of key exchange algorithm, symmetric encryption algorithm, and signature algorithm should all be configurable. A base class stipulates generic behavior, derived classes handle various semantic options (e.g. software based cryptography versus hardware based cryptography.)

The Cryptographic Software portion provides RSA and DES support. This may be provided utilizing the SUN, RSA or Microsoft system components depending on the implementation selected for a particular customer. Cryptographic Hardware creates a lower level API which can underpin the Cryptography API and be utilized to replace Cryptography Software with an off the shelf cryptography engine. The message sequence charts describe the flow of messages/data between the consumer, the browser and/or the various major components of the Semeru system. The major components of the system are the Merchant system which includes the vPOS, the PayWindow, and the Payment Gateway. The merchant system allows a consumer to shop, accept the payment transactions sent by the PayWindow application, and send payment transactions to the acquiring bank. The Consumer Payments Class Library (CPCL) module is a layer within the application which sends the payment transactions, securely, from the consumer to the merchant.

Figure 28:
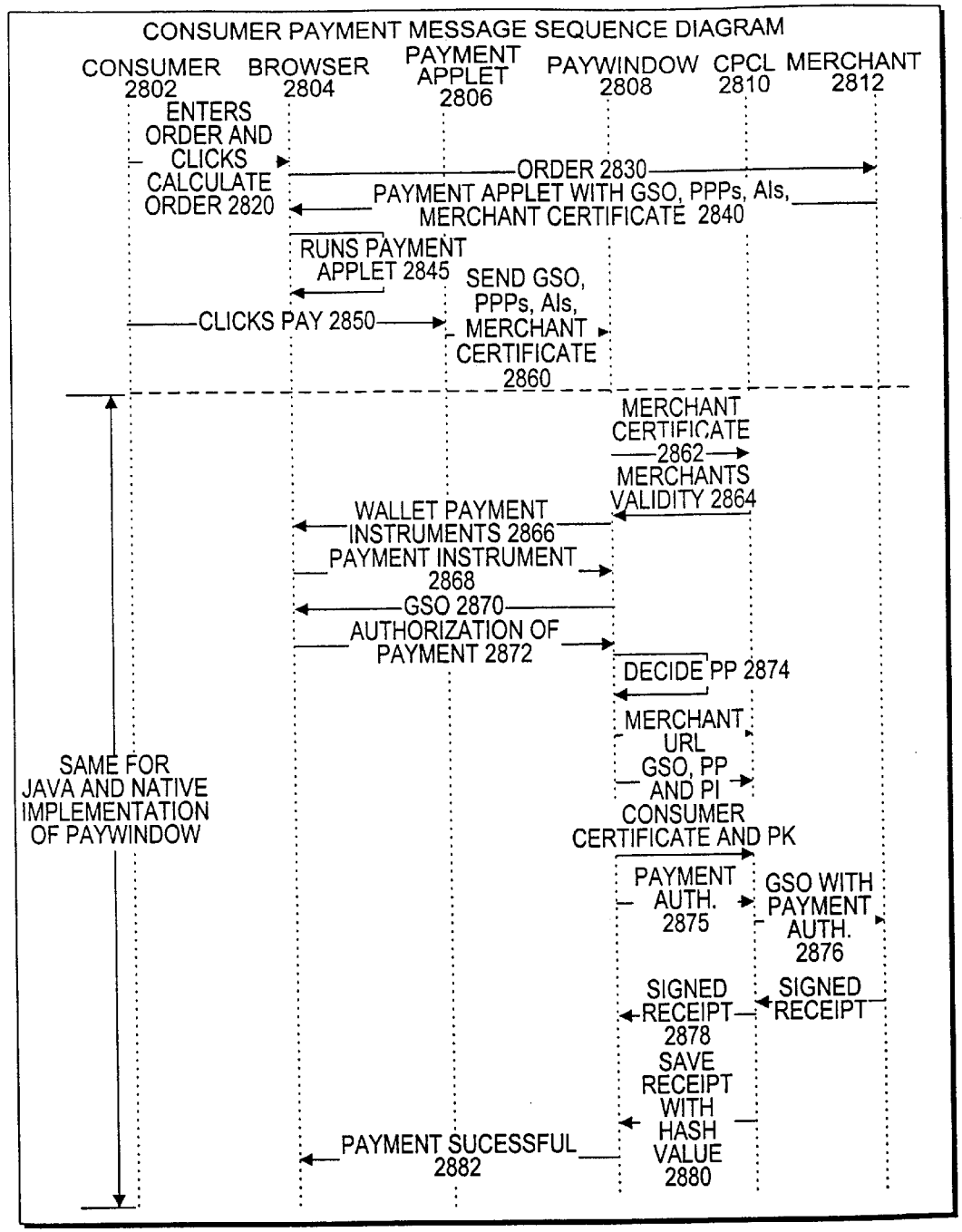
FIG. 28 is a Consumer Payment Message Sequence Diagram in accordance with a preferred embodiment of the invention.

FIG. 28 is a Consumer Payment Message Sequence Diagram in accordance with a preferred embodiment of the invention. The diagram presents the flow of messages between the consumer, the browser, the merchant system, the PayWindow application, and CPCL. This message flow describes the payment process from the time an order is completed and the consumer elects to pay, to the time the payment is approved and the receipt is returned to the consumer. The difference between the Native implementation and Java implementation of the PayWindow application is in the delivery of the order information to the PayWindow. Once the order information is received by the PayWindow, the flow of messages/data is the same for both implementations. In the case of the Native implementation, the order information is delivered via a MIME message. This MIME message is sent to the PayWindow by the browser via a document file. In the Java implementation, the order information is delivered to the PayWindow by an applet. The merchant system sends an applet with the order information to the browser which in turn delivers the order to the PayWindow. Once the order is received, the PayWindow interacts with the consumer and the Protocol modules for the completion of the payment process.

Enters Order and Clicks Calculate Order 2820

This message represent the consumer order entry and the clicking of the 'Calculate Order' button. The consumer's shopping experience is all condensed into this one message flow for the purpose of highlighting the payment process. The actual implementation of the shopping process varies, however, the purpose does not, which is the creation of the order.

Order 2830

This message represents the order information which is sent by the browser to the merchant via an HTML form.

Payment Applet with GSO, PPPs, AIs, merchant certificate and URL 2840

On receipt of the order, the merchant system calculates the payment amount. This message represents the HTML page which is sent by the merchant system detailing the payment amount along with the Java payment applet which contains the GSO, PPPs, AIs, merchant certificate and URL.

Run Payment Applet 2845

The Java enabled browser runs the Payment applet. The applet displays a button called "Pay" for the consumer to click. This is embedded in the HTML page delivered by the merchant.

Clicks Pay 2850

This message represents the clicking of the Pay button on the browser by the consumer after confirming the payment amount.

GSO, PPPs, AIs, merchant certificate and URL 2860

This message represents the GSO, PPPS, AIs, merchant certificate and the merchant URL carried by the Java applet. The Java applet now delivers these to the PayWindow application.

Merchant Certificate 2862

This message represents the merchant's certificate which is sent to the CPCL module for checking the validity of the merchant.

Merchant's Validity 2864

The CPCL modules examines the merchant's certificate and send this message to the PayWindow indicating whether or not the merchant is a valid merchant.

Wallet, Payment Instruments 2866

This message represents the wallets and payment instruments that is displayed to the consumer. Not all payment instruments from a wallet is shown to the consumer. Only the ones accepted by the merchant is shown.

Payment Instrument 2868

This message represents the payment instrument selected by the consumer. This message is created in the current design when the user double clicks on the payment image in the "Select Payment Method" Window.

GSO 2870

This indicates that the GSO is displayed to the consumer in the "Make Payment Authorization" screen.

Authorization of Payment 2872

This message represents the authorization of the payment by the consumer. The consumer authorizes the payment by clicking the 'Accept' button on the "Payment Authorization" screen.

Decide Payment Protocol 2874

Once the consumer authorizes the payment, the payment protocol is decided by PayWindow based on the merchant's Payment Protocol Preferences and the consumer selected payment instrument.

Payment Authorization 2875

These messages represent the merchant's URL, the GSO, payment protocol (PP) to use, account number, certificate and the private key handle (PK) associated with the payment instrument which is sent to the protocol module.

GSO with Payment Authorization 2876

This message represents the payment instructions which is sent by the protocol module to the Merchant system. The GSO, PI, consumer certificate and PK is packaged based on the payment protocol.

Signed Receipt 2878

This message represents the digitally signed transaction receipt received by the protocol module from the merchant.

Save Receipt with Hash Value 2880

The digitally signed transaction receipt is saved by the PayWindow for future reference.

Payment Successful 2882

This indicates that the transaction receipt and the 'payment successful' have been displayed to the consumer.

Certificate Processing

A payment instrument must be certified by a "certificate issuing authority" before it can be used on a computer network. In the case of credit card payments, the issuer may be one of the card issuing banks, but it might also be a merchant (eg SEARS), a transaction aquiring bank or an association such as VISA or Mastercard.

Payment instrument information is stored in the consumer's wallet. The certificate which authorizes the payment instrument will be stored along with that data in a secured database. The process of acquiring a certificate is described below. A certificate can be delivered to a consumer in a preconfigured wallet. The consumer receives a wallet which contains the certificate together with the necessary details associated with a payment instrument including a payment instrument bitmap which is authorized by a certificate issuing authority or the agencies represented by the issuing authority.

Obtaining a Certificate

Figure 29:
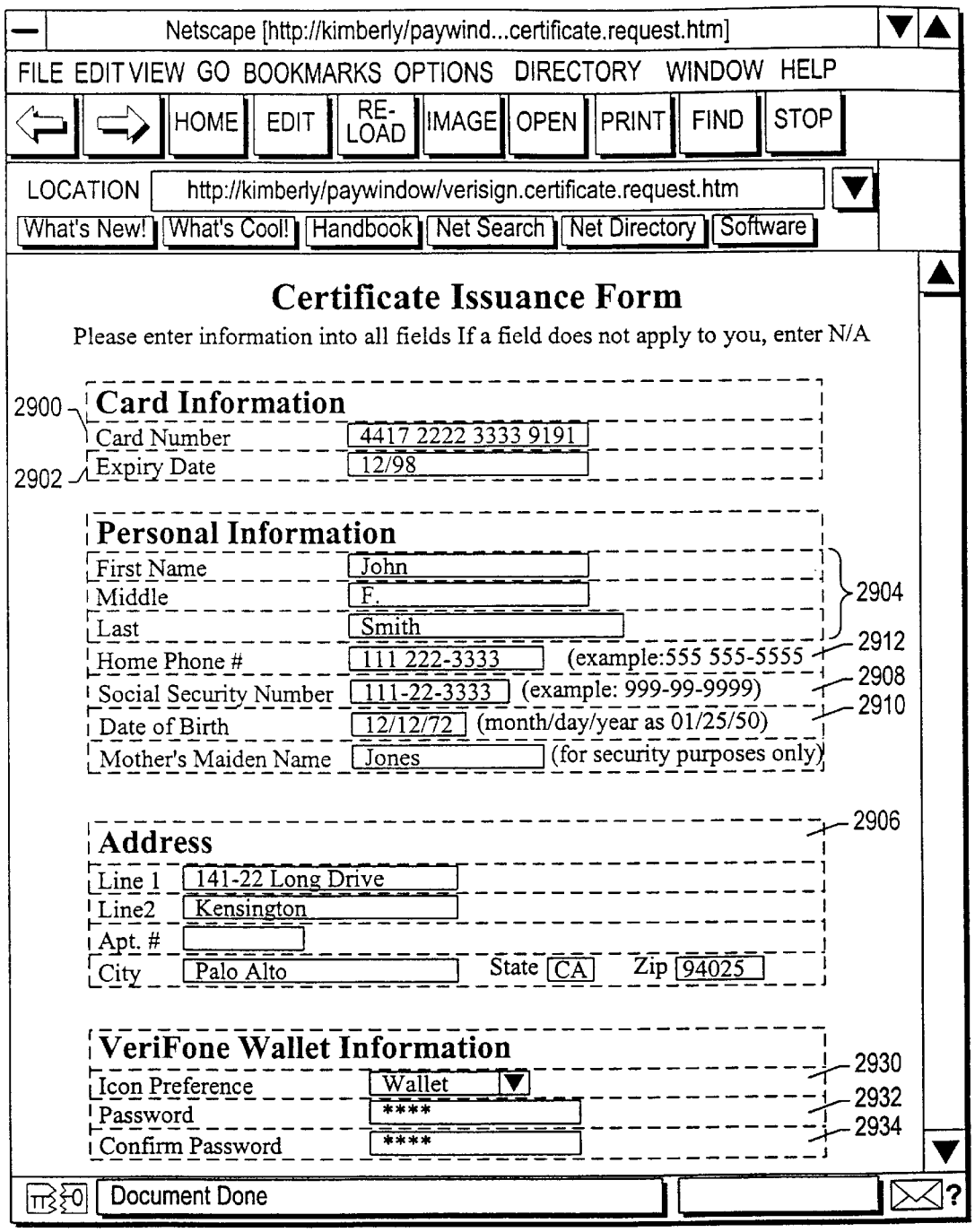
FIG. 29 is an illustration of a certificate issuance form in accordance with a preferred embodiment.

A consumer will deliver or cause to be delivered information to a certificate issuing authority. FIG. 29 is an illustration of a certificate issuance form in accordance with a preferred embodiment. A user may fill out the form on-line, on paper and mail it in, or get his bank or credit card company to deliver it. The consumer delivered data will usually contain a public key belonging to a security key pair generated by consumer software. This information will normally be mailed to the consumer's address and actuated by a telephone call from the consumer. The certificate authority takes this information and uses it to validate that he is indeed entitled to use the payment method. This processing normally takes a few days to accomplish. Information will normally be exchanged with the organization issuing the payment method in the physical space if there is one, and with credit agencies. The certificate information is loaded into the consumer's software to enable payment processing to proceed online.

In some cases the consumer will be able to select details about a payment instument holder (wallet) he desires to own. This may be the icon representing a holder, the access password or other information. After creating the certificate, the issuing authority can use information received in the certificate application to create a custom payment instrument holder ready to use. This payment instrument holder will contain the following information. Payment instrument information including card number 2900 and expiration date 2902. Personal information including name 2904, address 2906, social security number 2908 and date of birth 2910.

Figure 30:
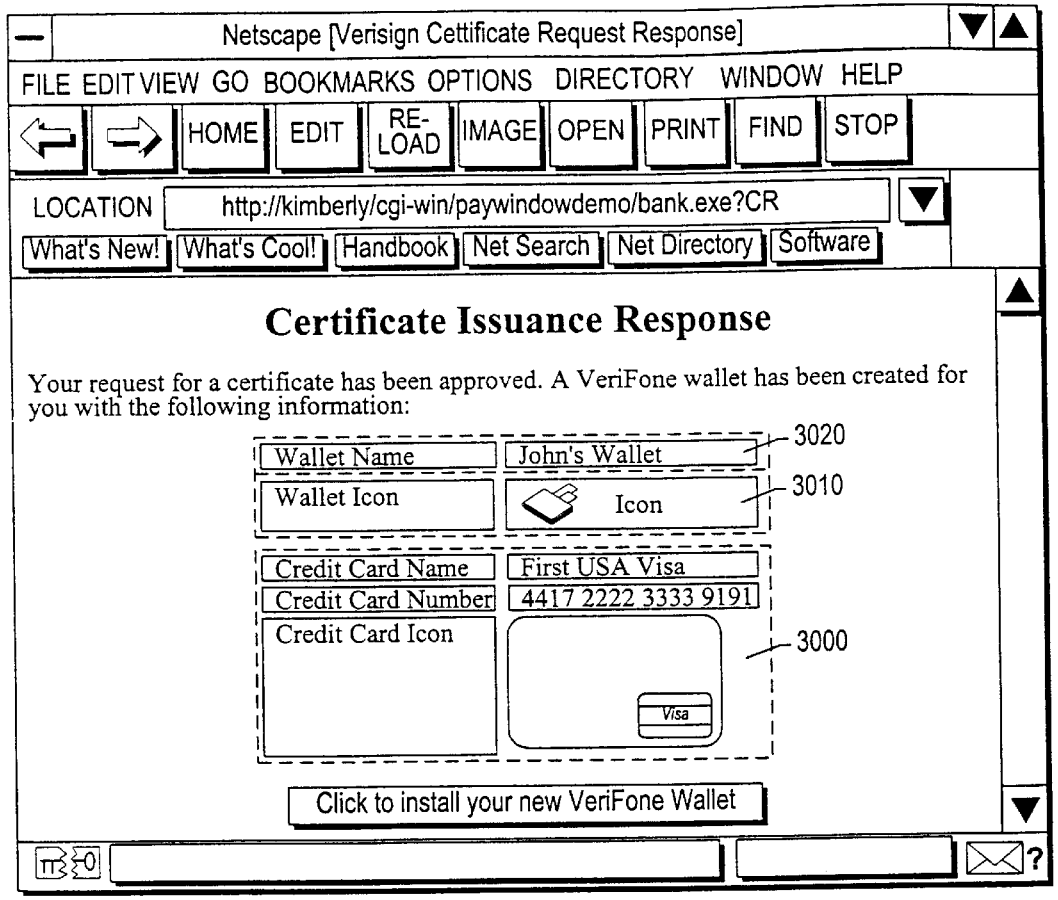
FIG. 30 illustrates a certificate issuance response in accordance with a preferred embodiment.
Figure 31:
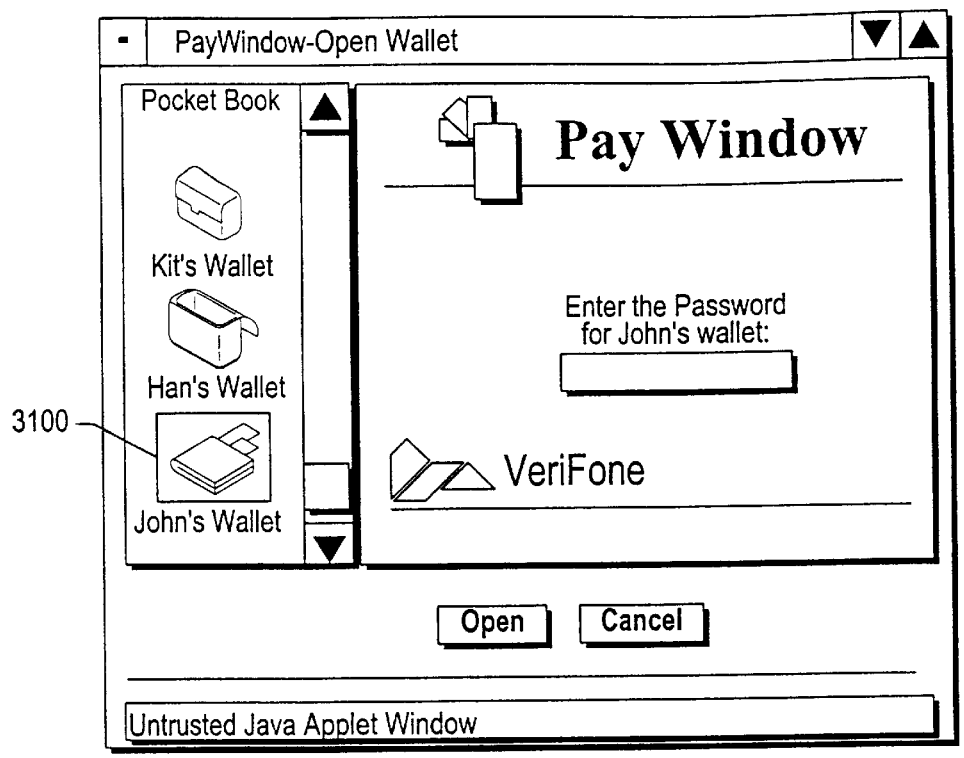
FIG. 31 illustrates a collection of payment instrument holders in accordance with a preferred embodiment.
Figure 32:
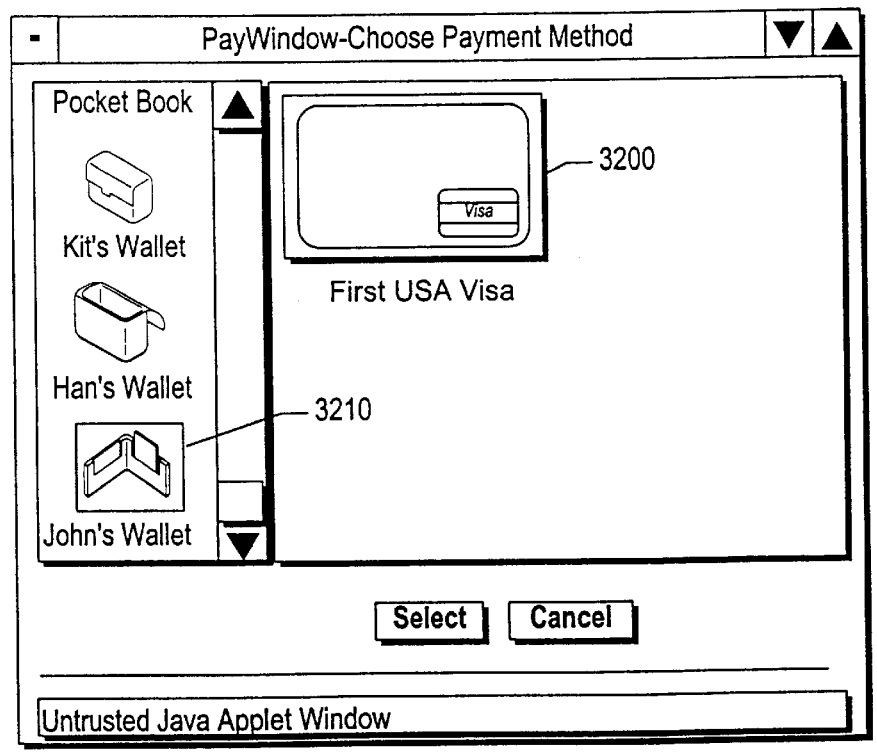
FIG. 32 illustrates the default payment instrument bitmap in accordance with a preferred embodiment.

The associated certificate (eg X509 standard ), an associated public key or in some cases public/private key pair (eg RSA), and an approved bitmap representing the payment instrument are provided to the requesting consumer. FIG. 30 illustrates a certificate issuance response in accordance with a preferred embodiment. An approved bitmap for a VISA card is shown at 3000. Also a default payment holder 3010 and a default payment holder name are provided with the certificate issuance. After the consumer aquires the payment instrument holder 3010, the payment instrument holder is immediately visible to him in his collection of payment instrument holders. FIG. 31 illustrates a collection of payment instrument holders in accordance with a preferred embodiment. The predefined payment instrument holder 3100 is the same JOHN's WALLET that was predefined based on defaults by the certificate issuance form. FIG. 32 illustrates the default payment instrument bitmap 3200 associated with the predefined payment instrument holder 3210 resulting from the consumer filling in and obtaining approval for a VISA card.

Figure 33:
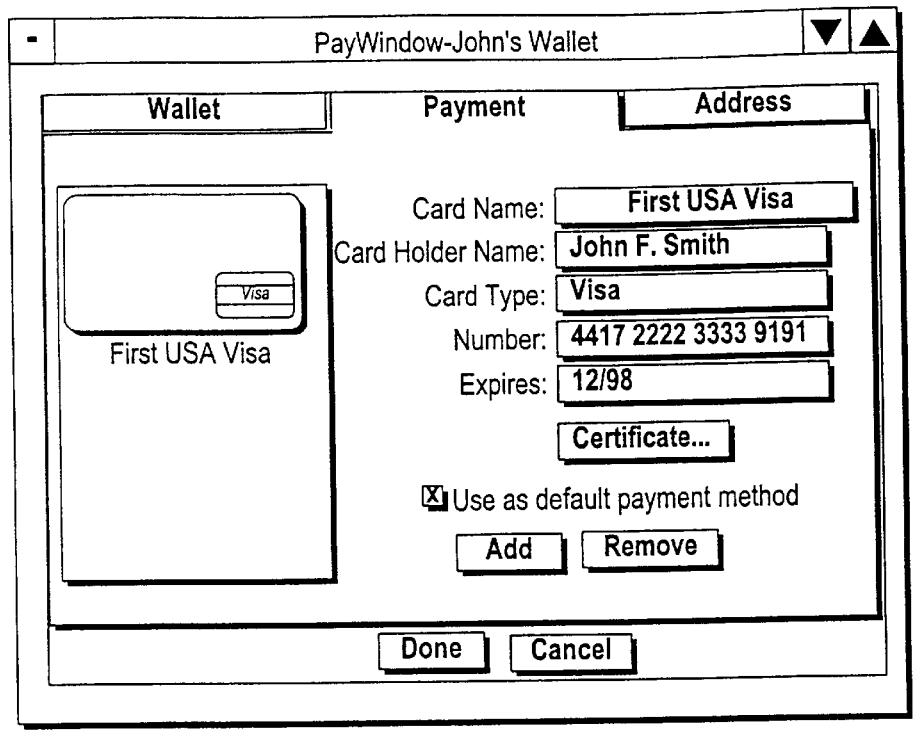
FIG. 33 illustrates a selected payment instrument with a fill in the blanks for the cardholder in accordance with a preferred embodiment.
Figure 34:
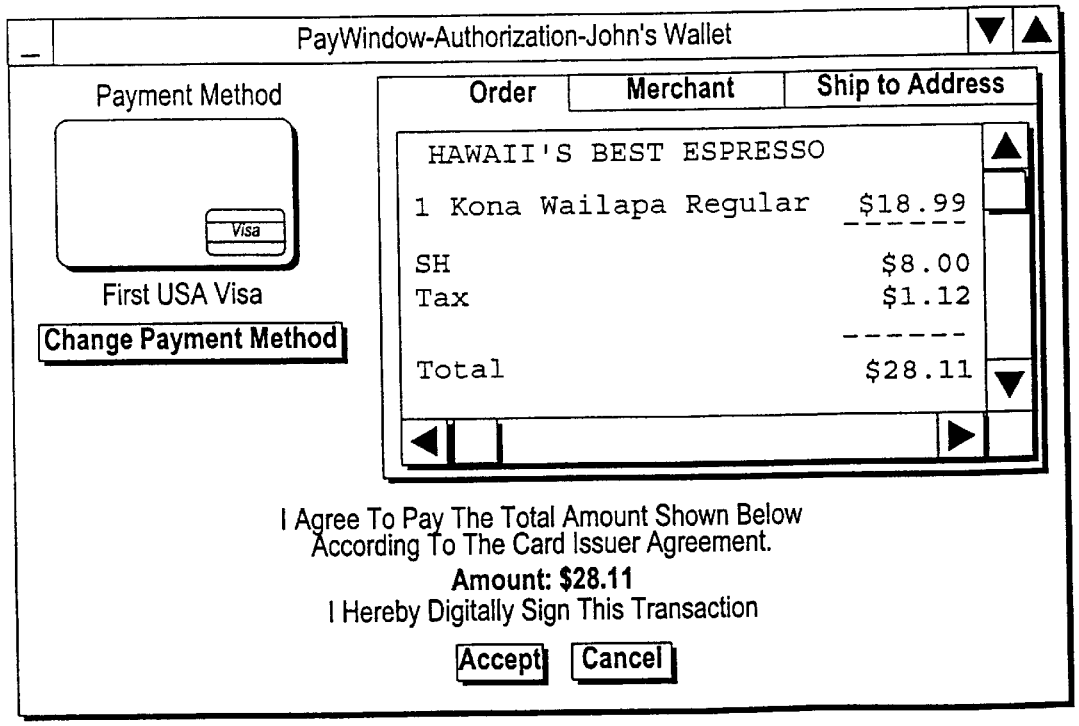
FIG. 34 illustrates a coffee purchase utilizing the newly defined VISA card in accordance with a preferred embodiment of the invention.

FIG. 33 illustrates a selected payment instrument with a fill in the blanks for the cardholder in accordance with a preferred embodiment. Next time the payment instrument holder is opened in a payment context the certificate issuing authorty's approved instrument bitmap can be used to select the payment instrument and utilize it to make purchases. FIG. 34 illustrates a coffee purchase utilizing the newly defined VISA card in accordance with a preferred embodiment of the invention.

Figure 35:
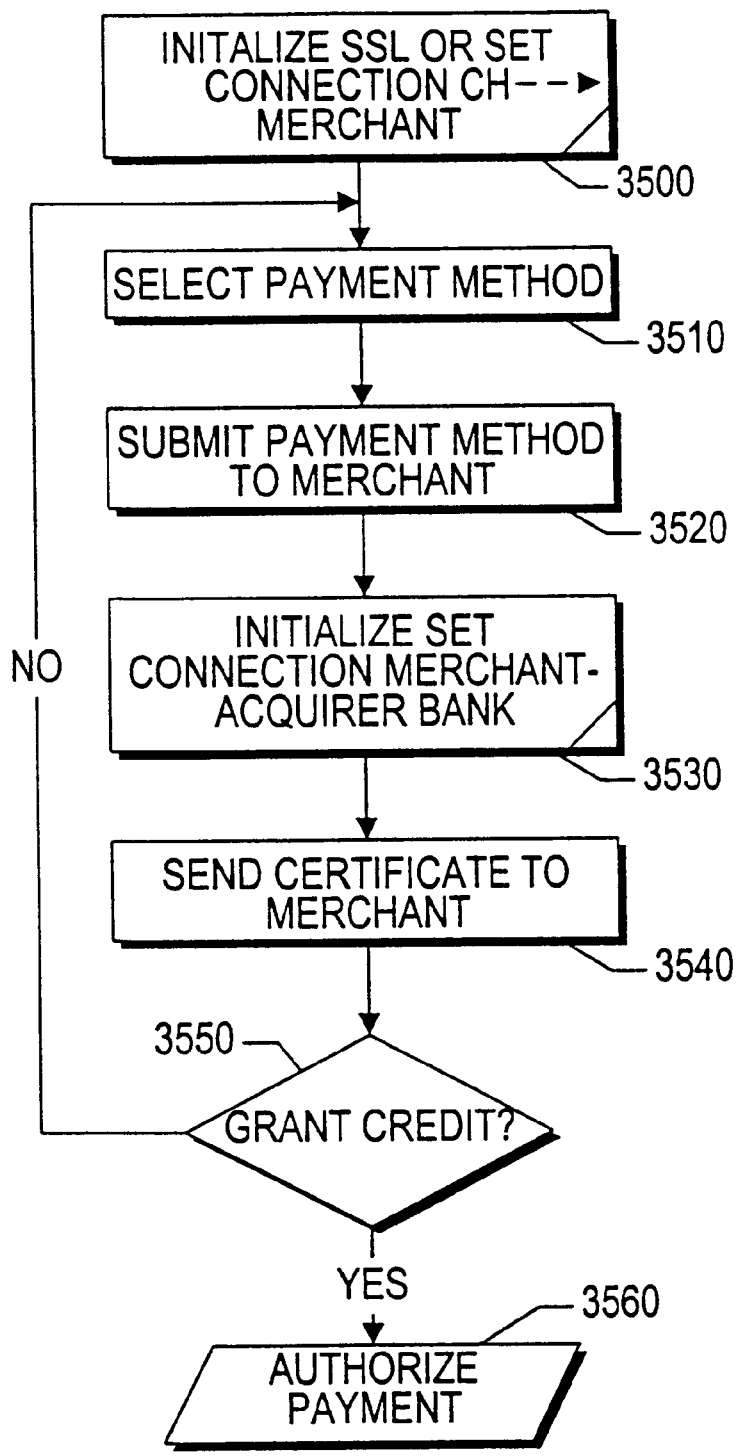
FIG. 35 is a flowchart of conditional authorization of payment in accordance with a preferred embodiment.
Figure 36:
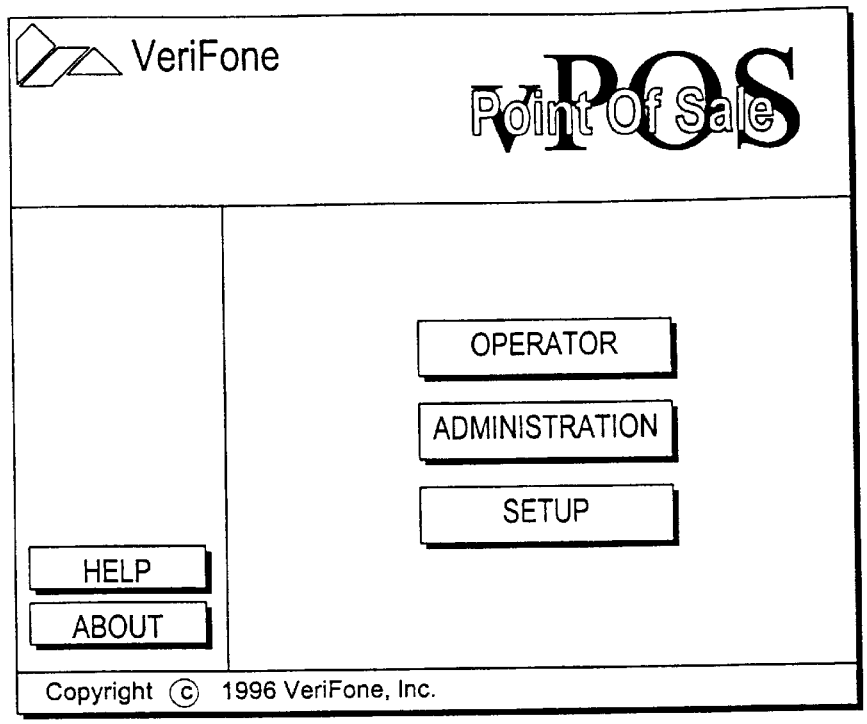
Figure 37:
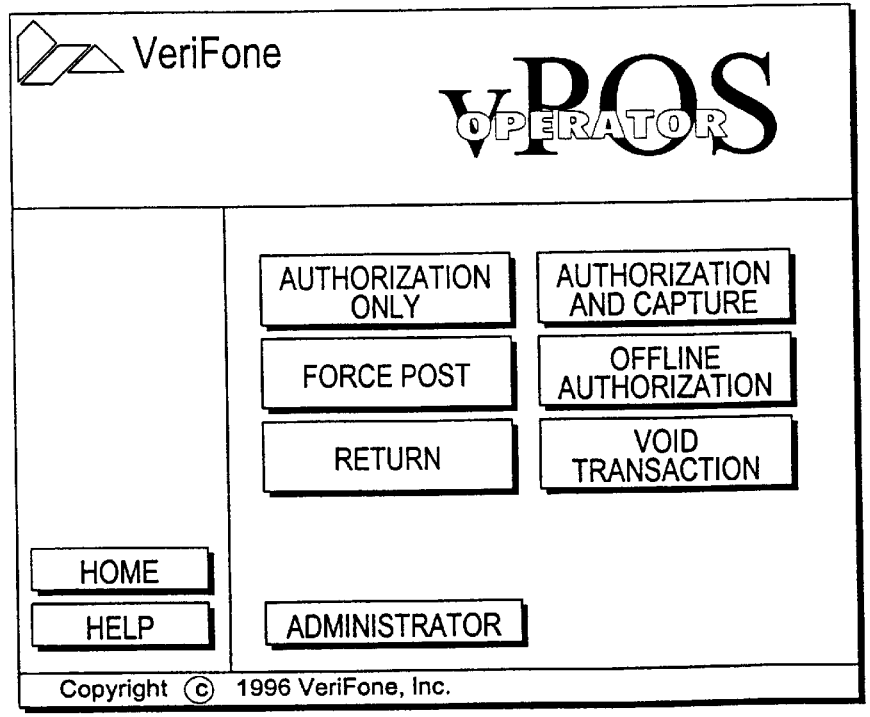
Figure 38:
Figure 39:
Figure 44:
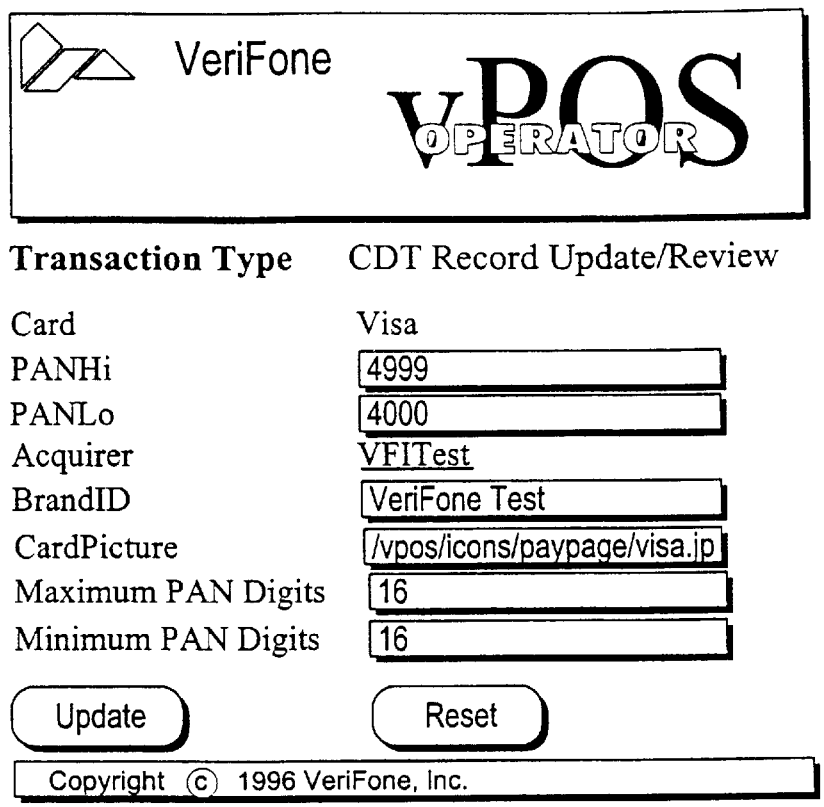
Figure 45:
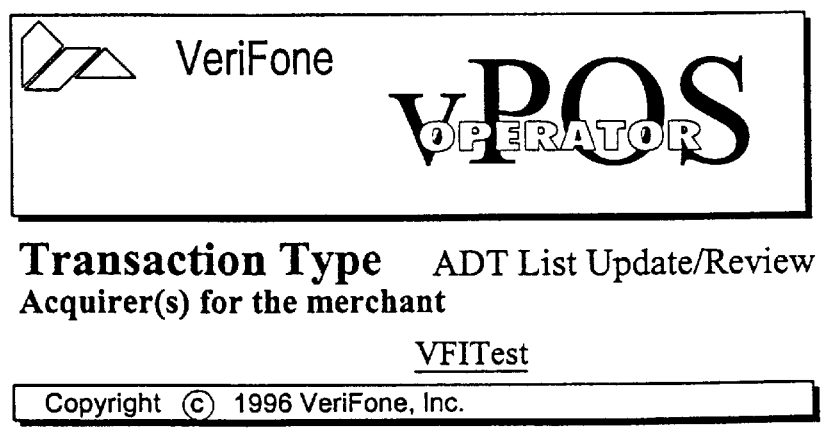
Figure 46:
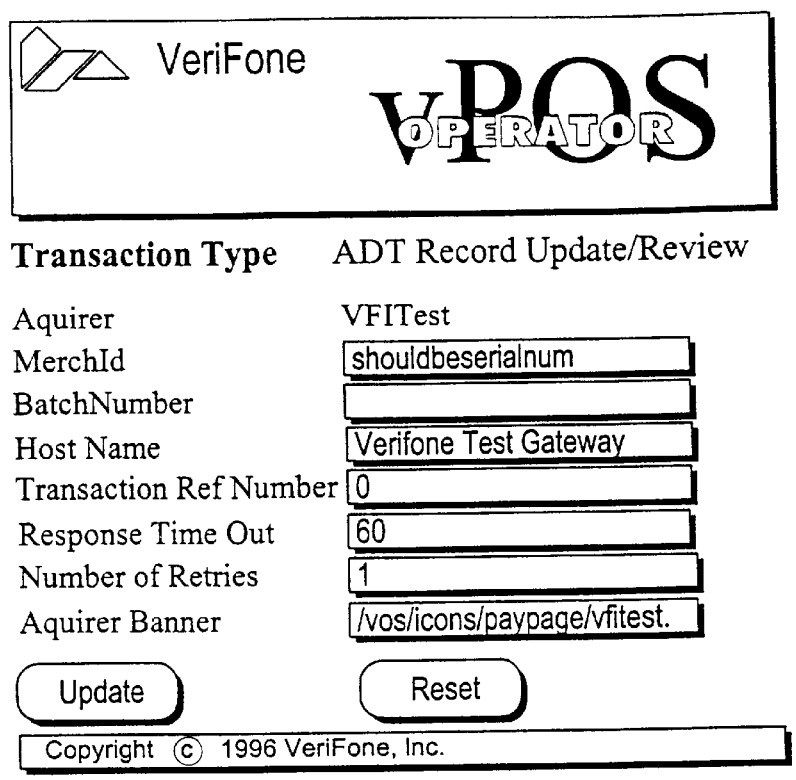
Figure 47:
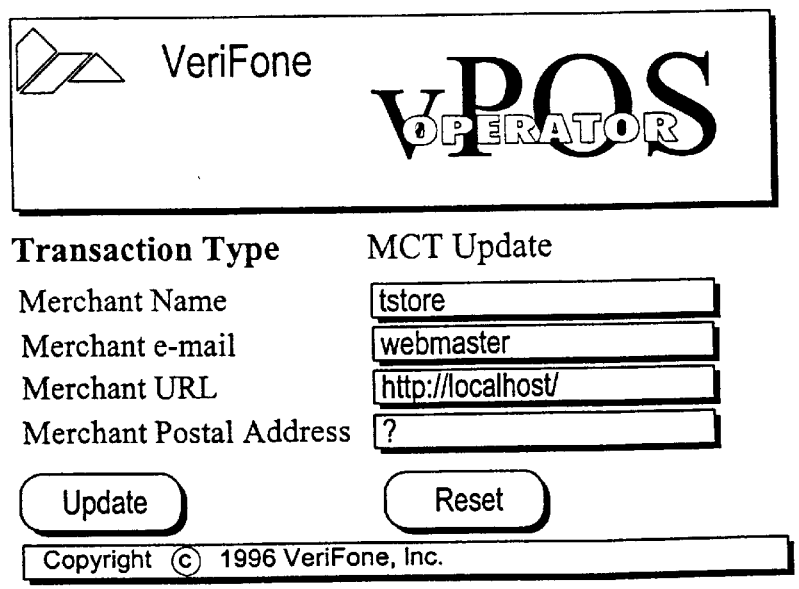

FIG. 35 is a flowchart of conditional authorization of payment in accordance with a preferred embodiment. Processing commences at 3500 where the program initializes the connection betweeen the cardholder and the merchant for the purposes of shopping. After the cardholder completes shopping, a new SSL connection is established which provides authenticating information to the merchant. At this point the merchant is able to execute payment functionality (based on SSL or SET) conditionally, based upon the quality and character of the digital signature and the certificate used to validate said signature. Then, at function block 3510, the cardholder selects the payment instrument for the particular transaction. Payment instruments could include VISA, MASTERCARD, AMERICAN EXPRESS, CHECK, SMARTCARD or DEBIT CARDS. The payment method is then submitted to the merchant at function block 3520. The merchant then initializes the SET connection to the acquiring bank at function block 3530 if the connection is not already established. Then, at function block 3540, the certificate is submitted to the merchant from the acquiring bank. The certificate includes a public key portion and a private key used as an irrebutable digital signature to authenticate the parties to the transaction. The certificate also includes information on the level of credit risk which allows a merchant to conditionally decide on the authorization or rejection of credit under a particular payment instrument based on their risk level and the merchant's personal comfort level with the ability of the cardholder to pay. This processing has not previously been possible because the information returned from the authorizing bank did not include a level of credit risk a cardholder posed, it only contained credit rejected or approved.

A detailed description of the gateway internals is presented below in accordance with a preferred embodiment.

Gw ClearSetRequestHandler

Figure 51:
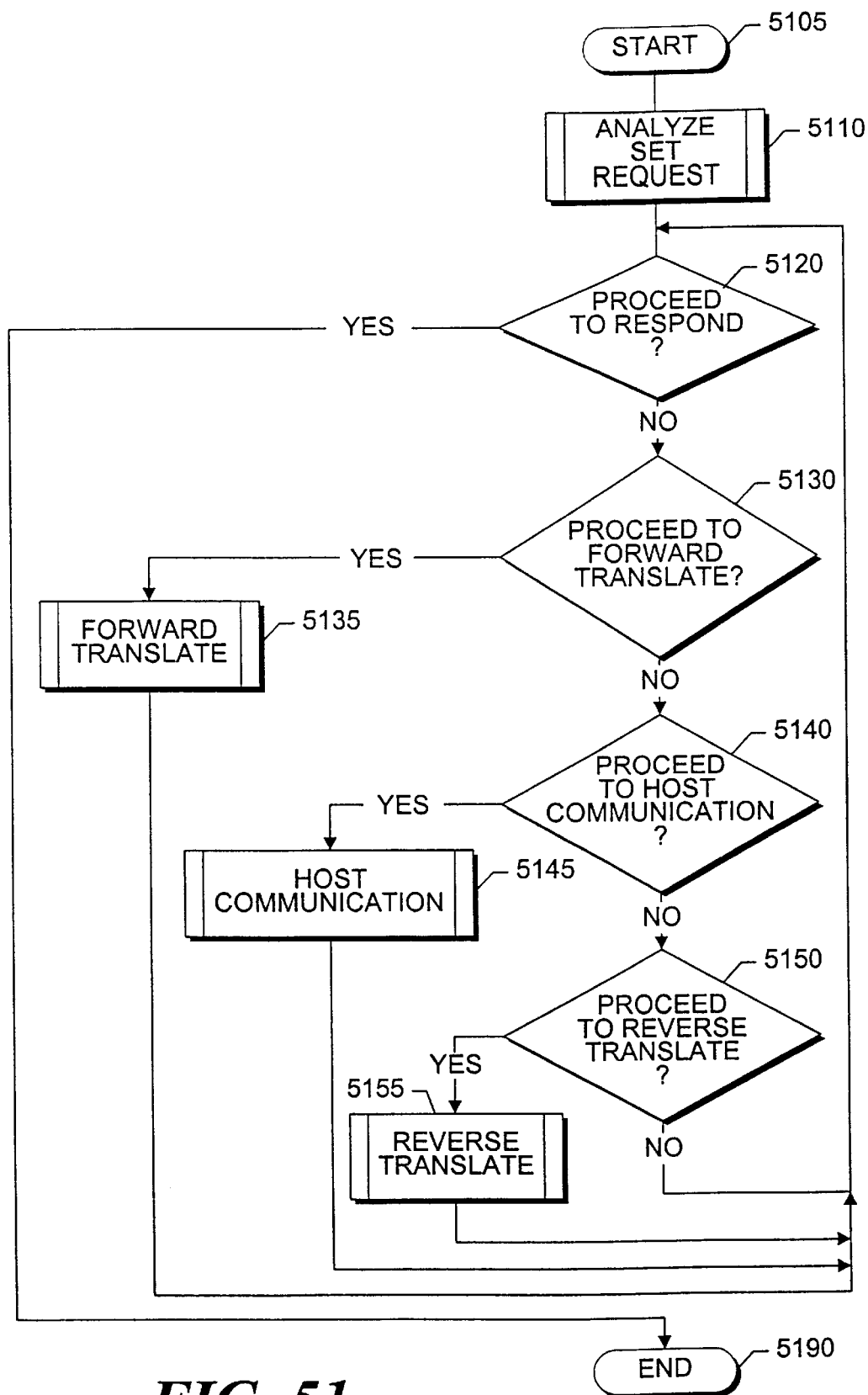
FIGS. 51–61 are flowcharts depicting the detailed logic of the gateway in accordance with a preferred embodiment.

FIG. 51 depicts a flow diagram for the GatewayClearSetRequestHandler routine. Execution begins in Step 5105. In Step 5110 an SET analysis routine is called to analyze the SET request, as will be more fully disclosed below. Step 5110 sets a status flag indicating the next stage to be performed by the Gateway. In Step 5120 the Gateway checks to see whether the status is set to indicate that a response should be provided to the user. If so, execution proceeds to Step 5190, which ends the request handling routine and returns control to a calling routine, which then provides a response to the user. Otherwise execution proceeds to Step 5130. In Step 5130, the Gateway checks to see if the status is set to indicate that forward translation is required. Forward translation is necessary to translate an outgoing message into a format that can be understood by the host computer. If forward translation is indicated, execution proceeds to Step 5135. In Step 5135, the outgoing message is forwarded translated, as more fully disclosed below with respect to FIG. 53. If no forward translation is indicated, for example, if an already-translated transaction is being retried, execution proceeds to Step 5140. In Step 5140, the Gateway checks to see if the next step is communication to the host. If so, the Gateway proceeds to Step 5145, and initiates host communication as will be more fully discussed below with respect to FIG. 54. If not, execution proceeds to Step 5150. In Step 5150, the Gateway checks to see whether reverse translation is indicated. Reverse translation translates a response from a host into a format useable by the calling routine. If reverse translation is indicated, execution proceeds to Step 5155, and the reverse translation is performed, as will be more fully discussed below with respect to FIG. 55. In any case, after either forward translation in Step 5135, host communication in Step 5145, or reverse translation in Step 5155, control returns to Step 5120 for further processing. As will be more fully disclosed below, the forward translation, host communication, and reverse translation routines manipulate status indicators to prevent the occurrence of an infinite loop.

The Gw_ClearSetRequestHandler routine as depicted in FIG. 51 may be implemented using the following C++ code:

```
int Gw_ClearSetRequestHandler(CPCLRequest*pRequest)
{
    gwAction         action;
    char             fatalError;
    CPCLCCRequest    *pVehicle = (CPCLCCRequest*) pRequest;
    CGW_Engine       *setTrans = (CGW_Engine*) pVehicle->GetContext();
    action = setTrans->AnalyzeSetRequest(pVehicle,&fatalError);
    while ((action!=GW PROCEED_TO_RESPOND)&& (!fatalError)){
        switch (action){
            case GW_PROCEED_TO_FWD_XLAT:
```

```
            action = setTrans->TranslateForward(pVehicle);
            break;
        case GW_PROCEED_WITH_HOST_COMMS:
            action = setTrans->DoHostCommunication(pVehicle);
            break;
        case GW_PROCEED_TO_REV_XLAT:
            action = setTrans->TranslateReverse(pVehicle);
            break;
        case GW_PROCEED_TO_RESPOND:
        default:
            break;
        }
    }
    // Response should be built, return up the protocol
    // stack so that it will encode and then crypt our response.
    if (fatalError){
        // Set an error code for the protocol stack
        pVehicle->SetError(eEInvalidRequest);
        return(0);
    }
    else {
        return(1);
    }
}
```

AnalyzeSetRequest

Figure 52A:
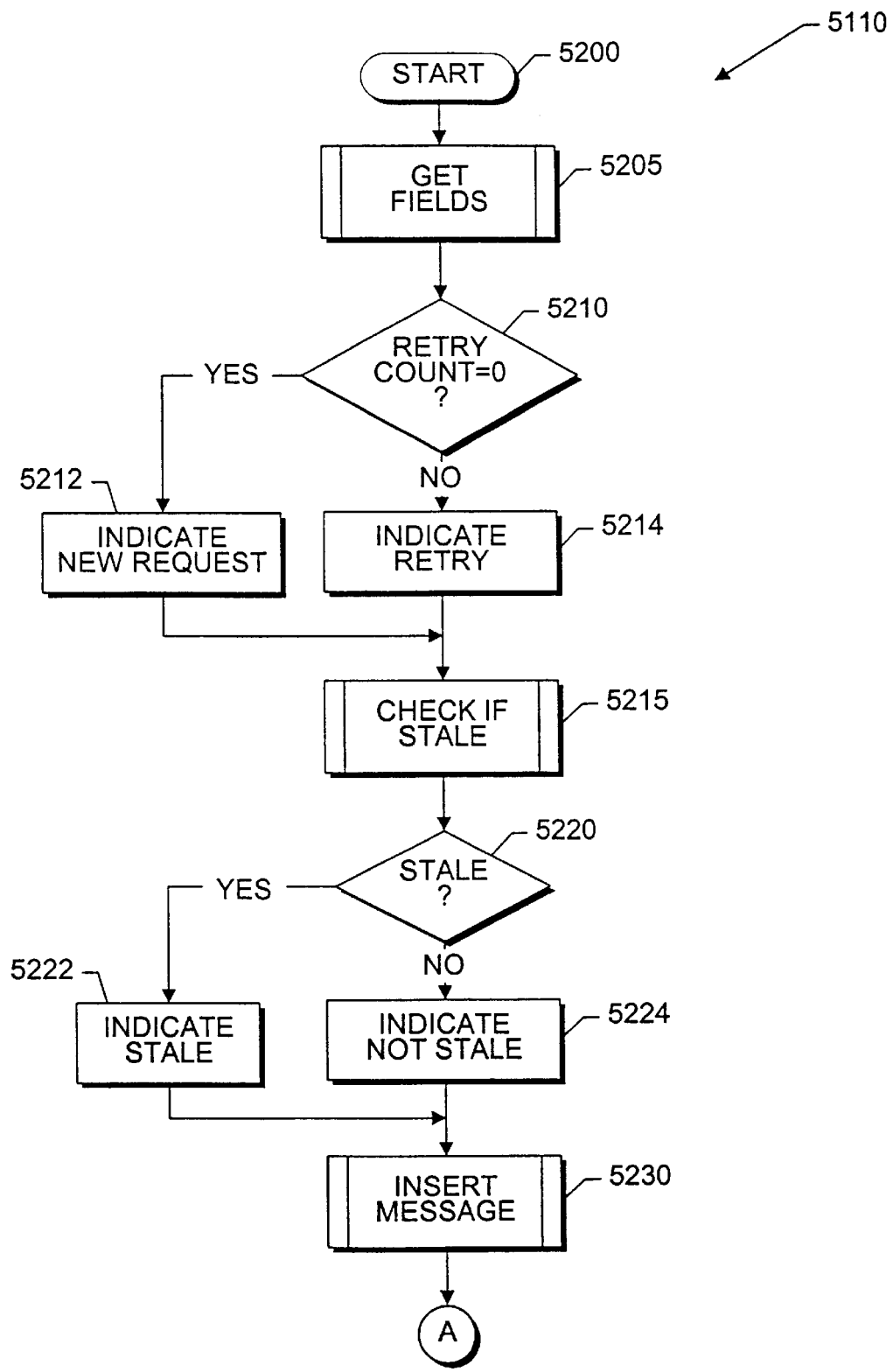
Figure 52B:
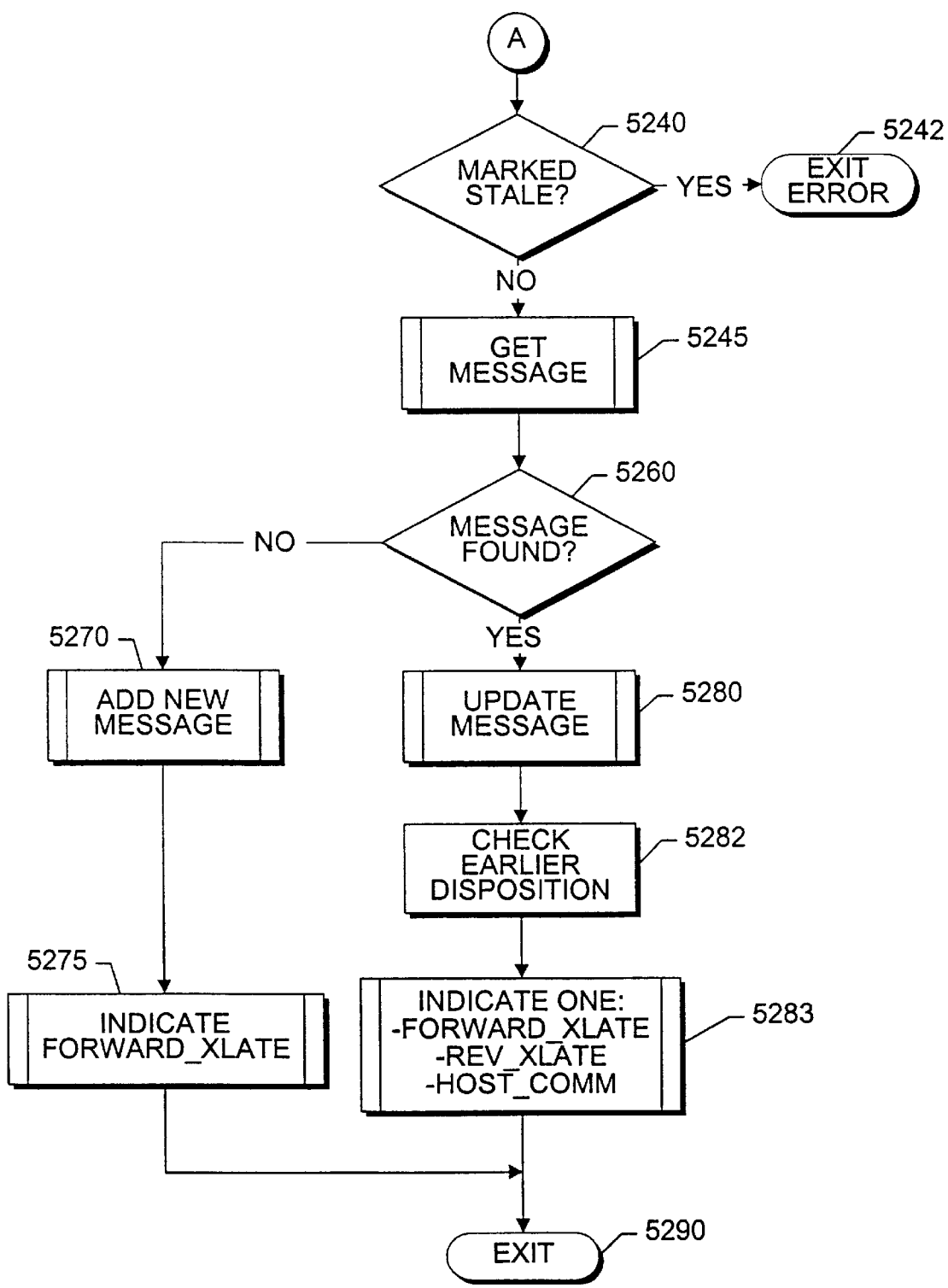

FIGS. 52A and 52B describe the AnalyzeSetRequest routine. This routine is by Step 5110 as illustrated in FIG. 51. Execution begins in Step 5200. In Step 5205 the various fields in the SET record are obtained, as will be more fully disclosed below with respect to FIGS. 56A and 56B. In Step 5210 the Gateway checks the retry count. A retry count is zero indicates that the request being analyzed is a new request, and control proceeds to Step 5212, indicating a new request. If the retry account is non-zero, this means that the request is a retry of a prior request, and control proceeds to Step 5214 where a retry is indicated.

Following either step 5212 or 5214, execution proceeds to Step 5215. In Step 5215 the Gateway checks to see whether the request represents a "stale request," as will be more fully described below with respect to FIG. 57. In Step 5220, the Gateway tests the result of the stale check from Step 5215. If the request is stale it is marked as stale in Step 5222. Otherwise the record is marked as not stale in Step 5224. Following either Step 5222 or Step 5224, control proceeds to Step 5230. In Step 5230 a message representing the SET request is inserted into the database for tracking purposes, and control proceeds to Step 5240.

In Step 5240 the Gateway checks to see if the request had been marked stale in Step 5222. If so, it proceeds to Step 5242, exiting with an error condition. In Step 5245, the Gateway attempts to retrieve from the database a message corresponding to the current SET request, as will be fully disclosed below with respect to FIG. 59. Step 5260 checks to see whether the message was successfully retrieved from the database. If the message was not found in the database, this indicates that the SET request represents a new message, and control proceeds to Step 5270. In Step 5270 a new message representing the SET request is added to the database, as is more fully disclosed below with respect to FIG. 60. Because this is a new request, it must be processed from the beginning, including forward translation. Therefore, after the new message is added in Step 5270, control proceeds to Step 5275. In step 5275, where a status flag is set indicating that the next step to be performed for this message is for translation. If the message was found in Step 5260, this indicates that the request represents a request that is already in progress. Therefore, control proceeds to Step 5280 to update the database with current information representing the request status. The update process is described in further detail with respect to FIG. 61, below. Following Step 5280, control proceeds to Step 5282. In Step 5282 the Gateway checks to see the disposition in which the SET request was left as a result of partial processing. This is done, for example, by interrogating fields in the database record that indicate the steps that have already been performed for this request. In Step 5283, based upon this status information, the Gateway indicates the next stage of processing to be performed: either forward translation, reverse translation, or communication with the host. After this status has been set, whether for a new request in Step 5275, or for an already-existing request in Step 5283, control proceeds to Step 5290, which exits the AnalyzeSetRequest routine, returning control to Step 5110 in FIG. 51.

The AnalyzeSetRequest routine as depicted in FIGS. 52A and 52B may be implemented using the following C++ code:

```
gwAction CGW_Engine::AnalyzeSetRequest(CPCLCCRequest*pVehicle, char
*fatalError)
{
    gwAction   action;
    gwDBRC     dbrc;
    gwRC       rc;
    int        retryCount;
    char       staleMsgFlag;
    *fatalError = _FALSE; // Default to "all is OK".
    // Extract the key SET fields that are required. The key
    // SET fields contain the primary key elements of the "setmsg"
    // table.
    if ( (rc=GetSetKeyFields(pVehicle))!= GW_SUCCESS)
        switch(rc){
            case GW_NOT_SUPPORTED:
                BuildSetErrorResponse(pVehicle,ISO_RESP_FUNC_NOT#SUPP);
                break;
            default:
                BuildSetErrorResponse(pVehicle,ISO_RESP_SYS_MALFUNC);
                break;
        }
        *fatalError=_TRUE; // Only place we return this!
        return (GW_PROCEED_TO_RESPOND);
    }
    else
        // Set this so that the front-end will be able to tell
        // whether enough information was derived from the request
```

-continued

```
   // in order to do update the "setmsg" log.
   m_haveKeyFields = 1;
 }
 // If the count of SET messages with current xid and rrpidbase is
 // non-zero then the message is an honest retry otherwise it
 // is a new request.
 if ((dbrc=Gwdb_GetSetMsgRetryCount(&retryCount)==GWDB_SUCCESS){
   if (retryCount == 0)
      m_setRequestClass= GW_SREQCL_NEW_REQUEST;
   else
      m_setRequestClass= GW_SREQCL_HONEST_RETRY;
 }
 else {
   BuildSetErrorResponse(pVehicle,ISO_RESP_SYS_MALFUNC);
   GW_LogError(LOG_ERR "Gwdb_GetSetMsgRetryCount(): %d", dbrc);
   return (GW_PROCEED_TO_RESPOND);
 }
 // Check whether the message is stale. If it is, we still
 // insert it into the database shortly but we will not process
 // it.
 Gwdb_IsSetMsgStale(&staleMsgFlag);
 if (staleMsgFlag ==_TRUE)
   m_setRequestDisposition= GW_SREQDI_STALE;
 else
   m_setRequestDisposition= GW_SREQDI_OK; // Not stale.
 // Log the "SET message" in the database. If the insert fails
 // then we must have a replay attack!
 dbrc = Gwdb_InsertSetMsg();
 switch (dbrc)
   case GWDB_SUCCESS:
      break;
   case GWDB_DUPLICATE_ON_INSERT:
      BuildSetErrorResponse(pVehicle,ISO_RESP_SECURITY_VIOLATION);
      dbrc = Gwdb_InsertReplayAttack();
      if (dbrc != GWDB_SUCCESS){
         GW_LogError(LOG_ERR "Gwdb_InsertReplayAttack(): %d", dbrc);
      }
      return (GW_PROCEED_TO_RESPOND);
      break;
   default:
      BuildSetErrorResponse(pVehicle,ISO_RESP_SYS_MALFUNC);
      GW_LogError( LOG_ERR "Gwdb_InsertSetMsg(): %d", dbrc);
      return (GW_PROCEED TO_RESPOND);
      break;
 }
 // If the message is stale do no more.
 if (m_setRequestDisposition== GW_SREQDI_STALE){
   BuildSetErrorResponse(pVehicle,ISO_RESP_SECURITY_VIOLATION);
   return (GW_PROCEED_TO_RESPOND);
 }
 // If we reach this far in this function then:
 //    i) the request is new or an honest retry AND
 //    ii) the request is not stale AND
 //    iii) a setmsg record has been added for this request.
 // If there is already a "host message" then update the key
 // with the new retry count. If there was not a "host message"
 // then insert one.
 dbrc = Gwdb_GetHostMsg();
 switch(dbrc) {
   case GWDB_SUCCESS:
      dbrc = Gwdb_UpdateHostMsgKeys();
      break;
   case GWDB_ROW_NOT_FOUND:
      dbrc = Gwdb_InsertHostMsg();
      if (dbrc != GWDB_SUCCESS)
         BuildSetErrorResponse(pVehicle,ISO_RESP_SYS_MALFUNC);
      }
      return(GW PROCEED_TO_FWD_XLAT);
      break;
   default:
      BuildSetErrorResponse(pVehicle,ISO_RESP_SYS_MALFUNC);
      GW_LogError( LOG_ERR, "Gwdb_GetHostMsg(): %d", dbrc);
      return (GW PROCEED_TO_RESPOND);
      break;
 }
 if (dbrc != GWDB_SUCCESS)
      BuildSetErrorResponse(pVehicle,ISO_RESP_SYS_MALFUNC);
      GW_LogError( LOG_ERR, "Gwdb_UpdateHostMsgKeys(): %d", dbrc);
      return (GW_PROCEED_TO_RESPOND);
```

-continued

```
}
}
// If this request is an honest retrv then determine if we
// can "short circuit" a) the forward translation, b) the
// communications to the host or c) the reverse translation
// all of which will save time.
if (m_setRequestClass == GW_SREQCL_HONEST_RETRY)
    switch (m_hostResponseDisposition){
  case GW_HRESDI_UNKNOWN:
      action = GW_PROCEED_TO_FWD_XLAT;
      break;
    case GW_HRESDI_RECEIVED_OK:
      action = GW_PROCEED_TO_REV_XLAT;
      break;
    case GW_HRESDI_REV_XLAT_FAILED:
      action = GW_PROCEED_TO_REV_XLAT;
      break;
    case GW_HRESDI_RECEIVE_FAILED:
    case GW_HRESDI_TIMEOUT:
      action = GW_PROCEED_WITH_HOST_COMMS;
      break;
    default:
      break;
    }
  }
  return (action);
}
```

TranslateForward

Figures 53, 58:
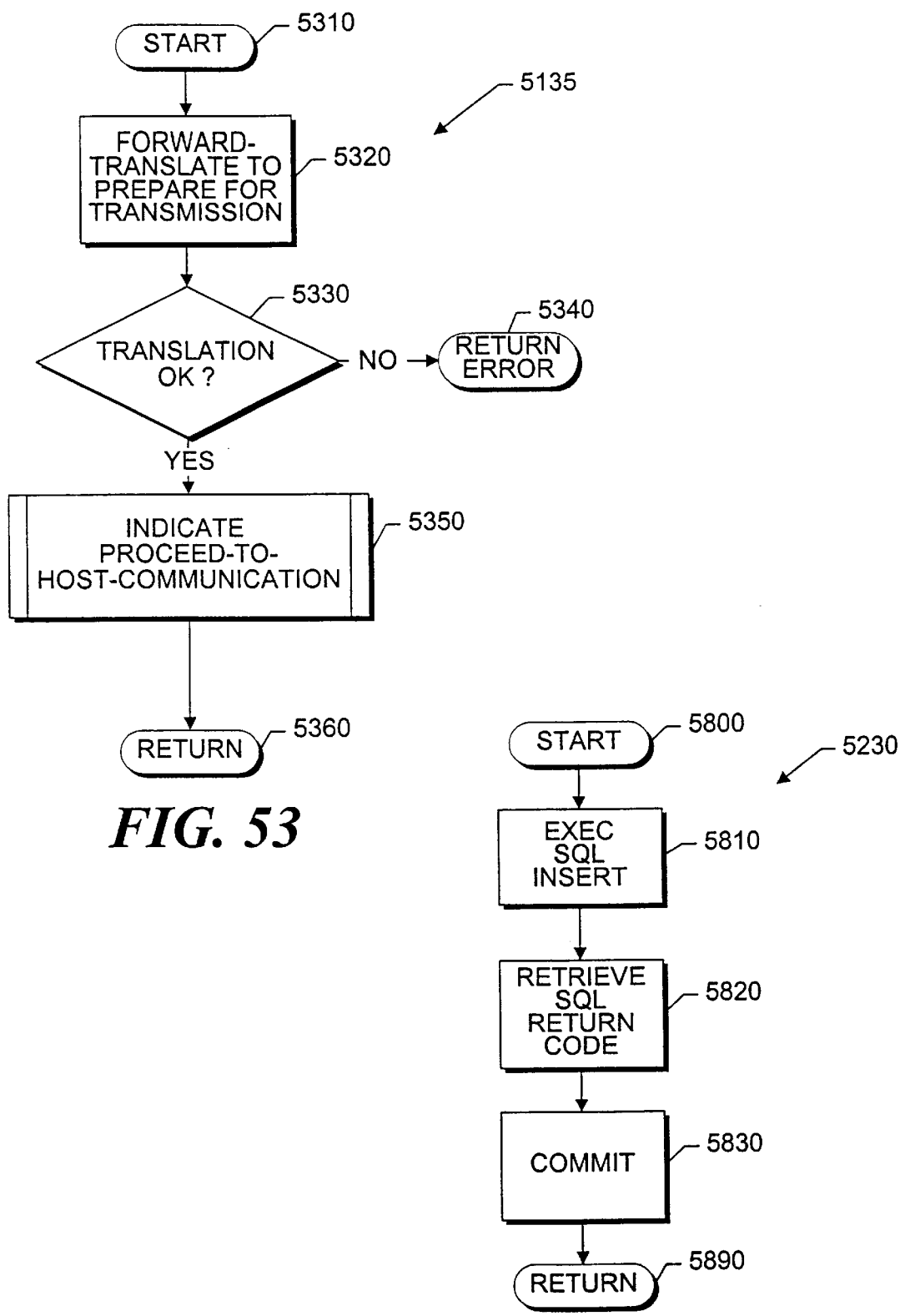

FIG. 53 depicts the execution of the TranslateForward routine, which is called by Step 5135 in FIG. 51. Execution begins at Step 5310. In Step 5320, the Gateway forward-translates the request to prepare it for transmission to the host. Forward translation consists of packaging the fields in the request into a format that is understandable by the legacy system at the financial institution. The exact format of the translated request will vary from institution to institution. However, in general, the format will consist of a fixed length record with predetermined fields, using a standard character set such as ASCII or EBCDIC. In Step 5330, the Gateway checks to see whether the translation was successfully performed. If not control proceeds to Step 5340, which returns an error condition. If the translation was successful, control proceeds to Step 5350. In Step 5350, the Gateway sets a status flag to indicate that the next stage to be performed for this SET request is to proceed to host communication. This will be used in the next iteration of the Gw_ClearSetRequestHandler routine as depicted in FIG. 51. After the status is set in Step 5350, the translate forward routine returns control in Step 5360.

The TranslateForward routine as depicted in FIG. 51 may be implemented using the following C++ code:

```
gwAction CGW_Engine::TranslateForward(CPCLCCRequest*pVehicle)
{
  gwRC      rc;
  gwDBRC    dbrc;
  rc = HM_TranslateForward(m_hostSpecificMessagepVehicle);
  if (rc == GW_SUCCESS)
     return (GW_PROCEED_WITH_HOST_COMMS);
  }
  m_hostRequestDisposition= GW_HREQDI_FWD_XLAT_FAILED;
  BuildSetErrorResponse(pVehicle,ISO_RESP_FORMAT_ERR);
  dbrc = Gwdb_UpdateHostMsgRequestDisp();
  if (dbrc != GWDB_SUCCESS)
     GW_LogError( LOG_ERR "GwdbUpdateHostMsgRequestDisp(): %d",
dbrc);
  }
  return (GW_PROCEED TQ_RESPOND);
}
```

DoHostCommunication

Figure 54:
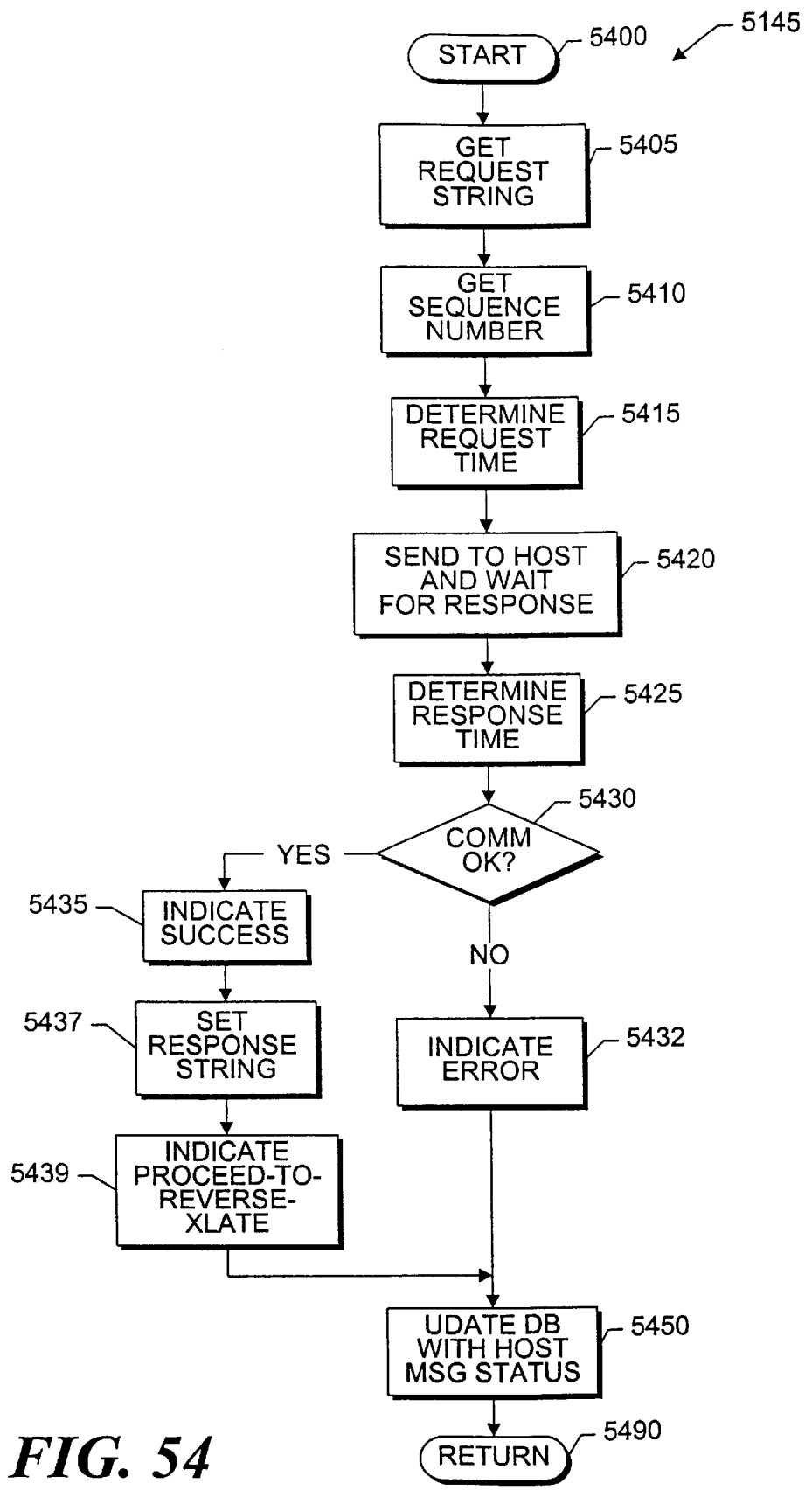

FIG. 54 depicts the step of host communication, as shown in Step 5145 in FIG. 51. Execution begins in Step 5400. In Step 5405 the Gateway obtains from the request object the string representing the request text. In Step 5410 it obtains the sequence number for the request. In Step 5415 the Gateway determines the current time, in order to record the time at which the request is made. In Step 5420 the Gateway sends the request to the host and waits for a response from the host. When a response is received, execution continues in Step 5425. In Step 5425, the Gateway again checks the current time, thereby determining the time at which a response was received. In Step 5430, the Gateway checks to see whether the communication was successfully performed. If a communication was not successful, the Gateway records that an error occurred in Step 5432. If the communication was successful, the Gateway, in Step 5435, indicates that the request was successfully sent and responded to. In Step 5437, the Gateway sets the response string based upon the response received in Step 5420. In Step 5439 the Gateway sets a status to indicate that reverse translation of the received response is required. Regardless of whether the communication was successful or unsuccessful, execution continues to Step 5450. In Step 5450, the database is updated with status information from the host communication. In Step 5490, control is returned to the calling routine.

The DoHostCommunication routine as depicted in FIG. 54 may be implemented using the following C++ code:

Step 5530, where a status flag is set indicating a successful translation. If translation was not successful, control proceeds to Step 5540, in which the Status Flag is set to indicate an unsuccessful translation. Regardless of whether translation was successful or unsuccessful, execution proceeds to Step 5550. In Step 5550, a status flag is set to indicate that the next stage for the request is to provide a response from the Gateway. This step is always executed, because, regardless of whether the translation or any other aspect of the

```
gwAction CGW_Engine: :DoHostCommunication(CPCLCCReques_pVehicle)
{
    gwHMRC        hmrc;
    gwDBRC        dbrc;
    gwAction      action = GW_PROCEED_TO_RESPOND;
    unsigned char hostRequestMessage[HOSTREQ_SZ+1];
    int           hostRequestLength=0;
    unsigned char hostResponseMessage[HOSTREQ_SZ+1];
    int           hostResponseLength=0;
    long          sequenceNo;
    HM_GetRequestString( m_hostSpecificMessage, &hostRequestMessage[0],
            &hostRequestLength);
    HM_GetSequenceNo( m_hostSpecificMessage, &sequenceNo);
    time( &m_hostRequestTime);
    hmrc = SendToHos+AndWait(
            &hostRequestMessage[0],hostRequestLength,
            &hostResponseMessage[0],&hostResponseLength);
    time( &m_hostResponseTime);
    switch(hmrc) {
        case GWHM_SUCCESS:
            m_hostRequestDisposition= GW_HREQDI_SENT_OK;
            m_hostResponseDisposition= GW_HRESDI_RECEIVED_OK;
    HM_SetResponseStrng(m_hostSpecificMessage, &hostResponseMessage_,
            hostResponseLength);
            action = GW_PROCEED_TO_REV_XLAT;
            break;
        case GWHM_SEND_FAILED:
            m_hostRequestDisposition= GW_HREQDI_SEND_FAILED;
            m_hostResponseDisposition= GW_RRESDI_UNKNOWN;
            break;
        case GWRM_RCV_FAILED:
            m_hostRequestDisposition= GW_HREQDI_SENT_OK
            m_hostResponseDisposition= GW_HRESDI_RECEIVE_FAILED
            break;
        case GWRM_RCV_TIMEOUT:
            m_hostRequestDisposition= GW_HREQDI_SENT_OK
            m_hostResponseDisposition= GW_HRESDI_TIMEOUT;
            break;
        default:
            break;
    }
    if (hmrc != GWHM_SUCCESS)
        BuildSetErrorResponse(pVehicle,ISO_RESP_ISSUER_INOP);
    }
    dbrc = Gwdb_UpdateRostMsgAllInfo(sequenceNo,
            &hostRequestMessage[0],hostRequestLength,
            &hostResponseMessage[0], hostResponseLength);
    if (dbrc != GWDB_SUCCESS)
        BuildSetErrorResponse(pVehicle,ISO_RESP_SYS_MALFUNC);
        GW_LogError( LOG_ERR "Gwdb_UpdateHostMs_flInfo(): %d", dbrc);
    return (action);
    }
}
```

TranslateReverse

Figure 55:
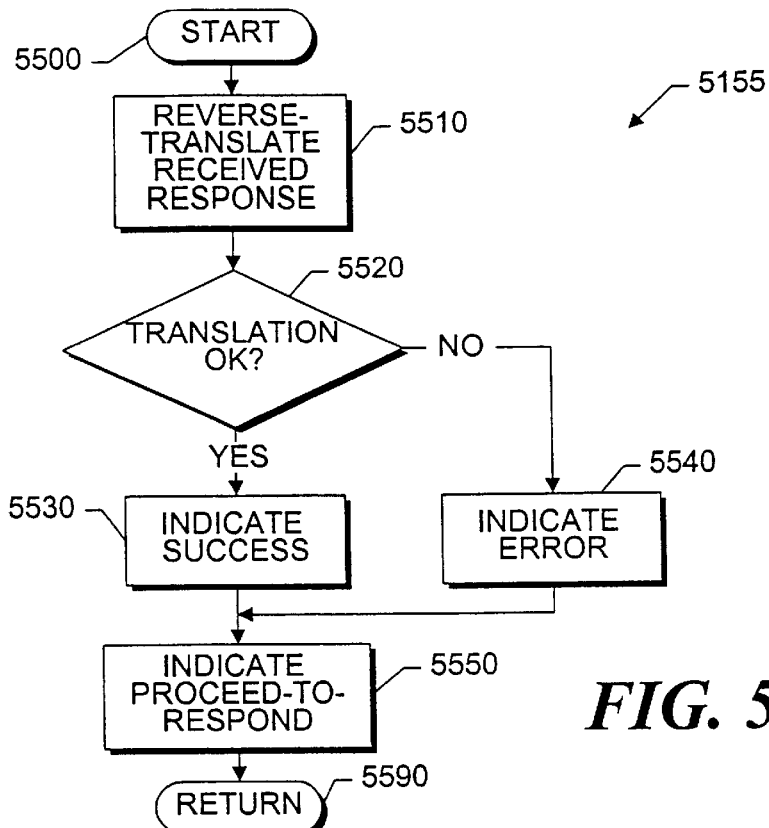

FIG. 55 depicts the operation of the TranslateReverse routine, as executed in Step 5155 in FIG. 51. Execution begins at Step 5500. In Step 5510 the Gateway reverse-translates the response received from the legacy system host. Reverse translation consists of extracting data from the data records received from the legacy system, and placing them in objects so that they are useable by the Gateway. In Step 5520, the Gateway checks to verify that translation was successful. If translation was successful control proceeds to transaction was successful, a response indicating either success or failure must be returned by the Gateway. Control then proceeds to Step 5590, in which the TranslateReverse routine returns control to the calling routine in FIG. 51. It will be seen that the TranslateForward routine in FIG. 53, the DoHostCommunication routine depicted in FIG. 54, and the TranslateReverse routine depicted in FIG. 55, each alter the status of the request. As a result as the loop depicted in FIG. 51 executes a particular request will proceed through all three stages and finally to exit in Step 5190.

The TranslateReverse routine as depicted in FIG. 55 may be implemented using the following C++ code:

```
gwAction CGW_Engine::TranslateReverse(CPCLCCReques_pVehicle)
    gwRC       rc;
    gwDBRC     dbrc;
rc = HM_TranslateReverse(m_hostSpecificMessagepVehicle);
if (rc == GW_SUCCESS)
    // Success; we have a normal PDU to send back to vPOS!
    // If there is any problem further to this (eg: PCL/ASN libs)
    // that the frond-end is responsible for calling the method
    // LogsetErrorResponse()on this engine instance.
    m_setResponseClass= GW_SRESCL_APP_NORMAL_PDU
    m_setResponseDisposition= GW_SRESDI_SENT_OK;
    HM_GetResponseCode(m_hostSpecificMessage _n_setResponseCode);
}
else {
    m_hostResponseDisposition= GW_HRESDI_REV_XLAT_FAILED;
    BuildSetErrorResponse(pVehicle,ISO_RESP_INVALID_RESPONSE);
    dbrc = Gwdb_UpdateHostMsgResponseDisp();
    if (dbrc != GWDB_SUCCESS) {
       GW_LogError( LOG_ERR "Gwdb_UpdateHostMsgResponseDisp():
%d", dbrc);
    }
}
// Whether there was a transation error or not we need to respond.
return (GWYROCEED TO_RESPOND);
}
```

GetSetKeyFields

Figure 56A:
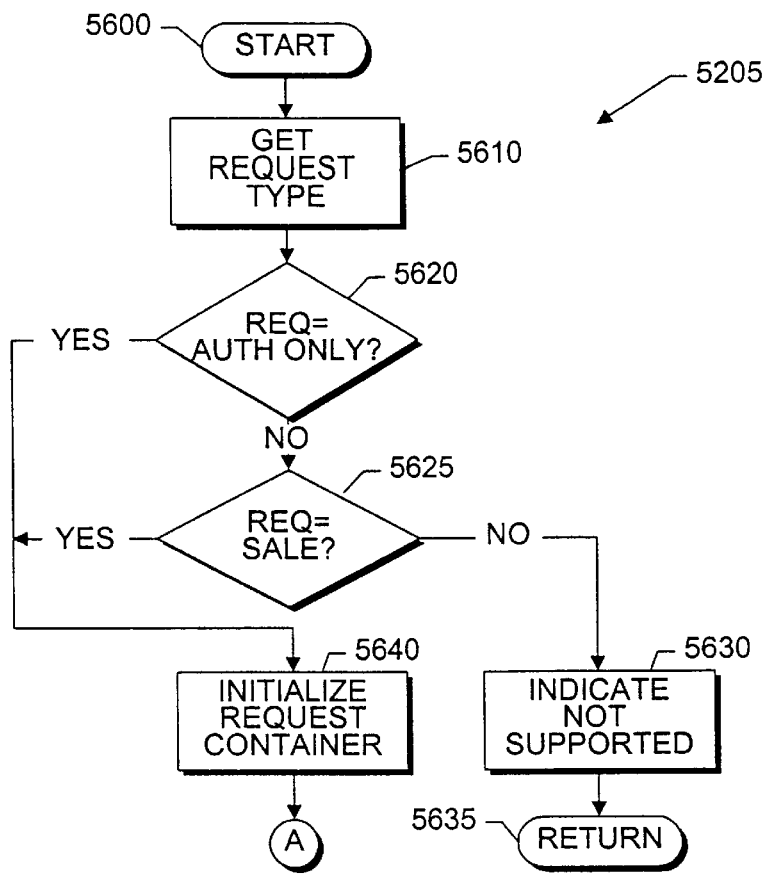
Figure 56B:
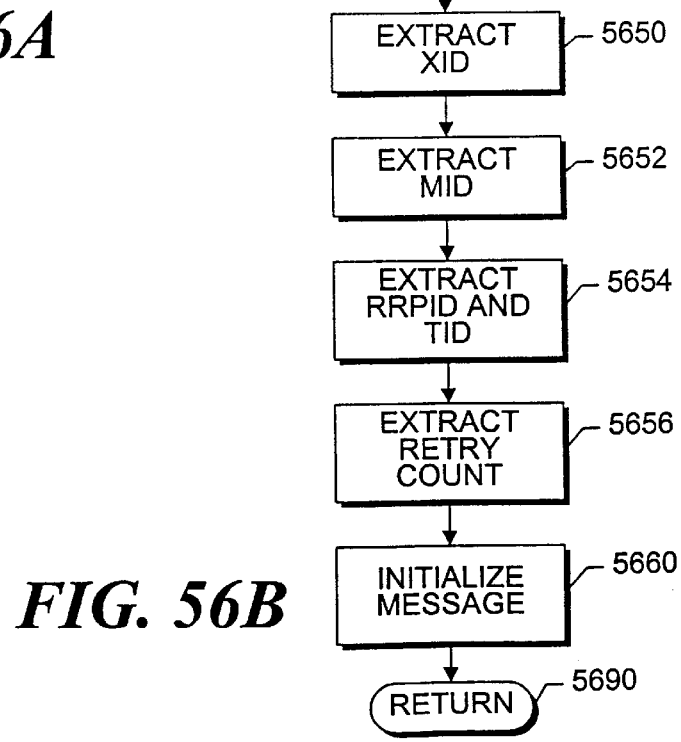

FIGS. 56A and 56B describe the GetSetKeyFields routine. This routine is called by Step 5205 as illustrated in FIG. 52A. Execution begins in Step 5600. In Step 5610, the Gateway interrogates the request object to determine the request type. In Step 5620, the Gateway determines whether the request type is for authorization only. If the request type is not for authorization only, execution proceeds to Step 5625. In Step 5625, the Gateway checks to see whether the request type is for a sale. If the request type is neither for authorization only nor for a sale, execution proceeds to Step 5630. In Step 5360, the Gateway indicates that the request type is not a supported request, and proceeds to Step 5635, where it returns to the caller.

If the request type is either for authorization only or for a sale, execution proceeds with Step 5640. In step 5640, the Gateway initializes a container object to represent the request. In Step 5650, the Gateway extracts the [transaction identifier?] (XID) for the transaction. In Step 5652, the Gateway extracts the merchant identifier (MID) for the transaction. In Step 5654, the Gateway extracts the [what is the RRPID?] (RRPID) and the terminal identifier (TID) for the request. In Step 5656, the Gateway extracts the retry count associated with the current request. In Step 5660, a message data area is initialized with the extracted contents. The message area can then be used for further processing by the called routine. In Step 5690, the GetSetKeyFields routine returns control to the caller.

The GetSetKeyFields as depicted in FIGS. 56A and 56B may be implemented using the following C++ code:

```
gwRC CGW_Engine::GetSetKeyFields(CPCLCCRequest*pVehicle)
{
    gwRC         transRc = GW_SUCCESS;
    unsigned int got;
    char         s_RrpidTid[2*XID_SZ];
    unsigned long rrpid;
    unsigned long tidOffset;
      m_setKeyFields.reqType=pVehicle->GetRequestType();
      switch(m_setKeyFields.reqType){
      case CPCLRequest::CCAuthOnly:
      case CPCLRequest::CCSale:
        {
        // Initial cast to correct subclass.
        CASNAuthorizationRequestDataContainer*s_req =
            ((CPCLCCAuthOnlyRequest*)pVehicle)->GetRequestContainer()-
>get_data()->get_data();
//xid
        s_req->get_transaction_id()->get_x_id() ->
        get_value((unsigned char*) &m_setKeyFields.xid,XID_SZ &got);
// mid
#ifdef JUNE_3RD
        strncpy(m_setKeyFields.mid, "42581", MID_SZ);
#else
```

```
    // TODO: get code from Deepak for pulling MID out of s_req!
    strncpy(m_setKeyFields.mid, "42581", MID_SZ);
    //bah!
#endif
//--------------------------------------------------------------
    // NOTE: We have agreed with VPOS team that the RRPID field
    // will contain the following:
    //
    //      <rrpid><space><tid><null>
    //
    // where <rrpid> is a string representing the rrpid value
    // and <tid> is a string representing the tid value.
    //
//--------------------------------------------------------------
        memset(s_RrpidTid,'[0]' sizeof(s_RrpidTid));
        s_req->get AuthorizationRequestData extensions()->
          get_auth_req_res_pair_id()->
          get_value( (unsigned char*) &s_RrpidTid, sizeof(s_RrpidTid), &got);
        // get rrpid and offset to the tid.
        sscanf(s_RrpidTid, "%d %n", &rrpid, &tidOffset);
        // rrpidBase and retryCount
        m_setKeyFields.retryCount=rrpid % 100;
        m_setKeyFields.rrpidBase=rrpid - m_setKeyFields. retryCount;
        // tid
    strncpy(m_setKeyFields.tid,(s_RrpidTid+tidOffset),TID_SZ);
        // reqDate
        GW_GetTimeFromASNTime(&(m_setKeyFields.merchantTime),
                    s_req->get_authorization_request_date());
      break;
      }
    case CPCLRequest::CCAuthReversal:      // == Void
    case CPCLRequest::CCCreditReversal:
    case CPCLRequest::CCCapture:
    case CPCLRequest::CCCredit:            // == Refund Return
    case CPCLRequest::CCCaptureReversal:   // == Void
    // case eBalInquiry:
    transRc = GW_NOT_SUPPORTED;
      break;
    default:
      transRc = GW_NOT_SUPPORTED;
      break;
    }
    // Initialize the host message will with the key fields "in the clear"!
    if (m_hostSpecificMessage==NULL){
      transRc = GW_FAILED;
    }
    else{
      HM_Initialize(m_hostSpecificMessage,&m_setKeyFields);
    }
    return (transRc);
}
```

Gwdb IsSetMsgStale

Figure 57:
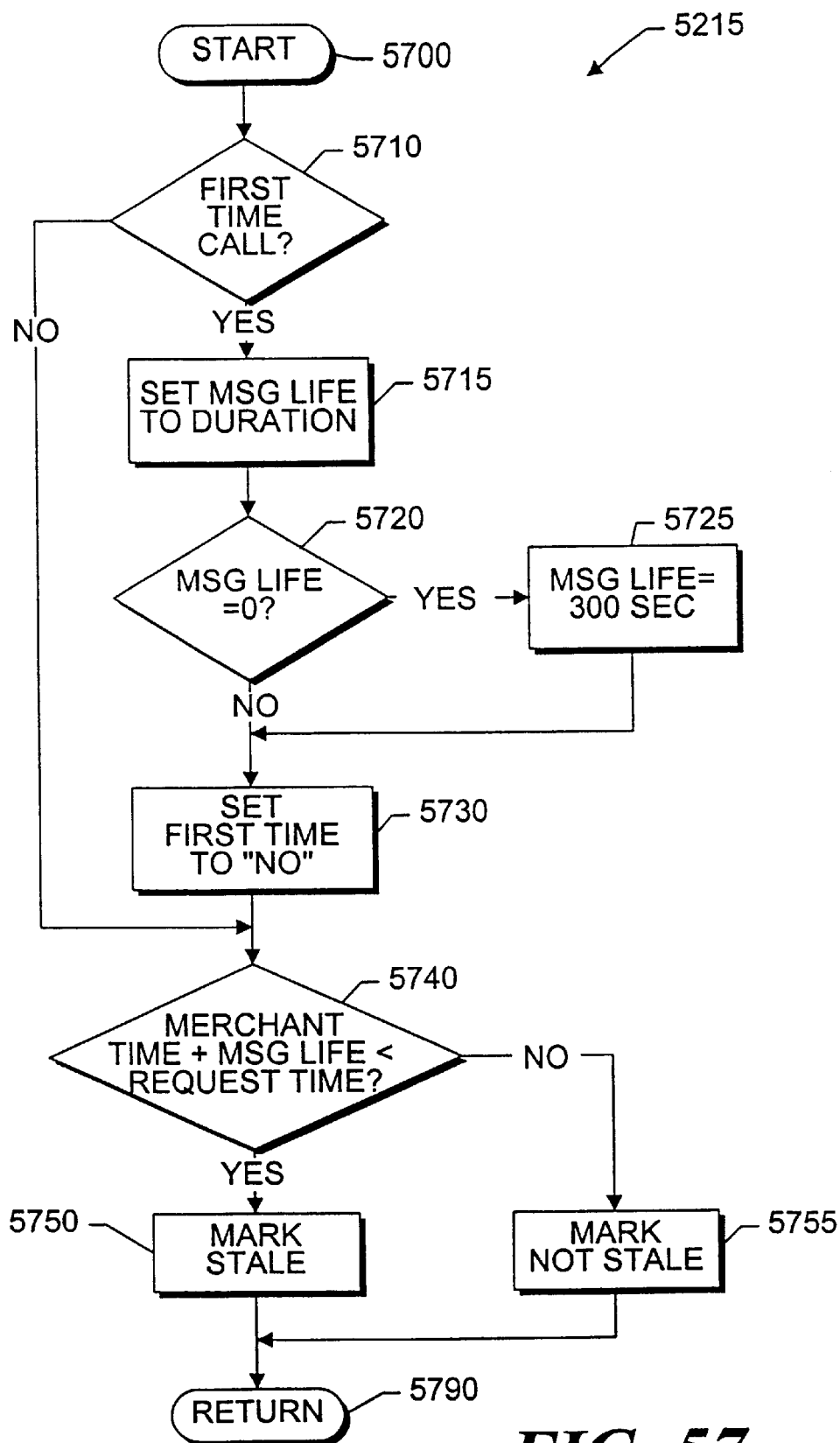

FIG. 57 depicts the Gwdb_IsSetMsgStale routine. This routine is called by Step 5215 as illustrated in FIG. 52A. Execution begins in Step 5700. In Step 5710, the Gateway checks to see whether this is the first time the Gwdb_IsSetMsgStale has been called for this request. If this is the first time, Steps 5715 through 5730 are performed; otherwise those steps are skipped. In Step 5715, a field representing the message life is initialized to a predetermined duration. The message life is a field that will be used to determine how long the message representing the transaction will remain valid. The use of the message life field prevents a transaction that is effectively lost due to extensive processing delays from being processed. In Step 5720, the Gateway checks to see if the value of the message life is equal to zero. If the message life is equal to zero, a default value, i.e., 300 seconds or 5 minutes, is assigned to the message life in Step 5725. In Step 5730, an indicator for this request is set to indicate that first time processing has already been performed for this request. This flag is the same flag interrogated in Step 5710, and is used to prevent successive reinitialization of the message life field.

In Step 5740, the Gateway checks to see whether the merchant's time stamp, plus the value of the message life, is less than the time of the request. If so, then the request is considered stale, and is marked stale in Step 5750. If not, the request is not stale, and is marked not stale in Step 5755. Following either of Step 5750 or 5755, the Gwdb_IsSetMsgStale exits in Step 5790. The Gwdb_IsSetMsgStale routine as depicted in FIG. 57 may be implemented using the following C++ code:

```
void CGW_Engine::Gwdb_(sSetMagStale(char*staleFlag)
{
  static char gotStaleDuration=0;
```

-continued

```
    static long setMsgLife;
    static char *funcName = "Gwdb_IsSetMsgStale";
    // Only get this once per process lifetime.
    if (gotStaleDuration==0){
        FILE    *fp;
        char    duration[INI_MAXLNSZ+1];
    if ((fp=OpenIniFile())!=NULL){
            setMsgLife = 0;
            (void) iniGetParameter(fp,"GATEWAYADMIN","SetMsgLife",
duration);
            setMsgLife = atol(duration); // could return 0; handled later.
            (void) CloseIniFile(fp);
        }
        if (setMsgLife == 0){
            setMsgLife = 5 * 60; // Default to 5 minutes;
        }
    gotStaleDuration = 1;
        }
    // If the message has expired its lifetime.
        if ((m_setKeyFields.merchantTime+setMsgLife)<m_setRequestTime)
            *staleFlag = _TRUE;      // request is stale.
        else
            *staleFlag = _FALSE;     // honour request, it is not stale.
    return;
}
```

Gwdb_InsertSetMsg

FIG. 58 depicts the Gwdb_InsertSetMsg routine. This routine is called from Step 5230 as illustrated in FIG. 52A. Execution begins in 5800. In Step 5810, the routine invokes a database insert function by, for example, executing an SQL INSERT command. In Step 5820, the database return code is obtained in order to be used as a return code from the Gwbd_InsertSetMsg routine. In Step 5830, a database commit function is performed, thereby instructing the database engine to commit the database changes to a permanent recording, i.e., by writing the information to the file, and/or by journalizing the change made by INSERT function. In Step 5890, the routine returns control to the calling program.

The Gwdb_InsertSetMsg as depicted in FIG. 58 may be implemented using the following C++ code:

```
gwDBRC CGW_Engine::Gwdb_InsertSetMsg()
{
EXEC SQL BEGIN DECLARE SECTION;
    //Key.
        char        *h_xid                  =&(m_setKeyFields.xid[0]);
        long        h_rrpidBase             =m_setKeyFields.rrpidBase;
        int         h_retryCount            =m_setKeyFields.retryCount;
    // Columns to insert into.
        char        *h_mid                  =&(m_setKeyFields.mid[0]);
        char        *h_tid                  =&(m_setKeyFields.tid[0]);
        char        h_merchantTime[26];
        int         h_requestType           =(int) m_setKeyFields.reqType;
        char h_requestTime[26];
        int         h_requestClass          =(int) m_setRequestClass;
        int         h_requestDisposition    =(int) m_setRequestDisposition;
        char h_responseTime[26];
        int         h_responseClass         =(int) m_setRequestClass;
        int         h_responseDisposition   =(int) m_setResponseDisposition;
        char        *h_responseCode         =m_setResponseCode;
EXEC SQL END DECLARE SECTION;
static char *funcName = "Gwdb_InsertSetMsg";
    gwDBRC dbrc;
GW_MakeDateString(h_merchantTime,&m_setKeyFields.merchantTime));
    GW_MakeDateString(h_requestTime,&m_setRequestTime);
    GW_MakeDateString(h_responseTime,&m_setResponseTime);
EXEC SQL INSERT INTO setmsg
        (
            xid, rrpidbase, retrycount, mid, tid,
            merchanttime,
            requesttype,
            requesttime,
            requestclass, requestdisposition,
            responsetime,
            responseclass, responsedisposition, responsecode
        )
        VALUES
        (
```

-continued

```
        :h_xid, :h_rrpidBase, :h_retryCount, :h_mid, *h_tid,
        TO_DATE(:h_merchantTime,'DY MON DD HH24:MI:SS YYYY'),
        :h_requestType,
        TO_DATE(:h_requestTime, 'DY MON DD HH24:MI:SS YYYY'),
        :h_requestCass, :h_requestDisposition,
        TO_DATE(:h_responseTime, 'DY MON DD HH24:MI:SS YYYY'),
        :h_responseClass, :h_responseDisposition, :h_responseCode
    );
    dbrc Db_Error(funcName);
(void) Db_Commit(funcName);
return (dbrc);
}
```

Gwbd GetHostMsg

Figure 59:
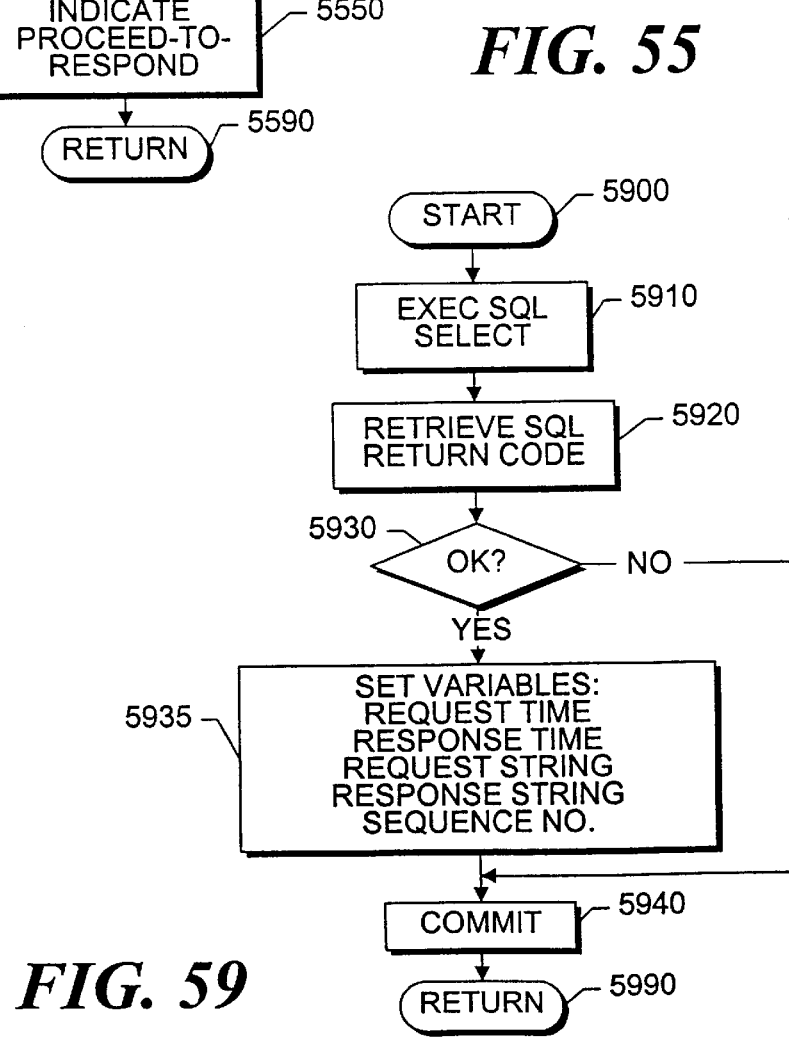

FIG. 59 depicts the Gwbd_GetHostMsg routine. This routine is called by Step 5245 as shown in FIG. 52B. Execution begins in Step 5900. In Step 5910, the routine invokes a database select function by, for example, executing an SQL SELECT command. In Step 5920, the database return code is obtained in order to be used as a return code from the Gwbd_InsertSetMsg routine. In Step 5930, the Gateway checks to see whether the database retrieve operation was successfully performed. If so, execution proceeds to Step 5935. In Step 5935, the Gateway sets a number of status variables from the values retrieved from the database records. This includes the time the request was made, the time a response was received, the contents of the request string, the contents of the response string, and a sequence number for this request. In Step 5940, a commit operation is performed. (What is the point of a commit operation following a retrieval, as opposed to an insert or an update? In Step 5900, control returns to the calling program.

The Gwdb_GetHostMsg as depicted in FIG. 59 may be implemented using the following C++ code:

```
gwDBRC CGW_Engine::Gwdb_GetHostMsg()
{
    struct tm    requestTimeTM;
    struct tm    responseTimeTM;
    EXEC SQL BEGIN DECLARE SECTION;
        //Key.
        char    *h_xid            = &(m_setKeyFields.xid[0]);
        long    h_rrpidBase       = m_setKeyFields.rrpidBase;
    // Indicator Variables.
        short   h_requestStringInd;
        short   h_responseStringInd;
    // Columns to retreive.
        long    h_sequenceNo =====0;
        int     *h_reqYear = &requestTimeTM.tm_year;
        int     *h_reqMonth = &requestTimeTM.tm_mon;
        int     *h_reqDay = &requestTimeTM.tm_mday;
        int     *h_reqHour = &requestTimeTM.tm_hour;
        int     *h_reqMinute = &requestTimeTM.tm_min;
        int     *h_reqSecond = &requestTimeTM.tm_sec;
        int     *h_requestDisposition = (int*)&m_hostRequestDisposition;
        VARCHAR h_requestString[128];
        int     *h_resYear = &responseTimeTM.tm_year;
        int     *h_resMonth = &responseTimeTM.tm_mon;
        int     *h_resDay = &responseTimeTM.tm_mday;
        int     *h_resHour = &responseTimeTM.tm_hour;
        int     *h_resMinute = &responseTimeTM.tm_min;
        int     *h_resSecond = &responseTimeTM.tm_sec;
        int     *h_responseDisposition = (int*) &m_hostResponseDisposition;
        VARCHAR h_responseString[128];
    EXEC SQL END DECLARE SECTION;
        static char    *funcName = "Gwdb_GetHostMsg";
        gwDBRC dbrc;
        // Set the "tm⇆ structures to null. Set tm_isdst to -1 so that the
        // mktime() function W_11 determine if whether Daylight Savings Time
        // is active.
        memset(&requestTimeTM,'[0]', sizeof(tm));
        requestTimeTM.tm_isdst=-1;
        memset(&responseTimeTM,'[0]', sizeof(tm));
        responseTimeTM.tm_isdst=-1;
        EXEC SQL SELECT
            sequenceno,
            TO_NUMBER(TO_CHAR(requesttime,'YYYY'))-1900, // see "man mktime"
            TO_NUMBER(TO_CHAR(requesttime,'MM'))-1, // see "man mktime"
            TO_NUMBER(TO_CHAR(requesttime,'DD')),
```

```
    TO_NUMBER(TO_CHAR(requesttime,'HH24')),
    TO_NUMBER(TO_CHAR(requesttime,'MI')),
    TO_NUMBER(TO_CHAR(requesttime,'SS')),
  requestdisposition, requeststring,
    TO_NUMBER(TO_CHAR(responsetime,'YYYY'))-1900, // see "man mktime"
    TO_NUMBER(TO_CHAR(responsetime,'MM'))-1, // see "man mktime"
    TO_NUMBER(TO_CHAR(responsetime,'DD')),
    TO_NUMBER(TO_CHAR(responsetime,'HH24')),
    TO_NUMBER(TO_CHAR(responsetime,'MI')),
    TO_NUMBER(TO_CHAR(responsetime,'SS')),
responsedisposition, responsestring
    INTO
:h_sequenceNo,
:h_reqYear, :h_reqMonth :h_reqDay, :h_reqHour, :h_reqMinute, :h_reqSecond,
:h_requestDisposition,:h_requestString:h_requestStringInd,
:h_resYear, :h_resMonth, :h_resDay, :h_resHour :h_resMinute :h_resSecond,
:h_responseDisposition,:h_responseString:h_responseStringInd
    FROM
      hostmsg
    WHERE
      xid=:h_xidAND
      rrpidbase = :h_rrpidBase;
dbrc = Db_Error(funcName);
if (dbrc == GWDB_SUCCESS)
    if (h_requestStringInd == -1) h_requestString.len=0;
    if (h_responseStringInd ==-1) h_responseString.len=0;
    m_hostRequestTime=mktime(&requestTimeTM);
    m_hostResponseTime=mktime(&responseTimeTM);
      HM_SetRequestString(m_hostSpecificMessage,
         h_requestString.arr,
         h_requestString.len);
    HM_SetResponseString(m_hostSpecificMessage,
         h_responseString.arr,
         h_responseString.len);
    HM_SetSequenceNo(m_hostSpecificMessage,h_sequenceNo);
    }
(void) Db_Commit(funcName);
return (dbrc);
}
```

Gwdb_InsertHostMsg

Figure 60:
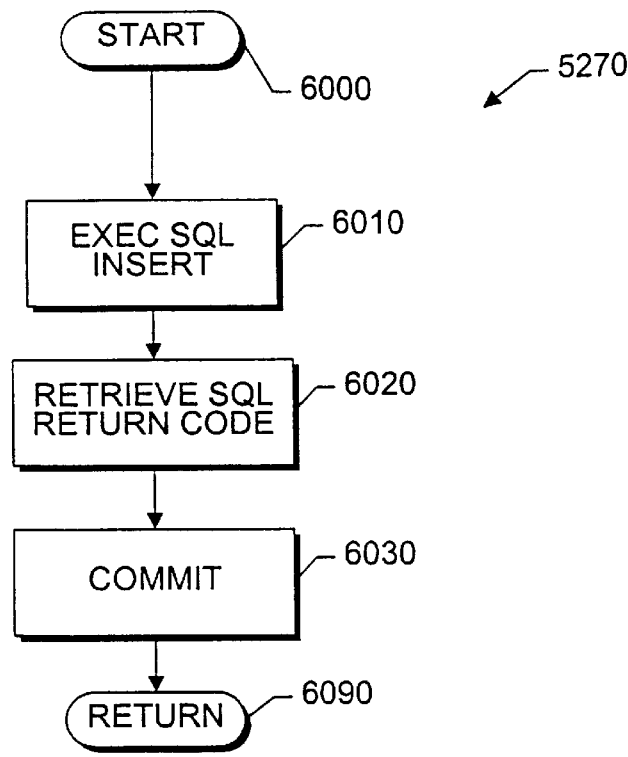

FIG. 60 depicts the Gwdb_InsertHostMsg routine. This routine is called by Step 5270 as illustrated in FIG. 52B. Execution begins in Step 6000. In Step 6010, the routine invokes a database insert function by, for example, executing an SQL INSERT command. In Step 6020, the database return code is obtained in order to be used as a return code from the Gwbd_InsertSetMsg routine. in Step 6040, a commit operation is performed. In Step 6090, the routine returns control to the calling program.

The Gwdb_InsertHostMsg as depicted in FIG. 60 may be implemented using the following C++ code:

```
gwDBRC CGW_Engine::Gwdb_InsertHostMsg()
{
EXEC SQL BEGIN DECLARE SECTION;
  // Key.
    char   *h_xid            =&(m_setKeyFields.xid[0]);
    long   h_rrpidBase       =m_setKeyFields.rrpidBase;
    int    h_retryCount      =m_setKeyFields.retryCount;
  // Columns to insert into.
    long   h_sequenceNo          ≦0;
    char   h_requestTime[26];
    int    h_requestDisposition = (int) m_hostRequestDisposition;
    char   h_responseTime[26];
    int    h_responseDisposition = (int) m_hostResponseDisposition;
EXEC SQL END DECLARE SECTION;
    static char   *funcName = "Gwdb_InsertHostMsg";
    gwDBRC dbrc;
    GW_MakeDateString(h_requestTime,&m_hostRequestTime);
    GW_MakeDateString(h_responseTime,&m_hostResponseTime);
    EXEC SQL INSERT INTO hostmsg
      (
        xid, rrpidbase, retrycount,
        sequenceno,
        requesttime,
        requestdisposition,
        responsetime,
```

```
        responsedisposition
        )
    VALUES
        (
        :h_xid :h_rrpidBase, :h_retryCount,
        :h_sequenceNo,
        TO_DATE(:h_requestTime,'DY MON DD HH24:MI:SS YYYY'),
        :h_requestDisposition,
        TO_DATE(:h_responseTime,'DY MON DD HH24:MI:SS YYYY'),
        h_responseDisposition
        );
    dbrc = Db_Error(funcName);
    (void) Db_Commit(funcName);
    return (dbrc);
}
```

Gwdb_UpdateSetMsgResponseInfo

Figure 61:
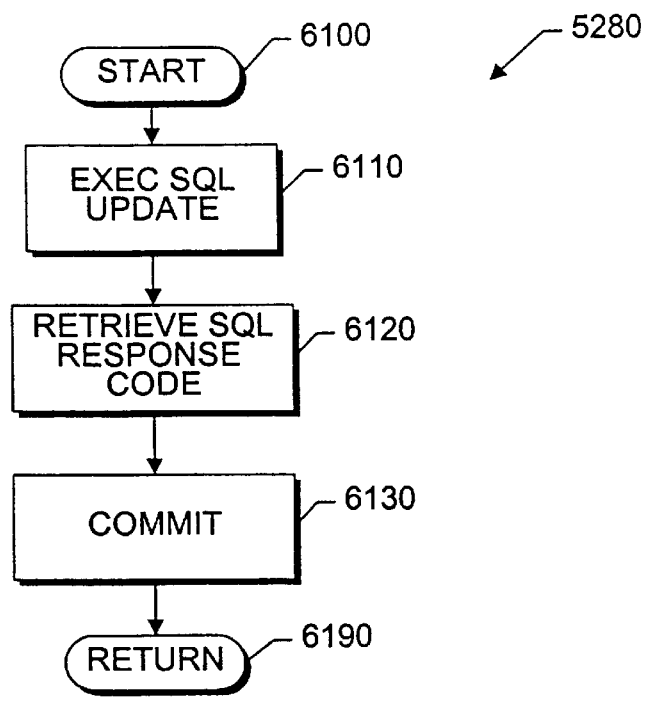

FIG. 61 depicts a flow diagram for the Gwdb_UpdateSetMsgResponseInfo routine. Execution begins at Step 6100. In Step 6110, the routine invokes a database update function by, for example, executing an SQL UPDATE command. In Step 6120, the database return code is obtained in order to be used as a return code from the Gwbd_UpdateSetMsgResponseInfo routine. In Step 6190, the routine returns control to the calling program.

Figure 64:
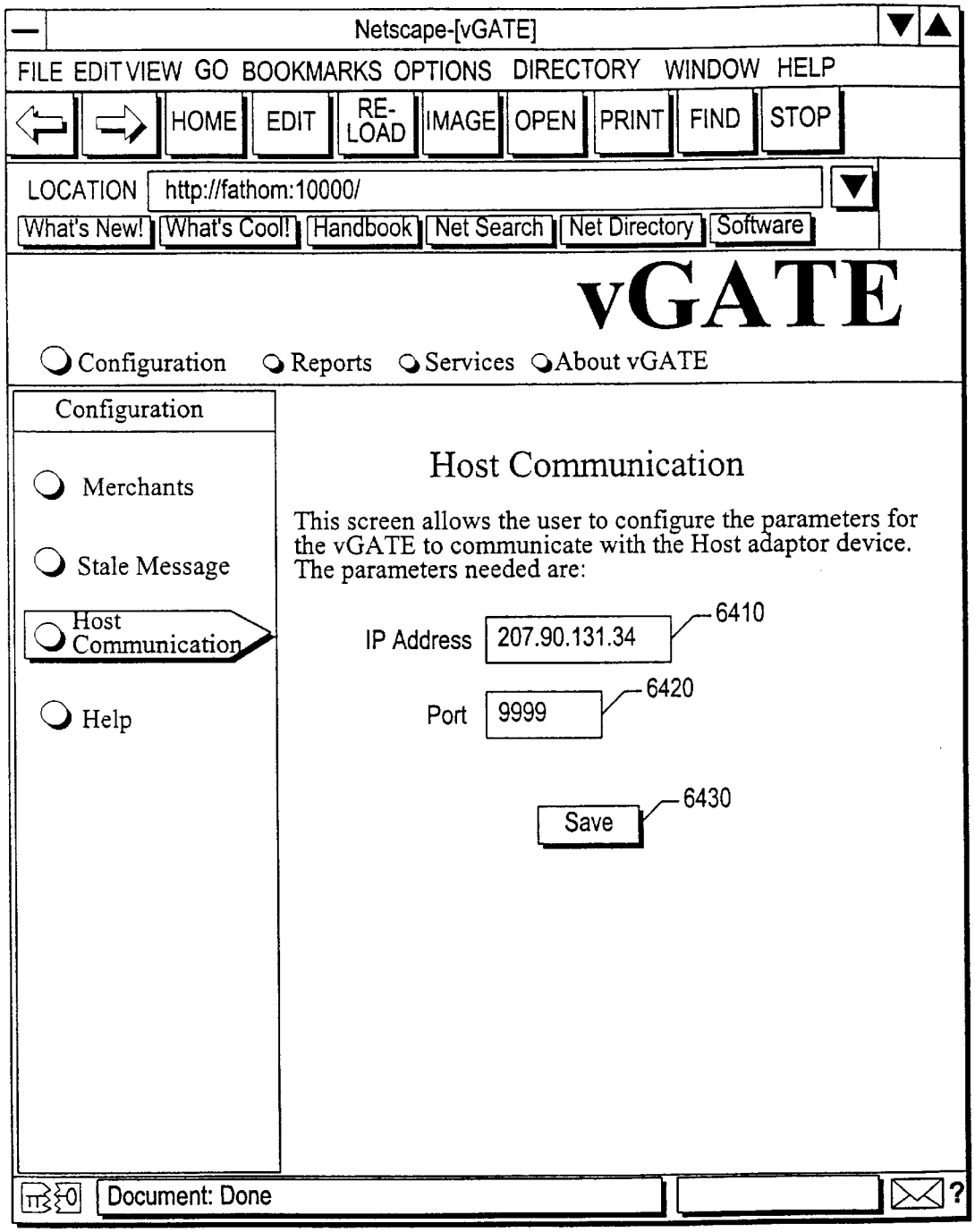
FIG. 64 is a host communication display for facilitating communication between the gateway and the acquirer payment host in accordance with a preferred embodiment.
Figure 65:
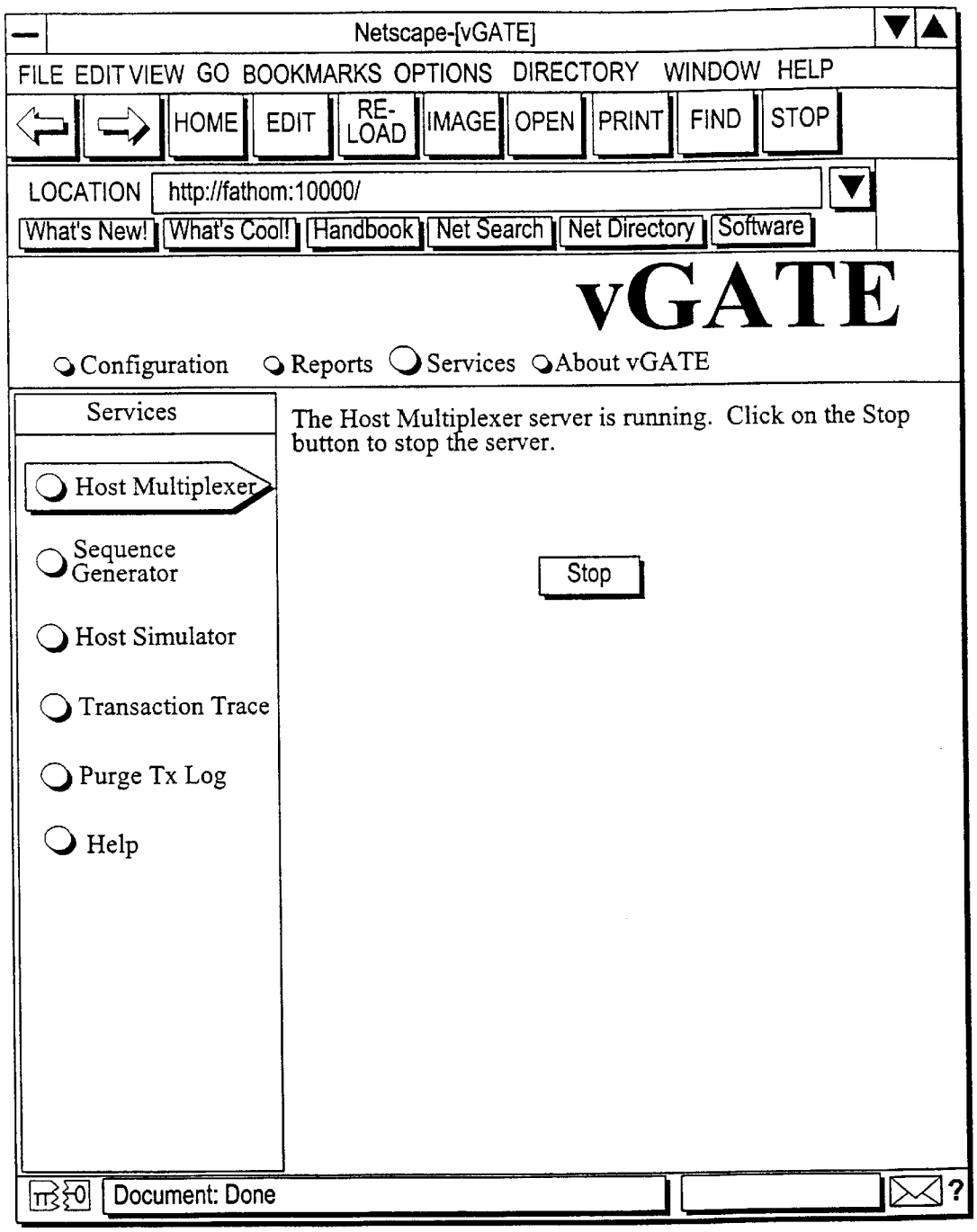
FIG. 65 is a Services display in accordance with a preferred embodiment.

The Gwdb_UpdateSetMsgResponseInfo as depicted in FIG. 61 may be implemented using the following C++ code:

hyperlinks to detailed panels for modifying information in the management information database. FIG. 64 is a host communication display for facilitating communication between the gateway and the acquirer payment host. The IP Address Field 6410 contains the Internet Protocol address for communicating via TCP/IP to the Internet. The TCP logical port field 6430 uniquely identifies the port for accessing the Internet, and the SAVE field 6430 invokes storing of the host communication information in the database. FIG. 65 is a Services display in accordance with a preferred embodiment. This display initiates portions of the

```
gwDBRC CGW_Engine::Gwdb_UpdateSetMsgResponseInfo()
}
EXEC SQL BEGIN DECLARE SECTION;
    // Key.
    char    *h_xid            =&(m_setKeyFields.xid[0]);
    long    h_rrpidBase       =m_setKeyFields.rrpidBase;
    int     h_retryCount      =m_setKeyFields.retryCount;
    // Columns to update.
    char    h_responseTime[26];
    int     h_responseClass       =(int)m_setResponseClass;
    int     h_responseDisposition =(int) m_setResponseDisposition;
    char    *h_responseCode   =m_setResponseCode;
EXEC SQL END DECLARE SE_ON;
    static char    *funcName = "Gwdb_UpdateSetMsgResponseInfo";
    gwDBRC dbrc;
    GW_MakeDateString(h_responseTime,&m_setResponseTime);
    EXEC SQL UPDATE setmsg SET
    responsetime = TO_DATE(:h_responseTime,'DY MON DD HH24:MI:SS YYYY'),
        responseclass = :h_responseClass,
        responsedisposition = :h_responseDisposition,
        responsecode = :h_responseCode
    WHERE
        xid = :h_xid AND
        rrpidbase = :h_rrpidBase AND
        retrycount = :h_retryCount;
    dbrc = DbError(funcName);
    (void) Db_Commit(funcName);
    return (dbrc);
}
```

Figure 62:
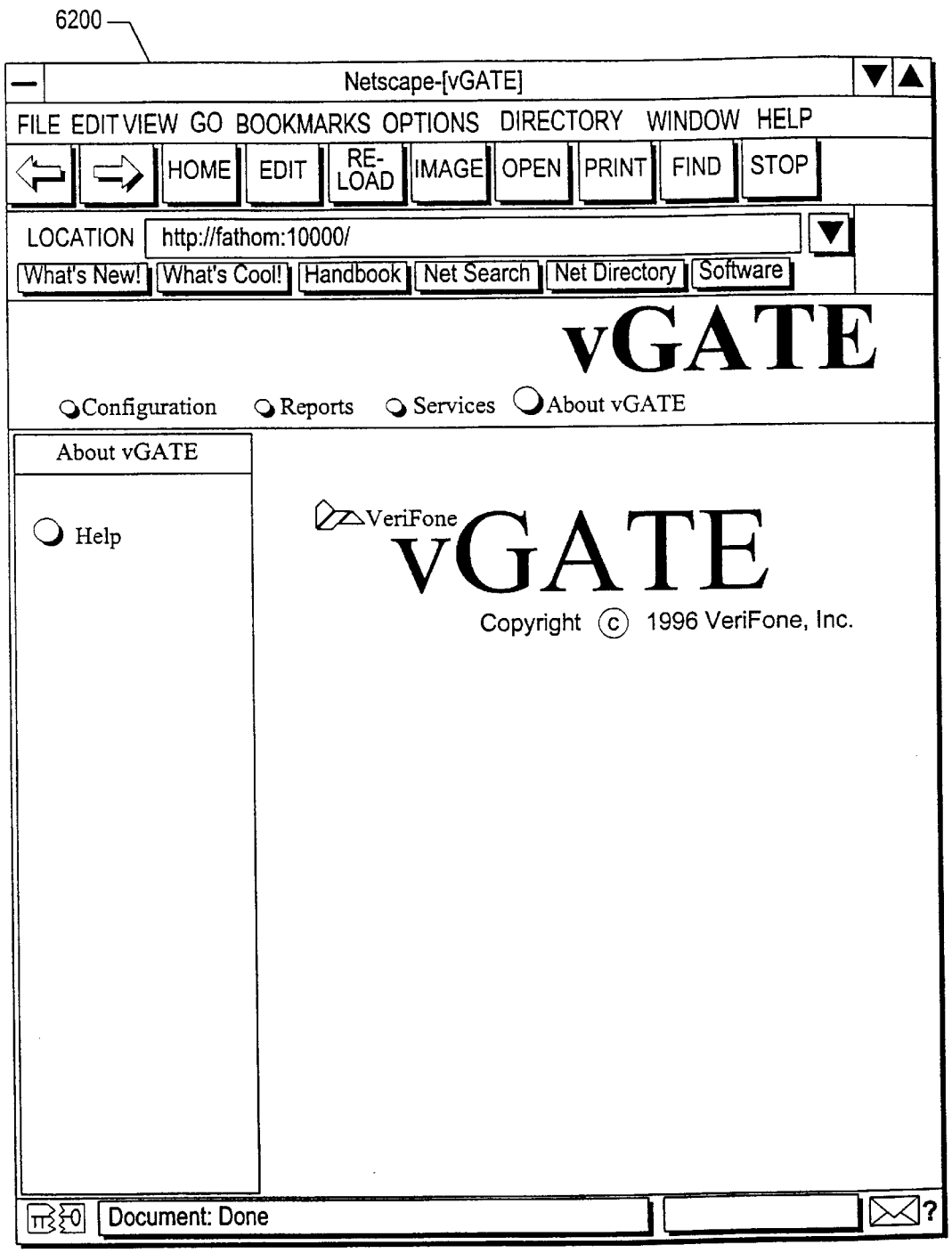
FIG. 62 is the main administration display for the Gateway in accordance with a preferred embodiment.
Figure 63:
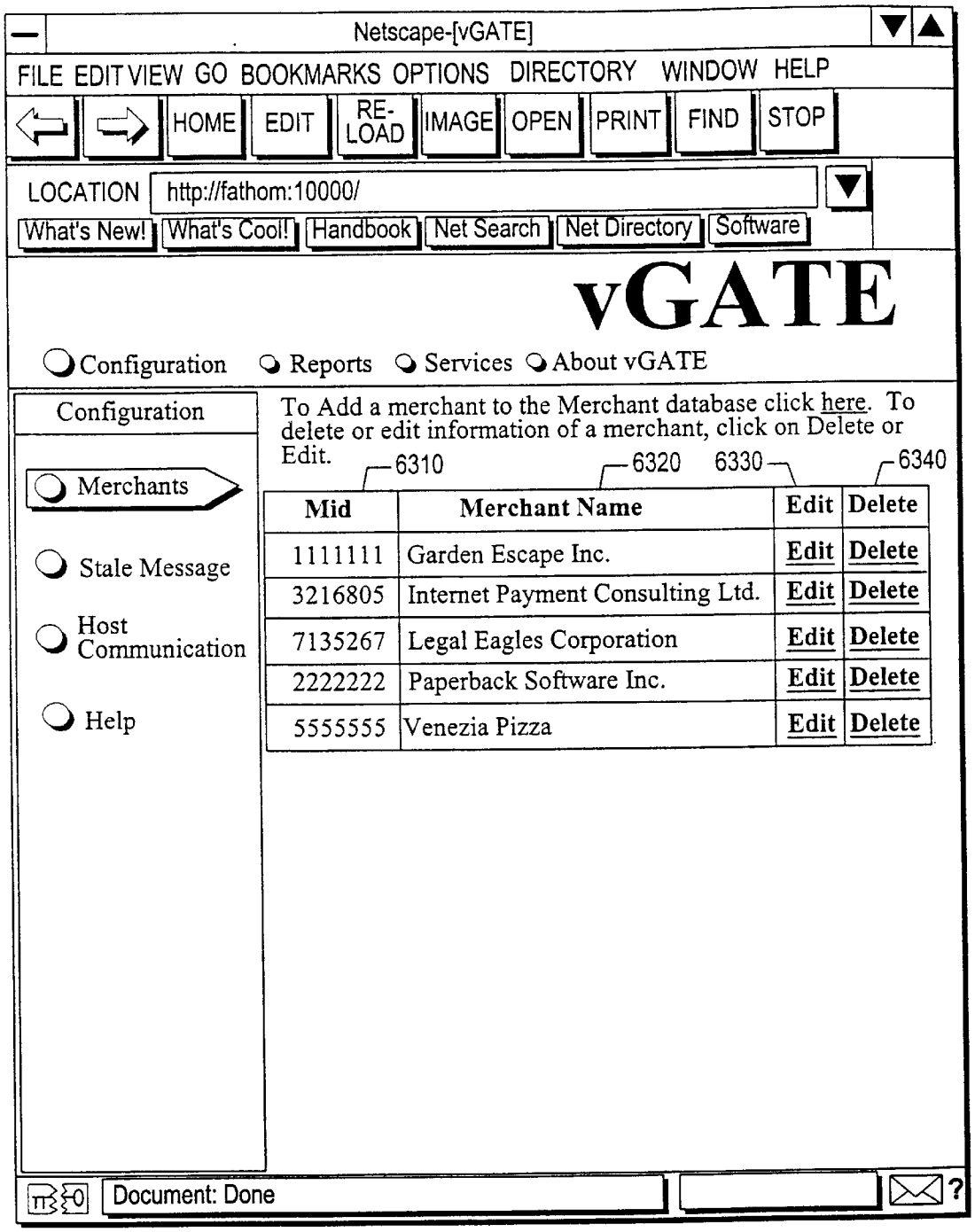
FIG. 63 is a configuration panel in accordance with a preferred embodiment.
Figure 66:
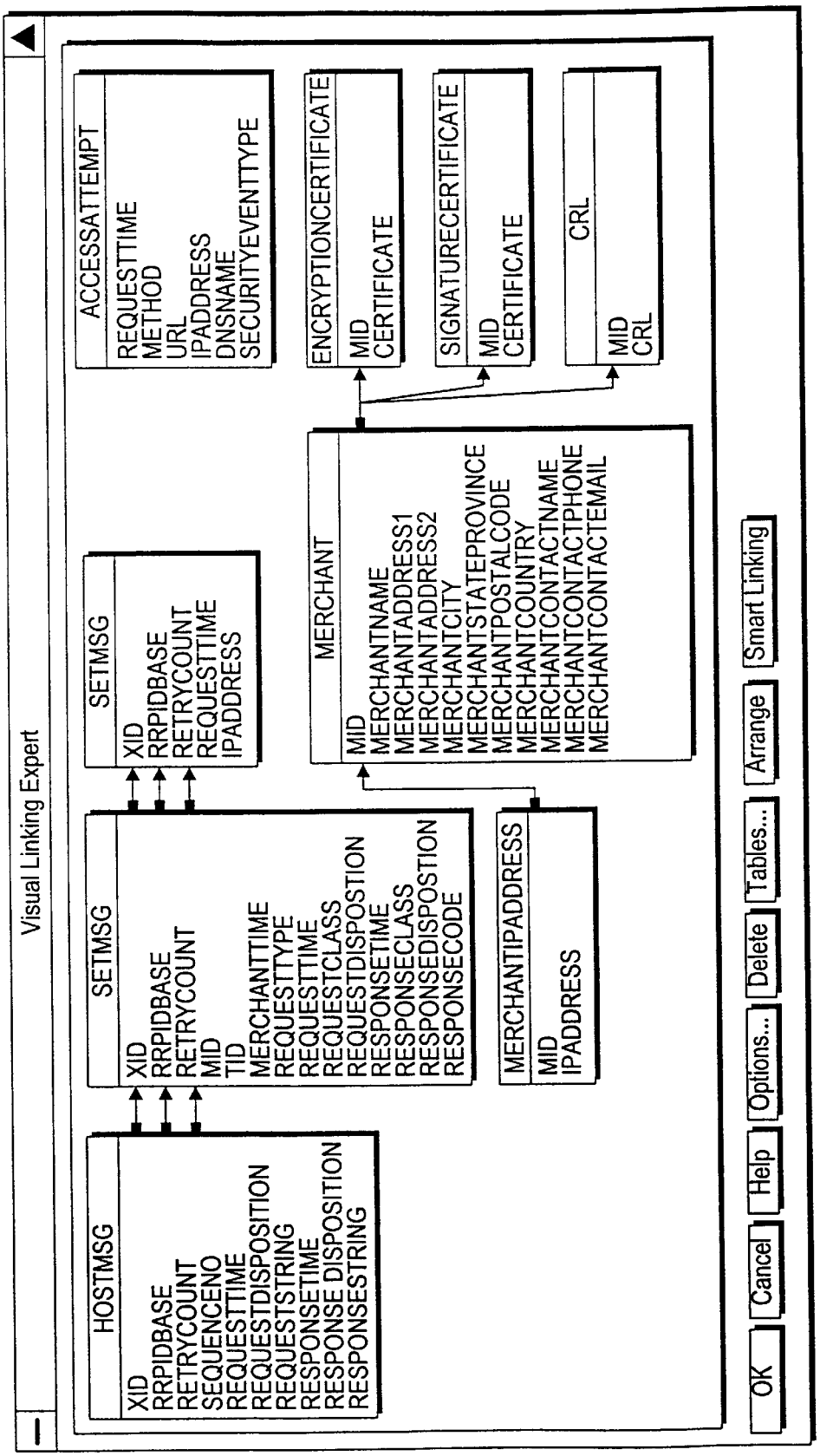
FIG. 66 is a graphical representation of the gateway transaction database in accordance with a preferred embodiment.

FIG. 62 is the main administration display for the Gateway in accordance with a preferred embodiment. A set of menu selections are presented at 6200 which will be described in more detail for each display. FIG. 63 is a configuration panel in accordance with a preferred embodiment. The configuration panel provides access to management information database for configuring a gateway management information database. The Merchant Identifier (Mid) 6310 is a thirty character, alphanumeric field that uniquely defines a merchant. The Merchant Name 6320 is a fifty character, alphanumeric field, the Edit 6330 and Delete field 6340 are Gateway such as the host mulitplixer 2130 of FIG. 21. FIG. 66 is a graphical representation of the gateway transaction database in accordance with a preferred embodiment. Each of the fields represents a portion of the internet database schema in accordance with a preferred embodiment.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for communicating between a server and a payment gateway, comprising the steps of:
   (a) receiving data into the server, the server processing data for two or more storefronts, each storefront corresponding to a particular merchant;
   (b) parsing the data and determining which of the two or more merchants is associated with the data;
   (c) generating a formatted transaction in accordance with a predefined syntax;
   (d) encrypting the formatted transaction using digital credentials associated with the merchant associated with the data;
   (e) establishing a communication link between the server and the payment gateway; and
   (f) transmitting the encrypted transaction across the communication link from the server to the payment gateway.

2. The method of claim 1, including the step of formatting the transaction in accordance with a secure electronic protocol.

3. The method of claim 1, wherein the communication link operates under the HTTP protocol.

4. The method of claim 1, wherein the transaction is formatted as a MIME-encapsulated PKCS-7 message.

5. The method of claim 1, wherein the digital credentials are public key certificates.

6. The method of claim 1, wherein the digital credentials are passwords sent over a secure communication link.

7. The method of claim 1, wherein digital credentials are selected dynamically based on a transaction type.

8. The method of claim 1, wherein digital credentials are selected dynamically based on a payment instrument associated with the data.

9. An apparatus for communicating between a server and a payment gateway, comprising:
   (a) means for receiving data into the server, the server processing data for two or more storefronts, each storefront corresponding to a particular merchant;
   (b) means for parsing the data and determining which of the two or more merchants is associated with the data;
   (c) means for generating a formatted transaction in accordance with a predefined syntax;
   (d) means for encrypting the formatted transaction using digital credentials associated with the merchant associated with the data;
   (e) means for establishing a communication link between the server and the payment gateway; and
   (f) means for transmitting the encrypted transaction across the communication link from the server to the payment gateway.

10. The apparatus of claim 9, including means for formatting the transaction in accordance with a secure electronic protocol.

11. The apparatus of claim 9, wherein the communication link operates under the HTTP protocol.

12. The apparatus of claim 9, wherein the transaction is formatted as a MIME-encapsulated PKCS-7 message.

13. The apparatus of claim 9, wherein the digital credentials are public key certificates.

14. The apparatus of claim 9, wherein the digital credentials are passwords sent over a secure communication link.

15. The apparatus of claim 9, wherein digital credentials are selected dynamically based on a transaction type.

16. The apparatus of claim 9, wherein digital credentials are selected dynamically based on a payment instrument associated with the data.

17. A computer program embodied on a computer-readable medium for communicating between a server and a payment gateway, comprising:
   (a) a code segment for receiving data into the server, the server processing data for two or more storefronts, each storefront corresponding to a particular merchant;
   (b) a code segment for parsing the data and determining which of the two or more merchants is associated with the data;
   (c) a code segment for generating a formatted transaction in accordance with a predefined syntax;
   (d) a code segment for encrypting the formatted transaction using digital credentials associated with the merchant associated with the data;
   (e) a code segment for establishing a communication link between the server and the payment gateway; and
   (f) a code segment for transmitting the encrypted transaction across the communication link from the server to the payment gateway.

18. The computer program of claim 17, including a code segment for formatting the transaction in accordance with a secure electronic protocol.

19. The computer program of claim 17, wherein the communication link operates under the HTTP protocol.

20. The computer program of claim 17, wherein the transaction is formatted as a MIME-encapsulated PKCS-7 message.

21. The computer program of claim 17, wherein the digital credentials are public key certificates.

22. The computer program of claim 17, wherein the digital credentials are passwords sent over a secure communication link.

23. The computer program of claim 17, wherein digital credentials are selected dynamically based on a transaction type.

24. The computer program of claim 17, wherein digital credentials are selected dynamically based on a payment instrument associated with the data.

* * * * *